US010033702B2

(12) United States Patent
Ford et al.

(10) Patent No.: US 10,033,702 B2
(45) Date of Patent: *Jul. 24, 2018

(54) SYSTEMS AND METHODS OF SECURE DATA EXCHANGE

(71) Applicant: Intralinks, Inc., New York, NY (US)

(72) Inventors: Christopher Todd Ford, Boston, MA (US); Mayank Choudhary, Shrewsbury, MA (US); Kevin L. McCarthy, Arlington, MA (US); Anupam Miharia, Winchester, MA (US); John William Giudice, Lexington, MA (US); Kiran Kumar Tadakamalla, Wakefield, MA (US); Cole Parker Mercer, Portland, OR (US); Peter Wenzel, Pasadena, CA (US); Paul Teamen, Seattle, WA (US); Clement Cazalot, Boston, MA (US); Salil J. Darji, Quincy, MA (US); Jonathan Gorin, Forest Hills, NY (US)

(73) Assignee: Intralinks, Inc., New York, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/975,728

(22) Filed: Dec. 19, 2015

(65) Prior Publication Data
US 2017/0041296 A1 Feb. 9, 2017

Related U.S. Application Data

(60) Provisional application No. 62/201,420, filed on Aug. 5, 2015, provisional application No. 62/202,494, filed
(Continued)

(51) Int. Cl.
H04L 29/06 (2006.01)
G06F 17/30 (2006.01)
(Continued)

(52) U.S. Cl.
CPC .... *H04L 63/0421* (2013.01); *G06F 17/30864* (2013.01); *H04L 63/083* (2013.01);
(Continued)

(58) Field of Classification Search
CPC . H04L 63/0421; H04L 63/083; H04L 63/102; H04L 2463/082; G06F 17/30864; H04W 12/06; H04W 12/02
See application file for complete search history.

(56) References Cited

U.S. PATENT DOCUMENTS 5,537,618 A 7/1996 Boulton et al.
5,630,159 A 5/1997 Zancho
(Continued)

FOREIGN PATENT DOCUMENTS

EP 1320010 A2 6/2003
JP 2002318802 A 10/2002
(Continued)

OTHER PUBLICATIONS

"Audit trail", From Wikipedia, https://en.wikipedia.org/wiki/Audit_trail (accessed on Mar. 2017), 2017, 2 pages.
(Continued)

*Primary Examiner* — Yonas Bayou
(74) *Attorney, Agent, or Firm* — Moser Taboada

(57) ABSTRACT

In embodiments of the present invention, improved secure exchange system features include a federated search facility, hybrid encryption management (adjustable encryption key management), anonymous IRM, disassembled storage of data as chunks rather than files, asynchronous notification process/integrated file upload and messaging, an identity facility, multi-factor authentication, dynamic access authorization, and various enhancements to a customizable exchange system.

13 Claims, 87 Drawing Sheets

Related U.S. Application Data on Aug. 7, 2015, provisional application No. 62/206,987, filed on Aug. 19, 2015.

(51) Int. Cl.
*H04W 12/06* (2009.01)
*H04W 12/02* (2009.01)

(52) U.S. Cl.
CPC .......... *H04W 12/06* (2013.01); *H04L 63/102* (2013.01); *H04L 2463/082* (2013.01); *H04W 12/02* (2013.01)

(56) References Cited

U.S. PATENT DOCUMENTS

| | | |
|---|---|---|
| 5,630,169 A | 5/1997 | Jackson |
| 5,694,596 A | 12/1997 | Campbell |
| 5,721,827 A | 2/1998 | Logan et al. |
| 5,764,906 A | 6/1998 | Edelstein et al. |
| 5,771,355 A | 6/1998 | Kuzma |
| 5,781,901 A | 7/1998 | Kuzma |
| 5,790,790 A | 8/1998 | Smith et al. |
| 5,813,009 A | 9/1998 | Johnson et al. |
| 5,815,665 A | 9/1998 | Teper et al. |
| 5,898,780 A | 4/1999 | Liu et al. |
| 5,903,723 A | 5/1999 | Beck et al. |
| 5,915,019 A | 6/1999 | Ginter et al. |
| 5,923,756 A | 7/1999 | Shambroom |
| 5,937,405 A | 8/1999 | Campbell |
| 5,961,590 A | 10/1999 | Mendez et al. |
| 6,029,146 A | 2/2000 | Hawkins et al. |
| 6,088,722 A | 7/2000 | Herz et al. |
| 6,092,114 A | 7/2000 | Shaffer et al. |
| 6,112,181 A | 8/2000 | Shear et al. |
| 6,148,342 A | 11/2000 | Ho |
| 6,192,407 B1 | 2/2001 | Smith et al. |
| 6,223,177 B1 | 4/2001 | Tatham et al. |
| 6,233,608 B1 | 5/2001 | Laursen et al. |
| 6,253,326 B1 | 6/2001 | Lincke et al. |
| 6,266,692 B1 | 7/2001 | Greenstein |
| 6,370,575 B1 | 4/2002 | Dougherty et al. |
| 6,374,653 B1 | 4/2002 | Gokcebay et al. |
| 6,385,644 B1 | 5/2002 | Devine et al. |
| 6,385,655 B1 | 5/2002 | Smith et al. |
| 6,397,261 B1 | 5/2002 | Eldridge et al. |
| 6,415,321 B1 | 7/2002 | Gleichauf et al. |
| 6,421,678 B2 | 7/2002 | Smiga et al. |
| 6,430,601 B1 | 8/2002 | Eldridge et al. |
| 6,442,571 B1 | 8/2002 | Haff et al. |
| 6,453,348 B1 | 9/2002 | Barnier et al. |
| 6,457,040 B1 | 9/2002 | Mizuhara et al. |
| 6,487,557 B1 | 11/2002 | Nagatomo |
| 6,493,760 B1 | 12/2002 | Pendlebury et al. |
| 6,515,988 B1 | 2/2003 | Eldridge et al. |
| 6,529,956 B1 | 3/2003 | Smith et al. |
| 6,539,419 B2 | 3/2003 | Johnstone et al. |
| 6,591,291 B1 | 7/2003 | Gabber et al. |
| 6,672,506 B2 | 1/2004 | Swartz et al. |
| 6,678,698 B2 | 1/2004 | Fredell et al. |
| 6,718,367 B1 | 4/2004 | Ayyadurai |
| 6,738,981 B1 | 5/2004 | Tönnby et al. |
| 6,816,906 B1 | 11/2004 | Icken et al. |
| 6,839,850 B1 | 1/2005 | Campbell et al. |
| 6,889,208 B1 | 5/2005 | Okabe et al. |
| 6,898,636 B1 | 5/2005 | Adams et al. |
| 6,904,449 B1 | 6/2005 | Quinones |
| 6,941,285 B2 | 9/2005 | Sarcanin |
| 7,085,800 B2 | 8/2006 | Abbott et al. |
| 7,124,101 B1 | 10/2006 | Mikurak et al. |
| 7,140,035 B1 | 11/2006 | Karch |
| 7,143,175 B2 | 11/2006 | Adams et al. |
| 7,146,367 B2 | 12/2006 | Shutt |
| 7,168,094 B1 | 1/2007 | Fredell |
| 7,225,157 B2 | 5/2007 | Howard et al. |
| 7,225,256 B2 | 5/2007 | Villavicencio et al. |
| 7,231,426 B1 | 6/2007 | Hall et al. |
| 7,233,992 B1 | 6/2007 | Muldoon et al. |
| 7,237,188 B1 | 6/2007 | Leung |
| 7,266,840 B2 | 9/2007 | Gruber et al. |
| 7,275,158 B2 | 9/2007 | Akama |
| 7,296,058 B2 | 11/2007 | Throop |
| 7,302,634 B2 | 11/2007 | Lucovsky et al. |
| 7,328,276 B2 | 2/2008 | Alisuag et al. |
| 7,349,912 B2 | 3/2008 | Delany et al. |
| 7,366,900 B2 | 4/2008 | Shambroom |
| 7,440,959 B2 | 10/2008 | Elzbieta et al. |
| 7,467,142 B2 | 12/2008 | Sinn et al. |
| 7,496,353 B2 | 2/2009 | Odinak |
| 7,496,750 B2 | 2/2009 | Kumar et al. |
| 7,509,490 B1 | 3/2009 | Hsu et al. |
| 7,536,439 B1 | 5/2009 | Jaladanki et al. |
| 7,552,470 B2 | 6/2009 | Dominic |
| 7,567,977 B1 * | 7/2009 | White .................... G06Q 10/10 |
| 7,580,988 B2 | 8/2009 | Rudd |
| 7,587,504 B2 | 9/2009 | Adams et al. |
| 7,644,022 B2 | 1/2010 | Kavanaugh |
| 7,644,163 B2 | 1/2010 | Gustafsson |
| 7,752,269 B2 | 7/2010 | Schreuder et al. |
| 7,761,507 B2 | 7/2010 | Herf et al. |
| 7,809,126 B2 | 10/2010 | Marascio et al. |
| 7,814,537 B2 | 10/2010 | Fredell |
| 7,966,388 B1 | 6/2011 | Pugaczewski et al. |
| 8,037,298 B2 | 10/2011 | Finlay |
| 8,307,119 B2 | 11/2012 | Rochelle et al. |
| 8,311,946 B1 | 11/2012 | Warnock et al. |
| 8,325,625 B2 | 12/2012 | Nair et al. |
| 8,386,799 B2 | 2/2013 | Kim et al. |
| 8,411,562 B2 | 4/2013 | Chia et al. |
| 8,505,075 B2 | 8/2013 | Jevans et al. |
| 8,549,300 B1 | 10/2013 | Kumar et al. |
| 8,554,932 B1 | 10/2013 | Lee et al. |
| 8,571,971 B1 | 10/2013 | Brown et al. |
| 8,639,215 B2 | 1/2014 | McGregor et al. |
| 8,639,625 B1 | 1/2014 | Ginter et al. |
| 8,751,793 B2 | 6/2014 | Ginter et al. |
| 8,756,250 B2 * | 6/2014 | Unger ............... G06F 17/30867 705/3 |
| 8,756,977 B2 * | 6/2014 | Ramadas ................. F16T 1/48 702/183 |
| 8,787,579 B2 | 7/2014 | Roberts et al. |
| 8,959,612 B2 | 2/2015 | DeBaille et al. |
| 8,965,784 B2 | 2/2015 | Postrel |
| 9,002,018 B2 | 4/2015 | Wilkins et al. |
| 9,049,051 B2 | 6/2015 | Didcock et al. |
| 9,069,436 B1 | 6/2015 | Fieweger et al. |
| 9,070,112 B2 | 6/2015 | Glover |
| 9,143,530 B2 | 9/2015 | Qureshi et al. |
| 9,148,417 B2 | 9/2015 | Fieweger et al. |
| 9,152,577 B2 * | 10/2015 | Rodgers ............... H04N 19/423 |
| 9,229,607 B2 * | 1/2016 | Powers ................ G06F 3/0484 |
| 9,235,681 B2 | 1/2016 | Smith |
| 9,251,086 B2 | 2/2016 | Peterson et al. |
| 9,251,360 B2 | 2/2016 | Meyer et al. |
| 9,253,176 B2 | 2/2016 | Ford et al. |
| 9,275,363 B2 * | 3/2016 | Maleeny ................ G06Q 10/10 |
| 9,313,196 B2 | 4/2016 | Pritchard, Jr. |
| 9,369,454 B2 | 6/2016 | Porzio et al. |
| 9,369,455 B2 | 6/2016 | Huang et al. |
| 9,397,998 B2 | 7/2016 | Ford et al. |
| 9,514,327 B2 | 12/2016 | Ford |
| 9,547,770 B2 | 1/2017 | Meyer et al. |
| 9,553,860 B2 | 1/2017 | Meyer |
| 2001/0020274 A1 | 9/2001 | Shambroom |
| 2001/0027477 A1 | 10/2001 | Nakamura et al. |
| 2001/0028364 A1 | 10/2001 | Fredell et al. |
| 2002/0007330 A1 | 1/2002 | Kumar et al. |
| 2002/0016910 A1 * | 2/2002 | Wright .................. G06F 21/10 713/150 |
| 2002/0026592 A1 | 2/2002 | Gavrila et al. |
| 2002/0035697 A1 | 3/2002 | McCurdy et al. |
| 2002/0042829 A1 | 4/2002 | Mizuhara et al. |
| 2002/0095499 A1 | 7/2002 | Barnett et al. |
| 2002/0099837 A1 | 7/2002 | Oe et al. |
| 2002/0112240 A1 | 8/2002 | Bacso et al. |

(56) References Cited

U.S. PATENT DOCUMENTS

| | | |
|---|---|---|
| 2002/0123924 A1 | 9/2002 | Cruz |
| 2002/0138582 A1 | 9/2002 | Chandra et al. |
| 2002/0138744 A1 | 9/2002 | Schleicher et al. |
| 2002/0156695 A1 | 10/2002 | Edwards |
| 2002/0162005 A1 | 10/2002 | Ueda et al. |
| 2002/0162027 A1 | 10/2002 | Itwaru |
| 2002/0184191 A1 | 12/2002 | Marpe et al. |
| 2002/0194049 A1* | 12/2002 | Boyd ................... G06Q 10/109 709/204 |
| 2002/0194394 A1 | 12/2002 | Chan |
| 2003/0014270 A1 | 1/2003 | Qureshi et al. |
| 2003/0046313 A1 | 3/2003 | Leung et al. |
| 2003/0065917 A1 | 4/2003 | Medvinsky et al. |
| 2003/0074580 A1 | 4/2003 | Knouse et al. |
| 2003/0097410 A1 | 5/2003 | Atkins et al. |
| 2003/0105734 A1 | 6/2003 | Hitchen et al. |
| 2003/0105764 A1 | 6/2003 | Kageyama et al. |
| 2003/0105862 A1 | 6/2003 | Villavicencio et al. |
| 2003/0105978 A1 | 6/2003 | Byrne |
| 2003/0115481 A1 | 6/2003 | Baird et al. |
| 2003/0126215 A1 | 7/2003 | Udell et al. |
| 2003/0172296 A1 | 9/2003 | Gunter |
| 2003/0188200 A1 | 10/2003 | Paquin et al. |
| 2003/0189592 A1 | 10/2003 | Boresjo |
| 2003/0217127 A1 | 11/2003 | Sinn et al. |
| 2003/0221102 A1 | 11/2003 | Jakobsson et al. |
| 2003/0221124 A1 | 11/2003 | Curran et al. |
| 2003/0225763 A1 | 12/2003 | Guilak et al. |
| 2003/0225796 A1 | 12/2003 | Matsubara |
| 2003/0226105 A1 | 12/2003 | Waldau |
| 2003/0229900 A1 | 12/2003 | Reisman |
| 2004/0006594 A1 | 1/2004 | Boyer et al. |
| 2004/0010791 A1 | 1/2004 | Jain et al. |
| 2004/0024616 A1 | 2/2004 | Spector et al. |
| 2004/0025052 A1 | 2/2004 | Dickenson et al. |
| 2004/0034646 A1 | 2/2004 | Kimball et al. |
| 2004/0049730 A1 | 3/2004 | Ishizaka et al. |
| 2004/0054790 A1 | 3/2004 | Himmel et al. |
| 2004/0103202 A1 | 5/2004 | Hildebrand et al. |
| 2004/0133775 A1 | 7/2004 | Callas et al. |
| 2004/0153472 A1 | 8/2004 | Rieffanaugh et al. |
| 2004/0210772 A1 | 10/2004 | Hooker et al. |
| 2004/0221118 A1 | 11/2004 | Slater et al. |
| 2004/0229199 A1 | 11/2004 | Ashley et al. |
| 2004/0230820 A1 | 11/2004 | Hui Hsu et al. |
| 2004/0255137 A1 | 12/2004 | Ying et al. |
| 2004/0267762 A1 | 12/2004 | Tunning et al. |
| 2004/0268451 A1 | 12/2004 | Robbin et al. |
| 2005/0018858 A1 | 1/2005 | John et al. |
| 2005/0060572 A1 | 3/2005 | Kung et al. |
| 2005/0060584 A1 | 3/2005 | Ginter et al. |
| 2005/0060643 A1 | 3/2005 | Glass et al. |
| 2005/0091077 A1 | 4/2005 | Reynolds |
| 2005/0102534 A1 | 5/2005 | Wong |
| 2005/0108283 A1 | 5/2005 | Karimisetty et al. |
| 2005/0114661 A1 | 5/2005 | Cheng et al. |
| 2005/0138110 A1 | 6/2005 | Redlich et al. |
| 2005/0160065 A1 | 7/2005 | Seeman |
| 2005/0187972 A1 | 8/2005 | Kruger et al. |
| 2005/0193009 A1 | 9/2005 | Reinhardt et al. |
| 2005/0193043 A1 | 9/2005 | Hoover |
| 2005/0195975 A1 | 9/2005 | Kawakita et al. |
| 2005/0231738 A1 | 10/2005 | Huff et al. |
| 2005/0240572 A1 | 10/2005 | Sung et al. |
| 2006/0031412 A1 | 2/2006 | Adams et al. |
| 2006/0047752 A1 | 3/2006 | Hornby |
| 2006/0048099 A1 | 3/2006 | Templin et al. |
| 2006/0053280 A1 | 3/2006 | Kittle et al. |
| 2006/0064434 A1 | 3/2006 | Gilbert et al. |
| 2006/0075028 A1 | 4/2006 | Zager et al. |
| 2006/0136417 A1 | 6/2006 | Avinash et al. |
| 2006/0143447 A1 | 6/2006 | Vasishth et al. |
| 2006/0206622 A1 | 9/2006 | Noble et al. |
| 2007/0056046 A1 | 3/2007 | Claudatos et al. |
| 2007/0073831 A1 | 3/2007 | Oscherov et al. |
| 2007/0079137 A1 | 4/2007 | Tu |
| 2007/0083615 A1 | 4/2007 | Hollebeek et al. |
| 2007/0088846 A1 | 4/2007 | Adams et al. |
| 2007/0118889 A1 | 5/2007 | Fredell |
| 2007/0136814 A1 | 6/2007 | Lee et al. |
| 2007/0185875 A1 | 8/2007 | Chang et al. |
| 2007/0266104 A1 | 11/2007 | Bolf et al. |
| 2008/0068519 A1 | 3/2008 | Adler et al. |
| 2008/0120196 A1 | 5/2008 | Reed et al. |
| 2008/0134175 A1 | 6/2008 | Fitzgerald et al. |
| 2008/0178278 A1 | 7/2008 | Grinstein et al. |
| 2008/0196092 A1 | 8/2008 | Benschop et al. |
| 2008/0201299 A1 | 8/2008 | Lehikoinen et al. |
| 2008/0215979 A1 | 9/2008 | Clifton et al. |
| 2008/0294899 A1 | 11/2008 | Gazzetta et al. |
| 2009/0012869 A1 | 1/2009 | Henkin et al. |
| 2009/0100060 A1 | 4/2009 | Livnat et al. |
| 2009/0172795 A1 | 7/2009 | Ritari et al. |
| 2009/0183001 A1 | 7/2009 | Lu et al. |
| 2009/0204580 A1 | 8/2009 | Seamon et al. |
| 2009/0222535 A1 | 9/2009 | Ni et al. |
| 2009/0259838 A1 | 10/2009 | Lin |
| 2009/0282469 A1 | 11/2009 | Lynch et al. |
| 2009/0319781 A1 | 12/2009 | Byrum et al. |
| 2009/0327729 A1 | 12/2009 | Rhodes et al. |
| 2009/0327739 A1 | 12/2009 | Relyea et al. |
| 2009/0328171 A1 | 12/2009 | Bayus et al. |
| 2010/0005520 A1 | 1/2010 | Abbot et al. |
| 2010/0042846 A1 | 2/2010 | Trotter et al. |
| 2010/0064354 A1 | 3/2010 | Irvine et al. |
| 2010/0115586 A1 | 5/2010 | Raghavan et al. |
| 2010/0138671 A1* | 6/2010 | Kim ........................ G06F 21/10 713/189 |
| 2010/0138797 A1 | 6/2010 | Thorn |
| 2010/0161424 A1 | 6/2010 | Sylvain |
| 2010/0161961 A1 | 6/2010 | Beigelman et al. |
| 2010/0306670 A1 | 12/2010 | Quinn et al. |
| 2010/0325710 A1 | 12/2010 | Etchegoyen |
| 2010/0333116 A1 | 12/2010 | Prahlad et al. |
| 2011/0022836 A1 | 1/2011 | Murphy et al. |
| 2011/0029666 A1 | 2/2011 | Lopatecki et al. |
| 2011/0047080 A1 | 2/2011 | Im et al. |
| 2011/0082794 A1* | 4/2011 | Blechman ............. G06F 19/328 705/50 |
| 2011/0087603 A1 | 4/2011 | Garcia et al. |
| 2011/0093471 A1 | 4/2011 | Brockway et al. |
| 2011/0154506 A1 | 6/2011 | O'Sullivan et al. |
| 2011/0173443 A1 | 7/2011 | Osterwalder et al. |
| 2011/0184998 A1 | 7/2011 | Palahnuk et al. |
| 2011/0202756 A1 | 8/2011 | West et al. |
| 2011/0289574 A1 | 11/2011 | Hull et al. |
| 2011/0296440 A1 | 12/2011 | Laurich et al. |
| 2011/0307947 A1 | 12/2011 | Kariv et al. |
| 2012/0030187 A1 | 2/2012 | Marano et al. |
| 2012/0066349 A1 | 3/2012 | Trotter et al. |
| 2012/0084544 A1 | 4/2012 | Farina et al. |
| 2012/0084566 A1 | 4/2012 | Chin et al. |
| 2012/0089481 A1 | 4/2012 | Iozzia et al. |
| 2012/0144195 A1 | 6/2012 | Nair et al. |
| 2012/0198030 A1* | 8/2012 | Wang ...................... H04L 67/02 709/219 |
| 2012/0204032 A1* | 8/2012 | Wilkins ................. H04L 9/006 713/170 |
| 2012/0226462 A1 | 9/2012 | Rucker |
| 2012/0233019 A1 | 9/2012 | Hwang et al. |
| 2012/0284802 A1 | 11/2012 | Hierro et al. |
| 2012/0291142 A1 | 11/2012 | Seleznev et al. |
| 2012/0297468 A1 | 11/2012 | Bharadwaj et al. |
| 2012/0317414 A1 | 12/2012 | Glover et al. |
| 2012/0317613 A1 | 12/2012 | Kim et al. |
| 2013/0007298 A1 | 1/2013 | Ramaswamy et al. |
| 2013/0013912 A1 | 1/2013 | Rung et al. |
| 2013/0031155 A1 | 1/2013 | Terrano et al. |
| 2013/0036302 A1 | 2/2013 | Lord et al. |
| 2013/0054514 A1 | 2/2013 | Barrett-Kahn |
| 2013/0054917 A1 | 2/2013 | Ludwig et al. |
| 2013/0060661 A1 | 3/2013 | Block et al. |
| 2013/0117218 A1 | 5/2013 | Fan et al. |
| 2013/0173530 A1 | 7/2013 | Laron |

(56) References Cited

U.S. PATENT DOCUMENTS

| | | | |
|---|---|---|---|
| 2013/0254699 A1 | 9/2013 | Bashir et al. | |
| 2013/0268677 A1 | 10/2013 | Marshall et al. | |
| 2013/0311769 A1 | 11/2013 | Hayes | |
| 2013/0318589 A1 | 11/2013 | Ford et al. | |
| 2013/0332811 A1 | 12/2013 | Chang et al. | |
| 2013/0346491 A1 | 12/2013 | Margolin et al. | |
| 2014/0047560 A1 | 2/2014 | Meyer et al. | |
| 2014/0053001 A1* | 2/2014 | Rodgers | H04N 19/423 713/193 |
| 2014/0143831 A1 | 5/2014 | Fieweger | |
| 2014/0165148 A1 | 6/2014 | Dabbiere et al. | |
| 2014/0165213 A1 | 6/2014 | Stuntebeck | |
| 2014/0189483 A1 | 7/2014 | Awan et al. | |
| 2014/0189818 A1 | 7/2014 | Meyer | |
| 2014/0235179 A1 | 8/2014 | George et al. | |
| 2014/0245015 A1 | 8/2014 | Velamoor et al. | |
| 2014/0245381 A1 | 8/2014 | Stuntebeck et al. | |
| 2014/0304836 A1 | 10/2014 | Velamoor et al. | |
| 2015/0135300 A1 | 5/2015 | Ford | |
| 2015/0163206 A1 | 6/2015 | McCarthy et al. | |
| 2015/0222625 A1 | 8/2015 | Ford et al. | |
| 2015/0254360 A1 | 9/2015 | Fieweger et al. | |
| 2015/0310188 A1 | 10/2015 | Ford et al. | |
| 2015/0358308 A1 | 12/2015 | Huang et al. | |
| 2015/0381599 A1 | 12/2015 | Porzio et al. | |
| 2016/0085978 A1 | 3/2016 | Meyer et al. | |
| 2016/0105825 A1* | 4/2016 | Hedberg | H04L 63/0407 370/331 |
| 2016/0255071 A1 | 9/2016 | Huang et al. | |
| 2016/0285838 A1 | 9/2016 | Ford et al. | |
| 2016/0373425 A1 | 12/2016 | Porzio et al. | |
| 2017/0046807 A1 | 2/2017 | Ford | |

FOREIGN PATENT DOCUMENTS

| | | |
|---|---|---|
| JP | 2007156800 A | 6/2007 |
| JP | 2011186849 A | 9/2011 |
| JP | 2012221274 A | 11/2012 |
| KR | 1020110031428 A | 3/2011 |
| KR | 1020120108942 A | 10/2012 |
| WO | 2007086015 A2 | 8/2007 |
| WO | 2009143286 A1 | 11/2009 |
| WO | 2009158531 A2 | 12/2009 |
| WO | 2011160855 A1 | 12/2011 |
| WO | 2012050367 A2 | 4/2012 |
| WO | 2012070935 A1 | 5/2012 |
| WO | 2012134682 A1 | 10/2012 |
| WO | 2013103959 A2 | 7/2013 |
| WO | 2013163625 A1 | 10/2013 |
| WO | 2014025809 A1 | 2/2014 |
| WO | 2014063030 A1 | 4/2014 |
| WO | 2014063030 A9 | 9/2014 |
| WO | 2014152025 A2 | 9/2014 |
| WO | 2014152025 A3 | 11/2014 |
| WO | 2014185832 A1 | 11/2014 |
| WO | 2015051017 A1 | 4/2015 |
| WO | 2015073708 A1 | 5/2015 |
| WO | 2015089171 A1 | 6/2015 |
| WO | 2015164521 A1 | 10/2015 |

OTHER PUBLICATIONS

"Cimage Content Lifecycle Management", available at: http://web.archive.org/web/20010205074400/www.cimage.com/products/e31index.html, retrieved on Sep. 23, 2001, 1 page.
"Doculogic Press Release", available at: www.archivesystems.com/pressroom/press_doculogic.asp, retrieved on Apr. 11, 2000, 2 pages.
"DocuTouch Features", available at : http://web.archive.org/web/20011218003617/www.docutouch.com/dt_productfeatures.html, retrived on Dec. 17, 2001, 2 pages.
"FilesOnTheNet.com Product Specifications", available at: http://webarchive.org/web/20000914181459/www.filesonthenet.com/FOTNProdSoecs.PDF, retrieved on Sep. 14, 2000, 4 pages.
"Net Documents Overview", available at: http://web.archive.org/web/20010822083155/www.netdocuments.com/main.asp?l1=5&12=1&13=510, retrieved on Jul. 6, 2001, 1 page.
"Secure Documents", https://web.archive.org/web/20140413184245/http://www.doctrackr.com/secure-documents/ [retrieved on Jul. 29, 2015], 46 Pages.
"Setting Sharing Permission for Google Docs and Google Sites Content", Retrieved from the Internet: URL:https://web.archive.org/web/2011 0813124252/http:/1www.library.kent.edu/files/SMS_Google_Sharing_Permissions.pdf [retrieved on Jun. 7, 2016], Aug. 13, 2011, 8 pages.
Backer, Andreas et al., "DocMan: A Document Management System for Cooperation Support", Proceedings of the Twenty-Ninth Hawaii International Conference on System Science, vol. 3, Jan. 3-6, 1996, pp. 82-91.
Baker, Dixie B. et al., "PCASSO: a design for secure communication of personal health information via the Internet", International Journal of Medical Informatics, vol. 54, 1999, pp. 97-104.
Barker, Brian , "How the Internet Will Revolutionize M&A", M&A Today, vol. 8, No. 9, Sep. 1999, 4 pages.
Braun, T. et al., "Virtual Private Network Architecture", Apr. 1999, pp. 1-31.
Chan, M. C. et al., "Customer Management and Control of Broadband VPN Services", Integrated Network Management, 1997, 14 pages.
Crispo, Bruno et al., "Reasoning about Accountability within Delegation", Accessed from: https://www.researchgate.net/publication/220738991_Reasoning_about_Accountability_within_Delegation, 2001, 2001, 13 pages.
Datta, Anupam , "(MURI-08) Collaborative Policies and Assured Information Sharing", Air Force Research Laboratory AD Office of Scientific Research (AFOSR)/RSL, Arlington, VA 22203, report AFRL-OSR-VA-TR-2013-0495, 2013, 5 pages.
Divya, S. et al., "Scalable and Competent Aduit Service of Storage Data in Clouds Retaining IHT", International Journal of Scientific & Engineering Research, vol. 7, iss. 6, Jun. 2016, pp. 322-327.
Florian, Markus et al., "Trustworthy Evidence Gathering Mechanism for Multilayer Cloud Compliance", The 8th International Conference for Internet Technology and Secured Transactions (ICITST-2013), London, UK, Dec. 9, 2013-Dec. 12, 2013, pp. 529-530.
Giles, David E. , "Modelling the Tax Compliance Profiles of New Zealand Firms: Evidence from Audit Records" Chapter 12 of Taxation and the Limits of Government, Kluwer Academic Publishers, G. W. Scully et al. (eds.), 2000, pp. 243-269.
Heames, R. N. et al., "Data Accountability in Cloud Using Reliable Log Files Forwarding", Proceedings of the 2013 International Conference on Information Communication and Embedded Systems, 2013, Feb. 2013, 6 pages.
Jaeger, Paul T. et al., "Cloud Computing and Information Policy: Computing in a Policy Cloud", https://www.umiacs.umd.edu/~jimmylin/publications/Jaeger_etal_2008.pdf (accessed Mar. 24, 2017), 2008, 35 pages.
Juric, Matjaz B. et al., "Oracle BPEL Process Manager", Chapter 4 in Business Process Execution Language for Web Services, 2006, pp. 1-73.
Kartheek, K et al., "Secure Data Storage and Log Records Using JAR, AES", International Journal of Computer Science and Information Technologies, vol. 5, No. 6, 2014, pp. 6942-6945.
Kent, Karen et al., "Guide to Computer Security Log Management", Recommendations of the National Institute of Standards and Technology (NIST), NIST Special Publication 800-92, 2014, 72 pages.
Kiniry, Joseph et al., "A Hands-on Look at Java Mobile Agents", IEEE Internet Computing, vol. 1, iss. 4, Jul.-Aug. 1997, pp. 21-30.
Latham, Donald C. , "Trust Computer System Evaluation Criteria", Orange Book, 1985, p. 1-116.
Mandal, Sanjeev K. et al., "Enhanced Security Framework to Ensure Data Security in Cloud Using Security Blanket Algorithm", IJRET: International Journal of Research in Engineering and Technology, vol. 02, No. 10, Oct. 2013, pp. 225-229.
Meng, Fanxing et al., "The Research of Network Database Security Technology based on WebService", International Conference on Graphic and Image Processing (ICGIP 2012), Proc. of SPIE vol.

(56) References Cited

OTHER PUBLICATIONS 8768, (downloaded from: http://proceedings.spiedigitallibrary.org on Mar. 2, 2017), 2012, 87685J-1 to 87685J6.
Netscape Extranet Standards, , "Overview of Extranet Standards: Extending the Networked Enterprise", http://web.archive.org/web/1999021894752/http://sitesearch.netscape.com/products/whitepaper/extranetstds.html, 1999, 5 pages.
Nisbet, Euan , "Cinderella science", Nature, vol. 450, No. 6, Dec. 6, 2007, pp. 789-790.
PCT/US2013/038533, , "International Application Serial No. PCT/US2013/038533, International Preliminary Report on Patentability With Written Opinion dated Nov. 6, 2014", Intralinks, Inc., 19 Pages.
PCT/US2013/038533, , "International Application Serial No. PCT/US2013/038533, International Search Report and Written Opinion dated Aug. 23, 2013", Interest Intralinks, Inc., 23 pages.
PCT/US2013/053835, , International Application Serial No. PCT/US2013/053835, International Preliminary Report on Patentability With Written Opinion dated Feb. 19, 2015, Intralinks, Inc, 10 Pages.
PCT/US2013/053835, , "International Application Serial No. PCT/US2013/053835, International Search Report and Written Opinion dated Nov. 27, 2013", Intralinks, Inc., 13 Pages.
PCT/US2013/065646, , "International Application Serial No. PCT/US2013/065646, International Preliminary Report on Patentability and Written Opinion dated Apr. 30, 2015", Intralinks, Inc., 10 Pages.
PCT/US2013/065646, , "International Application Serial No. PCT/US2013/065646, International Search Report and Written Opinion dated Feb. 10, 2014", Intralinks, Inc., 14 Pages.
PCT/US2014/026830, , "International Application Serial No. PCT/US2014/026830, International Preliminary Report on Patentability and Written Opinion dated Sep. 24, 2015", Intralinks, Inc., 14 Pages.
PCT/US2014/026830, , "International Application Serial No. PCT/US2014/026830, International Search Report and Written Opinion dated Sep. 17, 2014", Intralinks, Inc., 18 Pages.
PCT/US2014/058665, , "International Application Serial No. PCT/US2014/058665, International Search Report and Written Opinion dated Dec. 17, 2014", Intralinks, Inc., 11 Pages.
PCT/US2014/065521, , "International Application Serial No. PCT/US2014/065521, International Preliminary Report on Patentability and Written Opinion dated May 26, 2016", Intralinks, Inc., 13 Pages.
PCT/US2014/065521, , "International Application Serial. No. PCT/US2014/065521, International Search Report and Written Opinion dated Feb. 25, 2015", Intralinks, Inc., 17 Pages.
PCT/US2014/069519, , "International Application Serial No. PCT/US2014/069519, International Search Report and Written Opinion dated Feb. 24, 2015", Intralinks, Inc., 9 Pages.
PCT/US2014/069519, , "International Application Serial No. PCT/US2014/069519, International Preliminary Report on Patentability and Written Opinion dated Jun. 23, 2016", Intralinks, Inc., 6 Pages.
PCT/US2015/027131, , "International Application Serial No. PCT/US2015/027131, International Preliminary Report on Patentability and Written Opinion dated Nov. 3, 2016", Intralinks, Inc., 8 Pages.
PCT/US2015/027131, , "International Application Serial No. PCT/US2015/027131, International Search Report and Written Opinion dated Sep. 1, 2015", Intralinks, Inc., 11 pages.
Punitha, R. et al., "Data Storage Security in Cloud by Using JAR Files and Hierarchical ID-based Cryptography", International Journal of Advanced Research in Computer Engineering & Technology (IJARCET), vol. 2, Iss. 1, Jan. 2013, pp. 91-96.
Schimm, Guido , "Process Miner—A Tool for Mining Process Schemes from Event-Based Data", JELIA 2002, LNAI 2424, Springer-Verlag Berlin Heidelberg, S. Flesca et al. (Eds.), 2002, pp. 525-528.
Sundareswaran, Smitha et al., "Ensuring Distributed Accountability for Data Sharing in the Cloud", http://web.mst.edu/~lindan/publication/accountability_TDSC_final.pdf (accessed Mar. 24, 2017), 2012, pp. 1-14.
Viljamaa, Antti et al., "Java and Internet Security", University of Helsinki Department of Computer Science, Finland, 1998, 33 pages.
Wallach, Dan S. , "A New Approach to Mobile Code Security ", A Dissertation Presented to the Faculty of Princeton University in Candidacy for the Degree of Doctor of Philosophy, Jan. 1999, 185 pages.
Wang, Cong et al., "Privacy-Preserving Public Auditing for Secure Cloud Storage", IEEE Transactions on Computers, vol. 62, No. 2, Feb. 2013, pp. 362-375

\* cited by examiner

Fig. 2

SECURE EXCHANGE SYSTEM 102

| COLLABORATIVE CONTENT FACILITY 282 | FAIR SHARE QUEUING FACILITY 284 | OFFLINE FILE ACCESS FACILITY 286 | LOC-BASED FILE ACCESS FACILITY 280 |
| --- | --- | --- | --- |
| SPREDSHEET VIEWER FACILITY 292 | EMAIL EFFECTIVITY FACILITY 294 | CROSS-ENTERPRISE FACILITY 296 | MULTI-FACTOR AUTH FACILITY 201 |
| CONFIGURABLE PASSWORD FACILITY 203 | CLIENT ARCHIVING FACILITY 205 | CLIENT KEY HOSTING FACILITY 207 | VM-DRM FACILITY 209 |
| E-DISCOVERY FACILITY 211 | INTERACTIONS PLAYBACK FACILITY 213 | TIME-DELAY FILE DELETION FACILITY 215 | WATERMARKING FACILITY 217 |
| RULES-BASED WORKFLOW FACILITY 219 | DELIVERY OF SERVICE FACILITY 221 | PROTECTED DRIVE FACILITY 223 | VIRTUAL DRIVE FACILITY 225 |
| REVISION TIMELINE FACILITY 227 | 3D VIEWING FACILITY 229 | METADATA SHARING FACILITY 231 | SECURE STORAGE FACILITY 233 |
| COMMENT NOTIFY FACILITY 235 | DYNAMIC ENTITLEMENT 239 | ACTION CHECKING FACILITY 241 | SECURE MOBILE DEVICE FACILITY 243 |
| WORKSTREAM SYNC FACILITY 247 | CONTEXTUAL SHARING FACILITY 249 | CONTENT ACCESS MANAGEMENT FACILITY 251 | SECURE ENTERPRISE CONTENT PORTAL 255 |

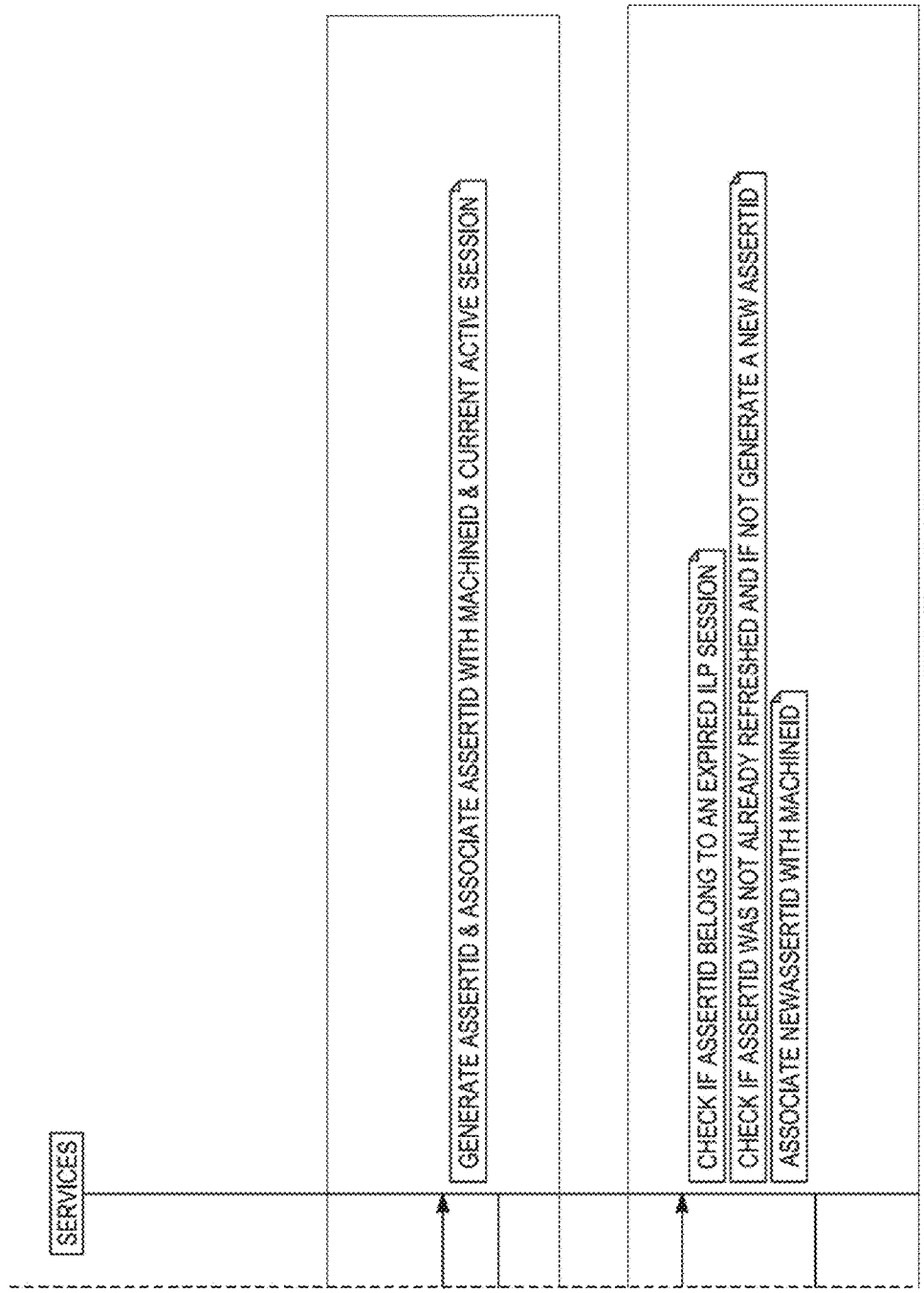

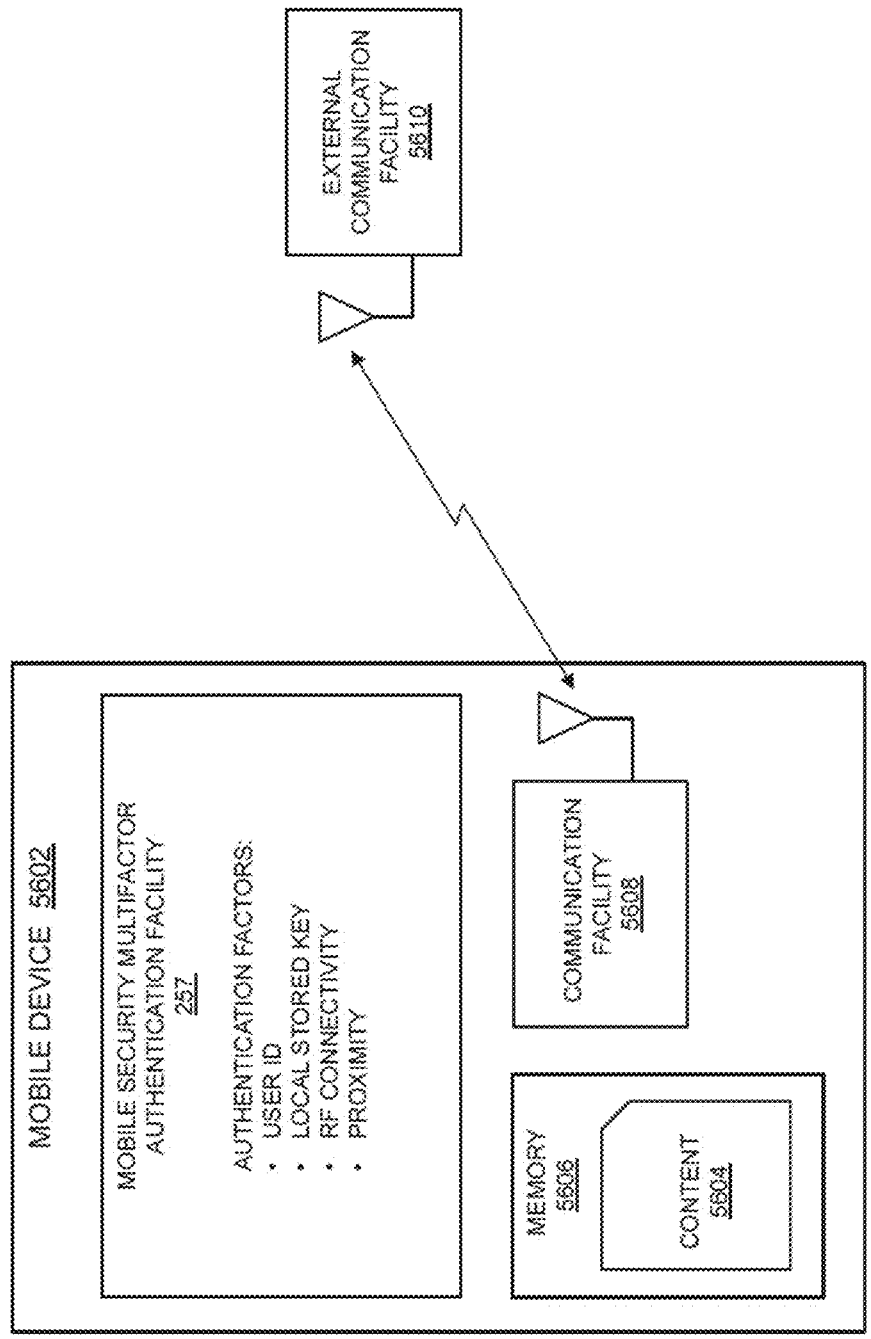

SYSTEMS AND METHODS OF SECURE DATA EXCHANGE

CROSS-REFERENCE TO RELATED APPLICATIONS

This application claims the benefit of the following provisional applications, each of which is hereby incorporated by reference in its entirety: U.S. Patent Application Ser. No. 62/201,420 filed Aug. 5, 2015, U.S. Patent Application Ser. No. 62/202,494 filed Aug. 7, 2015, and U.S. Patent Application Ser. No. 62/206,987 filed Aug. 19, 2015.

FIELD OF THE INVENTION

The present invention relates to networked secure content, and more particularly to collaboration of networked secure content.

BACKGROUND

Despite the availability of the Internet, there is still no entirely satisfactory way for people at different companies or other entities to have the benefits of private network security, such as for file sharing or collaborative work between enterprises on a daily basis and for ad hoc alliances, i.e., different sets of entities coming together to function as one mega or meta entity, for the duration of some particular project. In such cases, the time and expense of actually wiring a network between two or more companies or other entities and agreeing on one common software package or standard presents a barrier to conventional network solutions. In addition, any new process for the sharing of content has in the past generally required the user to adopt new workflow components, applications, and habits that tend to be disruptive to the user's normal day-to-day workflow routine, e.g. when working internal to their enterprise and with personal use. Simply using the Internet remains imperfectly secure for the sharing of confidential information without some pre-arranged secure encryption processes has been cumbersome and unproductive, especially in today's increasing use of personal devices being incorporated into the workflow. Further, secure storage and sharing of content across diverse storage facilities makes it difficult to meet requirements for tracking content, such as for maintaining the ability to access all versions of a document, to all users with a copy of a document, and the like. There is a need for such systems and for users to utilize the systems in such a way that does not force them to adopt new infrastructure, software, and business and personal processes in their daily workflow in order to achieve a shared and potentially secure extended work environment.

Thus, there are still yet-unsolved problems associated with different groups of companies or other entities to sharing securely over an expanding global network environment.

SUMMARY

The present disclosure describes methods and systems relating to a federated search facility, hybrid encryption management (adjustable encryption key management), anonymous IRM, disassembled storage of data as chunks rather than files, asynchronous notification process/integrated file upload and messaging, an identity facility, multi-factor authentication, dynamic access authorization, and various enhancements to a customizable exchange system.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 2 depicts functions of a host server in an embodiment of an exemplary secure exchange service.

FIGS. 2A-B depict additional functions of a host server in an embodiment of a secure exchange service.

FIG. 14A depicts a functional block diagram for an exemplary email effectivity facility in an embodiment of the present invention, showing a case where an identical email address does not have entitlement to a data file.

FIGS. 48A-B, 49A-B, 50, 51A-B, and 52 depict DRM authentication service flow diagrams.

FIG. 56 depicts an embodiment of multifactor authentication on a mobile device.

Figure 1A:
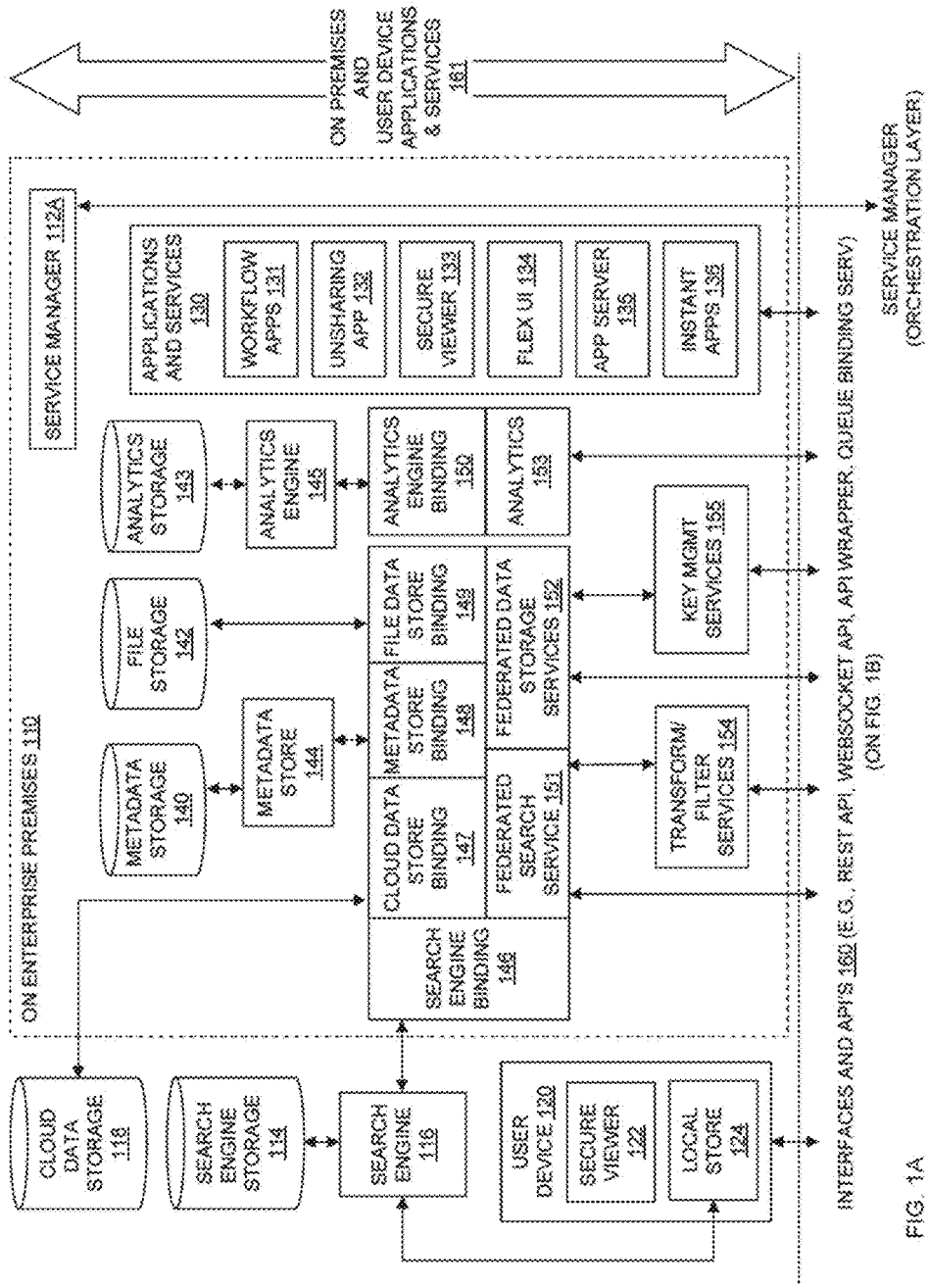
FIGS. 1A-1B depict a top-level block diagram of an exemplary secure exchange service.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Secure Exchange System

The present disclosure describes a secure exchange system (alternatively referred to as an 'exchange', 'exchange platform', 'exchange service' or 'data exchange system' throughout this disclosure) where many types of communications are required between different parties that are associating for a temporary transaction or project, but as competitors or for other reasons are not suitable for a permanent communication network (such as an intranet or enterprise network, such as a LAN or WAN) as might be used for a single government agency, single corporation, or other single enterprise or institution. Transaction projects involving financial transactions and projects involving complex legal agreements (such as mergers, acquisitions, and the like) are situations in the which the methods and systems described herein are particularly suitable; however, these are not necessarily the only sort of projects appropriate, as any project in which parties need to share confidential information across entities, outside the boundaries of the network of a single entity, may benefit from the methods and systems described herein, including litigation or other disputes. In embodiments, the secure exchange system may be implemented as a large, multi-tenant, enterprise-scalable, global orchestration of work, such as organized into work streams with work products, where the secure exchange system is hosted by an intermediate organizational entity accessible by a plurality of other independent organizational entities.

In an example, transactions within the banking industry may provide a situation where a secure exchange service may be particularly applicable, where ad hoc syndicates are formed under the leadership of one or more lead banks to permit a number of agent or associate banks to participate in a major loan to a borrower. Such loans have become more common and may involve loans in excess of one billion dollars. Syndication of such large loans is used since any one bank is not prepared to lend such a large amount to a single customer. Conventionally, proposed terms of a loan are negotiated between the borrower and the lead banks, each in consultation with its advisors such as legal counsel, public-relations consultants, accountants and insurance carriers. In some instances, some advisors may be in-house advisors as employees of a given entity and thus constitute an internal team. However, the advisors in many instances may be independently associated with external entities such as law firms or major accounting firms, and thus constitute either external teams or combinations of the above. The lead bank(s) negotiates with the borrower to arrive at terms and conditions for the loan, such as the interest rate, repayment schedule, security and the bank's fee for processing and syndicating the loan. The lead bank may agree to underwrite the entire loan in which case the lead bank uses syndication to create sub-loans between it and other banks to raise the funds for the loan. All of these transactions require management of voluminous amounts of documentation, most of which is confidential and whose disclosure could result in huge damages to the borrower or lenders. Thus, it would be desirable to provide an exchange as described herein which enables secure document transmission between users over a global communication network without requiring the users to communicate in advance to establish an encryption method. In this example, the exchange service may provide a suitable level of security with respect to each of the shared transactions, among companies that commonly may be vigorous competitors, with numerous confidential documents that the companies do not want uncontrollably shared among other members of the loan-project group or accessible by outsiders generally. Substantially secure communications is particularly of the utmost concern to all parties to a syndicated loan transaction: the borrower, the lead bank, and the associate banks. A virtual network system provided through the exchange may readily provide substantial security to ensure that information and communications among all the various parties are secure.

In embodiments, the exchange may enable electronic transmission and reception of confidential documents over a global communication network such as the Internet for distributing electronic documents containing sensitive information or data to selected entities, for notifying intended recipients of the availability of such documents, for tracking access, downloading and uploading of such documents, and the like.

In embodiments, the exchange may only be accessed by authorized computers using an acceptable log-in procedure, including user name and password. Communications within the exchange may establish a communication session based upon a selected security protocol, and thereafter messages are transmitted between using such secure encryption. Communications may be exchanged via a secure encrypted communication session using a selected encryption protocol, and may deny access if a secure session cannot be established at a desired secure level.

In embodiments, the exchange may provide a fully provisioned, turnkey service for users, where once the user's enterprise has established an account through the exchange, documents in electronic form may be uploaded to the secure site maintained through the exchange host server, where a variety of secure collaborative communications options may be chosen including document storage, e-mail, video broadcasting, video conferencing, white boarding, and the like, to augment and manage interactive access to the documents, including a user graphical interface for managing user interactions with one or more exchanges.

In embodiments, the exchange may provide one or more secure sites for placing documents and messages to be transmitted over a secure virtual network and may allow authorized users to read or edit messages according to their level of authorization. Any documents that are edited may be immediately available on the system so that other persons involved in the exchange have access to the edited or modified documents immediately. In addition, the exchange may provide tracking of each document to allow selected users to see who has had access to the messages and documents and who has modified or edited any of the documents. Content and communications shared amongst a group may be included in a work stream, where the work stream may be focused on or associated with a particular topic, task, project, event, and the like. Content and communications may also be presented to users based on activity, thus creating an activity stream that shows users what is active, such as in a work stream, within a group of work steams, and the like. In this way, the activity-based work stream provides a location were a user might go to see what is active in one or more work streams, exchanges, and the like.

In embodiments, the exchange may provide a centralized firewall that may be employed to protect confidential information so that no unauthorized access to such information occurs. A firewall, such as may be effectively used for corporate intranets, may be applied in each exchange. Groups of users, such as on a virtual network, may be treated like a remote corporate office and restricted by firewall protocols from uncontrollable access to the information from other users. In addition, if needed, respective inter-user firewalls may be established to prevent one user from accessing information in the host site of another user. The exchange may be particularly suitable for communication among multiple unrelated groups of users, since a centralized firewall management may simplify the logistics of each user having to separately provide secure access through their own respective enterprise firewalls. In such a centralized management architecture, the host management entity, as opposed to each respective user, may conveniently process server access security data. Similarly, system backup and recovery may be better handled by a centralized backup and recovery system through the host management entity, as opposed to such recovery tasks being separately handled at a multiplicity of enterprise sites.

In embodiments, a plurality of exchange service users of the secure exchange system may exchange data, such as documents, messages, data, and the like, between a secure host server and a plurality of user computers across a network (e.g. the Internet) in a secure manner such as only accessed by authorized user computers using an acceptable log-in procedure. In embodiments, the user computers may interface with the network through a network server, a mail server, and the like, and in association with an enterprise intranet, where a firewall is present between the user computer and the network, and where the exchange is conducted between the user computers and the host computer through a secure exchange across the network and through the network server, mail server, and the like. In another embodiment, the user computers may interact in the exchange with the secure exchange system across the network while away from or in the absence of the enterprise intranet and enterprise firewall. For instance, the user may be able to access the exchange while at home, such as using a mobile enterprise computer, a personally owned computer, a mobile device, and the like.

In embodiments, the exchange host server may be distributed over a plurality of server computers, and therefore the host server may be viewed as one of such multiple servers. In this way, the server computers may work together to provide essentially seamless access to a large number of users on various platforms with varying communications speeds. The server computers may run under server management software which in turn may be responsible for coordination of services, maintaining state and system status, monitoring, security, and other administrative functions. In embodiments, a user computer having a suitable Web browser may directly access the host server, where the exchange may not need to provide each user with subscriber application software, such as including software modules for access, activation, viewing, communications, and the like, relative to the exchange service.

In embodiments, whenever an exchange of data is initiated, such as by a document being received at the host server connected to a host database, the host server may extract the address of the intended recipient and create a notification to the recipient(s) of the existence of the data at the host server. The notification may contain the URL for the host server. However, the recipient may not be able to access the message unless the recipient is authorized to use the system, such as the recipient needing to be a registered user and have an assigned password to access the data, or other repository at the host server where data is stored, such as on a user database. If the intended recipient is granted access to the host server, the recipient may then locate the message intended for them by browsing through all messages to which the recipient has been granted access.

While the notification sent to the intended recipient may be sent using standard Internet protocol without encryption, once the user computer contacts the host server, the server may establish a secure encrypted communication session using a selected encryption protocol. The host server may deny access if a secure session cannot be established at a desired secure level, such as 128-bit encryption.

In embodiments, exchange services for different users may utilize separate software structured server databases. For example, company 'A' and company 'B' may use the secure exchange system, but each company's data may be maintained in separate databases, although perhaps in the same physical data storage facility. This feature offers the advantage of allowing the facilities of the secure exchange system to be customized for each company. For example, when the external user accesses the secure exchange system, the secure exchange system may recognize the user and associate the user with a particular one of the companies A and B. Using this recognition, the secure exchange system may present a customized browser interface which makes the secure exchange system look like it is operated by or branded for the selected company. To the external user, it may appear that they have been connected directly to the company server rather than the secure exchange system. Thus, the present invention may allow a user to securely send data such that the network connection is substantially transparent to the user. Further, the system may provide customization for each of a plurality of different users such that an external user accessing the secure exchange system may appear to be connected to an internal client server.

Figure 1B:
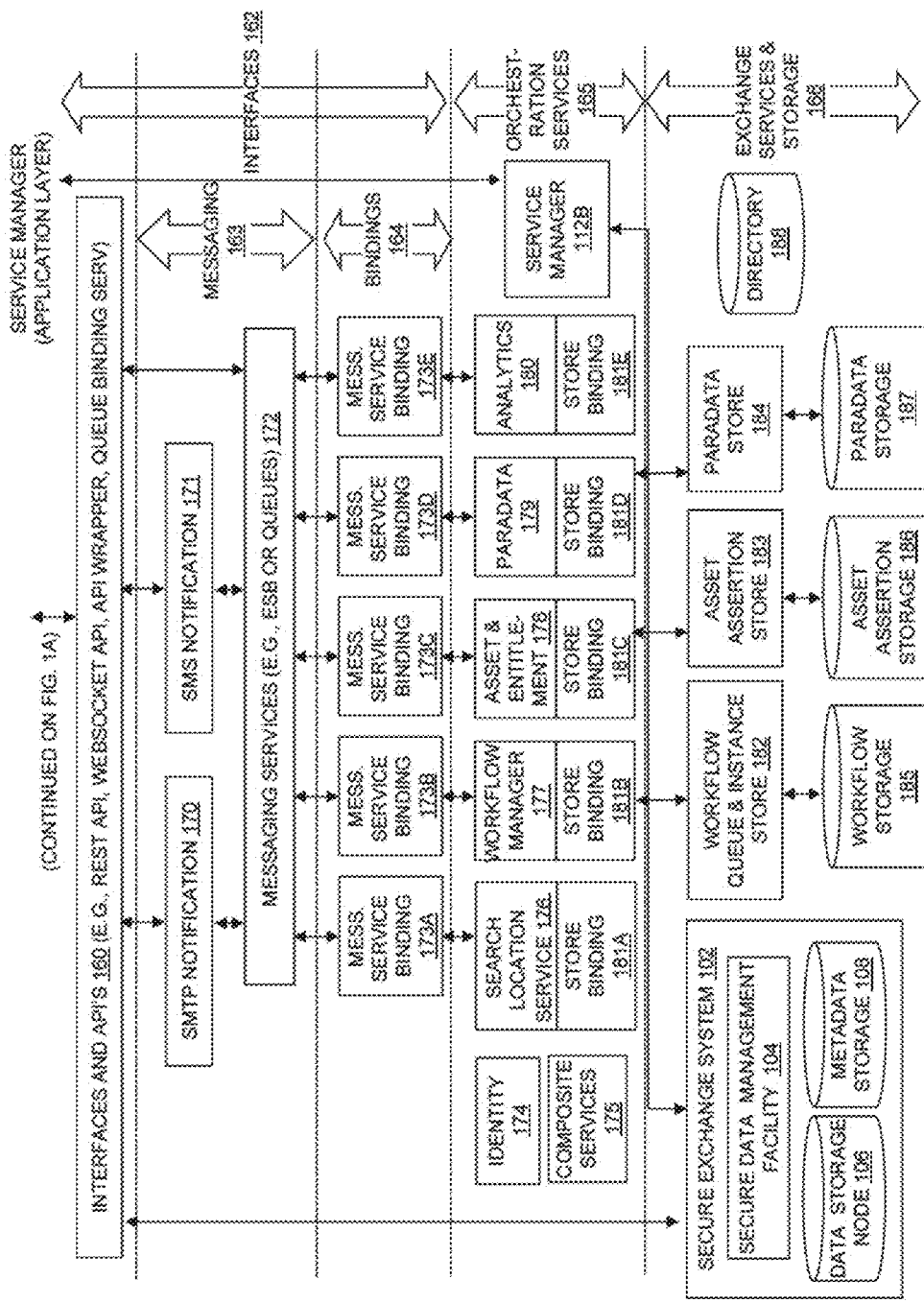

In embodiments, the secure exchange system may be organized as a centrally hosted secure computer system, a distributed hosted secure computer system, and the like, accessible by a plurality of organizational entities. The secure exchange system may be organized as a customizable hybrid system to accommodate the needs of organizational entities. In embodiments, data stored by the plurality of organizational entities may be at least in part centrally stored, stored at least in part in distributed locations, stored at least in part on the premises of the organizational entity, and the like. FIGS. 1A and 1B depict an embodiment secure exchange system with functional elements enabling a hybrid system having available both centralized and distributed storage capabilities, each enabled with secure exchange system capabilities. The embodiment is not meant to be interpreted as limiting in any way, but to be illustrative of the capabilities of the secure exchange system as described more fully in this disclosure. For example, the secure exchange system may include a centralized secure exchange system 102 that provides centralized management of the secure exchange of content with user devices 120 (including mobile devices like smart phones and tablets), on-enterprise premises 110 resources (such as enterprise file systems, data stores, and metadata stores), and the like. The secure exchange system 102 may include a secure data management facility 104, data storage node 106, metadata storage 108, and the like, to provide secure data exchange services to the enterprise site, user devices inside or outside the enterprise firewall, and the like.

As depicted in embodiments shown in FIGS. 1A-1B and 1C-1D, and as described in this disclosure, the secure exchange system may comprise a customizable secure exchange system that is at least in part modularized, with one or more of the modules, services and/or capabilities depicted in these figures being encapsulated in one or more secure envelopes (e.g., where security extends beyond a centralized hosted secure server, out into the cloud computing space, as part of an enterprise computing resource inside the enterprise firewall, or the like), and/or provided for use to business entities in a location other than the secure host server, such as one or a combination of on-site at a business entity, on a secure cloud service, on a commercial cloud service, distributed across a geographic area, in a location local to the business entity, provided through distributed hosting, and the like. This architecture may provide a highly scalable platform upon which business process applications that use the data and metadata that is exchanged and stored via the secure exchange system can be built. Further, the functionality provided in secure exchange system embodiments such as described herein may be modularized to enable the business entity to select basic services, building blocks, components, toolkits, and the like in building their own secure collaboration and sharing facility that is adapted to meet the needs of the business entity and its business units and users, such for a specific business market in which the business entity operates, a project the business entity is working with, a partnered collaboration between business entities, and the like.

In embodiments, certain modules of the secure exchange system may be at least in part located on enterprise premises 110 to provide on premises and user device applications and services 161, such as client-side customer managed keys, community facility, amendment voting, electronic signature facility, dashboard facility, email-in facility, viewer facility, playback of interactions, buyer interest index, mobile device interface, sharing and un-sharing facilities, content access management, time-based file detection, watermarking, question and answer management, single sign-on, un-authenticated document exchange, metadata synchronization facility, filing sharing activity, collaboration management facility, geo-tagging facility, secure collaborative content, fair share queuing, location based file access, multi-factor authorization, configurable password, client archiving, offline file access, spreadsheet viewer, virtual machine and container digital rights management facility, email effectivity facility, e-discovery facility, a rules-based workflow management facility, protected drive facility, virtual drive facility, revision timeline facility, collections user interface, 3D viewing facility, metadata sharing facility, comment notification facility, cross-enterprise collaboration facility, action checking, secure mobile device environment, workstream synchronization, contextual sharing facility, study space and electronic investigator site files, managing access to content through digital rights management, dynamic entitlement management, key management in a secure content environment, collaborative customer relation management, IP address and domain rule based access restriction, and the like. For example, various applications and services 130 may be provided (e.g., various workflow applications 131 for accomplishing a wide range of business functions (e.g., human resources, accounting, research and development, product management, transaction management, and many others), sharing and un-sharing applications 132 as described throughout this disclosure, user interface applications (such as a flexible user interface 134 and/or a secure viewer 133 or other interface as described elsewhere in this disclosure), application server functionality 135, instant applications 136 as described elsewhere in this disclosure, and a wide range of other applications and services of the type typically used by a business entity).

In the embodiment depicted in FIGS. 1A and 1B, a range of interfaces 162 (which may include various bindings 164 and messaging 163 capabilities) each may be adapted to enable exchange of messages, data, metadata and the like with a particular service, engine, module, function, application or the like on the enterprise premises system 110, at the intermediate host's secure exchange system 102, on a user device 120, by orchestration services 165, or in some other location, such as in a cloud storage system 118. The interfaces 160 may include application programming interfaces (APIs), such as REST APIs, websocket APIs, APIs for wrappers and containers and the like, as well as other elements, such as queue binding services, message brokers, bridges, gateways, sockets and the like.

Among other things, the interfaces allow secure interfacing with orchestration services 165 as described in more detail elsewhere in this disclosure, which, among other things, allow the secure exchange system to enable, orchestrate, track and report on activities of users of various business entities involving secure exchange of data among them, without the need for the host of the secure exchange system to have access to the data itself. These orchestration services 165 may include, for example, identity management services 174, search services (including search location services 176 across various data stores located on premises, in the cloud, at the host and on user devices as described in more detail elsewhere in this disclosure), workflow management services 177, asset and entitlement management services 178 (including key management services), paradata services 179, analytics services 180, and the like. The orchestration services 165 may also include various composite services 175, such as ones that are constructed using other services or components thereof. The orchestration services 165 may include a service manager 112B, which may interact with a similar service manager 112A located in the on enterprise premises system 110, as well as with capabilities and services of the secure exchange system 102, to deploy, track, manage, and report on the activities of one or more of the services, applications, engines and the like described herein.

The intermediate host's secure exchange system 102 may also include various exchange services, such as a hosted secure data management facility 104 as described throughout this disclosure, with data storage nodes 106 and metadata storage nodes 108, functionality to support a customizable secure exchange system, functionality to support federated access across heterogeneous content repositories, secure exchange of customer managed keys, single sign-on, archive facility, multi-factor authorization, configurable password facilities, archiving services, offline file access facilities, rules-based workflow management facility, investor portal, encryption services, cross-enterprise collaboration facility, work-stream synchronization, study space and electronic investigator site files, secure enterprise content portal, digital rights management services, key management in a secure content environment, collaborative customer relation management, API wrapper support, end-to-end encryption protection, and the like, as described in this disclosure, where FIGS. 1A-1B are intended to encompass the range of deployments of such capabilities, whether on premise, on the secure exchange server, on a client device (e.g., mobile), and/or via orchestration services. The secure exchange system 102 may be deployed alone, or it may be deployed in a hybrid situation with the orchestration services 165. The intermediate host may also manage the orchestration services 165, such as by the service manager 112B and/or by interacting with various interfaces or APIs of the orchestration services 165 that are designed to enable use of the various services, modules, functions and applications thereof.

The orchestration services may include various data stores that may be used by or in connection with uses of the orchestration services 165 for exchange services and storage 166, such as a workflow queue and instance store 182 and related storage 185, an asset assertion store 183 and related storage 186, a paradata store 184 and related storage 187, various directories 188, and the like. Each module or set of services and its related store/storage system may have associated bindings 173A-E, 181A-E and message services 170, 171, 172 that enable secure exchange of data with other modules, services and store/storage systems, as well as within the particular module, service set or store/storage system, such as enabling extraction of data, transformation of data to appropriate protocols or formats, and loading of data. For a given user, some secure data exchanges may be undertaken with data hosted on data storage nodes 106 of the intermediate host's secure exchange system 102, while other data exchanges, such as of particularly sensitive information, may be exchanged using orchestration services 165 in a manner that does not allow the intermediate host to have access to the data; that is, the capabilities of FIGS. 1A and 1B can be deployed as a hybrid secure exchange system that may include, for example, both centralized (for some data) and distributed (for other data) secure exchange functionality.

On enterprise premises 110 facilities may include on premises storage (e.g., file storage in databases 142, on servers, in logs, in file systems, on local devices and the like that are in locations of the enterprise, as well as metadata storage 140/144, analytics storage 143, and the like). Connections may be provided, either through various interfaces and APIs, or through bindings, to outside storage, such as to cloud data storage 118 resources (including public and private clouds), and to more general resources, such as accessible through search engines 116. The on enterprise premises system 110 may include various bindings that allow services (such as a federated search service 151 and a federated data storage services 152) to access underlying storage resources. These may include search engine bindings 146, cloud storage bindings 147, metadata store bindings 148, file data store bindings 149, and the like. An analytics engine 145 may be used to track, record, and report on the uses and activities of the various services, modules, engines, applications and the like of the on enterprise premises system 110 to provide analytics 153 through analytics engine binding 150. The on enterprise premises system 110 may include transformation and filtering services 154 as described elsewhere in this disclosure, such as for handling necessary data transformations that are needed to access particular systems within the enterprise, including, without limitation, systems that may use proprietary data protocols or formats of the particular enterprise. The on enterprise premises system 110 may include key management services 155, such as enabling the enterprise and/or individual users to manage encryption keys used to secure and access content, as described in more detail elsewhere in this disclosure.

In embodiments, transformation and filtering services 154 may provide processing that is done on a file or other asset, such as when that asset is uploaded to or downloaded from a secure exchange environment. These transformation and filtering services may perform various functions, including security related activities, as well as any other processing that is defined for a specific asset type within a specific container. These transformation and filtering services may be container-specific, application-specific, customer-specific, and the like, or they may comprise general platform processing activities that are defined in the asset workflow. Example file transformation and filtering activities may include virus scanning, publishing, search indexing, document encryption, bulk download (e.g., zip), transformations from one document type to another (e.g., Microsoft® Office® to .pdf), application of DRM, file chunking, web application processing, unique file naming per folder, field validation (e.g., for business fields), and the like. In embodiments, customer-specific transforms may be provided. For example, the secure exchange facility may provide transforms such as virus scanning, converting a document to a different format (e.g., to a PDF), and providing application-specific transforms prior to the system applying customer-specific transforms before the secure exchange facility publishes a document. Similarly, customer-specific filters may be provided, such as after the secure exchange facility provides filter services for application of a watermark, application of DRM encryption, and application-specific filters or transforms, optionally before a document is downloaded to a user.

User devices 120 may interact with the other systems depicted on FIGS. 1A and 1B and with other systems and resources described throughout this disclosure. For example, a user device 120 may include a secure viewer 122 as described in more detail elsewhere in this disclosure, by which a user may have access to data in various parts of the on enterprise premises system 110, such access being managed by the secure exchange system 102 and/or the orchestration services 165 in various embodiments, such as to confirm the identity of the user of a user device 120, to confirm the authorization of the user and device to access particular data, to limit viewing to situations in which it is permitted (e.g., when the user is alone, when the user in in a permitted location, and the like), to cease access to certain content (such as by un-sharing), and the like. The user device 120 may also include a local store 124, which may be managed and accessed by the secure exchange system 102 and/or the orchestration services 165 and may be accessed by a federated search engine of the on enterprise premises system 110, the secure exchange system 102 and/or the orchestration services 165, such as being included in a federated search that allows a user to search all different stores (on premises, cloud, hosted and on local devices) with a single search.

The on enterprise premises 110 facilities may have connectivity with search engines 116 and associated search engine storage 114, which are shown in FIGS. 1A and 1B to be external to on-enterprise premises node 110, where search results may then be associated with internal facilities through a search engine binding. Metadata, file data, analytics, cloud data storage, and the like may be similarly bound, such as through binding to federated search services, federated storage services, analytics, and the like. On premises and user device applications and services may be interfaced and bound with orchestration applications and services through a messaging layer, such as through SMTP, SMS, and the like. In addition, as described in this disclosure, key management services 155 may be provided on enterprise premises, such as to provide the enterprise side of a customer managed key arrangement.

Figure 1C:
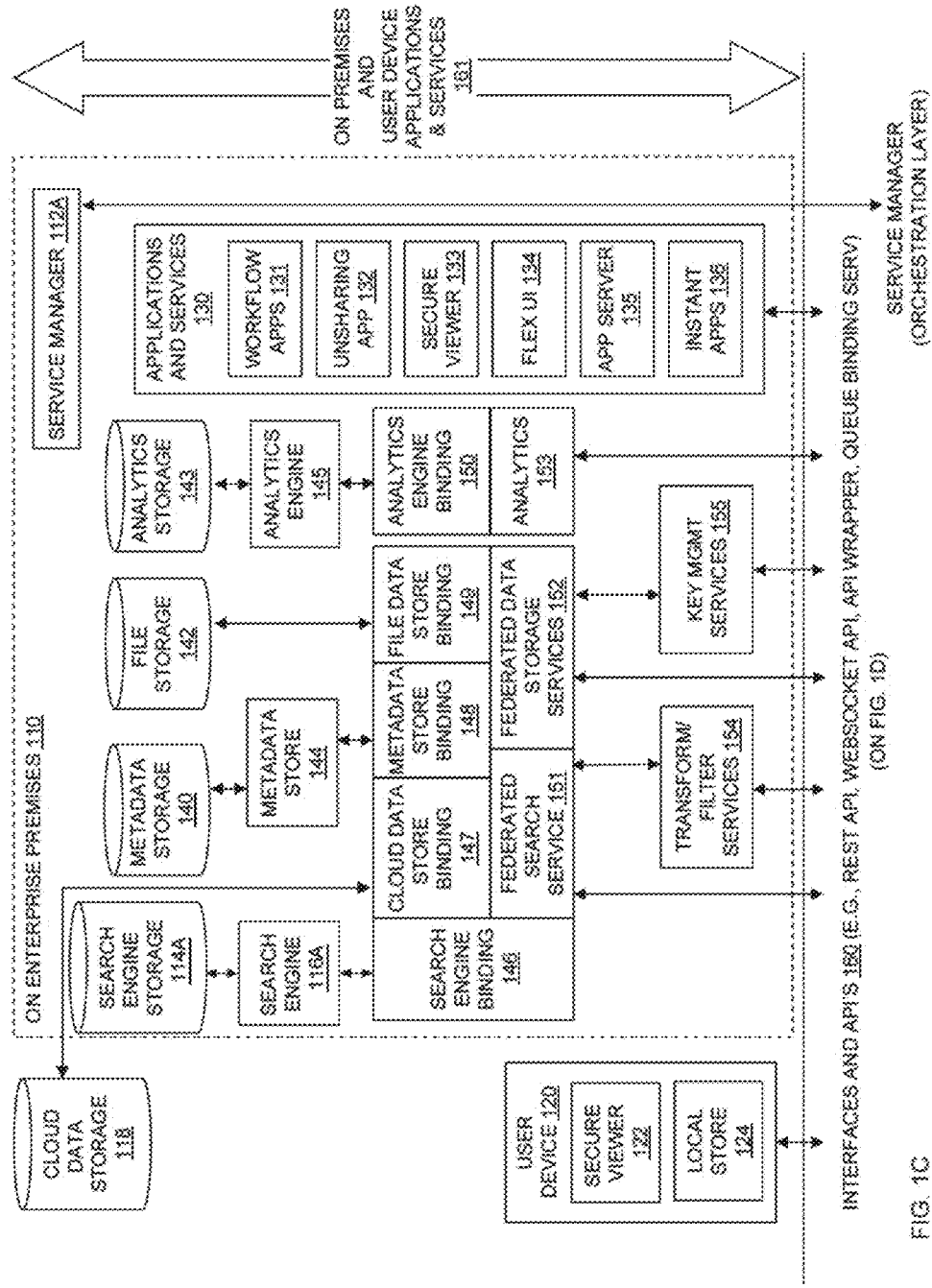
FIGS. 1C-1D depict a block diagram of an exemplary secure exchange service with federated searching.
Figure 1D:
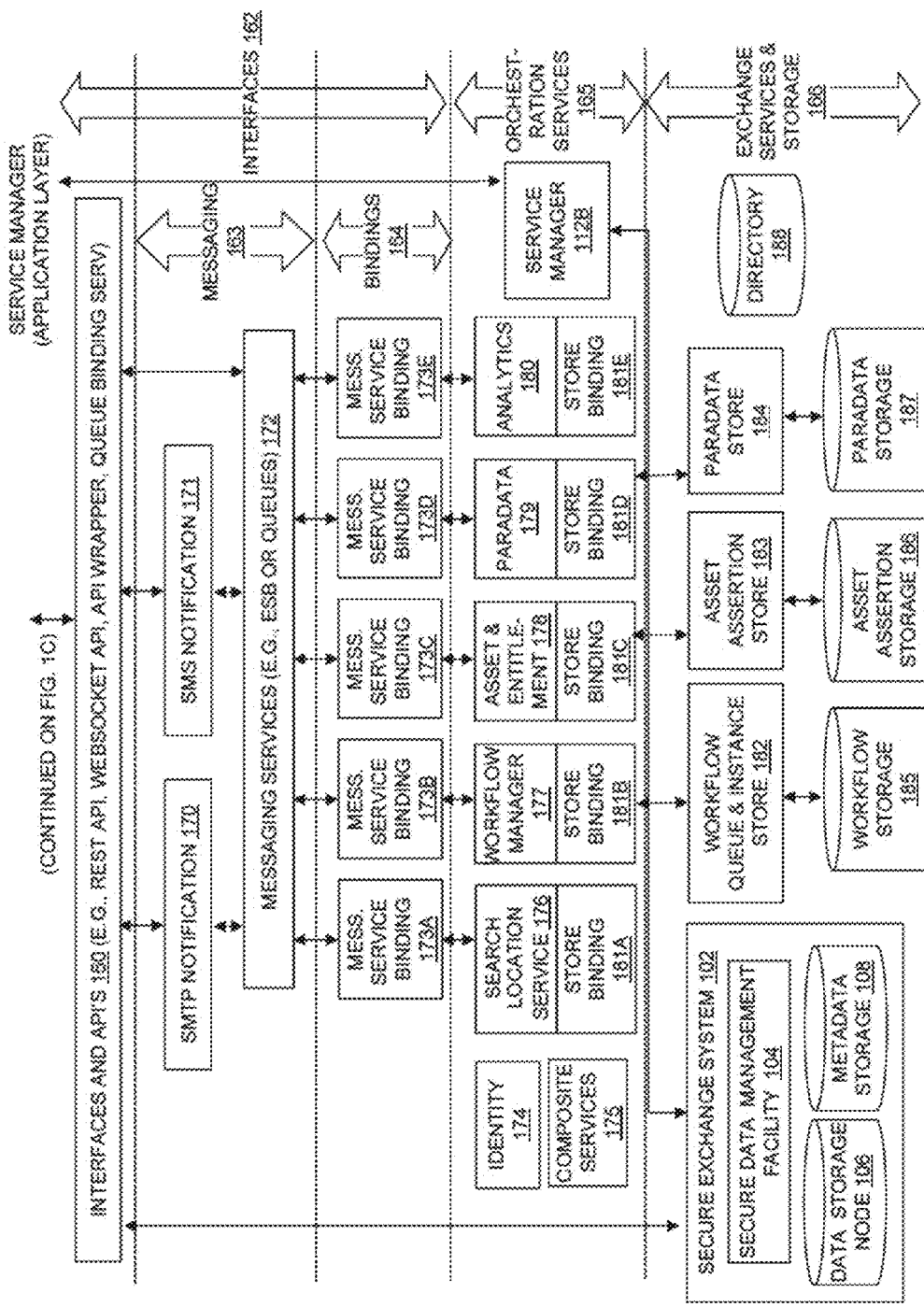

In embodiments, such as shown in FIGS. 1C and 1D, search engines 116A and associated search engine storage 114A may be located on various content nodes, including on-enterprise premises node 110, to enable a federated search capability. As shown in FIGS. 1C-1D, the search location service 176 in the orchestration layer 165, in conjunction with a federated search service 151 for each of a plurality of distributed content nodes, may operate to search relevant content nodes individually. Thus, rather than creating a centralized search index, when a user enters a search query to search for items in various content nodes to which the user has access, such as to search for a specific text string, the search location service 176 may operate to identify the relevant content nodes to which the user has access and to distribute the search query to each relevant node separately. The query may then be run locally on each of those nodes. The search results from each content node may then be sent back to the user's computing device, and collated, such as by a collating module running on the user's browser, to present a single set of search results to the user. In this manner, the content on each content node remains secure and localized, and is not shared among various content nodes, or shared with an intermediate business entity operating the orchestration services 165 or providing other services to the user.

Figure 58:
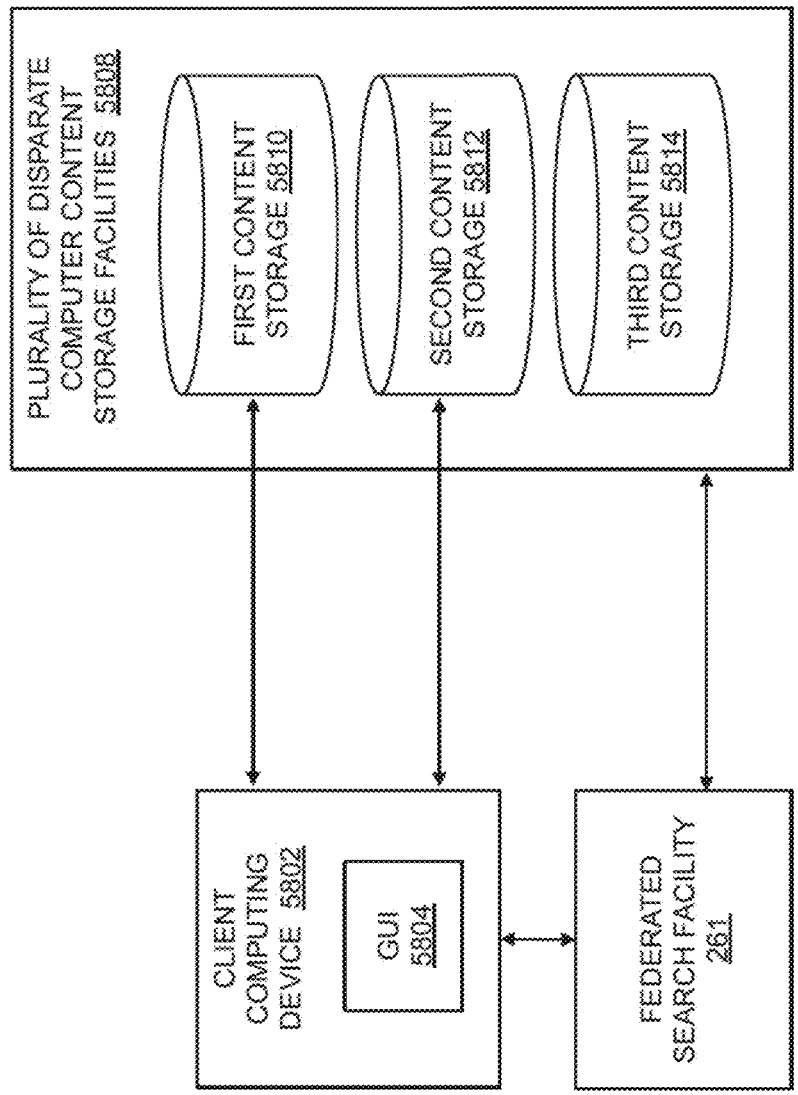
FIG. 58 depicts an embodiment of a federated searching facility.

Referring to FIG. 58, a federated search facility 261 is depicted as interfacing with a plurality of disparate computer content storage facilities 5808, including a first 5810, a second 5812, and a third 5814 content storage, where the federated search facility collects search results as the result of a search query from a client computing device 5802 and presents search results from the search of content storage facilities to which the user of the client computing device has access (e.g., the first and second content storage). The results of the search may be presented to the user through a graphical user interface (GUI) 5804, where the search results are presented as if they came from a single content storage rather than from separate content storages (e.g., from the first and second content storage).

In embodiments, a federated search facility adapted to search for computer content on a plurality of disparate computer content storage facilities may be provided, wherein the computer content storage facilities comprise a first content storage and a second content storage, wherein the federated search facility, the first content storage, and the second content storage are interconnected through the Internet. A computer content search request may be received by the federated search facility from a client computing device, wherein the user of the client computing device has access rights to secure computer content on at least one of the first content storage and the second content storage. The federated search facility may execute a first computer content search on the first content storage and a second computer content search on the second content storage, wherein executing the search includes using the access rights of the user on the at least one content storage to which the user has access rights. A first computer content search result may be received from the first content storage and a second computer content search result may be received from the second content storage. The first computer content search result and the second computer content search result may be consolidated into a consolidated computer content search result; and the federated search facility may provide the consolidated computer content search result to the user through a graphical user interface that presents the consolidated computer content as a single computer content search result.

In a non-limiting example of federated searching, a client (e.g., browser or other client application) may first call the orchestration layer to receive multiple search tickets needed to retrieve the data from the various data sources. In this example, two data sources will be considered. The search tickets may be returned in a single composite response. The client may then call a content node composite that makes multiple search calls and returns the results. The browser may then send an application-specific message to an application server, which creates an orchestration region composite request. A composite proxy may then validate the message for correct application signing, and the basic schema of composite message. The control element contents may be subject to the requirements of the composite invoked and may not be validated with the exception of operation. It may also invoke an evaluative entitlement function, and reject any requests that the entitlement service deems to be unauthorized. The composite proxy may then forward the message to an actual composite code. A search composite may then create a corresponding message for the data source search. The composite proxy may then perform basic safety checks on the message. It may validate the request operation in the message against a configured whitelist of operations allowed for this composite. If the message is OK, it forwards it to the correct service, such as a location service. The location service may perform validations except application signing, and check entitlements. It may return a standard signed response, which the composite proxy returns to the search composite. This process repeats for the document search. The composite then processes the responses and creates an orchestration composite response, including a request for assets needed by the content node composite. In this example a search request message may be constrained to only search the content type, such as 'document'. The composite proxy forwards the request to the location service to get it properly signed, returns it to the application server, and then to the browser (client). The browser invokes a content composite request to the content node. The composite proxy validates the message for correct platform signing, and the basic schema of composite message. The control element contents may be subject to the requirements of the composite invoked and not validated with the exception of operation. The composite proxy forwards the message to the actual composite code. The search composite may be an instance of a content node composite. The search composite then invokes the search request, through the composite Proxy. This may work exactly as it does in the orchestration layer, with the composite proxy performing basic safety checks on the message before forwarding it on. The search composite may iterate through the search results and invoke a document search request for each data source in the first result set and insert a document count in a metadata application element based on the answer from the second search request. Each search request in the second set is then modified to filter for one data source. The search composite returns the content composite response to the composite proxy, which forwards it to the browser (client).

In embodiments, service manager 112A and/or service manager 112B may be implemented as part of a service manager module or console having a user interface for providing automated service management for both the orchestration services 165 in the orchestration layer, and for the distributed content node services 161 (i.e., services such as search engine 116, file storage 142, and analytics 153 for the distributed content nodes, i.e., the various nodes such as cloud data storage 118, file storage 142, and data storage node 105). The service manager module and a related text-based or graphical user interface may provide a comprehensive view of the overall secure exchange platform and allow for provisioning, configuring, monitoring, and management of the secure exchange system/platform. The user interface, via a single view, may provide access to and insight into the status of content nodes of a business entity, and may allow for the monitoring of stuck/dead processes with respect to those content nodes (e.g., processes that were kicked off but are inactive for long periods of time; processes that become stuck in a recurring error state; processes that suspend running due to an error state without displaying an error message; processes that return error messages, such as being unable to complete given tasks; and the like.)

The service manager 112B may operate to "onboard" new content nodes to the secure exchange system so that the new content nodes have necessary software installed, and are appropriately configured and secured in order to automatically interoperate with the secure exchange system in a particular user environment. Content nodes may automatically wake up, register themselves and coordinate with the orchestration layer. This may occur by providing a shared secret (such as a predetermined password or other piece of encrypted or unencrypted data) to any new content node to enable it to be registered with the orchestration layer, upon providing the content of the secret to the orchestration layer, such that service images and configurations may then be pushed from the service manager 112B to the content nodes, and the services can become functional with the new content node.

The service manager module may provide an update of services for the secure exchange system in a rolling, tiered, iterative, and/or sequential manner. For example, services such as message formats may be updated in a manner that provides backward compatibility with previous message formats, while allowing the secure exchange system/platform to continue to operate with full functionality even while updates are not yet fully distributed.

Additionally, the service manager module may automate an encryption key distribution process, which may include the rotation of encryption keys (also called data keys) for encrypting content in order to provide enhanced security between the orchestration layer and the content nodes. The rotation of encryption keys (or data keys) for encrypting content or files may include the use of customer managed encryption keys, which are described in more detail below, in the section titled "Customer Managed Keys".

Figure 2:
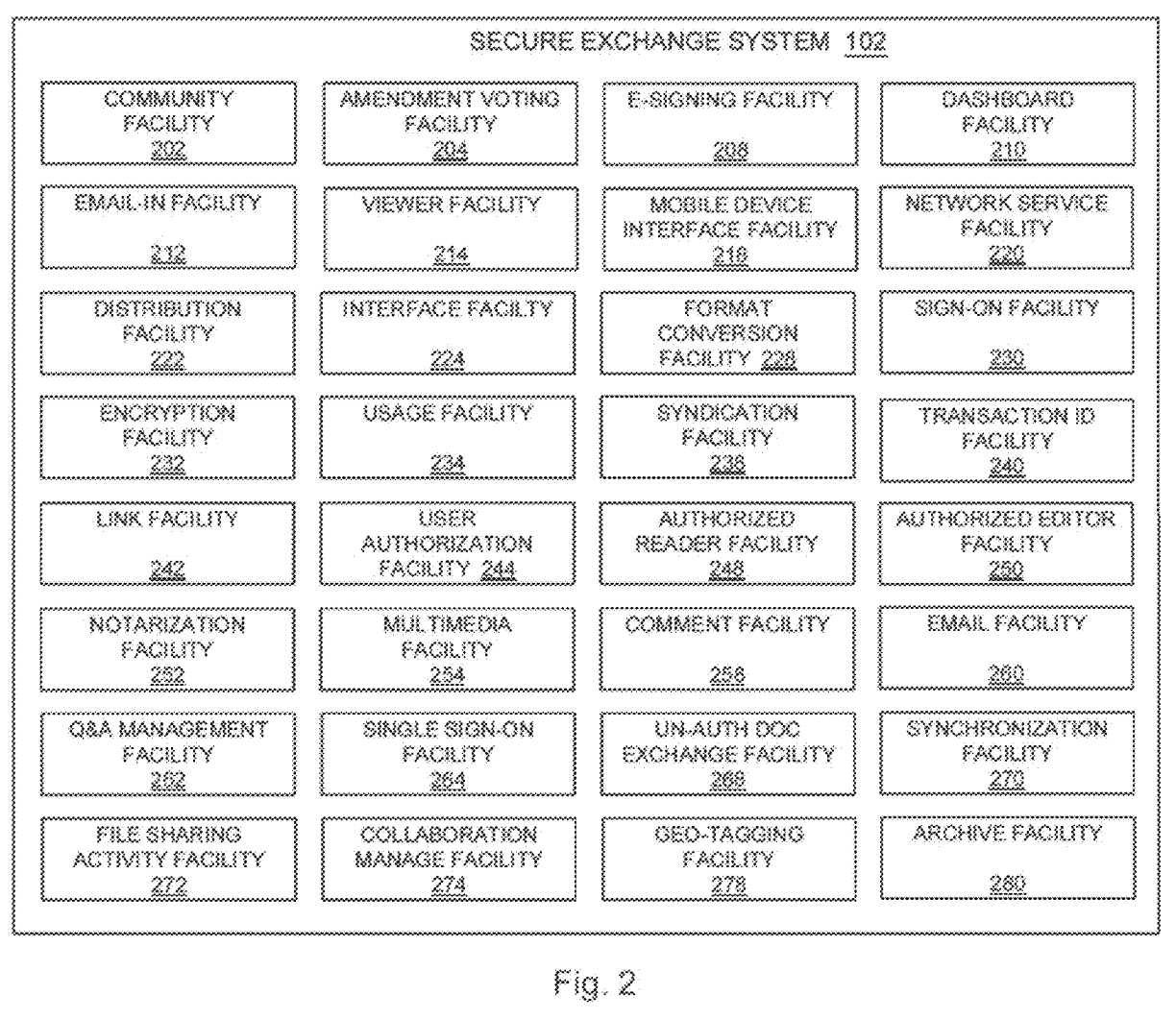
Figure 2B:
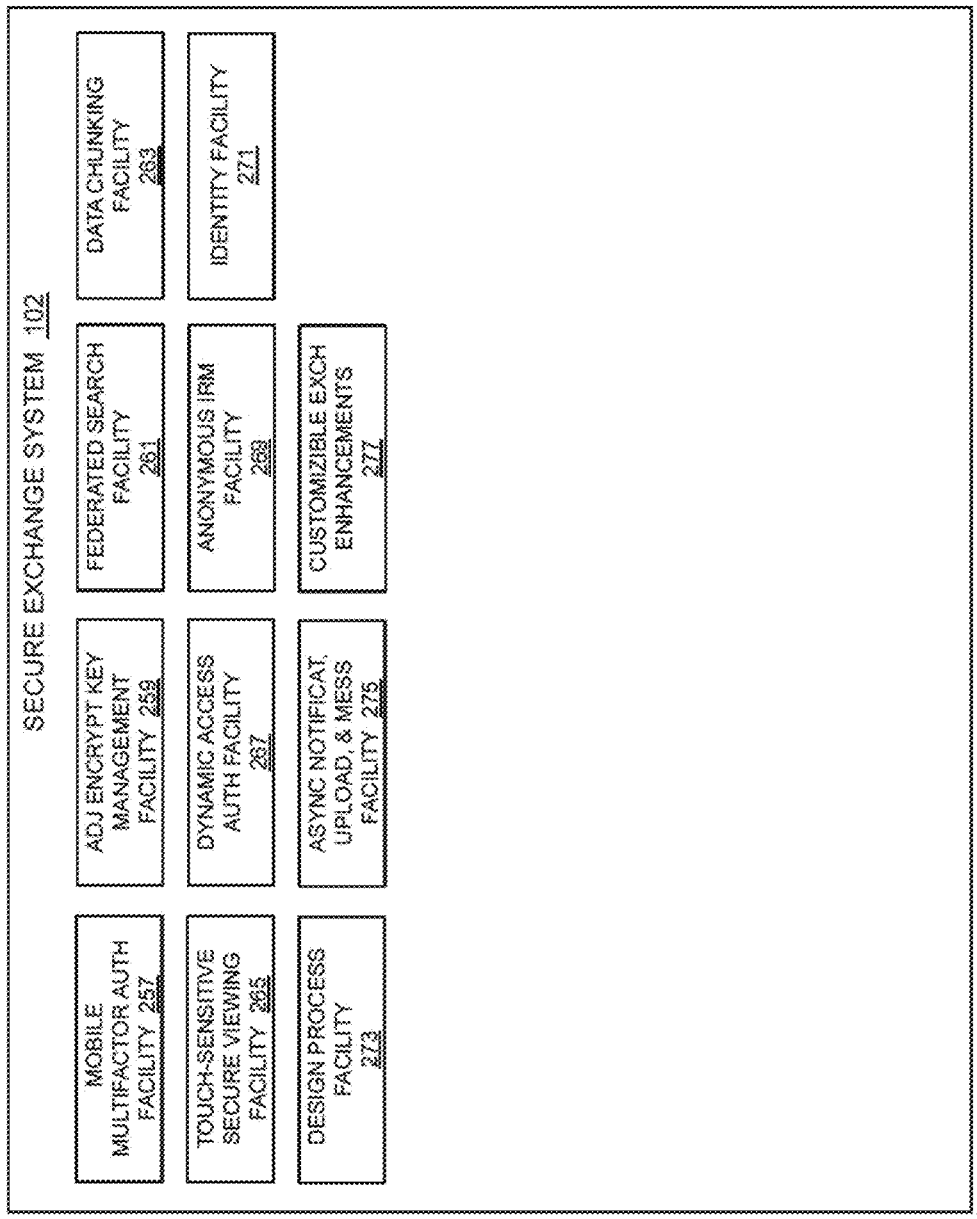

FIGS. 2, 2A, and 2B show further details in connection with the functionality that may be readily incorporated in the secure exchange system 102, including a community facility 202, amendment voting facility 204, e-signing facility 208, dashboard facility 210, email-in facility 212, viewer facility 214, mobile device interface facility 218, network service facility 220, distribution facility 222, interface facility 224, format conversion facility 228, sign-on facility 230, encryption facility 232, usage facility 234, syndication facility 238, transaction identification facility 240, link facility 242, user authorization facility 244, authorized reader facility 248, authorized editor facility 250, notarization facility 252, multimedia facility 254, comment facility 258, email facility 260, question and answer management facility 262, single sign-on facility 264, un-authorized document exchange facility 268, synchronization facility 270, file sharing activity facility 272, collaboration management facility 274, geo-tagging facility 278, archive facility 280, collaborative content facility 282, fair share queuing facility 284, offline file access facility 288, location-based file access facility 290, spreadsheet viewer facility 292, email effectivity facility 294, cross-enterprise facility 298, multi-factor authentication facility 201, configurable password facility 203, client archiving facility 205, client key hosting facility 207, and a virtual container DRM facility 209. Additionally, the server software may include a e-discovery facility 211, an interactions playback facility 213, a time-delay file deletion facility 215, a watermarking facility 217, a rules-based workflow facility 219, a delivery of service facility 221, a protected drive facility 223, a virtual drive facility 225, a revision timeline facility 227, a 3D viewing facility 229, a metadata sharing facility 231, a secure storage facility 233, and a comment notify facility 235, a dynamic entitlement facility 239, an action checking facility 241, a secure mobile device facility 243, a workstream synchronization facility 247, a contextual sharing facility 249, a content access management facility 251, a secure enterprise content portal 255, mobile multifactor authentication facility 257, adjustable encryption key management facility 259, federated search facility 261, data chunking facility 263, touch-sensitive secure viewing facility 265, dynamic access authentication facility 267, anonymous IRM facility 269, identity facility 271, design process facility 273, asynchronous notification, upload, and messaging facility 275, and customizable exchange enhancements 277.

For example, the distribution facility 222 may allow the host server to electronically distribute data using secure communications among the plurality of users. The usage facility 234 may allow the host server to monitor the usage of the network to permit the users to be billed for the network service. The host server may be set up to manage a plurality of separate virtual networks concurrently, with each such virtual network representing a different client, such as company A and company B. Further, a community facility 202 may provide for users of different companies to be exposed to one other even if the different companies have not had any previous contacts (e.g. through a shared exchange), and a dashboard facility 210 may provide companies the ability to manage exchanges, documents, contacts, communications, preferences, and the like.

The host server may offer a high level of security for all data by employing substantially secure network connections, and by means of security and encryption technologies developed for networks such as may be readily incorporated in the encryption facility 232. Additionally, the host server may provide highly secure access control by way of the user authorization facility 244 that may allow only authorized personnel to access individual messages and related documents and communications. The viewer facility 214 may be able to protect documents from unauthorized viewing, printing, saving, and the like, and a mobile device interface facility 218 may enable secure viewing on a mobile device, such as a personal tablet being used away from an enterprise network. The Email-in facility 212 may provide for the ability to add content to an exchange using regular email, such as that is sent to a designated secure email address.

The host server may give each user the ability to electronically link or be interconnected via a link facility 242 with any number of other users. Although data may be preferably formatted in a particular form, such as may be readily implemented with a commercially available document exchange program, other formats could be optionally accommodated using a suitable format conversion facility 228. The multimedia facility 254 may also be used to process data into a format suitable for presentation to the user in forms other than text, such as audio, still or moving images, and the like.

The virtual-network viewer may also include a multimedia viewer facility configured to, for example, provide: viewing of interactive multimedia or mixed media memoranda through suitable decoders, such as audio decoders, Joint Photographic Experts Group (JPEG) still image decoders, and Moving Pictures Experts Group (MPEG) moving image decoders. The virtual-network viewer may also support various collaborative communications options such as e-mail, video conferencing and white boarding which are enabled for a given transaction pursuant to instructions from the appropriate user. Of course, the range of multimedia capability and the collaborative communications options may vary depending on the various groupware facilities available to the user.

The notarization facility 252 may be provided to electronically certify any electronic data forwarded to users, such as incorporating electronic signature technology, and the like. The network service facility 220 may conveniently be used to display various data in connection with the network service such as additional services that may be available by the network service to the users. The above facilities may work jointly with the email facility 260, the interface facility 224, and the like, to send notices of data for exchange and interface with to securely pass data.

A virtual-network viewer or browser may conveniently provide the end user with an easy-to-use graphical interface to data and other particularly confidential information on the network service's virtual-network service. The virtual-network service may provide identification of services available over the virtual network as well as a variety of options for accessing and retrieving data. The virtual-network viewer may include the transaction identification facility 240 that, for example, may enable a user to quickly find and access information. The virtual-network viewer may automatically provide a suitable connection to the user to the virtual-network service through the sign-on facility 230. The viewer may also prompt the user to input one or more passwords or identifications which should be recognized by either the authorized editor facility 250 or the authorized reader facility 248 in order to access information on a database.

For the convenience of the users, some data offered through the virtual-network service may be designed as interactive multimedia documents that will include video, graphics, audio, and other multimedia elements. Multimedia communications may provide the user with a wide variety of information in addition to that provided by more standard text data.

By way of an example, a syndication desk, i.e., one or more individuals authorized to be responsible for the management of a syndicated transaction, of a lead user may be able to broadcast and/or selectively send e-mail messages processed by the syndication facility 238 to associate users and vice-versa. For example, amendment data processed by the amendment voting facility 204 may be used to vote on changes to a transaction document amongst authorized users. The amended document may be conveniently distributed via email using the e-mail facility 260 for providing associate users with up-to-the-minute information about the transaction. Amendments or messages may be appended to the document at the host site of the network service where they may be ordinarily viewed by accessing the virtual-network service that is authorized to access the document. E-mail messages or amendments may also be downloaded for printing or for attachment to local documents. Similarly, comment data in connection with a transaction may be processed through the comment facility 258 for appropriate distribution to authorized users. Transaction documents may also be signed by authorized users through the e-signing facility 208.

Secure Cloud Architecture with Meshed Data Centers and Various Enterprise Clouds In embodiments, the secure exchange server may utilize a secure cloud architecture with meshed data centers, various enterprise clouds, private clouds, hosted clouds, and the like. For instance, data centers in a meshed configuration may support the methods and systems disclosed herein in a secure cloud, where each of the node entities in a mesh configuration is always or nearly always up and running. Enterprises working in association with the secure exchange server may have their enterprise clouds linked to a secure cloud associated with the secure exchange server. For instance, each entity may run a core platform, a content router, an identity federator for identities associated with the enterprise, applications, code, and the like. In embodiments, the secure exchange server may connect with partner enterprise data centers, and run an image of the same configuration, or a subset thereof, on one more such data centers or on one or more clouds.

Limited Content Repositories

In embodiments, there may be limited content repositories, such as where distribution centers, separate from the main content repositories of an enterprise, provide content access interfaces, such as content players for running, playing, or otherwise providing access to a limited set of the content associated with an enterprise, a project, or the like. In embodiments, routing among repository elements may enable a party in control of content to allow multi-tenant access to any set or subset of content, such as enabling multi-tenant collaborations for various work streams that require access to content. For instance, a user interface may include a dashboard of work streams, one or more of which could be hosted on a secure cloud infrastructure, or on a specific data center, based on the choice of the party controlling the work stream or controlling the content used in connection with the work stream. In embodiments, for a given work stream, a user may connect to the closest data center in a meshed environment with at least partial content replication, so a user can get access to the data center (e.g., federated or replicated for at least certain content) that provides the highest quality of service (e.g., bandwidth, response time, etc.) for access to the relevant content by the particular user. To maintain effective mirroring of content in a timely manner for particular content, synchronization (such as for content and ID management) may be defined at a plurality of levels. In an example, a system platform may include ID management, collections, analytics, a composite layer, and the like.

In embodiments, the platform may be replicated for distribution (e.g., by sale, lease, or the like) to a number of data centers. The platform may have a link to applications and stores, where applications may access stores through or in compliance with a policy. A store may be viewed as an application and may reside in a plurality of locations, such as locally, in a data center, public cloud, private cloud, laptop, domain, and the like. A policy access layer may determine access, such as to a specified set of applications being granted access to a specified set of stores based on a policy. One store may be a location store, where the location store has identifying information as to what content exists and the location where particular content is stored. The system may provide for caching, such as a way for users to allow the system to cache content for access based on the policy. In this way, the platform may be viewed as a service infrastructure layer. These services may be in common across different storage types, so that users are able to exchange content even though the content resides in multiple different data centers, clouds, or other content repositories. In embodiments, the platform itself could be an appliance that is installed on an enterprise premises or connected through an open port. A use scenario may include a data protection compliance process workflow application, such as where a user needs to navigate data protection laws and is able to change where data is hosted to meet changing data protection laws. For instance, in some embodiments a policy may be implemented which specifies that unless certain data is hosted in Singapore, the system will block access to that data. In another embodiment, the data stores for an enterprise, wherever they reside (on premises in data centers, in public clouds, in private clouds, on devices, and the like) may be provided via a services layer with audit and access history, so that all such stores have a common point of content access, with associated logging and audit capability, for all content access for the entire enterprise. Audit history may provide the ability to know where the data resided at any time, as well as who accessed it, for all content that is stored for any purpose associated with the enterprise, regardless of the type of store (cloud, data center, individual device), the location of the same, or the type of content that is accessed. Thus, methods and systems provided herein enable universal auditing of content access across all content of an enterprise.

Community Facility

Figure 3:
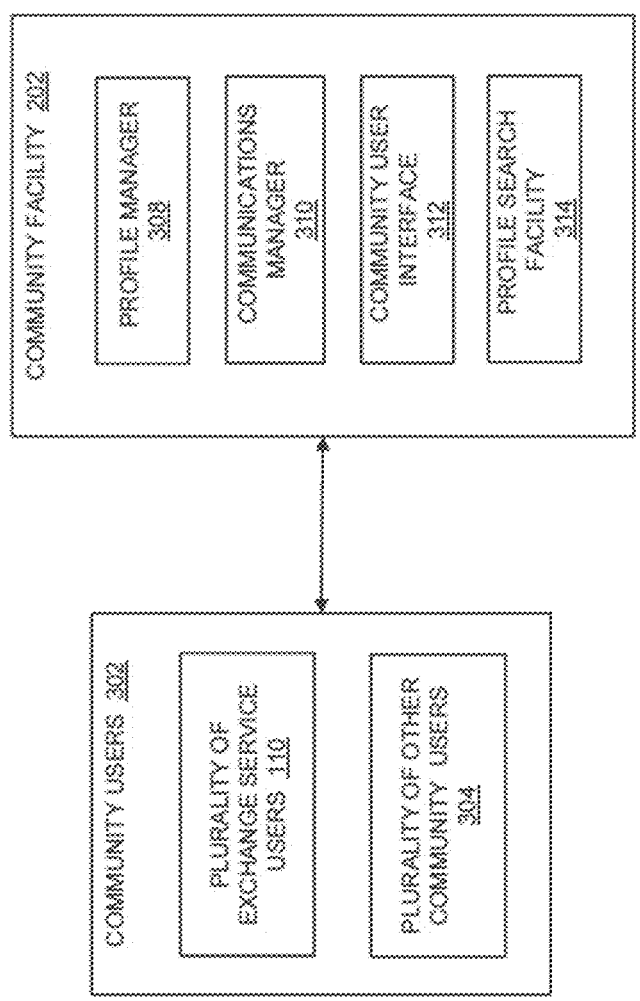
FIG. 3 depicts a functional block diagram for an exemplary community facility in an embodiment of the present invention.

Referring to FIG. 3, the community facility 202 may provide community, social, and the like facilities, as part of the system, such as to be able to expand a user's contacts list through exposure to other users who use or are otherwise associated with the facilities and more generally to make it easier for users to find and connect with other users who may have mutual interests. The community facility 202 may allow community users 302, such as the plurality of exchange service users 110 and plurality of other community users 304, to find one another using industry-specific profiles, such as provided by a profile manager 308, to find other community users, invite users to communicate by sending invitations through a communications manager 310, see status of invitation that have been sent or received, and the like. Through a community user interface 312 and associated profile manager 308, communications manager 310, and profile search facility 314, the community facility 202 may provide the user with a larger visibility to the plurality of users in the system, allow them to declare how they want to be viewed, control whether they want to be viewed, determine whether they can participate or not, enable them to be anonymous (e.g. profile only), allow them to be fully visible to other users, allow them to be available to users within just a particular industry, and the like. If a user is in a particular industry, they may be able to view a basic description of that community, as well as to other industries that the user determines to be beneficial. The system may be provided a profile window in the community user interface 312 that is set up based on industry or technical specifications, such as for private equity, M&A, finance, legal, and the like. There may be a variety of different types of user profiles available, such as, in connection with transactions, a buyer side, an investor side, an advisor side, an expert side, a seller side, and the like. The community user interface 312 may provide a user set up through a step-through process wizard, where the user selects industries, subsets of industries, and the like. Users may be as specific or as general as they wish, and position themselves in the community as seeking opportunities, presenting opportunities, presenting themselves as an expert to be called on to facilitate, and the like. The system may provide for location information, specify a deal type, specify a deal size, and the like, to help people who are searching for these profiles. The user may be able to upload attachments, examples, and the like. A visibility setting may be provided, such as available to community members, where the user is optionally able to remain anonymous. If the user chooses to not be anonymous then they may be visible to users immediately, but still protected in the system. In an example, a user may be a "buyer" and an "advisor", where they can see their own profile or sub-profile, edit the sub-profile, add another profile, and the like.

In embodiments, the community facility 202 may provide for search capabilities through the profile search facility 314, such as starting a new search, saving searches, saving the history of a search, and the like, to begin interacting with the profiles of users. The searcher may be able to search by a particular industry, investors, deal size, deal type, geography, type of profile and the like. The user may begin a search and generate results including the sub-profiles in the system that matched the search criteria. In addition, there may be a variety of visibility levels associated with the searches. For example, a search may return three matches but where one match is a user that is an anonymous user. In this instance, information may be withheld as to specifics, but with the ability to see more general profile attributes, such as a user's title. There may also be search indicators associated with previous searches, matches, contacts, and the like, such as with an icon to indicate past communication, and the like. In embodiments, the user may use a filter set to find a group the user wants to multi-select, grab, and move into another list.

Another feature of the community facility may be an 'activity index', or similar measure, such as for judging how active a user is on the system. For instance, a user performing M&A activities on the system may provide a qualified view indicating whether they are a current M&A buyer or not, such as showing how active they are. The system may also find information that indicates activity from other sources, and import that information to the system, thus providing a fuller indication of the user's activity level within the system, such as how many deals they might be working on.

Another feature of the community facility may enable a user to entice other users who are anonymous to be visible in order to initiate an interaction with them. For instance, a user may contact an anonymous user and add them to an exchange after the invitation to connect has been accepted. The user may 'click on' an anonymous user and send an invitation to them. In this instance, the sending user may become more visible to the anonymous user who is being invited. A subject line and a note regarding why the user is interested in contact them may be provided. An 'invitations list' may show what invitations have been sent, and the system may provide for a historical thread for the user's activity.

In embodiments, the system may keep a user's information anonymous until the user accepts an invitation from the inviting user, but where the anonymous user can still interact with the inviting user while still staying anonymous. The system may therefore provide a robust interaction facility at the profile level (email, etc.) without requiring actual acceptance of the invitation, and enable a continued dialog without revealing who they were (e.g., to get additional information, clarification, etc.). As the interaction goes back and forth, the goal may be to wind up in an acceptance state, but the system may also provide a means of blocking communications, such as after the user 'accepts' or 'declines'. The system may support an interaction until the user provides an acceptance, at which time the user's contact information may become visible, be provided a download of profile information, include the user in a contacts list, be recommended to an exchange, and the like. Once the user accepts, both parties may become visible to one another, including providing a history of the interaction.

The community facility may provide a user interface for user interaction with the community facility, such as a with a profile tab for a user. In embodiments, a new profile may be added through the user interface. The user interface may provide for identification of a sub-file, selection of an industry, selection of a geography, setting profile details, setting visibility, adjusting a privacy policy, and the like. In embodiments, a view for setting visibility may be provided, where the user may specify visibility to community members, such as being visible to community members, visible but anonymous to community members (e.g. contact information and attachment(s) are hidden), visible only the user, and the like. For example, a profile for an M&A seller seeking investors, may include an industry focus (such as materials), deal sizes (such as <$25 Million), geography (such as Asia/Pacific), deal type (such as full entity sale/merger), visibility (such as anonymous), and the like.

The community facility user interface may provide for a plurality of tabs, such as a hub, exchanges, tasks, documents, people, approvals, maintenance, forms, calendar, dashboards, fund data, collaboration, and the like. There may be actions the user may take with regard to a search result, such as to make contact, open an invitation, view detail, download a vCard, request to add a user to an exchange, manage a user exchange access, and the like. When a user is anonymous, an indication of such may be provided in place of their name, such as 'User is Anonymous', blanks in place of location, phone number, email contact information, company, and the like. An interface for composing an invitation may be provided. For example, users that receive an invitation may be asked to accept or decline the invitation, and the sending user may receive replies as email alerts (e.g., such as available under the community invitations section of the user interface). The invitation may include a subject, note, number of users the invitation is being sent to, information about the sending user (e.g. name, email ID, phone number), a cc function, and the like. An invitation may be provide to a visible user, an anonymous user, logged-in users, logged-out users, and the like. Successfully sending an invitation may result in an acknowledgement, such as an invitation alert, a text alert, and the like. An 'alert sent' indication may be provided. For example, an indication of a successful alert sent may also include a dialog indication, a title of the invitation, the body of the invitation, and the like. Users that receive a note may be able to reply directly to the sending user's email address. In some cases, user information may be left blank when the user is an anonymous user, such as email contact information, organization, position, industry, functional area, address information, phone number(s), fax number, and the like. In some cases, at least a portion of the information may be hidden, such as for example that the user is an M&A advisor/expert, area of expertise is investment banking, industry focus areas (e.g. industrials, financials, utilities, telecommunication services, health care, information technology, energy, consumer discretionary, materials, consumer staples), deal sizes, geography, and the like. Invitation alerts may be provided to a user's inbox, and various options may be provided to a user, such as to accept or decline the invitation, a 'decline invitation' screen, and records kept for invitations sent, received, accepted, declined, and the like. A running communications thread between two users in association with an invitation may be provided, wherein the accept-decline options may continue to be presented to the recipient of the invitation until they accept or decline the invitation. A feature for searching contacts may be provided.

Features for contact flow between two users may be provided. For example user 1 may set up a sub-profile that includes setting their visibility to anonymous. User 2 may conduct a community search and find user 1, where user 2 opens a user details page(s). User 2 may then send an inquiry to the anonymous user 1, where user 1 receives the inquiry (such as in their email inbox) and views the invitation in a community user interface. User 1 then has the option to accept or decline the invitation, where user 1 then closes the reply window. User 2 is able to see the inquiry status, such as through searching, where user 2 sees the inquiry, sees the status of accept or decline. User 1 is able to view the thread of the accepted/declined notes.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing an exchange community facility where the users of the plurality of client computing devices establish an informational profile that is made accessible to other users of the plurality of client computers and are enabled to interact with one another based on the content of the informational profile.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the content of the informational profile may include contact information, business association, and the like. The exchange community facility may provide users with facilities for sending an invitation to another user for communication. After the invitation is sent the exchange community facility may provide a status of the invitation related to the invitation being at least one of being sent, received, and read. The informational profile for the sending user may be restricted as anonymous until the receiving user accepts the invitation for communication. The exchange community facility may provide for informational profile viewing control, where the viewing control allows the informational profile to be viewed by other users, by a selected group of users, and the like. The exchange community facility may provide a graphical user interface through which a user manages their informational profile and interactions with other users, where the graphical user interface includes a search engine interface, provides an activity index measure of how active a user is on the exchange community facility, and the like. An informational profile may be categorized by professional activity, such as including a buyer, seller, investor, expert, and the like. The informational profile may include credentials for an individual, an indication of an area of interest (e.g. a type of project in which an individual is interested in participating), and the like.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an exchange community facility where the users of the plurality of client computing devices establish an informational profile that is made accessible to other users of the plurality of client computers and are enabled to interact with one another based on the content of the informational profile, wherein the interaction is executed as an anonymous interaction, where the anonymous interaction provides a subset of content from the informational profile.

Amendment Voting

Figure 4:
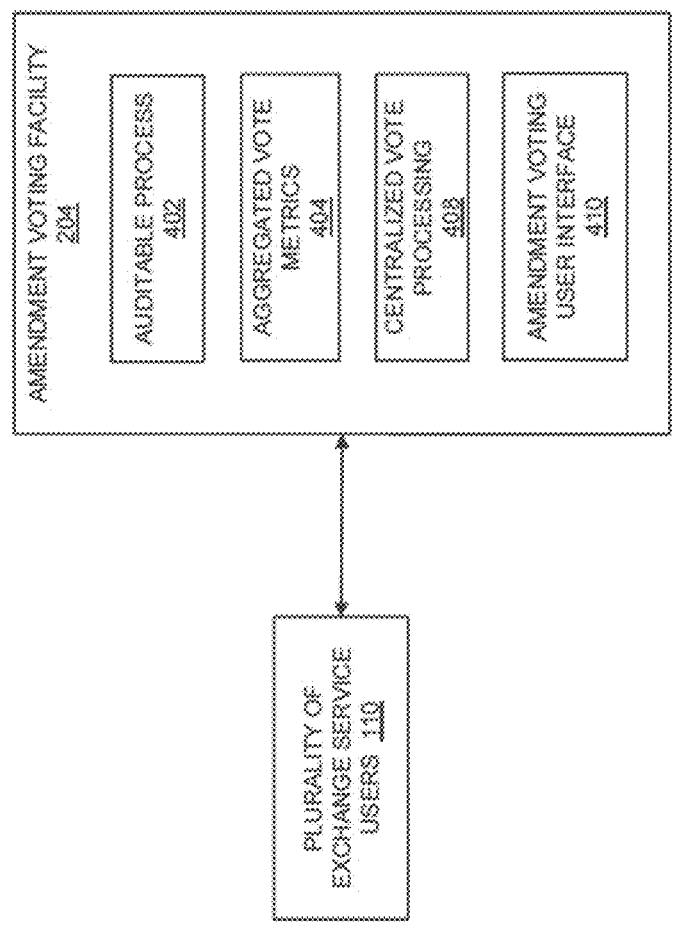
FIG. 4 depicts a functional block diagram for an exemplary amendment voting facility in an embodiment of the present invention.

Referring to FIG. 4, the amendment voting facility 204 may provide for managing, integrating, and facilitating a process where agency clients executing a transaction (e.g. a syndicated loan) may vote on modifications or amendments to a transaction or transaction content, including an auditable process 402, aggregated vote metrics 404, centralized vote processing 408, and the like. The auditing process 402 may utilize vote documentation, consent forms, signature page tracking, digital distribution, vote collection, and signature page submission, and the like, where the these documents may be fully traceable. The distribution, vote collection and signature page submission may all occur online, speeding the process and better ensuring transparency. Aggregating vote metrics 404 may utilize weighted voting calculations for consent percentage, visualization of responses (e.g. which lenders have done what), and the like, where vote calculations may be weighted by commitment percentage, and where a visual display of user responses may make it easy to see which users have taken action, and what those actions are. Centralized vote processing 408 may include sending reminder alerts, completion of approval tasks, completion of a vote, and the like. Features of the amendment voting facility 404 may include amendment templates for quick configuration and launch, lender voting that includes signature pate collection (e.g. with electronic submission of signature pages), task lists for consent, an amendment voting user interface 410 to track progress and statistics (e.g. group tracking, simplified reminders, export for vote tally and reporting), amendments within existing exchanges, and the like.

An embodiment flow process diagram for the amendment voting facility may include an initial step where an agency team initiates a vote response inquiry, such as including documents, amendments, signature pages, due dates, automatic alerts, and the like. Lenders may then receive an alert, including task assignments, such as for external counsel, the agency team, participants (e.g. lenders), and the like. Documents (e.g., memos, signature pages) may be downloaded and tracked at a next step. Then, signature pages, such as a memo with a signature page, may be signed and submitted as a response. Participants (e.g., administrator agency, external counsel) may receive the vote response. In an external process, votes may be weighted, such as based on committed dollar amounts on an agent's records. The process may be finalized, such as with posting totals (e.g., for an agent back team), where members of the process (e.g. lenders and borrowers in a loan process) are notified. In embodiments, the amendment voting facility may reduce or eliminate the manual process surrounding a vote collection and consent process, such as associated with a loan process, and helps the user efficiently prioritize a vote collection strategy.

In an example, on a syndicated loan, one agency bank may be in charge and have a number of lenders supporting that loan, often hundreds or even in excess of a thousand such lenders. As proposed modifications or amendments are made, each may need to be disseminated, have users react to it (such as providing information, making selections, and the like), be returned with appropriate documentation to the agency bank, and the like. A typical process is conventionally performed offline, where banks are required to have signing authorities pen-ink sign and re-submit to the agency bank. Further to the example, when a new amendment comes up, the agency bank may create a new transaction exchange environment for the amendment process. Through a data link the lender groups of members of those groups may be pushed into the new exchange environment, such that each of them appears as a participant in the exchange. Data relating to all current positions of the lenders (the amounts of their financial positions with respect to the particular loan or loans) may also be pushed into the exchange, so that it is available for further processing. In embodiments, the current position of a user with respect to the transaction structure may have a bearing on the voting, such as the weight given to a user's vote, minimum amounts related to the amendment, and the like. Such amounts may be stored and retrieved for processing by the exchange. For instance, an agency bank may ask lenders to confirm their understanding of their positions in the process, some or all of the data with respect to positions may be pre-populated into the system and carried through into the transaction, and the like.

In embodiments, the amendment voting facility may allow for the naming of an amendment vote, a date for the vote, a vote distribution, inclusion of associated documents, facility for signature providing page submissions, inclusion of instructions to voters, a process of approval, a step for outside counsel to review, and the like. Once the announcement for the vote is sent out, an administrator agent may be able to view the tasks that have gone out, to what individuals and groups, and the status of the voting. Features of the amendment voting facility may include import and export of commitment data, support of amendment vote collection workflow, creation of vote template configurations, configuration of election forms, display of an amendment voting graphical user interface dashboard, configuration of signature pages, access for an administrator to complete tasks, facility for client-specific amendment vote definition, and the like. Import and export may include users ability to populate a deal structure automatically (e.g., from a source file), create a list of lenders groups and tranches commitment information on a new deal exchange, reconcile an existing deal structure, generate reports (e.g. listing commitment amounts for each participant, updating commitments, and the like. Support of amendment vote collection workflow may include support of a plurality of different amendment types and allow users to create process definitions available for run-time execution, and the like, where the different amendment types may include a simple yes-no, a yes-no with signature, consent-no consent, amend and extend, and the like. Amendment vote collection workflow may include specification of due dates and time, collection of election options, distribution of documentation, the ability to edit voting parameters, and the like. Creation of vote template configurations may include support of vote template configuration creation, such as to encapsulate the amendment vote process for document control management, including users setting up owners, monitors, and vote elements once, and reusing for subsequent votes; providing consistent language and instructions and documentation across transactions and votes; setting up vote types that may be adjusted as-needed, and the like. The election form may be configured to allow users to dynamically generate election forms based on group participant relationships (e.g. lenders only having visibility to cases they have access to). Display of an amendment voting dashboard may include view of a list of multiple amendments initiated for a particular transaction, view of details of the process (e.g., list of lenders and their related status such s progress against a task), view of participant contact and additional information, and the like. Configuration of the signature page may include custom text, a logo, and the like, where users may update and maintain their own custom signature pages, such as for all transactions, per transaction, per vote, and the like.

Continuing with the syndicated loan example, a lender may receive an email alert that they are invited into a new amendment task process. They may then be asked to login, where they are brought into the task flow that came from the alert. Tasks may include instructions, document review, election options, and the like. Pre-populated information may also be provided in association with the task. The user may record their vote and save any amendments associated with their elections. Their election and amendments may be printable, where the user may then take that document to the signatory to have it signed. In this instance, all of the information, including instructions may be included in the hard copy for the lender, and where the signing indicates legal consent. In this way, there may be one single entry point of information, where the lender receives the document to be signed, has it signed, and is provided a facility for loading the document back into the system. In embodiments, an e-signature and described herein may also be utilized for signing the document and entry into the system.

In embodiments, a user may be provided the user interface 410 to view the exchanges that are running amendments, to see tasks generated and what state they are in, to view individual tasks for a particular lender, to view signature pages (e.g., where all of the election option information is carried), and the like. Custom fields may also be provided, such as to allow users to change commitments. In embodiments, users may see information as the data is populated, even before signatures are applied. A user may need to perform a calculation, such as to weight each vote to see how close they are to carrying the amendment. The system may enable the user to export data to a document (e.g., a spreadsheet) for performing the calculation separate from the system, and to monitor the amendment process and changes thereto. For instance, and continuing with the loan syndication example, an administrator agent may be most interested in monitoring response levels and challenges to the current commitment levels. For instance, if only three users are seen to have any challenge on their commitment amounts, then the administrator may need to handle those first, which may be a priority if there is a discrepancy. The user may also be interested in those who are planning to take action (e.g., increase their commitment, reduce their commitment, by how much their commitment may change, and the like). Ultimately, the agency bank may have the final say, and so the system may provide them with priority, and so enable them to decide on whether to allow the changes or not.

An exemplary amendment voting facility user interface may include various features, such as an dashboard listing and graphic showing the status of a user's amendment voting, where the graphic shown displays, for example, a pie graph of 'no consent', 'consent', and 'no response', as well as a listing of specific amendment voting statuses. A user interface may show a user notification of being assigned an amendment vote task, a user interface may show distribution of an amendment vote, and options available to the user for making the amendment vote, including to 'agree' or to 'disagree' with for example, a specified dollar amount commitment. A listing of an amendment voting task status for a user may be displayed, as well as a signature page being submitted by a user, which may include for example a note stating, "Please find my signature page attached, for review". The user interface may provide updated listing and status for the user's amendment voting tasks.

In embodiments, a method for managing a networked secure collaborative computer data exchange environment, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing an amendment voting facility for conducting a process of voting when the content relates to a proposed amendment to an agreement wherein the amendment voting facility enables users of the subset of the plurality of computing devices to vote on the proposed amendment.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the process of voting on the proposed amendment may be traceable, such as traceability including tracing vote documentation, consent forms, signature pages, digital distribution, vote collection, signature page submission, and the like. The amendment voting facility may provide for the aggregating of vote metrics for tracking the process of voting amongst the users of the subset of the plurality of computing devices, such as aggregating vote metrics utilizing weighted voting calculations for consent percentage and visualization of responses. The amendment voting facility may provide for a vote graphical user interface dashboard to track progress and statistics, such as where the tracking of progress and statistics includes group tracking, reminders, export for vote tally and reporting, and the like. The amendment voting facility may provide for relative weighting of votes amongst the voting users. The amendment voting facility may provide for management of the voting process including a date for the vote, a vote distribution list, inclusion of associated documents, facility for signature-providing page submissions, inclusion of instructions to voters, a process of approval, a step for outside counsel to review, and the like. A vote may be cast as a yes-no vote, a yes-no vote with signature, a consent, and the like. A voting form may be provided, where the voting form is configured to allow users to dynamically generate voting forms, such as where the dynamically generated voting forms are based on user participant relationships. The voting form may include a user customizable text or logo.

Electronic Signature Facility

Figure 5:
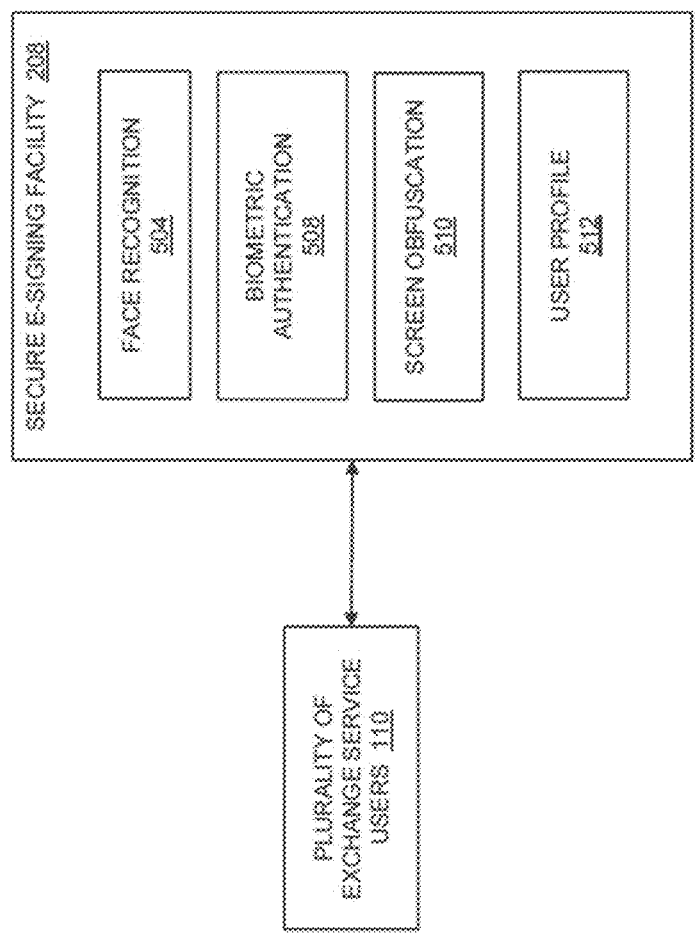
FIG. 5 depicts a functional block diagram for an exemplary secure e-signing facility in an embodiment of the present invention.

Referring to FIG. 5, the secure electronic signature facility 208 (also referred to herein as 'e-signature facility' or 'e-signing' herein) may support the process of providing documents for signature and for a user e-signing and sending the e-signed documents back to the sender. In embodiments, the electronic signature facility 208 may provide for secure viewing of the document signing, such as through face recognition 504 to determine the number of people viewing the monitor on which the signing is being executed and/or utilizing a digital photo of a user to verify the user is who they say they are, utilizing biometric authentication 508, utilizing screen obfuscation 510 to ensure only authorized users are viewing the document for signing, and the like. For instance, a computing device being used for e-signature may have a camera that views and detects the surrounding environment to determine how many people are currently viewing the screen, and if a condition exists where there is not only one person viewing the screen, the screen may obfuscate the document being e-signed, such as blurring, blanking, screening, and the like. For example, if the computer device detects that no one is viewing or multiple people are viewing the screen, the screen may blank out the document. In another instance, the computing device may utilize a camera to match the face of the person viewing the screen with a stored image of the person that is authorized to e-sign, and if the match is made, permitting the process of e-signing to proceed. In another instance, a biometric match may be required to permit the process of e-signing to proceed, such as through the use of a match to an iris as viewed through a camera, an e-fingerprint through a fingerprint pad for input to the computing device, or any other biometric verification method known to the art. In embodiments, conditions for enabling an e-signature process to proceed may be stored in a user profile 512, where if the conditions (e.g. number of people viewing, authorization matching though images and/or biometrics) are not met, the document may be obfuscated.

A user interface for turning on an e-signature process for an exchange may include various features. Note that in embodiments a user may only be able to view the document, or portion of the document, for which the e-signature applies. For instance, through the viewer facility, non-applicable portions of the document may be blocked out in some way as described herein. The user interface may include a toolbar for e-signature, where the user may click on an e-signature icon to initiate (or terminate) an e-signature process. Further the user interface may allow a user to move around an e-signature by dragging the e-signature with the mouse. The user may be able to perform a number of document functions, such as find, zoom, rotate, page up-down, and the like. In embodiments, if any portion of the e-signature is moved by the user to a position that places it off the page, the signature function may be disabled (e.g. e-signature disappears) to avoid placement of the e-signature in a position that won't show the entire e-signature on the document once the process is complete. Once the user has placed the e-signature, they may apply the signature and complete the process. A confirmation dialog box for completion of the e-signature process may be provided, including a confirmation note to the user about the final placement of the e-signature, where the user may be allowed to return to placement of the e-signature if they are not satisfied. The user, once satisfied, may save the e-signature application and placement. If there are unsaved changes at a time when the user attempt to close the application a prompt may appear notifying the user that there are unsaved changes and asking them if they want to save or close without saving. A dialog box may be provided for cancelling an e-signature, with for example control buttons for confirming whether to cancel or to continue.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing an electronic signature facility for managing a process of signing the received content by at least one of the subset of the plurality of computing devices, wherein the electronic signature facility includes a signature viewer interface that restricts viewing of the content for signing.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the electronic signature facility may include an electronic signature graphical user interface for presenting the content for signing. The restricted viewing may be a signing user being restricted to only those portions of the content that the signing user is authorized to view. The restricted viewing may be a signing user being restricted to only those portions of the content for which the signing applies.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an electronic signature facility for managing a process of signing the received content by at least one of the subset of the plurality of computing devices, wherein the electronic signature facility verifies the identity of the signing user through biometric profiling utilizing previously stored biometric data from the signing user.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an electronic signature facility for managing a process of signing the received content by at least one of the subset of the plurality of computing devices, the electronic signature facility assembling an electronically signed document including signatures from a plurality of users, each of which has had access to only a subset of the content for which they were the signatory.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an electronic signature facility for managing a process of signing the received content by at least one of the subset of the plurality of computing devices, wherein the electronic signature facility provides for secure viewing of the content as presented to a signing user through a computer display of the signing user's client computing device, wherein the user's client computing device includes an integrated camera for viewing the environment around the signing user and a face detection facility for recognizing the signing user, detecting if the signing user is the only individual present in the viewed environment, and if not, obfuscates the viewing of the content. The obfuscation may be blanking the screen, distorting the viewing of the content, and the like. The detection of the signing user by the face detection facility may be accomplished by comparing an image of a previously stored facial image of the signing user to the face detected in the viewed environment.

In embodiments, the electronic signature facility 208 may provide a unique signature code ID for a signature page, such that the signature code ID is unique in the system, thus providing a unique identifier for the signature page. Thus, the methods and systems disclosed herein include methods and systems for creating a repository of signature pages for an enterprise, with related indexing of the locations of, as well as preservation of, the content to which the signature pages relate. With this feature, a user may print out a signature page that has the signature code ID, and be able to subsequently pull the printed signature page out of a content store, and search the electronic storage system of an enterprise (e.g., a cloud, data center, file system, or the like) for the document associated with the signature code ID to confirm what document was signed. This allows a user to maintain a paper-based record in their records/files, but retain the ability to search for the e-document to which the signature page corresponds. The signature code ID may not only be unique to the signature page and associated document, but also to the version of the document, where the signature code ID may be wiped-out if that document is revised or changed. In this way, the system may create a parallel structure between a paper-based system and the electronic system, including revisions. The signature code ID may be stamped on one or more pages of the document. For instance, the document may be a PDF formatted document, and the stamp may be placed on all the PDF pages. This is only one simple example, but the signature code ID may be used on any kind of digital content that needs to be signed or initialed in any way. For example, sections of a document, such as clauses in a contract requiring separate approval (e.g., in real estate loan documents, rental car agreements, and the like) may be linked to distinct signature IDs, so that the approved clauses are separately searchable and verifiable electronically based on the signature IDs, and so that the system can identify any changes that may have been made to the content that is associated with the signature. In embodiments, the signature code ID may be stored as metadata with the digital content. The signature ID may be enabled with any conventional technique for providing a unique ID, such as an encryption key, or the like. In embodiments the key may be based on or include a hash of the content with respect to which the signature is associated, to assist in conforming that the signed content has not been changed when it is retrieved at a later time. Search for content may be enabled using location indices, by storing IDs in content metadata, by searches on linked lists or similar structures, by full text searches, or by other search and retrieval techniques known by those of ordinary skill in the art.

Dashboard Facility

Figure 6:
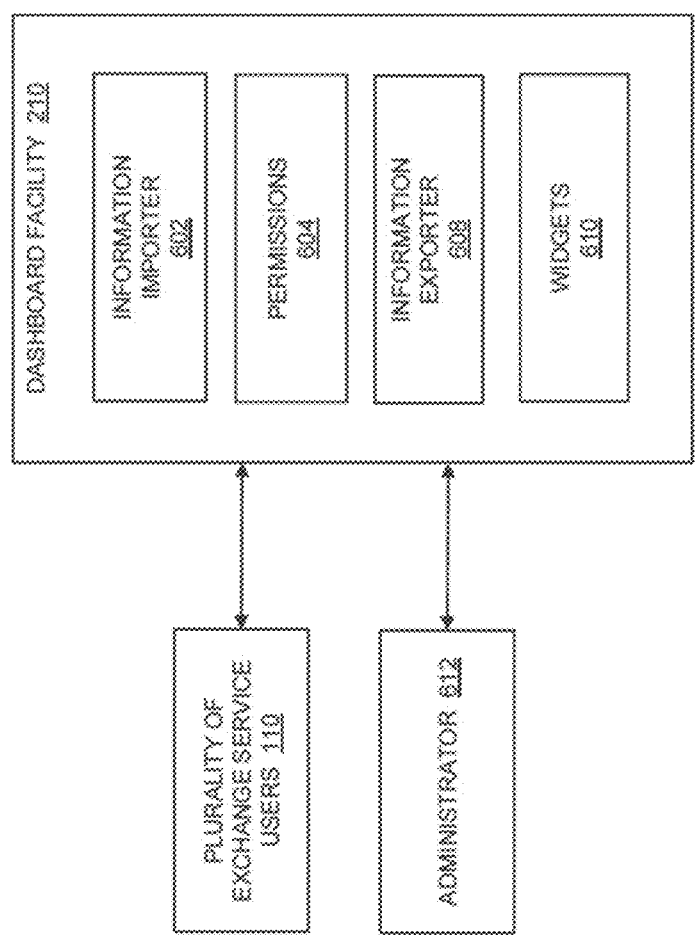
FIG. 6 depicts a functional block diagram for an exemplary dashboard facility in an embodiment of the present invention.

Referring to FIG. 6, the dashboard facility 210 may provide organized facilities for managing exchanges amongst the plurality of exchange service users 110, disseminate to users of multiple groups of users, separating exchange environments, and the like. For example, for a corporate M&A or private equity group, the dashboard may provide users with the ability to take their information, and create a profile and expose the information to other parties (e.g., to private equity investors showing performance of their individual funds). The dashboard may present information in an organized manner, allow for loading of information through an information importer 602, provide permissions 604 to view information, allow for the exporting of information through an information exporter 608, and the like. The dashboard may provide for a timeline view of activity in an exchange, work steam, project and the like, thus providing a graphical view of activity over time. The dashboard facility may provide for user access and display of both structured and unstructured data, access to views that provide a custom format or familiar terms to a particular category of transaction client (e.g., fund, investment documents, capital account statement, investment team), and the like, which also may restrict a user's view to content applicable to them or to the targeted category of transaction. In a private equity example, the user may configure the dashboard to their specific needs, such as including useful widgets 610 to display, information relating to the market (e.g. available funds). A funds widget may provide for selection of a fund, providing overview and performance information, and the like. There may also be sub-widgets that provide further functionality to a widget. The user may also have multiple dashboards, such as for different exchanges, different markets, different deals, and the like. One dashboard may handle information that is available to other users, and another dashboard may handle all personal files that are both available and unavailable to other users. The dashboard facility may also provide a compliance feature, such as to track changes made in each dashboard. In embodiments, the dashboard facility may present a view of exchanges in a list form, a visual folders form, a tile display, a card view (e.g., a card view that flips amongst exchanges or lower level organizations), and the like. Exchanges, work-streams, documents, and the like may be created, called up, closed, and the like, by voice command, through gesture detection, and the like.

In an example of setting up a file exchange, an administrator 612 user may place files within an input file directory, where the files may have a nomenclature that tells what widget they will populate. The system may create a configuration, run a process to populate it, ensure it is correct before allowing access, and the like. In this way, data may be considered 'stage data' prior to allowing access, and 'production data' once approved. Once the user is comfortable with a view, they can proceed and publish the staged data into 'production'. The system may be able to upload data as CSV file, create permissions files, and the like. In embodiments, a specific user might be provided a view within a dashboard but be given only access to one or more records within the dashboard. For example, the user might only see a particular fund, rather than all funds. If they select that fund, they may be able to see child data associated with that fund. But without permission, the other funds (or child data) would not be displayed. A permissions model may give users access to specific records within the dashboard. In an M&A example, a user may be able to see all the live deals an organization is managing, a certain human resources team might be allowed to see the dashboard, and the like, where specific entities are provided permissions.

The dashboard may have both optional and standard functionality, such as standard filtering options, converting documents to a PDF format, and the like. There may be a widget catalog provided, such as for textual displays, graphs and charts, document tracking, and the like.

The dashboard may enable management of files at a document level, at a record level, and the like, such as to allow a user to add records and manage information. A user may be able to add new content, put in the required information, refresh the screen (e.g., on a per-deal basis), and the like. The user may be able to edit and delete existing records, show a parent-child relationship, and the like. The user might want to choose the parent and find the document within the exchange and link it up to the parent document. The system may have the ability to manage individual records, such as for dashboard data, but also to permissions. The user may be able to take a parent record and provide permission to one of the many users to enable access to those parents. In embodiments, the system may provide for an auditing facility, such as for tracking who is adding records and permissions.

In embodiments, dashboard permissions may be automatically matched, provided, and the like, based on exchange permissions. For instance, dashboard permissions may be driven directly from the exchange permissions associated with a particular exchange. In this instance, people may be part of an exchange with various permissions, and the like, where they would send configuration files (e.g., CSV files) to permission through the dashboard, while they would manage groups and permissions separately in the exchange. With permissions automatically matched, permissions would be provided in multiple places, such as through the configuration files as well as in the exchange. In such embodiments, users may not have to use separate permission files, because the dashboard permissions may be able to follow from the permissions of the exchange. In embodiments, the system may use a matching algorithm between the exchange and the dashboard, such as based on fund information, and the like.

In embodiments, a permissions 'view-as' facility may be provided during staging of permissions for an exchange. For example, as a user is establishing permissions for an exchange, a project, a work stream, or the like, a user may initiate the "view-as" permissioning feature, such as by drop down menu selection, clicking on an icon, or the like, which may include a menu or data entry capability (e.g., a text field, box or the like) for selecting another user or category of user for which the permissioning user wishes to simulate viewing. Upon initiation of the "view as" capability and selecting the user or category of user to be simulated by the permissioning user, the system may display an exchange, a work stream, a dashboard, a project, a store, or a particular content item to the permissioning user as if the permissioning user were the other user selected by the permissioning user or as if the permissioning user is a member of the selected category of user. Thus, the permissioning user may see documents as if they were another user, so as to confirm that they have established the desired permissioning before going live with the exchange, project, work stream, or the like. In effect, in such embodiments the system combines the staging and verification of permissioning into two concepts, with simulated viewing providing verification that is simultaneous with, or proximate in time with, staging.

A user interface may be provided, which for example, provides a listing of available funds and fund information, providing a plurality of columns for content. Editing tools for editing specific column content may be provided. Various tools may be provided for editing a fund, such as editing specific column content. Alerts may be generated for a condition under which the user cannot save edits, such as because the user no longer has the latest version of the data (e.g., new data was uploaded or another user edited the content since the time the user interface dashboard was opened). In this instance, a control button may be provided to update the dashboard data. A dialog box for creating a new fund may also be provided, for attaching a documents, for providing permissions in association with the example fund, including for example providing an ID of the user wanting to change permissions, and the like.

Email-in Facility

Figure 7:
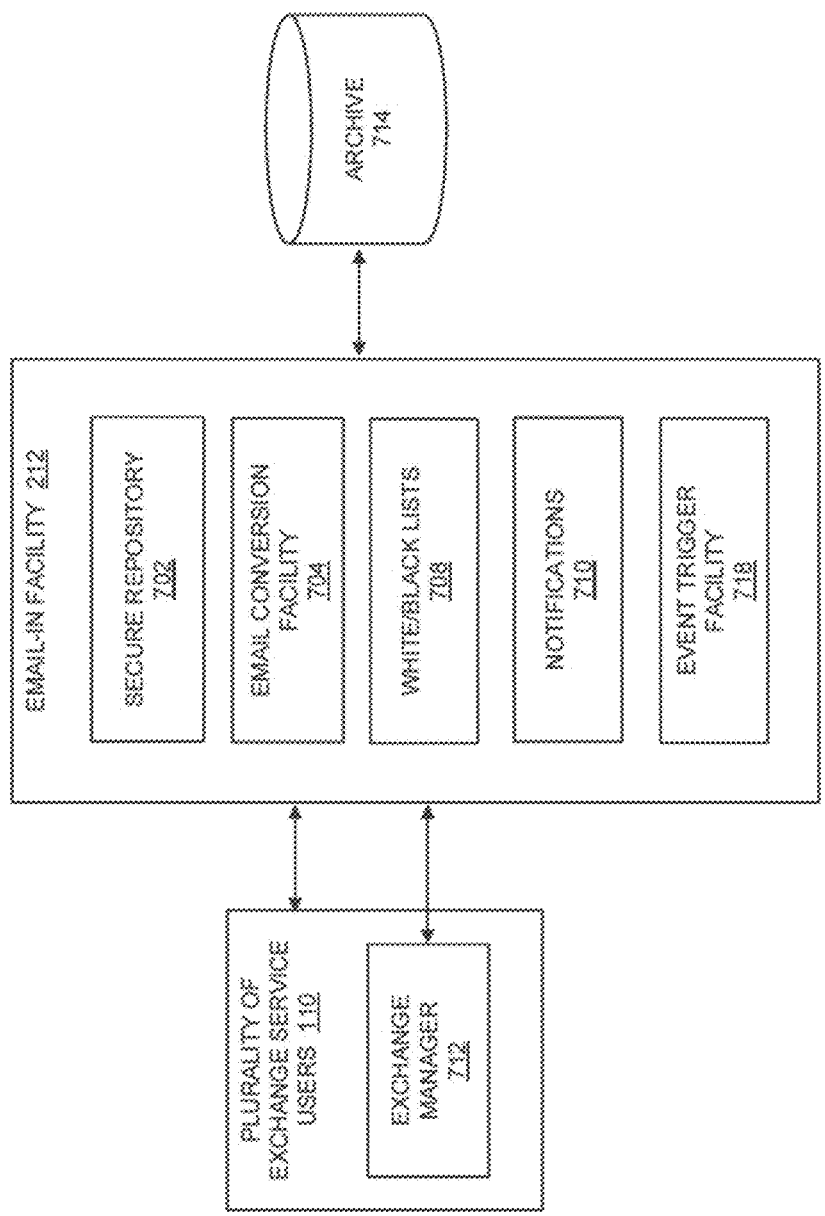
FIG. 7 depicts a functional block diagram for an exemplary email-in facility in an embodiment of the present invention.

Referring to FIG. 7, the Email-in facility 212 may provide for the ability to add content to an exchange using regular email, such as sent to a designated email address. This facility may be especially important with respect to users that circulate critical information and documents via email, and where there is a tendency to lose track of it at some point. Users may use the system's email-in facility to store email in a secure repository 702, and to be able to tell people to send email to this repository as part of a regular business process. The exchange manager 712 may then review and process the information further. This may simplify the learning curve of using any web application. If the manager is very knowledgeable, he may not need all of the counterparties to spend time learning the application. They simply send the content into an exchange. Other features may include an email address being associated with a folder in an exchange, a maximum number of allowed emails in an exchange (e.g. a user may define a cap), an email conversion facility 704, a white-list and black-list 708 of users, notifications 710 of success and/or error, and the like. In embodiments, email-in may be limited to authorized users only, such as already in the exchange, listed on a white list, and the like.

Use cases for email-in may include submission of analysis documents for review, a method for having a third party review applications (e.g. in order to create accounts while ensuring the third party does not gain control over attachments that contain private information), and the like. In addition, the system may provide for folder permissions in the email folder that can be used to prevent misuse. For compliance, the user may be able to store communications in an archive 714 and track what was done in association with the communications.

In embodiments, any exchange may be set up with email-in as a feature. An administrator or client may go through the process, such as defining where the sender's email address is stored in the system, using custom fields for the 'from' field, storing the message as an email, cap the maximum emails it can accept, choosing the folder it will be associated with, and the like. A folder location may thus be mapped to an email address (e.g., with the domain predefined but the pre-fix available for end user definition). The user may select users to be included for the feature, set alert settings and notification settings (e.g. problem alerts, that something was added), and the like. A white list may be included, such as for who should be able to send emails into the exchange (e.g. could be domains or even addresses). If a user is not on the white list, they may not be able to send emails to the exchange. A black list may be included, where a user may choose users to refuse acceptance onto the exchange.

The email-in facility may create a folder structure within a pre-defined mapped folder, and create a sub-folder for each email that is sent into the exchange, such as with the subject as the title of that folder. Contents of the folders may then include any attached documents. The email-in content may be organized like any exchange, where new emails are added as they come in. The system may be configured to send to a group, or to only one. For instance, a user may send the folder to one person to review but not give the recipient the right to do resend, print, or save the document. Permission may be applied to the documents like any other document as described herein, such as who can review the correspondence, who can modify it, save it, print it, and the like. In embodiments, an event trigger facility 718 may be provided where received email may trigger an event, such as a task, a process, and the like. For instance, if a contract comes in it may trigger a renewal process. In another instance, an amendment process may be triggered with the reception of an email.

In embodiments, the email-in facility may include the collection of emails from various parties into a structured database for later management and processing by a critical information exchange manager, eliminate the learning curve of using a web application to upload document to the cloud, allow specific internal-external parties to post documents into a web folder that may be shared with predefined individuals at various control levels, and the like. Components may include an email address associated with a folder in an exchange, a maximum number of allowed emails in an exchange, a definition of email conversion options, a white list, a black list, notifications on success and/or error, and the like. In an example, client or prospect requests may be processed, such as for an investment firm with a need to submit documents for analysis, a bank looking for a way to have a third part review applications to create new accounts while ensuring that the third party does not gain control over the attachments that contain private information, a bank having compliance needs such as needing to archive all communications they have (e.g. cc'ing and replying to the system on all correspondences), and the like. A user interface for email-in may include an introduction to email-in to the user, and a control button to begin the process. In embodiments, there may be a number of steps/options in the execution of email-in, such as choosing basic options, mapping folders, selecting alert recipients, creation of a white list, creation of a black list, enabling-disabling of the system, and the like. A dialog box may be provided for selection of basic options, including a custom field selection for the 'from' of an email, how incoming email body content be stored, definitions for the maximum number of emails that should be accepted into the exchange, and the like.

Dialog boxes for selection of a folder in association with mapping folders may be provided, with an alert being generated when a duplicate email address is used, for example. Users and their alert settings may be selected via a user interface, and warnings generated for a duplicate domain or email address associated with the creation of a blacklist. A checklist in association with the enabling of the system may be provided, such as shown in the figure for selection of a custom field, mapping to two folders, folders for mapping email into, no maximum specified for number of emails, two domains listed on a white list, and one domain listed on a black list. A user interface may be presented to the user once email-in is enabled, showing tabs for listing options, mapped folders, alert recipients, white lists, black lists, and the like, and showing specifically the email-in options.

In embodiments, intermediate fields/forms for mapping an email thread to the right place on an exchange may be provided. For example, if a user emails content relevant to a transaction or other project that is being executed on or with the help of an exchange (e.g., foreign exchange statement, a request to do a transaction, a securities document, a request for materials, a status update, or any of a wide range of other communications relevant to a project or an exchange) the system may map from an email application or environment where an email or email thread resides, such as Outlook, Gmail, or the like to a location of an exchange. The system may, for example, identify to which customer, enterprise, project, or individual the email is related. For instance, by recognizing the domain or the identity of the sender, the domain or identity of the recipient, the subject, an identifier related to the exchange (such as automatically embedded in content or communications relating to the exchange), content in the email thread or the like. Once recognized, the system may map the email thread to the appropriate exchange, location, store, project, or the like, associated with the exchange. In embodiments, once a mapping is identified, or a possible mapping is proposed, a form may be presented that, if used, will facilitate effective association with the exchange. For example, a form may have appropriate custom fields that map data of selected types to appropriate locations associated with the exchange, so that content of particular types is automatically and intelligently routed to the right places on an exchange. In this way, for instance, the 'To:' field of an email environment can be expanded in the form to present a set of fields or a mapping to a set of exchange locations, not just an email address or list of addresses. The rules for presenting a form and managing mapping from email forms to exchanges may be built into the exchange, such as in a meta-data triggered or meta-data managed business process. In one example, a user may create a safety report for a drug, such as where there has already been a related death, using an exchange to manage storage and distribution of the safety report to appropriate recipients. In this case, external regulations may specify who needs to be informed of what information in the safety report, and the exchange may store such rules, embodying them in forms that are presented when an email is identified as relating to that exchange or that safety report, so that distribution of the safety report to the right individuals (via the correct locations on the exchange) is enabled directly from the email environment in which the safety report is initially distributed. In another example, an email related to a merger transaction may have a subject line indicating that attachments to the email are responsive to a due diligence request on real estate matters of a target company. Upon recognizing the subject, the exchange, based on its specified rules, may present a form in the email environment prompting the user to direct the email to the section of the exchange that relates to "real estate due diligence," thus assuring that the content thread is appropriately mapped to, and stored with, the other content for that section of the exchange (and subsequently allowing the exchange to provide other features described herein and known to those of ordinary skill in the art, such as automatically notifying participants of updates to the content). Thus, exchange-specific rules (which may apply to exchanges, or to projects, work streams, or the like within an exchange) may indicate what information is required, who should be informed, and the like, and custom, or even pre-populated fields may conveniently be presented in response to initiation of email interactions with an exchange, project, work stream, or the like. Thus, this may be a convenient mechanism to trigger actions, and provide greater flexibility to improve system capabilities.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing a secure email input facility for accepting non-secure email from outside the exchange into the secure collaborative computer data exchange environment, wherein the non-secure email is received and stored as secure email in the secure exchange server.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the acceptance of the non-secure email may be dependent upon a controlled listing stored in the secure exchange server, where the listing is a white listing specifying emails that are allowed, a black listing specifying email that are not allowed, and the like. The reception of a non-secure email may trigger an event, where the triggered event is the initiation of a content amendment process, the initiation of a new exchange, the distribution of the email within the exchange, storage of the email in a secure archive facility, and the like. The email may be automatically associated with an area of content on the exchange based on the sender of the email, the subject line of the email, the destination address of the email within the exchange and the content of the email, and the like.

Viewer Facility

Figure 8:
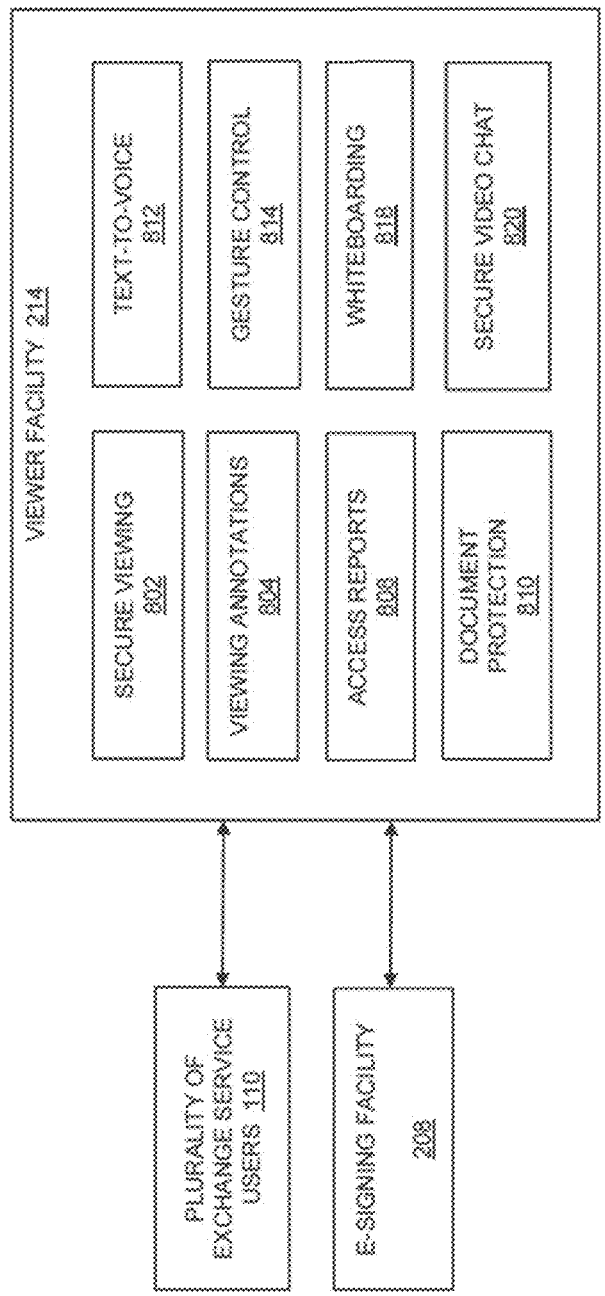
FIG. 8 depicts a functional block diagram for an exemplary viewer facility in an embodiment of the present invention.

Referring to FIG. 8, the viewer facility 214 may provide for a secure viewing 802 protection of documents from unauthorized viewing, printing, saving, and the like, such as without having to install custom client software (e.g. without installing anything beyond Adobe Flash). Documents in certain formats, such as Microsoft Office products, PDF documents, and the like, may be supported for protection. For example, for a PDF document a security warning may appear that a user is only allowed to view the document. However, if the user tries to print the screen, the screen may distort, such as transitioning to a fuzzy state. In embodiments, the user may need to hold the enter key down to make the document viewable. The user may be able to page up and down, rotate, zoom, and the like. The system may provide for watermarking the document so that if a user is permitted to print screen, the document will print with the watermarking. The viewer facility may also include functions such as viewing annotations 804 in the viewer, connectivity with the e-signing facility 208 (e.g. with a 'stamping' tool), document visibility based on face detection, document protection from eavesdroppers (e.g. automatic limitation of document viewing, also referred herein as spotlighting, based on detection of a second face), granular/page level document access reports 808, document protection 810 using facial recognition based encryption, text to voice feature 812 (e.g. such as in Apple® Siri), hand gesture based controls 814 (e.g. scrolling control based on hand-fist movement), real-time white-boarding 818, secure video chat 820 (e.g. one-on-one, group), and the like. In embodiments, the viewer facility may include an audio comment component, such as to allow a user to input comments into the document through audio dictation, to have the viewer facility play back the comments in audio, to provide audio output for various aspects of the document, and the like.

In embodiments, the viewer may be able to detect faces and enhance security based on face detection, such as through utilization of a camera connected to or integrated with the computing device being used to view content. The viewer may also utilize a 'secure view', such as where only a portion of a document is made viewable by the person viewing the document. Secure view may implement security measures (e.g. blanking the screen, distorting the screen, putting up a screen) based on eye motion, movement of the face, the presence of a second face, and the like. Viewing time may be monitored and reported, audited, and the like, based on how long the user's face has looked at the document, where the monitoring, reporting, auditing, and the like may be provided automatically. Reports of viewing time may be developed as a result of the viewing monitoring, such as reporting of page-based timing during the viewing of a document. In this instance, every page may be tracked. But many more details from the monitoring may also be reported, such as whether the person closed the browser; whether a person is looking at the screen, looking away from the screen, or walking away from the computer; Internet connection status; and/or computer configuration status (e.g., computer going into sleep mode, initiation of a screen saver, folding up of the computer, presentation of other content on another open window of the screen (e.g., entertainment content), playing of audio content via the audio system of a computer (e.g., if the user is listening to music), and the like. The system may take this information and develop a mapping of or report on the person's viewing actions and behaviors with respect to pages of content.

Document encryption and decryption may be provided based on document permissions. For instance, if the document can only be opened by a specific number of people, face detection may use the author, or any other permissioned user's face to encrypt the document and require the same face to be detected to allow 'un-locking' of the document. Encryption of the face may then be 'recorded' and used as an electronic signature, thereby tying the face to the user's profile. Recording of viewing time may be on a document level, on a per page basis, and the like. For instance, a computing device being used for viewing a document may have a camera that views and detects the surrounding environment to determine how many people are currently viewing the screen, and if a condition exists where there is not only one person viewing the screen, the screen may obfuscate the document being viewed, such as blurring, blanking, screening, and the like. For example, if the computer device detects that no one is viewing or multiple people are viewing the screen, the screen may blank out the document. In another instance, the computing device may utilize a camera to match the face of the person viewing the screen with a stored image of the person that is authorized to access and view, and if the match is made, permitting the process of access and viewing to proceed. In another instance, a biometric match may be required to permit the process of viewing to proceed, such as through the use of a match to an iris as viewed through a camera, an e-fingerprint through a fingerprint pad for input to the computing device, or any other biometric verification method known to the art. In embodiments, conditions for enabling an access and viewing process to proceed may be stored in a user profile, where if the conditions (e.g. number of people viewing, authorization matching though images and/or biometrics) are not met, the document may be obfuscated, or access denied.

In embodiments, viewing statistics may be mined for business intelligence by sellers in a strategic transaction, such as through a CIO with an enterprise, a marketing analyst, or any such user who may benefit from knowing with content is being read and what content is not being read.

In embodiments, the viewer may provide a search facility to search within a document. The system may allow for highlighting a search result, highlighting a selected portion of the document, and the like. The system may provide facilities for annotating, marking, commenting, and the like, to a document, such as a private annotation for the user, a shared annotation for other users, and the like. The system may provide for a secure document view, where only some portions of the document are viewable. For instance, a user may only want to show another user a selected portion of a document. The secure document view may also allow a user to increase the size of the document view window, which may better ensure that people proximate to you only see the relevant portions of the document. Another feature of the secure document view may include distorting those portions of the document that are not selected for viewing, such as making those sections fuzzy. The secure document view may react to the eye movement of the user, such as scrolling the document as the user's eye gaze direction shifts, distorting or blocking the document from view if the user looks away from the viewer, and the like.

The viewing facility may have capabilities for dealing with certain document formats in a standard way. For instance, the system may automatically convert Microsoft Word and PowerPoint documents to a PDF format, open spreadsheets (e.g. Microsoft Excel) in a spreadsheet viewer, and the like. For instance, when an Excel document is opened, it may be rendered on the fly, decrypted on the fly as a user scrolls down, retrieved from the server and encrypted on the fly, and the like.

A viewing facility may be provided, such as for use in a spreadsheet, word processor, and the like. As applied to a spreadsheet document, the viewing facility may provide features and tools such as a toolbar, a page/sheet count, a document search box, a spotlight interface, and a scrollbar. The viewing facility may also provide a search function and sample results and include a search window, a search results window, various ways that the results may be grouped by page/worksheet name, a search term highlighted, and a displayed message, such as if some search results are displayed before the entire document search is complete. A spotlight function may be provided, where only a portion of the document is viewable. A dialog box may be provided to be responsive to a user clicking on the print icon. Note that printing may be restricted as described herein, where the dialog box may send an alert to the user identifying the restrictions. Various other features of the viewing facility can be provided with respect to a sample word processing document, such as a toolbar, a page/sheet count, a document search box, a spotlight interface, and a scrollbar. Various features of the viewer facility functions related to a print command may also be provided, including a print icon, a document window grayed out, a print window, printer options, range of pages for print, a cancel control button where if the user cancels the print, the gray-out function may be turned off and again reveal the document, and a 'next' control button to close the pre-print window and open an operating system print dialog.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing a secure content viewer facility for the user to securely view the content on the user's client computing device, wherein the secure view is provided through a viewing restriction based on a user action.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the viewing restriction may be obfuscating the content view when the user action is an attempt to print screen, a security warning when the user action is an attempt to view the document, a water mark being inserted on the content when the action is a user printing the content, and the like. The client computing device may be a mobile client computing device, such as personally owned by the user, and configured for secure content viewing through the business entity.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a secure content viewer facility for the user to securely view the content on the user's client computing device, wherein a secure view is provided through a viewing restriction based on a user action, the user action detected through an integrated camera operating in conjunction with face recognition facility on the client computing device and the viewing restriction being an obfuscation of the content view when the user is observed such that viewing of the content by others is at risk. The user may be observed with other people in view of the camera, with an eye-gaze that is away from the client computing device, and the like.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a content viewer monitoring facility for monitoring the user viewing the content on their client computing device, wherein the monitoring is provided through an integrated camera operating in conjunction with a face recognition facility on the client computing device.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a content viewer monitoring facility for monitoring the user viewing the content on their client computing device, wherein a content viewing access report is generated that provides statistics related to the time the user spends viewing portions of the content. The portion of the content may be at a granular level of a page of the content, at a granular level of the entire document, and the like. The content viewing access report may provide for tracking and audit reporting for the user viewing the content. The statistics may be used to develop business intelligence.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a content viewer control facility for user-controlled viewing of the content on their client computing device, wherein the control is at least in part enabled through an integrated camera operating in conjunction with a motion recognition facility on the client computing device. The control may be actualized through monitoring user hand gestures, monitoring user eye movements, through monitoring user head movements, and the like. The control may be enabling the viewing of the content, tuning a page in viewing the content, inserting a signature into the content, closing a viewing session for the content, and the like.

Playback of Interactions

In embodiments, viewer-based time reporting and viewer-based tracking may be provided in an interactions playback facility 213 to allow a user of the system to replay the interactions of other users with particular content associated with an exchange. In embodiments, playback may be used to assist in review of user interactions in a transaction diligence process. In such an example, a user's interaction with a viewed content may be played back to make it available in the context of a diligence process that involves review of content on an exchange. For instance, if a user reads a contract, the system may be able to replay the reading experience to show what the user did when the viewer was looking at the document. The replay may include a summary or report of statistics associated with viewing, such as time spent on a page, engagement in other activities during the review, copying of material, focusing on particular sub-parts of content, note taking related the content, annotation of the content, or the like. In embodiments, rules of an exchange may be specified for particular content to require a user to enable content interactions playback. For example, a user may be required to turn on the user's device camera, so that the user can be viewed during the time in which the user engages with the content. Similarly, a user may be required to allow the exchange to capture any text entered into the user's machine during the review of the content. Content playback may provide some insight and intelligence associated with the original interaction of a user with the document. For example, if a user spent considerable time on a page of a contract, this may provide an indication of concern with that page, such as difficulty understanding the content, or with a high degree of interest in the content. As another example, if a user spent considerable time on a document containing a trade secret, that may indicate a high likelihood that the user learned the trade secret in the course of the review.

Buyer Interest Index

In embodiments, viewer time tracking information may be used to enable various analytic processes. For example, tracking information may help a seller determine the interest level of a potential buyer, such as in the development of a 'buyer interest index' to aid sellers in deal evaluation. Based on viewing patterns a user may be able to utilize such a report or other analytic result to determine which buyer is most likely to buy, such as in projecting a winner in a bidding process, where the projection is based on a particular buyer's viewing history with respect to documents associated with the deal or other actions taken by a buyer with respect to an exchange (e.g., the extent to which various individuals associated with a buyer engage with an exchange, or sections of an exchange, or a particular file). For example, a user spending a great deal of time looking at a financial document might be an indication that the potential buyer is skeptical, and not favoring an investment. On the other hand, if the system determined a user was looking at content for less time and/or not revisiting the content, that might show they have no questions, and be an indication that the potential buyer has a greater inclination to invest. Similarly, if a buyer has engaged a large number of personnel widely across all of the information on an exchange, this may be an indicator of strong interest, as the user may be moving into the late stages of due diligence prior to making a bid. Over time, observations about viewer behavior across various enterprises and prospective deals can be correlated with results, such as comparing time spent by winning bidders on the exchange, or on particular types of content, to time spent by other bidders and time spent by parties that did not elect to bid. Time spent can be correlated with various results, including winning bid information, information about prices, information about transactional costs (e.g., determining what types of content appear to create the largest delays during the deal process or contribute to the greatest costs). If the system provides this intelligence to people on the sell side of a deal, the seller may make use of the information in making the sale, such as by providing clarifying information about areas of potential concern, or initiating discussions over such areas.

The buyer interest index, or other analytic measure of buyer activity, may be developed based on what various users have done in past activity, to provide a predictor of future interest. In embodiments the system may extrapolate the viewing behavior of users to develop analytical trends for behavior of the user, or like users, such as looking at data from viewing specific documents and making predictions about what a buyer who looks at particular content tends to do in subsequent actions.

Such an index may apply to a buyer organization as a whole or to particular individuals or roles within a buyer; for example, an interest index may apply specifically to a CFO of a buyer, such that interest in financial documents is likely to be higher than interest in other items, such as intellectual property disclosures. Determinations of similarity, used for purposes of predicting interest, may compare various attributes, including organizational size, organizational type or industrial classification category, transaction type, past history of deal making, and the like at the enterprise level and may also be based at the individual or role level, involving comparison of attributes relating to the individual or role, including past activity history (e.g., tracking that the individual tends to explore the balance sheet and profit-and-loss statement first), level in the organization, tenure with an organization, past employment history, and many others. Similarity may be determined based on rules (e.g., those with the same role or title are treated as the same), or by attribute weighting or distance calculations such as used in various fields to cluster groups based on multiple attributes.

The system may assign various scores or metrics to users based on these analytics at the entity or individual level, thus providing a seller or a buyer with insight into the potential for an investment, a purchase, or other transaction. On the buy side of a deal, tracking of behavior of the seller may provide insight into various topics, such as a high level of seller activity indicating that a buyer is taking a bid seriously and a low level of activity suggesting the opposite. Again for both buyers and sellers, correlations of activity with actual market results over time can suggest which of these insights are most robust, and various hypotheses can be tested in an analytic environment that collects data regarding entity and individual viewing activity across various transactions for various enterprises, collects data regarding transactions themselves (e.g., price, timing, bidding history, and the like), and allows analysis (e.g., correlation) of various types on the data sets. In embodiments, transaction data can be cleaned to remove identifying information for a specific individual, for a specific entity and/or for a specific transaction, including by aggregating data across many transactions, so that analytic results relating to the impact of viewing activity can be understood over many transactions, without revealing confidential data relating to any particular transaction, individual or enterprise.

Mobile Device Interface

Figure 9:
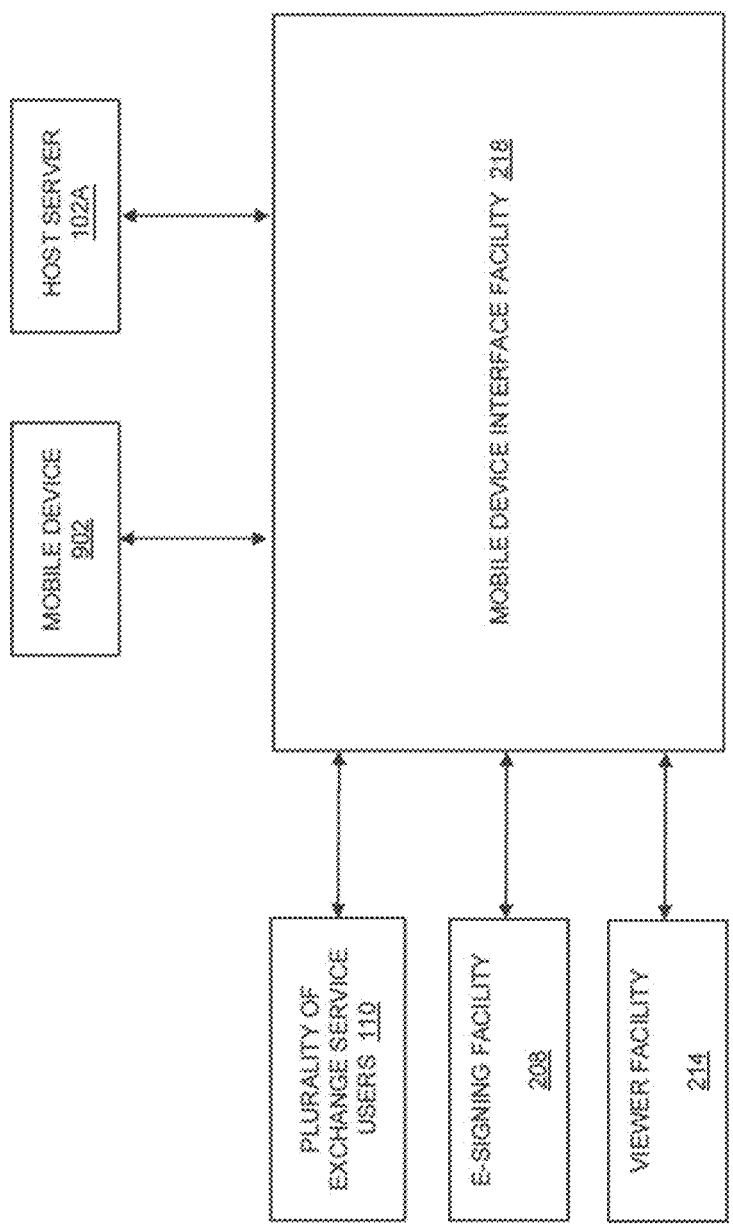
FIG. 9 depicts a functional block diagram for an exemplary mobile device interface facility in an embodiment of the present invention.

Referring to FIG. 9, the mobile device interface facility 218 may provide for facilities such that a mobile device 902 can be used while maintaining the secure exchange environment provided by a host server 102A of secure exchange system 102, such as for a tablet (e.g. an iPad), a smart phone, and the like, where for instance the mobile device is provided functionality provided through the e-signing facility 208, the viewer facility 214, and the like. Facilities normally provided through the host server 102A of secure exchange system 102 as shown in FIG. 2 may be provided in part or whole on the mobile device, such that the mobile device may be utilized when the mobile device does not have connectivity with the host server 102A. For instance, the user may be able to login to the same interface as when they are working through a non-mobile computer, such as on their personal computer, and see their list of exchanges, all of their documents, all of their contacts, and the like. Using an iPad as an example, all of the user's documents may be encrypted when sent to the iPad and decrypted for viewing, such that none of the information is decrypted and stored on the iPad. A user may not be able to print or save from the mobile device, and be provided with a secure document viewer, as described herein, such as partial viewing, eye gaze motion control, watermarking, and the like.

A mobile device viewing interface may include various configurations, such as public vs. private exchange views, where certain exchanges are visible as restricted by public-private declarations, more exchanges are viewed when all exchanges are able to be viewed, and certain other exchanges are viewable with viewing only mobile exchanges. Various functions can be provided for accessing exchanges, folders, files, and the like. For example, a message may be displayed if a user attempts to access an exchange or entity without the required declaration. Public vs. private document views may be displayed. Document classification may be provided, where a document control button may be provided for uploading, an appropriation may be specified, and the like. Public and private users and groups may be specified. Document access reports may be generated. File uploads may be made to various exchanges.

In embodiments, a secure viewing application for a mobile device may be provided to provide secure viewing

802, such as for a tablet (e.g. an iPad), a smart phone, or a mobile computer. In various embodiments disclosed herein, the user of a mobile device may be an employee or other individual associated with a business entity. In embodiments, users may include employees or individuals associated with business entities that place documents on secure data exchanges as well as employees or individuals associated with separate business entities that retrieve documents from secure data exchanges or view or consume documents on data exchanges. The entities in each case may further be separate from an intermediate business entity that hosts one or more secure data exchanges. The user of the mobile device may be able to login to the secure viewing application, such as when the user is working through a mobile device to see a list of exchanges, all of the user's exchange-related documents, all of the user's exchange-related contacts, or other information, where the application may be resident on the mobile device. In embodiments, the user may be able to login to the secure viewing application whether or not the mobile device is connected to an exchange, while in other embodiments some or all features of the application may be limited to situations where a connection to an exchange is maintained, or to situations in which the application has been connected to an exchange within a certain time period prior to using the secure viewing application. The secure viewing application may require the user to enter a personal identification number (PIN), password, or other indication of authentication (optionally including biometric authentication indicators) in order to access the application.

A user may be able to mark a document as a favorite by accessing the document from a mobile device, a personal computer, a web portal, an exchange or the like. The secure viewing application may allow a user to view a list of documents that have been marked as favorites. The user may be able to select an individual document from the list and view the document on the mobile device. The secure viewing application may track which documents and versions thereof have been selected and when the documents, or versions thereof, have been viewed by users. The secure viewing application may track versions of documents, including when each document version has been viewed by a user, whether or not the secure viewing application is connected to an exchange during viewing, such as by storing relevant data on viewing on the mobile device for delivery to or retrieval by an exchange when the mobile device is connected, or by sending viewing information at the time of viewing from the mobile device to the relevant exchange. The secure viewing application may communicate the tracked information to an exchange. The tracked information may be communicated to an exchange immediately if the mobile device is connected to an exchange. If the device is not currently connected to an exchange, the tracked information may be communicated to an exchange when the secure viewing application later becomes connected to an exchange. A document may be made available by an exchange to be marked as a favorite by a user. A document may be protected by an exchange to prevent a user from marking it as a favorite for downloading, and the like. A protected document may be restricted from off-line viewing, may be restricted from being screen printed, may be restricted to viewing only by authorized personnel, and the like.

Authorization for viewing may be provided by various methods, such as via face recognition using an integrated camera or some other type of biometric sensing, location-based services, network connectivity, and the like. As described herein, an integrated camera may be used to detect the authorized user's face, the authorized user's iris, the presence of other people in the camera's field-of-view, and the like, and when detecting the presence of an unauthorized individual, place restrictions on viewing, such as described herein. An integrated camera may be used in conjunction with a view-restricting layer, such as a physical sheet over the display of the mobile device, such as privacy screen (e.g., a polarizing filter preventing viewing outside a restricted angle of view) or by manipulation of the display to make off-angle viewing more difficult. In this way, the integrated camera is preconfigured to see any individual that is able to view the device screen within the restricted angle of view of the privacy screen. Location-based services may be used to restrict viewing by enabling or disabling a user's authorization for viewing based on the user's geographic location. For instance, the user may not be authorized to view a particular document in certain counties, outside their home country, outside a small geographic area around an office of an enterprise, around the user's home, on a known transportation route (e.g., a plane flight on which the user has a reservation), and the like. A user's authorization for viewing may be determined at least in part on the network connectivity of the mobile device, such as with the enterprise network, a trusted network, a WiFi network, and the like. For instance, a user may not be authorized to download a secure document through a cellular network, such as when they are not connected to a WiFi or wired network connection. The authorization for viewing may be a combination of these and other related parameters, where the restriction-based parameters and settings are controlled through a system administrator, such as stored in a user profile, determined by a policy, and the like.

If a user is connected to an exchange through an authorized network connection, a user may mark the document as a favorite and the document may then be downloaded to and stored securely on the mobile device of the user, such as being encrypted and/or provided with an unconventional, dedicated file format that is accessible only by the secure mobile application. If a mobile device is not connected to an exchange, or if the connection from the mobile device does not have sufficient bandwidth to download the document from an exchange, a document that has been marked as a favorite by the user may be tagged as a favorite by the user and then later downloaded to and stored securely on the mobile device of the user when the user becomes connected to the exchange and the connection has sufficient bandwidth. The postponed download may happen automatically or it may happen after the user later initiates the download or confirms that the download is still desired. The secure viewing application may alert the user that the download is taking place, provide the user with a download progress indicator, or download the file in the background without alerting the user.

The document may be downloaded over a secure connection between the exchange and the secure viewing application. The document may be stored in a secure location that may be accessed only by the secure viewing application, an encrypted memory location, or an otherwise secured memory location. The encryption used may be any encryption scheme known to one skilled in the art, such as AES 128 encryption, AES 192 encryption, AES 256 encryption, and the like.

A document may be constrained on an exchange such that it may only be accessed through the secure viewing application, or access may be allowed through any application that is compatible with the format of the document. In embodiments the document may be accessed by the secure viewing application whether or not the user is connected to an exchange. A setting may be provided, which may be selected by an administrator, to allow the administrator to restrict how or when a document can be accessed. For example, a setting may allow a document only to be accessed by the secure viewing application. Another setting may allow a document to be accessed by both the secure viewing application and any other application that is compatible with the format of the document. In embodiments the setting may be configured by the administrator of an exchange, such as working within an intermediate business entity or working for an entity that places documents on an exchange. The setting may be selected for an individual document, a document folder, or a group of documents. A document that is made available to be accessed by any application that is compatible with the document may be edited by another application and saved back to an exchange through the secure offline mobile application.

An exchange may verify changes to documents through indicators of modification, or "modification stamps", on the documents that have been marked as favorites by a user. Such indicators may indicate when changes have been made to items accessed through an exchange, so that a determination can be made whether any modification has occurred to a document, file, etc. between the time the user last connected to the exchange. Modification stamps may take the form of metadata stored in or associated with a document, file, etc., a tag, or similar facility for tracking status or state information. An exchange may verify the modification stamps on the documents that have been marked as favorites by a user when the user connects to an exchange and logs into the secure viewing application. A document may be deleted from the mobile device if its modification stamps indicate that the version of the document on the mobile device is not the current version. A document may be marked as being out-of-date when a user logs into the secure viewing application if it is not the most current version of the document. In embodiments the out-of-date document may be visible to the user. The out-of-date document may include an indicator to communicate to the user that the document is not the current version of the document. Access may be denied to an out-of-date document. The current version of the document may be downloaded. Download of the current version may happen automatically or upon user request or upon a confirmative response to an offer for the current version. The user may immediately download the current version at the time the user selects the document for viewing. The download may take place whether or not the user is logged into the secure viewing application. A visual indication may alert the user that a document is being downloaded. The user may not be able to access a document if the download of the most recent version of the document is not completed before the user disconnects from an exchange.

A secure viewing application may be provided, and may include a screen asking a user to setup a PIN, a screen that prompts a user to enter a PIN, and a screen that is used by a user to select a setting. The application may provide a list of various documents that have been selected as favorites by a user connected to the exchange, as well as other documents that are selected by a user and loaded for viewing. A screen of the secure viewing application may allow a user to select a document as a favorite when the mobile device is connected to an exchange. A screen of the secure viewing application may allow a user to select a document that is made available through the secure viewing application and is available to be opened in a different application.

A touch-sensitive secure viewing facility may be provided which prevents viewing a part of a document on a mobile device (such as a smartphone or tablet) or another device with a touchscreen or other touch-enabled controls. For example, a secure viewing application may enable the sharing of the text of a document or proposal, but obfuscate the figures or images at various times, such as to prevent data leakage by the taking of screenshots or detecting another person looking over the reader's shoulder, etc. In embodiments, certain selective portions of a document (e.g., figures, images, text) may be obscured or redacted except while a user of the device is touching the touchscreen of the device, or while the user of the device is touching the touchscreen of the device and for a brief period thereafter. In embodiments, only that portion of a document within a window on the touchscreen of the device is visible, with the window being movable as the user moves or scrolls their finger on screen in order to enable viewing of different portions of the document. In embodiments, a list of documents may be presented on one side of the touchscreen, and by pressing and holding an item on the list, a preview or abstract of the associated document can be seen while the user continues to press and hold. A separate way may then exist in order for the user to obtain or view the full document. The secure viewing application may be embodied in software compatible with or utilizing functionality provided by the operating system of the mobile device on which it runs, implemented through device hardware associated with the mobile device touch screen, and the like.

Figure 60:
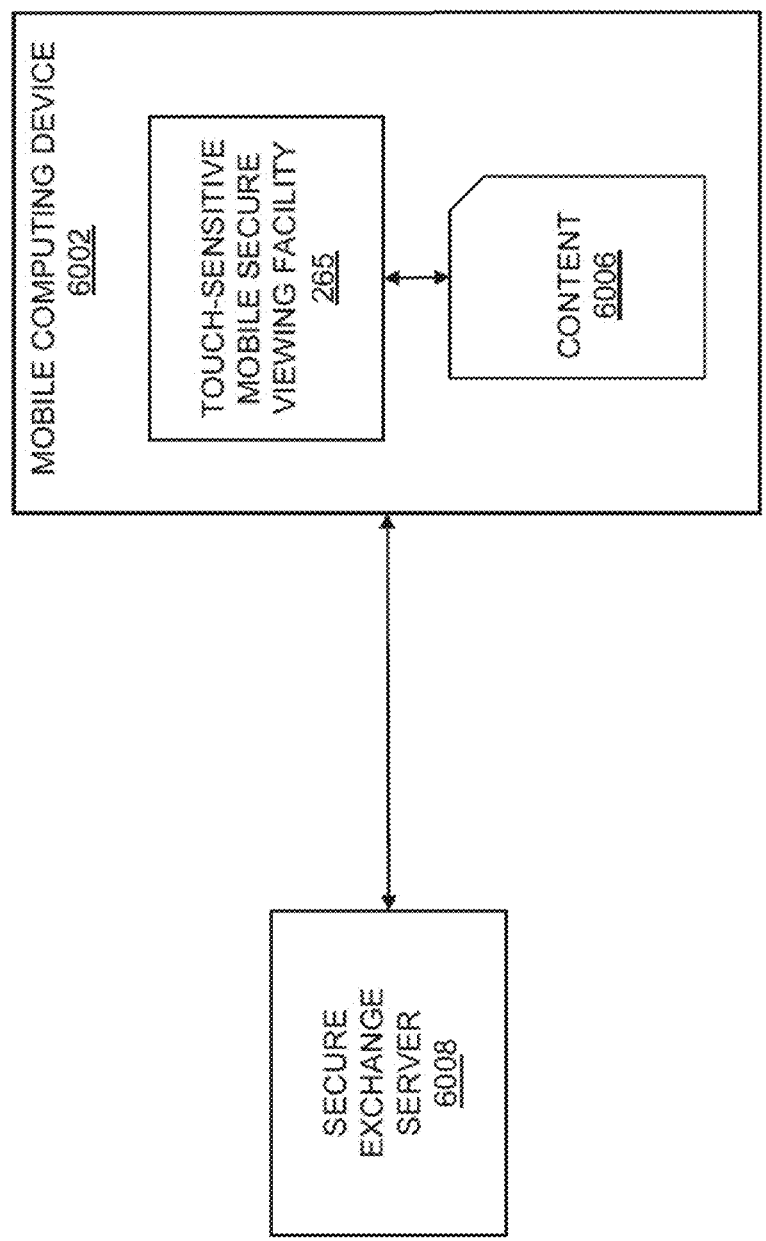
FIG. 60 depicts an embodiment of a secure viewing facility on a mobile device where viewing is obfuscated when a user is not touching the display of the mobile device.

Referring to FIG. 60, a touch-sensitive mobile secure viewing facility 265 (e.g., an application on a smart phone or tablet) may enable a computer data content 6006 to be viewed securely, such as where the computer data content was downloaded from the secure exchange server 6008 onto the mobile computing device 6002. The touch-sensitive mobile secure viewing facility may provide obfuscation of the computer data content when the user of the mobile computing device is not touching the display of the mobile computing device, not touching the image of the document on the display, and the like.

In embodiments, a secure exchange server hosted by an intermediate business entity may establish a user login data authentication procedure that allows one or more users through at least one client computing device to access the secure exchange server, wherein at least one of the one or more users is of a second business entity, and wherein communications between the secure exchange server and each of the one or more users is through a communications network. The secure exchange server may store user login authentication data for the at least one user of the second business entity, receive computer data content from at least one user of a third business entity, and receive from at least one user of the third business entity an indication of permission for the at least one user of the second business entity to access the computer data content through a designated mobile computing device equipped with a touch responsive display. The indication of permission may include a content viewing policy that permits viewing of the computer data content on the display of the designated mobile computing device only when at least one finger of the at least one user of the second business entity is in contact with the touch responsive display. The secure exchange server may grant access to the computer data content to the at least one user of the second business entity on the designated mobile computing device through a secure viewing facility when the secure exchange server receives the user login authentication data for the at least one user of the second business entity, wherein the secure viewing facility restricts viewing of the computer data content as presented by the designated mobile computing device to only the authenticated at least one user of the second business entity on the designated mobile computing device, wherein the granted access is in accordance with the content viewing policy.

Various documents may be made available for a user to view when a mobile device is not connected to an exchange and the mobile device includes a secure viewing application. The secure offline mobile viewing application may be employed when a user desires to access a document, especially one that is subject to frequent revision, when there is no connection between the mobile device and the exchange. The secure offline mobile viewing application may also be used in situations when a document is subject to a corporate policy which requires access to only the current version of a document. The secure offline mobile viewing application helps to ensure compliance with corporate policies that require prevention of access to superseded document versions and may be used as proof that the user accessed the current version of the document. The secure offline mobile viewing application also permits users to collaborate on documents with other users through an exchange, when the documents are not subject to any corporate compliance requirements with regard to version accessibility.

In embodiments, the present invention may provide for technology aspects related to architecture, structural components, facilities, data, communications, analytics, reporting, materials, inbound components, processes, algorithms, and the like. Architecture, structural components, and facility may include multi-language support, metadata association, document content processing, document content distribution, distributed geo-storage, and the like. Relationships among components may include CRM integration, sales force connector, HCM integration, ERP integration, ECM integration, e-Learning integration, and the like. Data, communications, analytics, and reporting may include user history reporting, activity reporting, permission reporting access reporting, audit and compliance reporting, configurable dashboards, self-service reporting (e.g. custom, scheduled, ad-hoc), IMAP folder management, exadata integration, and the like.

In embodiments, the present invention may provide for product aspects related to features, attributes, benefits, outputs, functional benefits, security, and the like. Products may include integration from a secure data room, public-private bifurcation in the loan market, secure mobile devices, and the like. Features, attributes, and benefits may include iPad protected documents, bounce-back reporting, branding, channels, alerts, task management, multi-task process management, automatic indexing, migration, automation (e.g. ILIA automation), specialization (e.g. custom fields, custom workflow), very large file support, document management (e.g. review and approve, check-in and out, version control), customizable user interface, unified inbox, and the like. Product features may include custom alerts, buyer utilities, bulk addition of files and folders, dynamically indexing information, advanced and federated search and filtering, custom fields and tags, integration with third-party document formats (e.g. Microsoft Office products), add and management of users and groups, multi-file uploads, commenting, compliant archiving, native-format file viewing, business intelligence based on activity reporting, question and answer components, link mapping, secure viewing without plug-ins, unified communication and collaboration (e.g. presence notification, IM-chat-discussion threads, forums and wikis), administration capability, e-forms, and the like. Security may include on-demand rights management, access and authentication (e.g. document and content level access, multi-factor authentication, single sign-on), data encryption, tracking and audit, intra-structure security (e.g. systems protection, security audits), personnel security, process security, encryption, watermarking, and the like.

In embodiments, the present invention may provide for market aspects related uses, applications, environments of deployment, use scenarios, ecosystems, value chains, system integration, and the like. Applications may include corporate repository, extended team collaboration, managed file transfer, secure extranet, project lifecycle management, board reporting, legal extranet, legal repository, legal collaboration, managed file transfer, regulatory audit and reporting, secure extranet, financial audit management, fundraising, investor communication, contract management, regulatory filings, board of directors' communication, Compliance feed integration, access gatekeeper, project capital finance, project collaboration, supply chain management, contract manufacturing, and the like. Markets may include finance, loan syndication, M&A (e.g. relationship management and marketing activities, client interactions, sending legal documents and contacts for comment, edit, and signature), alternative investments, commercial banking, investment banking, bankruptcy and restructuring, corporate development, construction, life sciences, pharmaceutical, biotechnology, energy and utilities, utility rate case management, insurance, telecommunications, project life cycle management, information technology, legal services, government, manufacturing, real estate, media and entertainment, and the like. Environments of deployment may include corporate development, corporate repository, corporate finance, corporate legal, engineering, human resources, marketing, general services, research and development, compliance and security, line of business, and the like. Use scenarios may include, bankruptcy and restructuring, board reporting, business development and licensing, clinical site activation, extended team collaboration, fundraising, initial public offerings (IPOs), investor portals, investor reporting, legal extranet, managed file transfer, mergers and acquisitions, private placements, project lifecycle management, regulatory audit and reporting, regulatory case management, safety document distribution, secure extranet, structured finances, syndicated lending, virtual data room, and the like.

Sharing and Un-Sharing

Current methods for sharing computer files are not adequately secure in that a user may make errors in sending information, such as with a single, errant click, and send sensitive information into the wrong hands with no way to recover the sent materials. Alternately, sensitive information may be provided to a trusted associate that subsequently leaves a company or department, to a vendor where the user's company subsequently switches vendors, to someone outside the company that is subsequently identified as a risk to the spread of sensitive information, and the like, where the sender would like to revoke access to the shared content. The present invention may provide for methods and systems for securely sharing content (e.g., computer data content, such as documents, presentations, spreadsheets, emails, blog entries, texts, calendar notes, meetings, social media messages, browser history, bookmarks, and the like) that allows for 'un-sharing' of content that has been previously shared. The facility to un-share content may be implemented through the content being associated with a secure protection feature, such as through digital rights management (DRM), encryption, permissions, and the like. In embodiments, each content item may shared with the protection feature, where the protection feature specifies a user or group of users that are authorized to access the content for viewing. Then when the content is shared with that user, access to the content may be revoked at any time (e.g. by changing the DRM, removing access to the key, changing permissions, and the like). Further, if the sender of the content controls the protection feature, then the sender has complete lifetime control of any content they distribute or provide access to.

The secure un-sharing facility may be used to securely share content beyond the secure protective facilities of their enterprise (e.g., allowing secure sharing beyond the firewall of the sender's enterprise), out to users in other companies, into the public space, to users not intended to get the content, and the like, where the sender maintains complete control to access of the content, no matter where or to who the content has been distributed. In this way, the secure sharing of content is made to be easy across corporate boundaries at the user level and at the individual content level (e.g., at the level of an individual document). Further, the process allows a user wishing to unshare content to be discrete in its execution, allowing the sender to revoke access without having to contact or to track down the recipients, who may not have any indication sent to them that access has been revoked. With the unsharing facility, the content simply stops being accessible. And the revoking of access may be for not only the original content, but for all instances of the content, such as copies stored on various devices and computer environments (e.g., stored on desktop computer, tablet, mobile smart phone, in an application, through a web browser, and the like), copies sent to third parties, and the like. And since the protection feature may apply to all versions that have been modified (e.g., edited versions, redline versions, commented versions, signed versions, and the like), access to modified versions of the content may also be revoked when the access to the original content is revoked.

In embodiments, access to a shared content may require an access authentication to a secure facility, such as the secure exchange server. That is, even if content has been shared with a user, the user may only be able to view the content if their access is authenticated. Authentication may be a manual login to verify that the user attempting access to the document is a user that is listed to have access to the content. Alternately, a user that has access may establish a computer device that is tied to their personal authentication, such as through the secure facility. For instance, an authorized user may associate their personal authorization to their portable computing device (e.g., tablet, smart phone), such as where the portable computing device has a password to access the device, thus ensuring that the person requesting the access from the mobile device is the authorized user.

In embodiments, the security process that protects the content, such as a document to be uploaded and shared, may incorporate a plurality of protective steps. For example, when a document is uploaded a virus scan may be run, permissions may be established, a search index may be created, digital protection may be applied, the document may be converted (e.g. formatted), the document may be encrypted, and the like, where encryption may be applied individually to each new content, such as through a randomly generated encryption key. When a download of the document is requested, such as when an authorized user is downloading as part of the document being shared, a random key with a key ID may be generated for that particular document where the document is encrypted with the random key. A master key may be split between a database and a file system, where the encrypted random key and random key ID are stored in the database, and the random key may be encrypted with the master key, and the like. Permissions, virus scan, watermark, digital protection, and the like may then be applied before delivery of the document.

In embodiments, the un-sharing facility may enable the control of access down to the individual content level, such as with the creation of a new document, which may be part of or be the start of a collaborative social work stream, allowing users to share content, and then initiate and perpetuate conversations and interactions around those contents. Social work streams may support discussion threads, activity streams, and other common social interaction facilities, which may utilize the content as the organizing basis. The process of un-sharing a content may result from removal of the content from the work stream, retiring the work stream, removing the individual content entirely, and the like.

The present disclosure describes a secure content sharing and productivity solution for organizations to share confidential and non-confidential content between and amongst enterprises over a global communication network such as the Internet, including outside enterprise firewalls. The present disclosure may provide a secure content sharing and collaboration environment that goes beyond the enterprise firewall; establishing a seamless dual-use user workflow environment that accommodates both secure and personal exchange of content without the need for the user to adopt substantially new workflow process and applications; providing secure interfaces for viewing documents using mobile computing devices, such as touch-interface tablets (e.g. including the incorporation of personal user devices); and the like.

The need for beyond-the-firewall content sharing space has been created by the confluence of technology evolution (e.g. cloud computing and virtualization, portable form factor innovation, 'big data' BI tools), organizational shifts (e.g. rapidly growing cross-enterprise collaboration, global fragmentation of enterprise, cross-functional teams, demographics shifts), changes in the role of integration technology (e.g. cost and complexity reduction, pressure for measureable business value, 'computerization' of enterprise IT and 'bring your own device'), government and regulatory issues (e.g. increasing regulations, cyber security threats), and the like that collectively increase the importance of easy and secure collaboration of documents and content beyond the enterprise firewall. Other solutions have taken a variety of approaches to address fragments of these requirements, but important unmet needs remain for information technology directors, business leaders, and users remain, including in the areas of integration of security/control, ease of use, seamless operation across different ways of sharing, and the like.

In embodiments, the system may include methods and systems for providing a single fabric to enhance the most common forms of beyond-the-firewall content sharing, improving individual and team productivity across the extended enterprise while providing unified security and compliance for IT and business leaders; allow users to continue beyond-the-firewall sharing however they prefer with a single user interface enhancing the security and productivity of e-mail, sync-and-share folders, externalized enterprise content management, and enterprise social collaboration tools; integrate with consumer-focused sync-and-share services where possible to enable their secure and compliant use within the enterprise; enhance forms of collaboration to which users are already accustomed, and not require adoption of a new way of working or collaboration destination; target the unique collaboration and sharing requirements of the extended enterprise and complement other enterprise systems; and the like.

In embodiments, a need for a comprehensive sharing system may include an ease of use and intuitive user interface; with granular security permissions, to help ensure that unauthorized individuals can't open documents; ability to control content post-sharing (e.g. the ability to pull back a document), enabling a user to recover and destroy data remotely, such as in using a virtual data room; productivity tools integrated with content sharing, consolidating a plurality of user log-ins and passwords; the ability to integrate with existing infrastructure, to eliminate the need for a plurality of sharing tools; providing multiple channels for collaboration in order to integrate the methods and systems into as many productivity platforms as possible; and the like. For instance, with a single user action within the user interface, the user may be able to revoke access to a shared file or resource, regardless of where the file or resource is stored, thus providing an enterprise workforce the freedom to share, as well as the ability to un-share. In addition, reporting of actions may include audit trail facilities, such as at the gateway level, and governance, including policies embedded in workflows. Collaboration may be provided with significantly reduced risk through tools provided by enterprise information technology personnel, thus reducing the risk of employees sharing sensitive documents outside the firewall (e.g. through email, USB transfers, FTP, through third-party services, web/cloud file sharing, and the like). Security may provide additional protection, such as through IRM, encryption, and the like. The sharing facilities may include sync and share functionality, workflow tools, business intelligence, and the like, and provide greater secure connectivity and productivity, improving the workflow in association with customers, suppliers, partners, professional service organizations, business prospects, and the like. Thus, methods and systems disclosed herein may include client and server-side, as well as cloud-deployed components, for managing access to resources, including based on policies associated with such resources, as well as such components for tracking, reporting, and managing access to resources, such as to keep consistent, synchronized versions of such resources across multiple access devices.

Content Access Management

Figure 10:
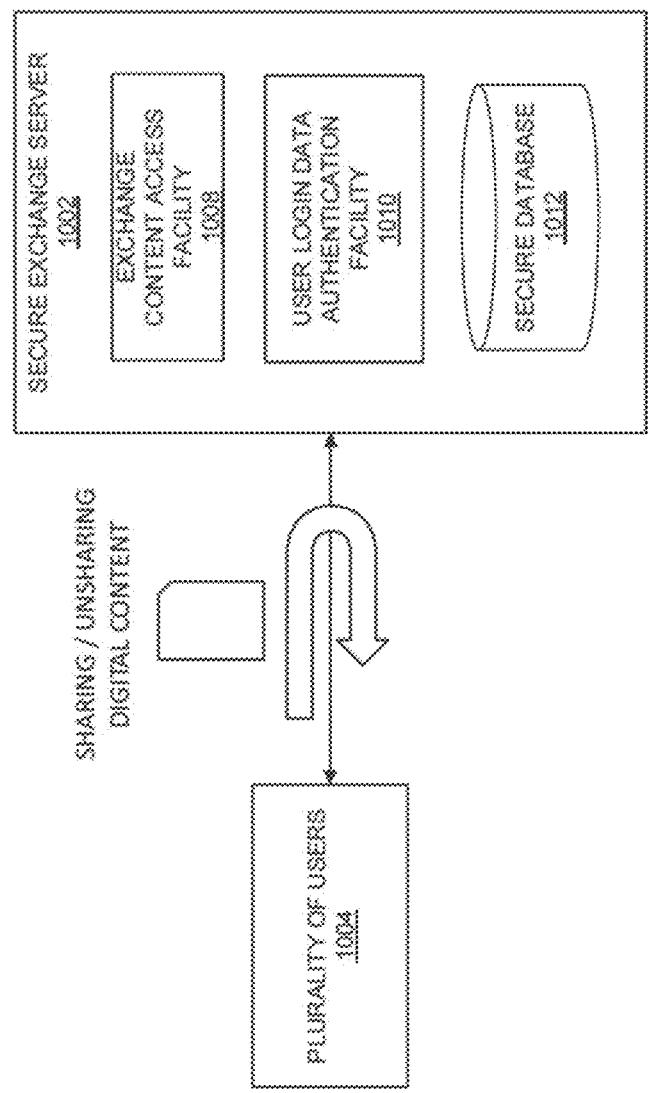
FIG. 10 depicts a functional block diagram for an exemplary un-sharing facility in an embodiment of the present invention.

Referring to FIG. 10, the present disclosure describes an exchange content access facility 1008 (content access management facility 251 as in FIG. 2*a*) in association with the secure exchange server 1002 that improves the security with which a plurality of users 1004 collaborate freely, including through a plurality of different content sharing devices and facilities, while providing lifetime control of their content. For example, suppose a user sent quarterly sales data to an old accounting firm, employee records to someone outside of HR, the wrong contract to the wrong vendor. When a user 'un-shares', content access may be instantly revoked, including any content that may have been from copies of the original content. In embodiments, the user may have total lifetime control of each and every content item, such as documents, emails, communications, and the like. In embodiments, the content may be stored and tracked in a secure database 1012. Users may share and revoke access to content all the way down to the document level, providing a secure place to upload files and share them across devices. In this way, users may be provided a secure storage facility for company sensitive information, where users are able to work more securely, such as with their existing infrastructure (e.g. seamless integration with applications like Microsoft Outlook, SharePoint, and the like). The un-share facility may allow a user to create a new work stream, securely upload the documents, and work with teams that are enabled to securely collaborate. In addition, the un-sharing facility may provide for reports, audits, summaries, and the like through a dashboard facility, such as a summary view of all work streams, customized security settings, ability to add new participants, provide automated reporting, and the like. The exchange content access facility 1008 may utilize a user login data authentication facility 1010 to authenticate users' access to content, where there may be the option of having a single sign-on in association with other user logins. In embodiments, the login may utilize security hashing in a redirect URL, such as to secure the login against Phishing attacks. The single sign-in may extend to mobile devices, including personal mobile devices, were a lookup table may be used to verify that the user has single sign-on capabilities or not.

In embodiments, a method for managing a networked secure collaborative computer data exchange environment may be provided. The secure exchange server 1002, such as managed by an intermediate business entity, may establish a user login data authentication procedure that allows a user to access the secure exchange server, where the secure exchange server may store user login authentication data for each of the plurality of users, such as in a secure database. Users may access the secure exchange server through a plurality of different computer devices, applications, communications channels, and the like. The user may be one of a plurality of users 1004 that work for a plurality of other business entities (e.g., users may be employees of the same business entity or users may be working for different business entities), where the users of the other business entities communicate with the secure exchange server through a communications network, such as a wide area network (e.g., the Internet). To share a computer content item, a first of the plurality of users may request a sharing access from the secure exchange server to a content item to at least a second of the plurality of users. Management for access to the content may be through an exchange content access facility 1008 managed by the intermediate business entity. After the exchange server receives the content from the first of the plurality of users, it may grant sharing access to the content when the secure exchange server receives from the second of the plurality of users its client login authentication data (provided that the second of the plurality of users is one of the subset of the plurality of users to which sharing access is permitted). The second of the plurality of users may then request a copy of the content from the secure exchange server, wherein a copy of the content is made. Further, the second of the plurality of users may further copy the content onto a plurality of different computing devices, make changes, revisions, annotations, and the like to a new version of the content, send the content to other users, send the content to people and computing devices beyond the boundaries of the business entities, and the like. To un-share the content, the first of the plurality of users may then make a request to the secure exchange server to revoke sharing access to the content to the second of the plurality of users. As a result, the secure exchange server revokes access by the second user to the content, such as through encryption and DRM facilities described herein. Further, this revocation of the second user's access to the content may similarly be applied to all instances of the content within the plurality of users, wherein the revoking of sharing access to the content revokes access to all instances of the shared content and all copies of the content made by the plurality of users. In a similar fashion, any individual that does not have authority to access the content may not have the ability to access any instance of the content. In embodiments, copies of the content may be deleted from the secure data server, wherein the deleting access to the copy of the content is revocation of digital rights management of the content. The digital rights management of the content may be controlled in part by the first of the plurality of users, including revoking access to the content through changes in the digital rights management associated with the content. The content may be a secure encrypted content. Users may securely view the content through a secure viewing facility. Users may be connected to a public network that is outside of the firewall for the business entity that manages them. Users may access the content through a personal computing device that is not owned by the business entity that manages them, such as through a personal computer, personal mobile device, and the like. Users through a dashboard facility may interface the exchange content access facility, where the dashboard facility may provide reports showing activity related the sharing of content. The dashboard facility may be accessible through third-party environments. The dashboard facility may track the location and version of the shared content on computing devices accessible by the at least second of the plurality of users.

Figure 10A:
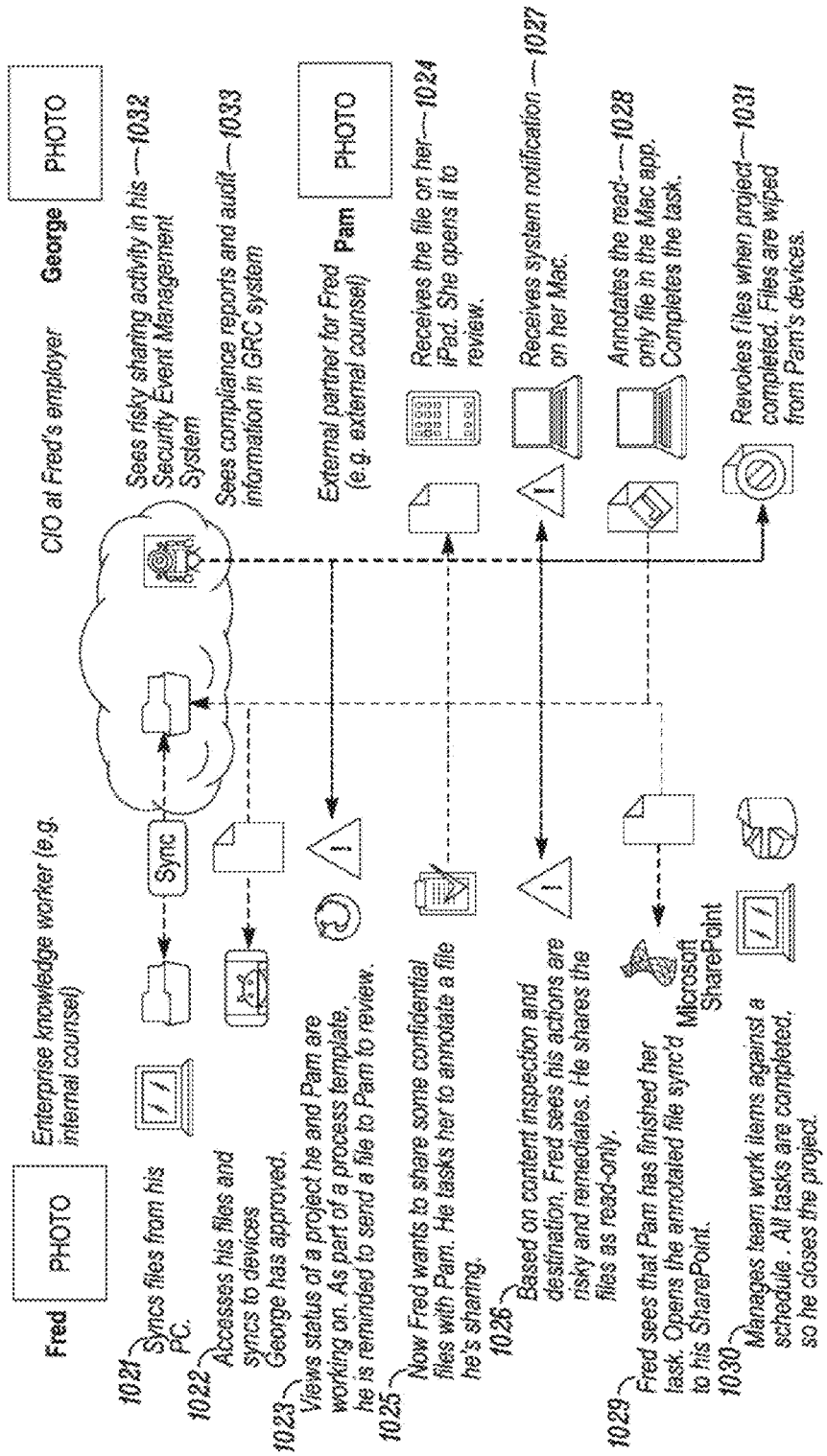
FIG. 10A depicts an illustrative process flow diagram that in part describes an interaction utilizing the un-sharing facility.

FIG. 10A provides a non-limiting example of how the present invention may provide an improved workflow between collaborating individuals. In this workflow scenario, an enterprise knowledge worker 'Fred' (e.g. internal counsel) is collaborating with a chief information officer 'George' who works at the same company as Fred, and an external partner 'Pam' (e.g. external counsel). As shown, in a first step 1021, Fred may sync files from his personal computer, such as with resources in the cloud. These resources may include syncing with virtual secure data room facilities, third-party computer sync facilities that are compatible with the present invention, and the like, and may be made available through the dashboard facility. In a second step 1022, Fred may also access his files and have the ability to sync to devices that George has approved, such as through a virtual secure data room, an enterprise or shared enterprise policy facility, and the like. In a step three 1023, Fred may view status of a project he and Pam are working on, such as through the dashboard facility. As part of a process template, he may be reminded to send a file to Pam for review. In a step four 1024, Pam may receive the file on her iPad, where she opens it to review, such as through the mobile device viewing facility. In a step five 1025, Fred may now want to share some confidential files with Pam, such as though a virtual secure data room facility, with the ability to 'pullback' the document from Pam at anytime through the un-sharing facility. In addition, Fred may task Pam to annotate, review, markup, revise, and the like, the file he's sharing, such as through a content creation application (e.g., word processor, spreadsheet application, presentation application, media tool), the amendment voting facility, the e-signing facility, via the secure viewer facility, and the like. In a step six 1026, based on content inspection and destination, Fred may see his actions are risky and decides to remediate, such as by un-sharing the document from Pam's access, as implemented through the dashboard facility, and the like. He may then, for instance, choose to share the files as read-only. In a step seven 1027, Pam receives system notification on her Macintosh computer, such as through the dashboard facility. In a step eight 1028, Pam annotates the read-only file in the Mac application, and competes the task, such as through an application that Pam is familiar with and integrated for ease of use in the familiar workflow environment created by the present invention. In a step nine 1029, Fred sees that Pam has finished her task, such as though the dashboard facility, opens the annotated file and syncs (e.g. via SharePoint). In a step ten 1030, Fred manages teamwork items against a schedule, and with all tasks competed, closes the project. For instance, the project may have been a loan syndication project, and once complete, Fred may completely eliminate accessibility to documents and communications that were transmitted during the transaction, such as removing access to any documents that were transmitted during execution of the project. In a step eleven 1031, Pam may also revoke files when the project is completed, and files are wiped from her devices, such as the system pulling back the files as tracked by the system in a secure database created for the project (which in itself may be deleted once the project is complete). In a step twelve 1032, George may see risky sharing activity in his security event management system, and in a step thirteen 1033, see compliance reports and audit information in a governance, risk management, and compliance (GRC) system, such as through monitoring via the dashboard facility. In embodiments, a workflow thread may be initiated within an exchange amongst other business entities, with selected individuals in a micro-transaction, from an email thread, and the like. In embodiments, a user may be enabled to create a concept of a big project and use micro-transaction capabilities to break the big project down into smaller projects that can link back up to the big project. A user may be able to create tasks out of their email inbox, turn an email thread into a task, clear a task by converting the email into a work-stream, make an exchange an extension of an email, and the like.

In embodiments, the system may provide for the ability to remotely delete content from a device while the device is off-line or not connected to a network. This capability may be implemented by providing a lease to a desktop application when it starts up and has a successful logon, such as configured by a policy through an administer console. When a device is powered up and a lease period is expired without a successful logon during the lease period, the system may initiate a deletion of files, such as would be the case if the device had been lost or stolen. This application may be a separate desktop service running on the device in the background (e.g., sleep and awake in pre-defined time intervals). When a device is powered up, the application may record the values of a lease expiration date/time of a previous successful login. In another instance, the service may try to connect to a server, and if it detects connection failures continuously past the lease expiration date and time, it may assume that either the device no longer needs to run the application, or it could be lost or stolen. In the case of the device that is subsequently found or re-used, the content may be re-synced for the user once they login to the application successfully. There may be hard or soft leases implemented in the system. In the instance of a hard lease, files may be deleted permanently on the local machine when the lease is expired. In a soft lease, rather than deleting data, the system may move the data to a random location on the disk where a user cannot find it. For example, the system may modify the folder attribute for the data, such as to "+S+H". Setting those attributes will mark it as an important operating system file so that the operating system won't display the data even if settings allow the display of hidden files and folders. In embodiments, the system may provide for automatically deleting documents, whether the device is online or not, based on a date/time range. For instance, setting a range of dates for the life of documents to be between on date/time and another, at which time all related documents and folders are deleted. The system may also delete documents, folders, desktop, and the like, after a predetermined number of login failure attempts, where the system may provide access again upon restoration of access privileges.

In embodiments, the system may provide for remotely deleting documents through a limited local access facility, where the user may have access to a document, folder, and the like, only through an encrypted local application. In this way, files stay encrypted on a user machine and the only way to access them is to use the application that will decrypt the documents. The local application may also be embedded, as described herein, such as through a browser, where a user may only be able to access documents with credentials that tie to the encryption key. The local application may be a viewer application, where documents are distributed through a distribution engine, but where the user can only view the documents using the viewer that would decrypt the document for viewing.

In embodiments, the system may integrate the sharing capability with other third-party environments, such as including existing file sharing solutions (e.g. Dropbox, Google Drive, Skydrive, Box.com, MediaFire, SugarSync, TitanFile, YouSendIt, SparkleShare, Ubuntu One) providing cloud storage, file synchronization, client software, and the like. In addition to sharing resources, the present invention may also provide a 'share' option within other third-party day-to-day workflow solutions, such as desktop tools (e.g. Microsoft Office, iWork, Google Docs, OpenOffice, and the like) and enterprise tools (enterprise DBs, CRM tools, analytical tools), and the like, where without departing the interface of the third-party tool or application, the present invention may allow content to be shared outside the enterprise with another party, but with the secure data room and secure viewing features as described herein (e.g. the ability to track access and viewing, ability to have 'read only' viewing and annotation, secure viewing on a mobile device, ability to pull back a document), and the like. Further, the present invention may be able to interface with templated secure sharing processes, such as by having input events and output actions consist with those (e.g., Outlook receives an email from a secure process and signals an action; LinkedIn lets a user view and approve a corporate voting item).

In embodiments, the system may enable an organization to maximize the value of content by balancing the freedom to share with the necessary control and monitoring provided by the system, which extends the way an organization works, such as by allowing them to share and access content wherever it is needed, controlling and monitoring content wherever it goes, coordinate work across people, organizations and devices as a natural extension of familiar tools and experiences. The system may provide for a full-service, global facility as a 'partner' wherever the user may go, providing visibility and control of work-centric content, freedom to collaborate, and the like. The system may provide a trusted standard for information security 'beyond the firewall', providing automation and monitoring of corporate information policy, extending a familiar user experience and existing infrastructure, and the like. Collectively, the methods and systems of the present invention may provide for an intent-based sharing 'fabric' for enabling comprehensive collaboration.

In embodiments, the system may provide for improved connectivity, security, productivity, and the like, as related to a shared collaborative work environment. Productivity may include the ability to assign and manage document-centric business actions (e.g. e-signature), project task management, and the like, such as to provide more structured document sharing platforms (e.g. more than just email, which may be an ad-hoc communication). Security may include role and file-based permissions, outside the firewall pullback of document permissions, automatic document content and security classification, and the like. Connectivity may include single secure connection to document sharing tools across devices, secure access to internal ECM platform for external parties, integration of enterprise-class security into existing sync-and-share tools, and the like, such as to enable access anywhere the client needs it and the ability to make updates to documents easily, regardless of where the user is located. The system may provide advanced analytical features to improve productivity, such as audit compliance, document versioning and tracking, document contextualization, historical performance analysis, predictive analytics, task productivity optimization, and the like. The system may also include social collaborative features to improve interactions within projects, such as improved communications within the workflow, secure project management, tablet-based collaboration, synchronous co-editing, social collaboration, a social layer around business applications, and the like.

In embodiments, the system may provide for synchronization and sharing for the individual business professional, including a plurality of channels (e.g. Windows desktop client, web browser, Microsoft Outlook for Windows, iOS support (such as a native app for the iPhone and iPad)), features (e.g. desktop file and folder synchronization; secure file sharing from desktop, browser, and iOS; push notifications, collaborative discussion threads and commenting; user self sign-up), for work with business intent (e.g. sending a copy for download, sharing access to a centrally located file for review), administration (e.g. canned activity audit reports, such as for compliance; canned accounting reports, such as for billing); centralized group policy, such as for security defaults), security (e.g. with strong, per-file encryption and permissions; browser-based, read-only file access; integrated file information rights management (IRM) and digital rights management (DRM); file access revocation; mobile device security; full compliance audit), and the like. The term 'work with business intent' may include the ability of users to share files 'with intent'. For instance, the intent may come in the form of document tasks that may be assigned to recipients, where the system may let users send files for review, send for signature, send for annotation, comment, and the like. For instance, the system may want to give users the ability to combine document tasks (verbs) into ad-hoc workflows and save as a template, which may also be referred to as a verb cluster. In an example, if a manager has to get slides ready for a board of directors (BOD) meeting, they may start up a "BOD" workflow that included several document tasks and individuals responsible. One employee may get a task to comment on the slide deck, another gets a task to review and approve the material, and the manager gets a task to sign the document for auditors after the first two tasks are completed.

In embodiments, the system may provide for document collaboration and intent-based 'work', including a plurality of channels (e.g. native Android, iPhone, and the like support; plugins for Microsoft Office apps; SharePoint Connector integration; Mac Client (such as file/folder sync)), features (e.g. desktop file and folder synchronization for Mac; file sharing with intent, such as for document-centric work assignment and task management; calendaring; in-document task completion; collaborative editing and annotation; 'in-app' publishing and collaboration, such as check in/out), for work with business intent (e.g. work items such as send for review and approval, send for feedback and annotation, request edits to a document, send for electronic signature, request form completion), administration (e.g. bulk user administration through active directory, UI customization and branding, report creation and scheduling), security (e.g. device registration, data loss prevention filters, such as reminders to users when they share files in a risky way; remote device wipe), and the like.

In embodiments, the system may provide for enterprise integration and business process management, including a plurality of channels (e.g. published integration API, third-party app integration, Outlook for Mac), features (e.g. work template creation, team collaboration spaces, milestone and project management, in-browser document editing), for work with business intent (e.g. work item customization, such as combining document tasks to create lightweight ad-hoc business processes), administration (e.g. user and administrator-authored business process), security (e.g. data loss prevention, such as blocking unsafe actions; security information manager (SIM) and security event manager (SEM) integration; customer managed encryption keys; governance, risk management, and compliance (GRC) system integration), and the like. For instance, disclosed features (e.g. an un-sharing feature to pull back documents as described herein) may be embedded into daily use tools, such as into communications software (e.g. Microsoft Outlook, Gmail), browsers (e.g. Windows Explorer, Firefox, Safari), Enterprise Resource Planning (ERP) applications, legal systems, collaboration systems, and the like, and to make it easily available and easy to use. All these systems have a need to distribute documents outside the enterprise firewall to users who are not logging into these systems on a daily basis, and by embedding these capabilities enables users for secure sharing, auditing, compliance, and the like for documents within user applications. In an example, suppose sales personnel are building a quote for a customer in a third-party application, such as Salesforce.com for instance. Typically, users would have the ability to email the quote directly, or to download the document and email it, where there is no audit or compliance within the third-party application for these quotes. With the use of an embedded capability, the document would be sent directly from the third-party application with the system's secure sharing audit and compliance capabilities, ability to pull back (un-sharing) documents, and would be available from within the third-party application. The embedded service may have the standard components to make this service possible, such as SSO authentication, file viewer, policy definition, auditing, device provisioning, user profiles and compliance, and the like, where these would be built like a service and may be integrated directly into the standard enterprise applications. Security rules may also be implemented in the embedded system, such as with a range of security (e.g., ranging from public to highly secure), screen capture and viewing protection, device control, auditing enforced, and the like.

Encrypted File Format for Desktop Access to Enable Secure "Un-Share"

In embodiments, a sharing process may utilize encryption to make the process of sharing documents, files, and the like, more secure; otherwise, downloaded shared documents may reside unsecured on the destination system, such as on a client device of the destination user. In embodiments, a document may be provided for download only in an encrypted format, and the exchange systems disclosed herein may provide a desktop tool, such as a viewer, that manages access to the encrypted items and tracks all actions taken by the destination user with respect to the encrypted item. The viewer may be provided, for example, via a web interface, so that the shared viewed content and the like viewed in the viewer, and the functionality for the viewer (other than basic browser features) resides on the host system, or the system of the party providing the secured item. Thus, the viewer, or its functions, may be controlled by the host or the party providing the secured item, such as based on policies that apply to the destination user's access; thus, the shared document is secured by the control of the viewer. In embodiments, 'un-sharing' is enabled by removing the ability of the destination user to decrypt the document, at which point the document, although downloaded, becomes inaccessible. This may be accomplished, for example, by changing the encryption for the item, removing the user's access rights to the viewer, or initiating deletion of the secured item by the viewer. Un-sharing may be triggered based on a policy, based on time-based factors (e.g., access is provided for a limited time), based on a requirement that the destination user re-establish credentials to use the viewer, and the like. In such embodiments, a shared document may reside, encrypted, so that the existence of the document can be viewed on the destination user's system, but the contents may be viewed only if a remotely controlled viewer or desktop application is there to allow the content to be viewed or played. Such methods and systems may be effective within an enterprise, such as when a user brings the user's own device. By remotely controlling a viewer that is necessary to view a file, files residing on such devices are more secure notwithstanding an enterprise's lack of control over the user's device.

Time-Based File Deletion (Time Bomb)

In embodiments, methods for a time-delayed automatic file deletion facility 215 may be provided that trigger the deletion of a file after a set period of time after the file (e.g., any digital content) moves beyond a pre-defined boundary parameter, such as a network boundary (e.g., beyond a trusted network), a geographic boundary (e.g., a national boundary), an enterprise boundary (e.g., beyond the network (s) of an enterprise), a device boundary (e.g., the document is only allowed to be on a specified machine or machines), a time boundary, and the like. In an embodiment, in order for the file to execute the automatic deletion, the file may have a time-delayed automatic file access policy embedded with the document. In an example, a document may be encrypted and provided with a policy that determines under what boundary conditions a timer for file deletion is set, and for what duration the timer may be set. Once the timer has elapsed, a deletion function may be executed, such as some form of encryption change, encryption key holdback, password change or holdback, or the like, making the document inaccessible, and thus effectively deleted, or the item may be simply deleted from the machine. In another example, the document may not be permitted to leave a specified enterprise network, and the timer may be set, such as for one hour. If an employee leaves work with the file loaded on the employee's laptop, one hour after the enterprise network connection is lost, the document may be automatically deleted, such as through a detection that the network connection has been lost and the timer has expired. However, if the employee only lost network connection for thirty minutes, the document would not be deleted. Under this condition, the timer may be reset for another potential event. In another example, the policy may declare that a new password, encryption key, or the like, is to be sent to either the document itself or to the authorized access user every set period of time. In the event that the new password is not received, such as because the document is now beyond the pre-defined boundary, the document would not receive the necessary means for unlocking the document, and can no longer be opened, and as such is effectively deleted though inaccessibility. In another example, a permanently infected file may destroy itself when the set period of time elapses. This time-delayed automatic file deletion process provides a composite protection scheme, where (1) a digital content is protected from moving outside a pre-defined boundary, and (2) once outside the boundary access to the content is not immediately terminated but rather delayed by a period of time, thus allowing the content to be temporarily outside the protective environment without the content being deleted, made inaccessible, and the like.

Time Bomb De-Fuser

In embodiments, a method may be provided that enables an authorized user to disable the time-delayed automatic deletion of content, where the authorized user is able to prevent the automatic deletion, undo the deletion, recover the content after deletion, and the like, where 'deletion' may be a deletion, a denying of access, an encryption element changed or held back, and the like. For example, an authorized user may have access to a facility that enables the user to recover the content after it has been 'deleted', such as through a recovery password, recovery encryption key, recovery application, and the like. In this way, a file would be secure if the boundary and time conditions have been violated, but recoverable if the authorized user deems it secure, or if the content is again within the secure boundary.

Watermarking

In embodiments, a document that is shared may be marked with sharing information, such as incorporated in the document's associated metadata, so that the system is able to use this information to implement sharing limitations, restrictions, controls, and the like. This information may change as the document undergoes access events, such as viewing, sharing, signing, copying, revising, and the like. In embodiments, sharing information may also be visually presented through a watermarking facility 217, such as in the form of a watermark on the document, such as to indicate that document is confidential, restricted, public, private, and the like. The watermark may also indicate the conditions under which users may access and or view the document, including restrictions on individuals, applications, enterprises, geographic location, and the like. The watermarking may be especially useful for viewing documents through a mobile device. For instance, a watermark may include information related to the user that is viewing the document, such as the user's name, the date and time of viewing by the user, and the like. Watermarking may also include any other access and/or viewing limitations and actions for the document. For instance, a watermark may indicate who and when users have viewed the document, what users have signed the document, what user created the document, and the like. In embodiments, information included in the watermark may be determined though a policy, by the sender, by the creator, and the like.

Question and Answer Management

In embodiments, a question and answer management facility 262 may be provided, where a collaborative group of users may exchange questions and answers, such as in a project, and where at least one user may manage exchange through the question and answer management facility. For instance, users may be buyers and sellers in a transaction, where buyers ask questions and sellers answer questions. In another instance, users may be customers and expert representatives of a product, service, deal, and the like, where customers are asking questions and the expert representatives are answering questions. Through the question and answer management facility, the at least one user may then manage the exchange (such as being identified as a question and answer coordinator). Alternately, each user in the exchange may use the question and answer management facility to manage the exchange, thus creating a dynamic collaborative question and answer environment. Management functions and features of the question and answer management facility may include the ability to trace questions and answer exchanges, archive the history of a question and answer exchange and resolution, provide the facility to import bulk questions into the exchange, remove a question from the exchange once the question is answered, match questions for answering to an individual or group of individuals based on a criteria or metadata extracted from the question, and the like. A question and answer exchange may be provided a question status, a delegation status, and urgency indicator, and the like, and marked as proposed, new, in-process, closed, FAQ, and the like. Questions and answers may be sorted, searched, organized, and the like based on a criterion, such as by submission date, status, category, a question ID, keyword, priority, and the like. A user or coordinator may assign a question one or more criteria, such as a level of priority (e.g. high, medium, low), which may aid experts to focus their attention on issues that are most important.

In an example, suppose a group of individuals is engaged in an acquisition transaction, where there are buyers and sellers, where there are a number of buyers and sellers on each side of the potential transaction, and where the buyers and sellers have different roles and expertise relative to the acquisition. A buyer may ask a question to the sellers. Through the question and answer management facility the question may be presented to the sellers, where one seller addresses the question, and after an exchange, the question is resolved. The question and answer management facility may track the exchange, archive the exchange, remove the question from further discussion, remove the question from a pending question queue as provided to buyers and or sellers (such as though a dashboard interface), and the like. Further, the question may be matched to a particular buyer and or seller for answering and resolution, such as based on a user expertise criteria associated with the user (e.g. the user is identified as being 'legal', 'finance', 'technical', and the like. The matching may also be determined through a facility of the question and answer management facility that uses characteristics or metadata associated with the question to match the question to an individual best suited to answer the question. For instance, the question may contain a word, string, phrase, and the like, that matches a criteria of being a financial question, and so the question is then directed to users on the other side of the exchange that represent finance. In embodiments, once the question and answer exchange is resolved, the question and answer management facility may mark the question as resolved, remove the question from the exchange, archive the exchange, and the like.

In embodiments, a user may import bulk questions and/or answers into the exchange through the question and answer management facility. For instance, a buyer and/or seller in an exchange may have a set of frequently asked questions and/or answers that are relevant to the exchange, and import them into the exchange. In an example, a buyer may have a standard set of questions for a seller, such as where the standard set of questions have been developed over time. To facilitate this import, the question and answer management facility may accept the bulk import in a plurality of formats and from a plurality of computer applications (e.g. imported to the system from a Microsoft Excel workbook).

In embodiments, the entrance of a user into an exchange may be as an authenticated access, an un-authenticated access, a semi-authenticated access, and the like, as described herein. For instance, management of an exchange may require the user be authenticated as having the privileges to manage the exchange, to view the exchange, and the like, but an unauthorized user may be able to insert a question into the exchange, and receive an answer from within the exchange group, but not have access to content within the exchange that requires authentication. In embodiments, a question and/or answer from an un-authenticated user may show an indication of such to other users in the exchange.

In embodiments, the question and/or answer in an exchange may include links to further information regarding the question and/or answer. For instance, the question may request data, and a link may be provided by the user answering the question to direct the user to the location of the data.

In embodiments, the question and answer management facility may provide the ability to retract, correct, or redact questions and/or answers as part of the exchange. For instance, an answer may be provided by a user, but later found to inaccurate. In this instance, the answer may be optionally retracted or corrected. In embodiments, users in the exchange may be informed when a retraction, correction, or redaction is executed.

In embodiments, the question and answer management facility may be provided through a user dashboard interface to manage the question and answer environment, such as to increase client usability, provide operations (e.g. delegate, close, withdraw, answer, change priority, and the like, in association with a question and answer exchange), provide for a facility for importing and exporting content associated with a question and answer exchange, manage priority (e.g. including management, voting, questioning, and the like, the priority of a question), provide filtering facilities for questions and answers, ability to re-open a closed question (e.g. for changing the answer, to reopen discussion, to solicit additional answers), alerts to questions and/or answers being changed, the ability for a respondent to save a draft answer prior to posting, and the like.

In embodiments, there may be scenarios where a coordinator does not have sufficient visibility in a question and answer session, such as on the answering question side. In this instance, a 'special coordinator' may be assigned for a category. For example, a CFO of a selling company might be acting as the coordinator on the selling side, delegating out to various subject-matter experts (SME), such as accounting, sales, contracts, and the like. On the other side, a buyer may want greater or more focused visibility, such as an effective tax rate, and the like. Ordinarily a coordinator would have to use standard communications channels to manage this delegation, such as through emails. Now the CFO can assign it to any of their groups through a 'SME delegation' or 'limited coordinator' method. Thus, the question and answer exchange may be improved, such as for a particular category.

In embodiments, a question and answer mobile facility may be provided for mobile devices to provide a user with question and answer facility capabilities while away from their computer, such as when they have access to a smart phone, tablet, and the like. This mobile facility may provide for voice recognition for input, text-to-speech for output, text recognition such as with a scanner or the mobile device's integrated camera, and the like. For example, a user may take a photo with the user's camera, have it captured and placed in the right place within an exchange with permissions, and the like, where the photo is of text, an object for discussion, and the like. In embodiments, a user may add content to an exchange with a mobile device, such as converting something to a question inside a question and answer session (e.g., convert from the email). For example, the user may start with a question, and be able to directly convert that into a question on the question and answer session of an exchange. Then take the thread and start a work-stream.

Single Sign-On

In embodiments, a single sign-on facility 264 may be provided, where users or organizations utilizing the system may be provided a private channel access to an exchange, such as through a single sign-on to the system with protected access. A Channel may provide a way to implement a private slice on the system, such as though a portal that allows users to view only those exchanges explicitly permissioned to the Channel. For instance, a Channel may be a list of allowable brands combined with an Identity Provider ("IdP"). When a user is authenticated by that IdP, that user may be considered to be in the associated Channel and his/her view of permissioned ILP data may be restricted to that of the Channel. In this instance a Channel is, essentially, a virtual private instance of the system. In customer deployments where the system user interface is hosted by a third-party, this system may better ensure that there is no data leakage between separately permissioned exchange domains. Private Channels may ensure that a client's information is only viewed by their SSO users. Private Channels may provide a means for ensuring that users do not see information from other organizations while using SSO, even if they are permissioned to other organizations' exchanges. In an example, if a user is logged into the system using Company A's SSO connection, they will see exchanges and data only for Company A, even though the user may have access to other organizations' exchanges through other access privilege. This facility may support organizations that want to authenticate external users through SSO. For instance, Life Sciences and Alternative Investments clients that maintain their own portal may want to authenticate their user community to using SSO. In another instance, a Johns Hopkins doctor may be in drug trials with two different pharmaceutical companies, and if the doctor accesses through the channel of the Company A's website, then they only see Company A's information. This functionality is especially useful anywhere that a client wants to have a private portal in a multi-tenant scenario.

In embodiments, the system may provide for context-based, automatic, on-demand provisioning. For instance, a client may create a web page where a user could enter credentials. When they create an account (e.g., new employee), the system may automatically provision an exchange for them, where the employee logs in by their structure. The SSO may verify that the person has permission, and automatically set up an account for that user, where everyone from that organization would be treated as signed-in to the organization. That is, once logged in, the user may go through the channel and access information without logging in again, such as based on the context provided through the user, the organization, and the like. In embodiments, the context may be provided through tagging the user to enable future sign-ins. For example, a company may want to provide an outside law firm to access certain data in an exchange, and through contextual-based provisioning, the law firm may be tagged to not only allow them to access again without logging in, but will be restricted to only the content the organization is provided through the private channel. Thus, a user's access to certain information is restricted to the context of where they sign-in.

Un-Authenticated Document Exchange

In embodiments, an un-authenticated document exchange facility 268 may be provided, where exchange managers may be able to mark specific exchange participants who are permitted to skip the login process (e.g. skipping steps requiring the providing of their user name and password), when downloading documents, such as from alerts. For instance, when a permissioned user tries to access a document through a special document URL in an email alert, the document will start to download, without asking the user for further authentication. The special document URL may allow such access for each document for the specific exchange user for a period of time, such as a week, a month, and the like, from the moment that the alert was sent. The system may identify the users to whom the alert was sent, where access reports may indicate that the particular user has viewed the document, even though an authentication is not required. Each exchange participant that was marked to allow such access may have a visual indication in the user's list view, to make it clear that they have a different type of access rights. This type of access may be specific to a given exchange, and may not necessarily be transferrable between exchanges. This functionality may be especially useful for clients that are distributing content to individuals and organizations that access services very infrequently, where these individuals constantly experience challenges logging in and using the service through lack of regular use, and often experience forgetting the login and password. For instance, an investment client may only send out content quarterly, and have a desire to allow a subset of their investors to gain access to their statements without authentication. Instead of sending these investors documents via email, the system could allow the fund administrators to send statements via this un-authenticated service, thus alleviating the need for the investors to remember a login and password. In embodiments, the user may be provided a link to access the content, where after optionally providing a confirmation of who the user is (e.g. an email address), the document can be downloaded. The use of this system may allow for targeting users to receive special document access (e.g. through alerts, email links, and the like) and tracking of their document access (e.g. for legal and security review), and the like. Users who are not required to log in may be identified by a special icon or identifier, such as when managers view a user list. Document access reports may also be updated whenever the link is activated (e.g., 'clicked'), and the access attributed to the user who was permissioned to use the document. Since access to content may be enabled and tracked through a URL link, the system may then limit distribution by de-permissioning a URL (which makes that URL inactive). Since the user doesn't know the URL, they can't obtain access if the URL is inactive.

The use of un-authenticated access to content may have many applications. For instance, an organization may want to provide publicly available information, where the system of un-authenticated access gives public users access to the document without 'permissions', but allows the organization providing the information with a means of tracking the access to the information. For example, an organization may want to make public a 'teaser', such as with respect to an investment opportunity. The organization now is able to track the access to the information.

In embodiments, the use of un-authenticated access may enable an organization to send out access to information without pre-populating a contacts list with secure-access users. The organization may only need to have a list of email addresses to send the URL link to, without the need for credentials from the user.

In embodiments, the system may utilize a semi-authentication process, such as requiring the user to provide a personal ID (PIN), such as determined by the user or the organization providing the URL link.

Metadata Synchronization Facility

In embodiments, a synchronization facility 270 may be provided for metadata-based content synchronization, where the system may be utilized to provide synchronization and sharing of content, such as amongst the various computing devices of a single individual, a group of individuals, an enterprise, and the like, where synchronization may be selective, such as a user selecting what files to synchronize, what computing devices to synchronize, which individuals may share through synchronizing, and the like. The user may also set up rules by which synchronization is selected, such as rules associated with location of a computing device (e.g. not synchronizing when a computing device is not on a secure network, in a foreign country, and the like), a version number of the document (e.g. only synchronizing the most recent revision of a document), and the like, where the rule is based on metadata attached with the document. In embodiments, documents may be geo-tagged, and through that geo-tagging the synchronization process may determine whether to sync. A user may not only be able to identify a certain folder for synchronizing with a group of individuals, but also that only the latest version of a document should be synchronized. In this way, a user being added to the synchronization group would not have all the old versions of a document synchronized. This capability may help the user make decisions that can reduce workload during synchronization and free cycles for synchronizing more critical content. In embodiments, synchronization may be contextual. For example, a person may be added to a synchronization group based on information about the person you are adding and how that person relates to a topic, a group, an exchange, a work stream, and the like, where the system tries to classify people and link them.

In embodiments, 'many-to-many' synchronization may be provided, such as when a select number of users/devices needs to be synchronized to a plurality of other users/devices, where the users/devices may be a group of users/devices that are a part of a workgroup, work stream, application, email list, and the like. Many-to-many synchronization may utilize rules to determine what content to synchronize, who to include in the synchronization, and the like, where the synchronization may not be restricted to just multiple devices, but to multiple systems based on the rules. For example, a user receives an email in Outlook. If the user has already linked that email thread to a work stream, that email should automatically go to the work stream. Or the user receives something in a work stream, and the rules trigger synchronization. In another instance, if the user deletes an email from Outlook, based on the rules, the deletion may not be synchronized, such as because the user needs to keep the email in the work stream. In this way, the user is able to do their work in email, but have the work stream synchronized correctly, based on the established rules.

File Sharing Activity

In embodiments, a file sharing activity facility 272 may be provided to package up and archive the history of file sharing between individuals in an exchange. The archived file sharing may be stored in a similar process as that of emails, and placed in an archive for future searching (e.g. for litigation or e-discovery requests). With the file sharing archive stored in a similar format as that of emails, searching for sharing and searching for emails may be carried out together, where the email and file searching archives appear to be, or actually are, a single searchable archive. This archive may also be sharable with other individuals within the exchange, may be synchronized with other devices active with individuals in an exchange, and the like. The archiving of sharing activity may be at an exchange-level, a user-level, a document-level, and the like. For instance, a document-level archive may include the document itself plus the whole history of the document (e.g. viewing history, who edited the document, when the document was signed, and the like), so that when this new archived history is found, such as in a search, a single document may be retrieved describing both its content and its history.

Collaboration Management Facility

In embodiments, a collaboration management facility 274 may be provided, where in the course of a collaborative exchange, users may have exchanged documents and communications, shared content, synchronized devices, and the like, where the collaboration management facility may be provided to manage the sharing of content and the retention, sharing, and persistence of shared content. For instance, a user may want to remove all trace of the exchange once the exchange is ended. The user may want to control the amount of time a recipient may have or view a document after delivery. The user may want to control the ability to print, forward, view, the document on various platforms, on various devices, with certain individuals and/or organizations, and the like. The collaboration management facility may include a document retention policy that determines the rules under which documents are retained. For example, documents may be tagged with a document retention tag that deletes the document in a set number of days, until a milestone event (e.g. such as tied to a Gantt chart), based on a criteria (e.g. when a document is signed, after the document has been viewed), and the like. In an example, a document offering a service or product may be tagged such that if the recipient of the offering declines the offer, the document is deleted. Alternatively, the document offering may be through a link, and the link is disabled after the recipient declines the offer. The document may be tagged with a duration-based permissioning, such that the document will be deleted, or a link disabled, at the end of a window of time has closed. The document may be tagged for temporary viewing, such as only viewable for a short duration of time when the document is viewed on a mobile device. For example, a recipient may have different viewing and retention permissions for the same document dependent upon the device they are viewing the document on, where they may have permission to view the document for a week on a computer, but only for a few minutes on a mobile smart phone. Alternately, it may be a link to the document that has a limited time for activation. This form of non-persistent sharing may allow the user to share documents in a time-sensitive manner, without the concern that the document will be retained beyond the desired duration. For example, a banker may distribute research to prospects. But the research is the property of the bank, and the banker needs to control access to the research. One option may be for the banker to distribute the research through a URL link, where the URL is tagged for access control through the retention policy. In embodiments, the retention policy may also dictate retention within a group distribution, providing different retention privileges to different recipients, and track the viewing actions and execute viewing-retention limitations for users within the distribution.

Geo-Tagging Facility

In embodiments, a geo-tagging facility 278 may be provided, where a document may be geo-tagged such as to indicate where a document has been created, sent from, received, edited, viewed, and the like. Geo-tagging a document may include information that is appended to and travels with the document through distribution, sharing, modification, and archiving. Geo-tagging information may include geographical location information (e.g. city, state, territory, country, region, zip code, latitude and longitude), a business location (e.g. company name, company address, business unit), a network location (e.g. secure network, an enterprise network, a public network, a wireless network), a storage location (e.g. archive location, thumb-dive storage, DVD), and the like. In an example, a document may be created by a user at Company 'A' in San Francisco, where the location information may include the company name and the city, as well as other information such as time and date and user's name. The document may then be distributed to two other users in two different counties working with two different companies, where this information may be appended to a geo-history of the document (e.g. as stored as metadata along with the document). Additional information may be appended to the document as it is edited, redistributed, and finally archived. The geo-location information may be searched on, such as during its life as an active document or while stored in archive. Geo-tagging of data may better enable the discovery of the document's history (and content therein), such as for legal or e-discovery searches.

In embodiments, an input file optimization facility may be provided, where rules and/or intelligence on document actions increase efficiency with which tasks, especially large tasks, are executed. For instance, when attempting to add a folder with a specific name, it may check and open the folders tag, check if a folder tag is already open, and if the current open folder is different to the new folder then close the existing folder and open the new folder tag.

Archive Facility

In embodiments, an archive facility 280 may be provided, such as where there is a need for same-day/next-day delivery of archives, such as in a quick and efficient way to create HTML archives (snap shots) of exchanges without leaving any footprint on the exchange. In embodiments, an API archive facility, created through API calls, may allow automation of the system that decreases delivery time as well as improving other key considerations for archives, including reliability, efficiency, time to production, scalability, predictability, simplicity of process, support, market needs, audit compliance, security compliance, cost, and the like. The tool also may have logic built in that allows the splitting of a single exchange into multiple volumes and splitting at a folder level or documents level. As well as pulling down HTML archives, the tool may be modified from within the configuration file to only download meta-data. Doing this may allow the tool to provide full meta-data reports similar to back-end database reports on folders and documents.

Figure 11:
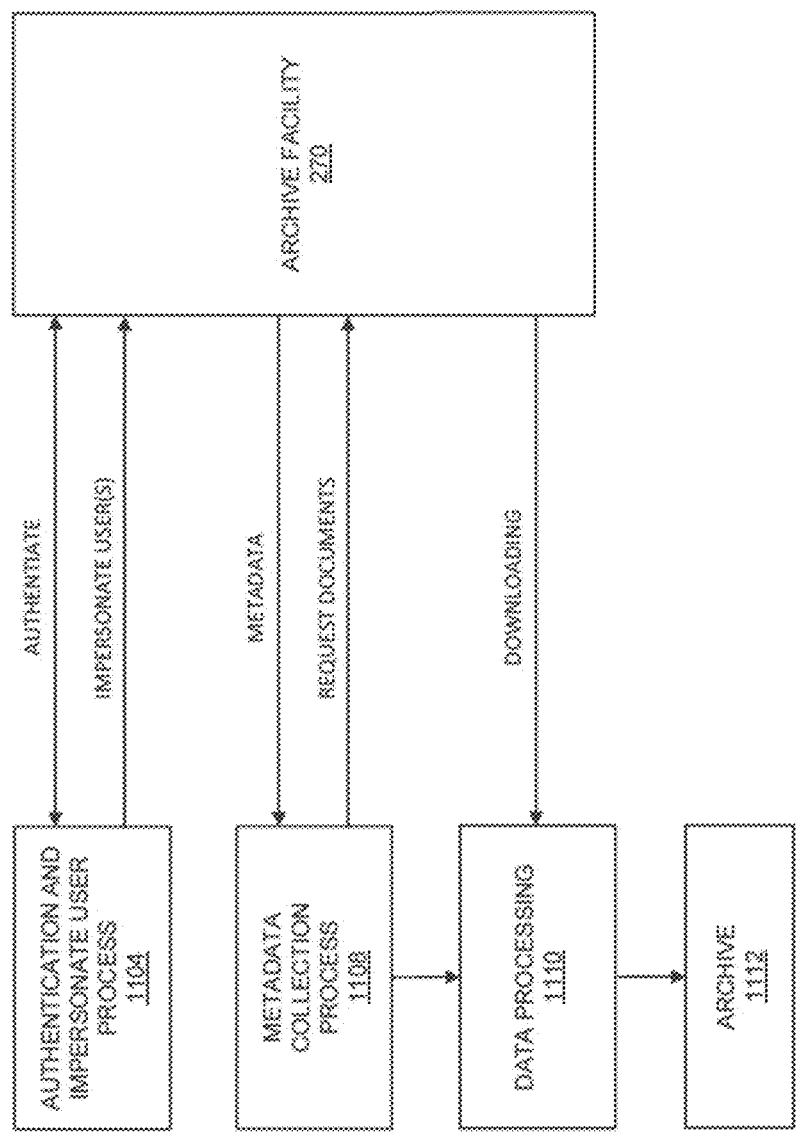
FIG. 11 depicts an illustrative process flow diagram for an archive facility.

Features of the archive facility may include automated confirmation letter creation (e.g. such as including e-signature), configurable viewpoint and naming structure, (e.g. by user ID, email address, exchange group, composite group), automated exchange freeze to create non-permissioned groups, archiving from frozen exchange to check a user's 'pre-freeze' role and impersonation against old (inactive) profile, freeze letter creation, and the like. FIG. 11 illustrates an example archive process, including authentication and impersonation of users 1114, metadata collection 1108 (e.g., including reports, such as permission reports, folder reports, document reports, viewpoint reports, and the like), download and data processing 1110, and creation of archive 1112.

The design of the archive facility may include a two-part routine that will firstly quickly and efficiently impersonate a user and download all the documents and folders to which they have visibility. The second path may be to create a HTML file that is a representation of the exchange that the end-user may navigate thorough to get to documents. Key functionality of the archive facility may include downloading user coverage for a selected user, ability to impersonate any user within an exchange if logged in with a role of manager or a hidden manager, minimal user interaction, automated download procedures (which may happen sequentially), ability to split archive volumes based on a defined size specified, process messaging relevant to a splitting process, support of UTF-8 encoding of document and folder names, debug mode for advanced logging and trouble shooting, audit files for tracking activity (e.g., user successful logins, exchange ID of where to download from, downloaded files, warnings, system errors), ability to split a large exchange over n number of volumes based on size of the volumes, splitting at a determined level (e.g. document level, folder lever), downloading of questions and attached documents, ability to freeze an exchange into several states (e.g. cold freeze (the phase of the exchange is placed into hold, and all users that are not reviewers are changed to reviewers), partial freeze (the phase of the exchange is placed into preparation, and all users that are not previewers or reviewers are changed to previewers), warm freeze (the phase of the exchange is placed into Open, and then all users that are not previewers or reviewers are changed to previewers)), ability to un-freeze an exchange and revert it back to a previous state (e.g. in regard to exchange phase and user role), and the like.

The functional structure of the archive facility may include a model, a view, a controller, and the like. For instance, the role of the model may be to make calls to the controllers, which are the classes that hold all the controllers. The model may also provide a specific response that is parsed into the model object, which may keep the 'controller layer' response away from the view and 'controller local'. Within the view the user may be able to enter their login credentials (this may also be where files (e.g. excel files) are created and read in. There may be a status display that is updated with events. It also may be in the view that the user is able to see if the process has completed with any errors. There may be multiple controllers, such as one for handling local events and a second within the combined layer that creates a web request. The local application may take user inputs and handle button events, call the models within a combined layer, contain the business logic to process the response from the combined layer model, and the like. The combined layer may be able to execute commands, and when a response is given, it may be parsed into the models response objects.

The archive process may be designed to be run by a trained individual as opposed to a user in an exchange. The process may use a combination of public and private API calls. Actions relating to this tool may include login-logout, getting folders, getting documents, downloading documents, downloading Q&A attachments, get all categories, get all questions using smart folders, get all workspace settings, update workspace phase, get user coverage report, create group, get group, get all workspace groups and details, get all workspace users and details, add existing user to group, and the like.

Secure Collaborative Content, Fair Share Queuing, Location Based File Access, Multi-Factor Authorization, Configurable Password, Client Archiving, Client Key Hosting Facilities In embodiments, a secure collaborative content facility 282 may be provided for the secure management of a plurality of secure documents, resources, communications, workflows, and the like, among a plurality of users, where secure documents, communications, and the like may contain or have associated therewith metadata content. In embodiments, one or more workflows may be created, triggered, modified, or redirected based on the metadata. The workflows may include, without limitation, workflows that include steps that take place across multiple entities or enterprises, such as work flows involve in inter-enterprise negotiation, collaboration, or cooperation. Secure communications may include an email, FTP, USB transfer, a secure third-party document sharing facility, and the like. The secure management may be for an information technology environment that is inside or outside an enterprise firewall, for secure or public use, through consumer grade or enterprise grade, and the like. The trigger may be metadata content in association with a signature, request for information, request for collaboration, communication with a new contact, and the like. For example, an enterprise user, working inside the enterprise firewall, may receive a new contact from a prospective client, where metadata in or associated with the communication triggers a new workflow for a new project. In another example, a manager may provide a new project document to an associate, where the new project document includes metadata that triggers the generation of a new workflow. In this way, the secure collaborative content facility enables a more seamless process for generating or managing workflows from metadata content in an initiating exchange. Metadata may be stored, for example, as part of a document, file of the like, such as in one or more tags, fields or headers. A host system of the type described throughout this disclosure, in connection with creation and handling of secure information exchanges, may define metadata types and associate the metadata types with one or more actions, including actions that may be linked to workflows. Such a system may indicate locations for storing and retrieving metadata, as well as rules pursuant to which metadata may be processed in connection with workflows. A metadata definition might correspond to any of a range of states, features, attributes, events, activities, or actions that are typically stored or used in connection with an exchange, such as user attributes (e.g., linkage of users to enterprise, work group, or the like), enterprise attributes (department information, and the like), security attributes (policies, access rules), storage attributes, and the like. Thus, a metadata definition may indicate how a user may, via metadata stored in a file or other resource or stored in a separate location but linked to the file or other resource, ensure the handling of the same by the system. For example, a metadata definition may allow a resource to be designated as a particular type of resource with respect to which, upon creation (and inclusion of the metadata definition), a work flow is automatically initiated that sends the document to a defined type of user within the entity for review and comment, notifies another user of creation, notifies another user of a requirement to create another resource, notifies another user to hold in taking action, or the like. Thus, a single definition may set out or invoke stored rules by which a series of different actions, or even set of multiple work flows may be initiated, modified, or stopped.

In embodiments, a fair share queuing facility 284 may be provided, for the execution of processes described herein, exchanges, sharing, collaboration, and the like, when jobs are required to be queued for processing through the system. Traditionally, queuing is on a first come first serve basis, but with large jobs such as with some processes described herein, this may lower performance of the exchanges that are hosted. For example, suppose a client 1 posts a job with 20,000 tasks into a queue. On a first come first serve basis, the system would have to process all 20,000 tasks of this job before beginning the processing of a second job. This may be adequate if all jobs are large, but if a small job is queued behind the large one, undue degradation of system performance may result as related to a project for which the small job is associated. However, queuing may be adjusted so as to queue jobs in an equitable manner through a dynamic share queuing facility, allowing multiple clients to submit bulk requests to the same work queue to be processed in parallel. On such jobs only the first n messages out of N may be created, and after that, a bulk message containing (N−n) messages is added at the end. Once n first messages are processed only then another n tasks get processed, and another bulk message at the end with (N−n−n) tasks. In this example the system may take 5 tasks out of 20000 tasks and put them in a queue as separate messages and add a bulk message with 19995 tasks in it (20000−5). Once the first 5 tasks are processed and the bulk message is picked up from the queue may the processor take another 5 tasks and put them back in a queue and add a bulk message of 19990 tasks at the end of the queue. In this instance, if Client 2 comes in with a task, it will have to wait no more than the time to complete 5 tasks. If Client 2 comes in with 20000 tasks, tasks of Client 1 and Client 2 may be interspersed. This solution may work with multiple processors on the queue as well. Processing of bulk messages may be used to reorder execution (priorities) of tasks so every time bulk messages get processed the system may specify a rule as to how to determine what next n tasks should be converted into messages to be processed.

In embodiments, a dynamic share queuing facility may be provided, where multiple clients are able to submit bulk requests to the same work queue to be processed in parallel, such as with the following steps: (a) receiving a large job of N tasks, wherein the job is categorized as a large job when N is greater than n predetermined maximum number of tasks permitted to be queued for processing in a single job; (b) queuing the first n tasks out of the N tasks in the large job, wherein the remaining N-n tasks of the large job are stored in a holding queue; (c) queuing a subsequent job based on the following criteria: (i) if no subsequent job is received, queue the next n tasks of the large job as taken from the holding queue, (ii) if a subsequent job is received where the number of tasks in the second job is equal to or less than n, categorize the subsequent job as a small job and queue all the tasks in the subsequent job, (iii) if a subsequent job is received that is a second large job, queue the first n tasks out of the N tasks in the second large job, wherein the remaining N-n tasks of the second large job are stored in a second holding queue; and (d) continuing the steps in (c) for additional subsequent queuing, wherein queuing of jobs for processing alternates between new jobs being received and jobs having remaining tasks stored in holding queues.

In embodiments, a location-based security facility 290 may be provided for file (or other resource) access within a cloud-based or server-based file storage facility where permissions of the file determine access based on location, such as the location of the device requesting the file or resource. Enterprises often want to limit access to sensitive data based on whether someone is physically present at a facility or location. In the past this has been achieved using physical security, meaning the individual who needs access was required to be co-located within the same premises as the entity that provides access. There have been no solutions to the problem other than physical security or network based security (e.g. based on a person's Internet Protocol address) and restricting access to data using a networked personal computer or mobile device. Virtual Private Networks have helped in this regard but they are still very restrictive when allowing access to individuals who do not belong to the same company as the source of the file or data. With the proliferation of devices that can determine the geographical location of a person using the device, this job becomes much easier. The location-based security facility applies geographical location based security to files accessed from a cloud or server based storage or service. In this system, files may have attributes of geographical location, and rights to view the file or save portions thereof may require the file to be accessed from a device where the location of the device can be determined and determined to be within range of a geographic location, such as specified on or in relation to the file. Files may be stored in a cloud based or server based system from where they can be retrieved by a person who has rights to the said file. Within this system, file attributes may be defined, where these attributes may be part of the metadata associated with the file, and therefore searchable. To these existing attributes, spatial data (location where the file can be accessed from) may be added. The location may include geographical coordinates (latitude and longitude), a country, a region, a city, an enterprise location, and the like. The system may provide a way for an individual to add a file to the service with a desired location where the file can be accessed. The system may also provide a way for the individual to add a radius from the aforementioned location to the file attributes. Based on these two inputs (location and radius), the file attributes may now be updated. Once the file attributes are set, they may be searchable and indexed via a geographical positioning data store. When an individual who has access to the file (e.g. based on permissions in the service) tries to access the file from a device (e.g. any mobile computing device or a personal computer), the service determines the location of the device. If there is no mechanism to obtain the location, then the file access is not allowed. If there is a mechanism to obtain the location, then the service compares the location to the location information associated with the file on the service. Once the comparison is done, the determination of whether the file is accessible or not may be provided by the service using the stored location and radius attributes. If the individual can access the file, then the right level of access is provided (e.g. read, write, save, print). If not, the file is not provided. Multiple locations and radii may be defined per file, such as several addresses and radii from those addresses where the file can be accessed.

In embodiments, a multi-factor authentication facility 201 may be provided when access to the system includes multi-factor authentication, such as at login. Multi-factor authentication may set authentication requirements beyond username and password, to not only challenge questions, but to risk-based questioning and detection based on a user or device history, such as location, device type, pattern of use, and the like. This method may be used at login, when moving between exchanges within the system, on a per-exchange basis, and the like, where preferences and/or settings may set whether multi-factor authentication is used, and to what level of complexity. For example, some work environments may require a mid-risk level of complexity required for login, while others may require a greater complexity for access. The system may require a level of complexity that looks at a plurality of channels, such as different devices, mobility vs. desktop use, and the like.

In embodiments, a configurable password facility 203 may be provided for configurable passwords. For instance, at the exchange level or the customer level a user may be able to determine what a password policy would be, such as when it will expire, what complexity is required, and the like. A user may login and use their most stringent policy based on all the exchanges for which the user is a member. For example, in one exchange a user might need a very secure password, while others it would not, so the user may use a password that is compliant to the more stringent of the two. The user may be able to use the greatest common denominator in password usage across multiple exchanges, such as at the customer level, at an individual exchange level, and the like.

In embodiments, a client archiving facility 205 may be provided for archiving of content made to an internal archive storage facility within the system, to at least one of plurality of customer server(s), to a third-party storage center, and the like. In the instance where content is being stored on a customer server or to a third-party storage center, the system may have the capability to pull back data in part or in total, such as in a similar manner as that of a document sent to an individual may be pulled back. For instance, in the case of a multi-partner collaboration, where multiple partners have elected to store data in their system as archive, one partner may decide to drop out of the collaboration, and the system may then pull back all the data previously archived on the partner's server. In another instance, customers may want to take over an archive, such as when an exchange is going to be closed, where the content may be written from the system to the customer's server. In this instance, the system may relinquish access to the content. In another instance, there may be a hybrid archiving structure set up, such as having a different archiving configuration on a per unit, per organization, and the like, basis. The ability for a customer to archive content to their own servers may be enabled through an application, API, and the like. When archiving is transferred between entities, such as when an archiving configuration is changed, a chain of custody, a history of ownership, and the like may be maintained. Configurations may also be able to set a level of granularity for the archived content, such as to a lower level of granularity when the content is in a dormant cold storage, but in a higher level of granularity when the content is being actively accessed, such as when an exchange is active.

In embodiments, a client key hosting facility 207 may be provided to enable users to host their own keys in association with access to content. For instance, a client may want some form of extra protection, such as ability immediately close off access to content (a 'red button' or 'kill switch' of sorts) so secure content will be shredded. To implement this, the system may encrypt content with a key over which the client has control. The client may host the key, such as creating an application/web application that they host and completely control, where this application can expose the key back to the system for the application. The client can then pull out the application, so the system does not have the keys, eliminating access to the content. There may be a plurality of different options for handling the keys, such as the system having an application that the system provides to a client that deploys to a semi-public cloud, that the client hosts on their own, that the system host it for the client, have a 'red button' or 'kill switch' in the system's own application (e.g. the system holds the keys, but the keys are shred when the client 'hits the button'), the client has a master key for their exchange, the client is able to download the key and get the material back but otherwise can 'shred' the content, and the like.

Dynamic Access Authorization

Figure 61:
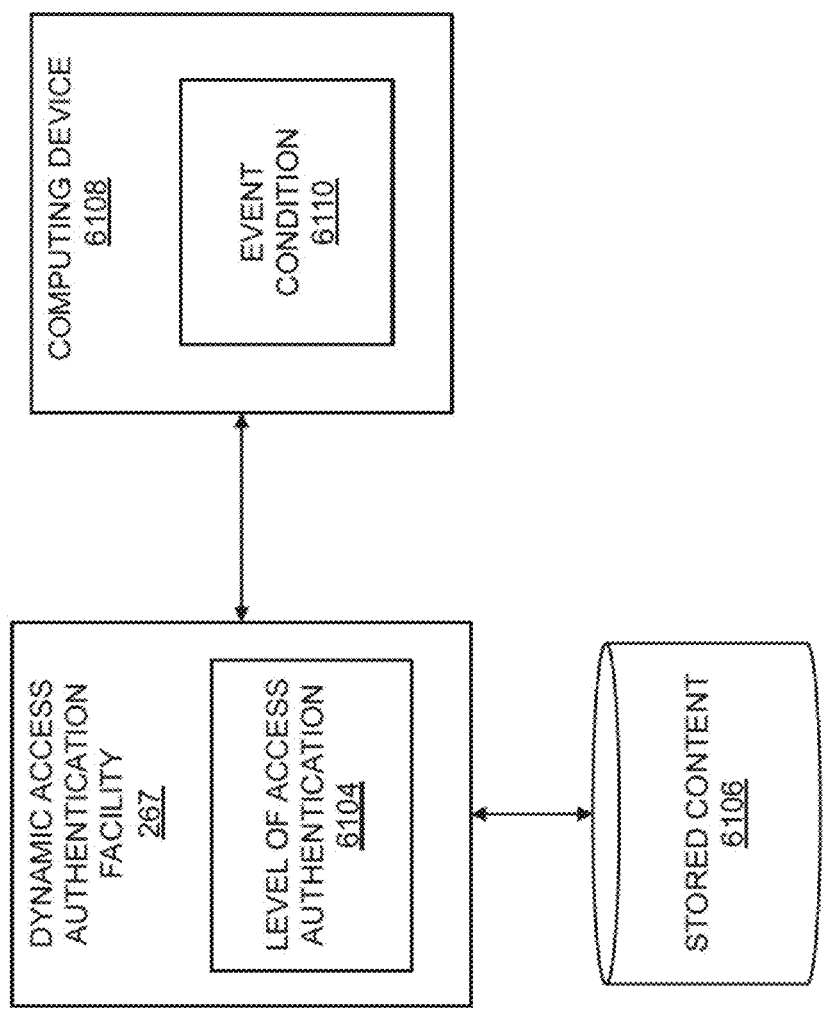
FIG. 61 depicts an embodiment of a dynamic access authorization facility.

In embodiments, a user authorization facility 244 or dynamic access authorization facility 267 (as shown in FIGS. 2B and 61), may facilitate an access authorization procedure that provides for a just-in-time verification of an authentication level that is driven by data access policies for different content (e.g., technical, financial, legal) that may change based on an event, a particular state, or a particular context. For example, each item of content or grouping of content items may have a corresponding content classification with an associated authentication level required for access to that content. In addition, the dynamic access authorization facility 267 may operate such that a user's authentication level is examined at various trigger events (and not just at log-in) when a user attempts to access content. For example, a user's authentication level may be examined or re-examined at various exchange entry events, multiple content viewing request events, multiple role adjustment and/or profile adjustment events, and like events attempted by a user to access content. Other trigger events for an examination or reexamination of a user's authentication level may include: a determination that a user changed devices (e.g., based on a corresponding change in network IP address, browser 'fingerprint', hardware ID, or the like); a determination that a user changed geographic location (e.g., based on corresponding GPS location, network IP address, or the like); when a user fails to authenticate successfully using standard methods; when a user uses an outdated password or other outdated identification; when a determination is made that user behavior varies from certain past behavior (e.g., user performs multiple file deletions and hasn't previously done so); or the like. Other examples of a triggering event for additional authentication for a user may include an administrator policy implemented change in access due to an administrator-sensed event (e.g., an administrator may determine that an attack is actually or potentially underway and opt to increase security for all users temporarily) or an automatic policy implemented change in access due to an automation-sensed event (e.g., an automated system may determine that an attack is actually or potentially underway and automatically opt to increase security for all users temporarily), based on time of day (e.g., outside of business hours may require an increased level or frequency of authorization as compared to during regular business hours), and the like. In an example, a user may request access to a financial document on Monday during working hours while logged in to the company network. Under these circumstances the user may required a fairly low authentication level. However, on Tuesday evening the same user may make the same request, but this time, because the request is being received after business hours, the authentication level may be increased. Authentication levels may be further increased if the user was requesting access if the user were using a personal computing device, operating away from the company network, located outside the country, and the like. The user authorization facility may make changes to authorization levels dynamically, such as reviewing the conditions of the user access request and making changes to authentication level at the time of the access request.

Once a re-authentication procedure is triggered, if the user's authentication level matches or exceeds the authentication level associated with the content to be accessed, the dynamic access authorization facility 267 may allow access to that content. If the user's authentication level is below that associated with the content, then access may be denied, or a further authentication challenge may be presented to the user. For example, content classified as 'sensitive' may require strong authentication with one-time passwords, which may be provided to the user in a secure manner, such as by tokens or SMS (text message); with other authentication means such as security questions, biometrics or second-party approval; and the like. Thus, access to some content may require an authentication level of a user ID and a password; access to some content may require a user ID, a password and a correct response to a security question; access to some content may require two factor authentication (2FA), such as with SMS (text message); and access to some content may require other authentication means stronger than passwords alone. As previously discussed, content items may be distributed to allow groups or classes of content to be stored at a specific type or location of content node, with a corresponding authentication level in place to securely protect that content.

Referring to FIG. 61, a dynamic access authentication facility 267 may alter a level of access authentication 6104 for access to stored-content 6106 based on an event condition 6110 of a user's computing device 6108. In embodiments, a method may include the following steps: establishing, by a secure exchange server hosted by an intermediate business entity, a user login data authentication procedure that allows each of a plurality of users, including a user of a second business entity and a user of a third business entity, through at least one corresponding client computing device, to access the secure exchange server, wherein communications between the secure exchange server and each of the plurality of users is through a communications network; storing, by the secure exchange server, data relating to a user login authentication for the user of a second business entity and data relating to a user login authentication for the user of the third business entity; receiving computer data content from the user of the third business entity; receiving from the user of the third business entity an indication of permission for the user of the second business entity to access the received computer data content; receiving a request to access the computer data content by the user of the second business entity; by the secure exchange server, determining a level of access authentication for access to the received computer data content for the user of the second business entity based on an event condition related to a current state of the client computing device of the user of the second business entity at the time of the access request; and by the secure exchange server, adjusting a level of access authentication based on the event condition, presenting the user of the second business entity the adjusted level of access authentication, and granting access to the received computer data content when the secure exchange server receives the adjusted level of access authentication.

Risk-Based Dynamic Security

In embodiments, a mobile device security level assessment may be provided to assess a user's computing device for a level of security based on hardware features of the mobile device, and dynamically enable features based on the hardware profile of the mobile device. For example, if the user mobile device is an iPhone, the system may allow an offline access to a document, while on Android device the offline access function is prevented, where some hardware feature or software feature difference between the two types of mobile devices determines different security levels associated with a particular system functionality (e.g., because of sandboxing the offline access function is safe). A security level assessment may be based on a real-time assessment of the mobile device or based on information stored in a central security database, such as where the database is updated based on the assessed security rating of the device. In this way the system is able to remove access to some features for a specific mobile device or mobile device type, such as allowing or denying offline access or copy/paste functionality for a document available through the system, such as based on the security assessment level stored in the central security database. In embodiments, mobile device characteristics that may influence the security level assessment may be type or model, operating system, communications facilities, resident applications, email accounts, configuration settings, application settings, communication settings, and the like.

Offline File Access

Figure 12:
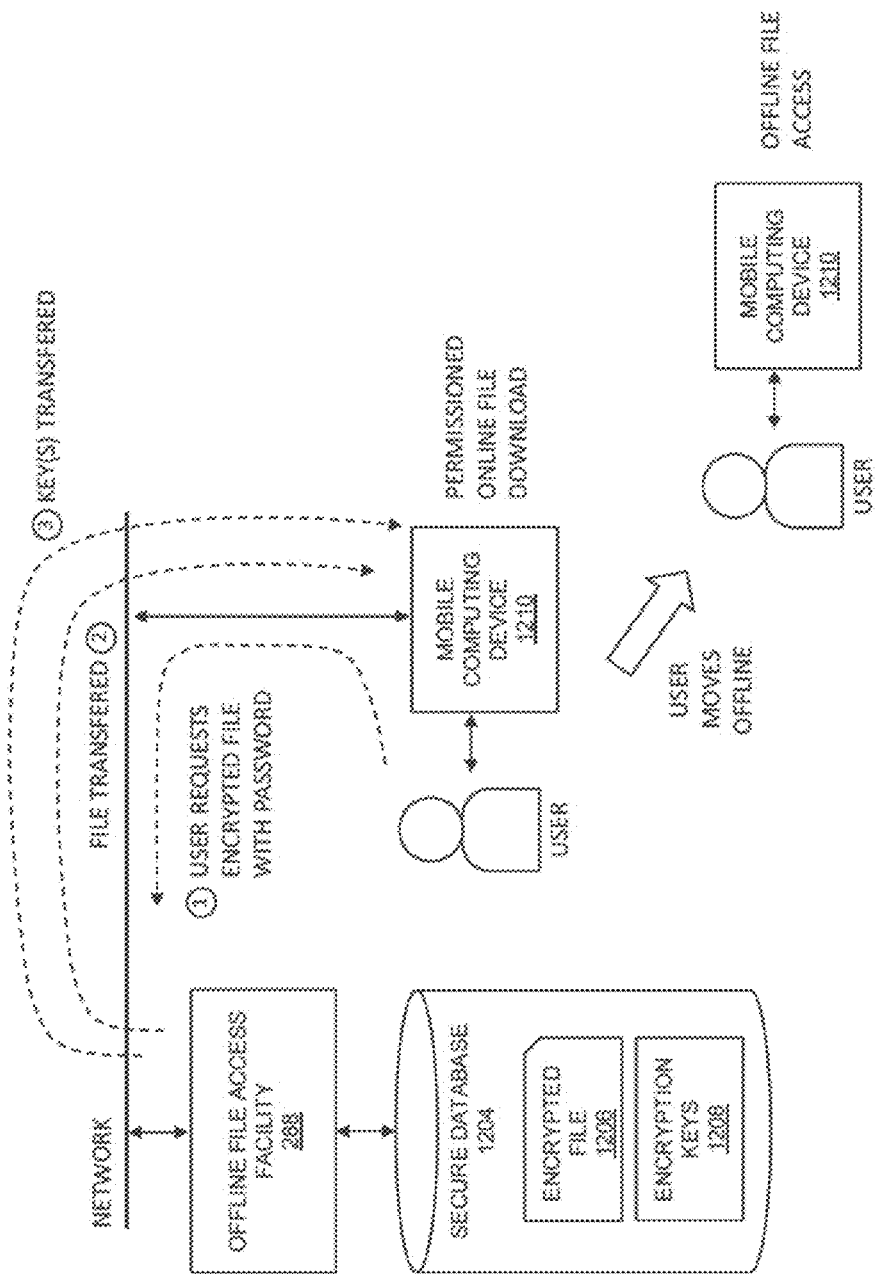
FIG. 12 depicts a functional block diagram for an exemplary file access facility in an embodiment of the present invention.

Referring to FIG. 12, in embodiments an offline file access facility 288 may provide offline file access to remotely stored files, such as protected by information rights management via an encrypted key lease (e.g., where a single key enables a single file access). Secure offline file access is a significant business problem. In the past, providing offline access to files increased the risk of data loss or theft of intellectual property that could prove disastrous to a company. However, providing convenient offline accessing of protected or secure files is also very important, as individuals accessing files are not always connected to a network that allows them to do further work on the files while offline. Existing solutions are very limited, such as only allowing for a date-based file access, where the date is set on the file or on a server. Existing solutions also do not provide for encrypted key stores, such as protected by a personal password, identification number, and the like.

In embodiments, files may be stored through the offline file access facility 288 in a cloud-based or server-based system from where they can be retrieved by a user who has rights to the file. Within this system, files may be protected by an information rights management mechanism. Retrieval of these files may be based on any of a plurality of public key exchange mechanisms available in the art (e.g., Diffie-Hellman). To view files, generated keys are sent from the file access facility 288 to the user wishing to view these files on a computing device. When a user who has access to the file (e.g., based on permissions in the file access facility) tries to access the file from a computing device (e.g. any mobile computing device or a personal computer), the offline file access facility 288 determines whether offline access is allowed for such a file. If offline access is allowed (e.g., access to the file on a user computer device while the computer device is not connected to the network), one or more generated keys may be sent to the computing device for future use, such as one key for each access. The number of times the files can be accessed at a later time without network connection, such as determined by the number of keys provided, may be set at the offline file access facility 288. This number may also be used in conjunction with an expiration date on the keys (e.g., which may also be set at the file access facility) to provide further constrained access to the file. Keys for file access may be handed out to the computing device when it is online to a user that has been authenticated and with permissions to download the encrypted file for offline access. Keys may be stored in an encrypted storage and a Personal Identification Number or a password selected, such as by the owner of the device, to protect the encrypted storage.

In a non-limiting example, and continuing to refer to FIG. 12, a user may be online with a mobile computing device 1210 and make a request to download an encrypted file 1206 from a secure database 1204 associated with the offline file access facility 288. The user may provide a password to the offline file access facility 288 in order to gain access to the file, which may then be authenticated by the offline file access facility. Once authenticated, permissions may be checked to determine if the user has permission to download the encrypted file for offline access. If so, then the offline file access may download the encrypted file 1206 along with at least one of a plurality of encryption keys 1208. Now, when the user moves offline from the network, the user is able access the encrypted file 1206 by using an encryption key that is stored on the mobile computing device 1210 along with the encrypted file. When the user moves back online with the network, the offline file access facility 288 may continue to synchronize keys and files, such as stored in the secure database 1204 and on the mobile computing device 1210, as based on the usage of encryption keys 1208 and access to the encrypted file 1206 by the user while the mobile computing device 1210 was offline.

Additionally, to access the encrypted file the user may need to provide a password to access the encrypted file to prevent unauthorized users from accessing the encrypted file with the encryption key. In the instance when one key provides a single access, if the user was downloaded multiple encryption keys, they may be able to access the file multiple times. Alternately, a single encryption key may provide for multiple accesses, such as determined by the offline file access facility at the time the encryption keys 1208 were downloaded to the mobile computing device.

In embodiments, a method may be provided for secure offline computer content access, comprising at a server-based file access facility connected to a network and to a secure database, storing a data file as an encrypted data file along with a plurality of encryption keys in the secure database, each of the plurality of encryption keys providing access to the encrypted data file, the encrypted data file accessible as downloaded to a mobile computing device that is not connected to the network only through use of at least one of the plurality of encryption keys and presentation of a user secure identifier from a user of the mobile computing device, wherein the at least one of the plurality of encryption keys allows the user of the mobile computing device to access the encrypted data file a limited number of times; receiving, at the file access facility, a request from the user of a mobile computing device for offline access to the data file when the mobile computing device is disconnected from the network, the access request using the user secure identifier; authenticating, at the file access facility, the user's permission for offline access to the data file while the mobile computing device is disconnected from the network; and downloading, upon authentication, to the mobile computing device, the encrypted data file along with the at least one of the plurality of encryption keys while the mobile computing device is connected to the file access facility through the network. In embodiments, the encrypted data file stored on the mobile computing device may be assessed through the use of the at least one encryption key and the presentation of the user secure identifier by the user on the mobile computing device while the mobile computing device is disconnected from the network. The encrypted data file may be access-controlled through digital rights management. The file access facility may be connected to the secure database across the network. The secure database may be a cloud-computing storage facility. The mobile computing device may be a laptop computer, a tablet computing device, a mobile phone enabled computing device, and the like. The secure identifier may be a password. Authenticating may be performed by utilizing the user secure identifier to check the user's permission profile for permission to access the data file offline. The permission profile may identify a number of offline accesses the user is permitted while disconnected from the network. The file access facility, upon authentication and identifying the number of offline accesses the user may be permitted when disconnected from the network, to download the encrypted file to the mobile computing facility along with at least one of a number of encryption keys equal to the number of accesses the user is permitted while disconnected from the network and an encryption key that can be used the number of times. A number N encryption keys may be downloaded to the mobile computing device, such as where one of the number N encryption keys enables one access to the encrypted data file, and after the one access, the one of the number N encryption keys cannot be used for a subsequent access to the encrypted data file. The limited number of times the user is allowed to access the encrypted data file with the at least one of the plurality of encryption keys may be limited to one time. The plurality of encryption keys may be only valid for a certain time period.

In another example, multifactor authentication, as described herein, may be utilized, such as with the combination of access to a local encryption key and a secure ID. For instance, a user may want to access a secure document while on an airline flight and so downloads the document ahead of time where the mobile device is provided an encryption key that may have limited use, such as described herein as related to offline access, and is able to access the secure document while on the flight through the use of the key in combination with the user providing a secure ID (e.g., password). Thus, access to the secure document is only achieved through multiple factors of authentication.

Spreadsheet Viewer

In embodiments, a server-based spreadsheet viewer facility 292 for rendering a spreadsheet document to a client computing device may be provided that enables the client computing device to view a spreadsheet document without the use of the spreadsheet's source application (e.g., Microsoft Excel). Rather than opening the spreadsheet document directly with the spreadsheet application, a client spreadsheet viewer on the client computing device may enable a user to view and interact with a 'viewable spreadsheet document' that has been rendered by the server-based spreadsheet viewer facility, where the original spreadsheet document is stored with the server-based spreadsheet viewer facility, such as transmitted to the spreadsheet viewer facility by a first user trying to share the spreadsheet document with a second user, by the second user who has been sent the spreadsheet document by the first user, and the like.

Figure 13:
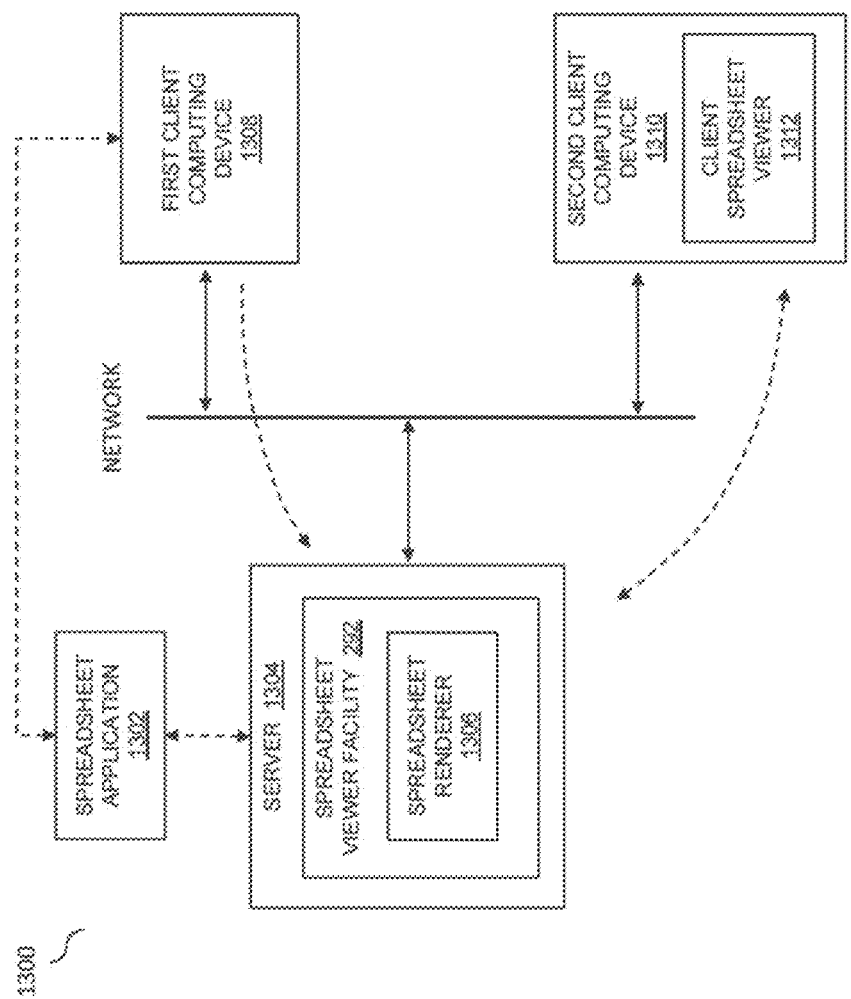
FIG. 13 depicts a functional block diagram for an exemplary spreadsheet viewer facility in an embodiment of the present invention.

In a non-limiting example, and referring to FIG. 13, the user of a first client computing device 1308 may send the spreadsheet document to the server 1304 (e.g., a secure server) hosting the spreadsheet viewer facility 292, along with a sharing invitation to the user of a second client computing device 1310 with permission to view the spreadsheet document. The second client computer 1310 may, upon the user's request, communicate with the spreadsheet viewer facility 292 to render the spreadsheet document with a spreadsheet renderer 1306 to a client spreadsheet viewer 1312 on the second client computer 1310. The spreadsheet renderer 1306 may then transmit spreadsheet document data to the client spreadsheet viewer 1312 for the initial rendering of the rendered spreadsheet document. The user of the second client computer 1310 may then interact with the rendered spreadsheet document, where the client spreadsheet viewer 1312 transmits user actions (e.g., keyboard and mouse actions) to the spreadsheet viewer facility 292 for interpretation and updating of the rendered spreadsheet.

In this way the rendering is an active rendering of the spreadsheet document, where the spreadsheet renderer 1306 keeps updating the rendered spreadsheet document as presented to the user of the second client computing device 1310 through the client spreadsheet viewer 1312. In embodiments, the spreadsheet viewer facility 292 may utilize a spreadsheet application 1302, such as located on the server 1304 or interfaced with remotely, such as a software-as-a-service type remote interface. The spreadsheet viewer facility 292 may then utilize the spreadsheet application 1302, the spreadsheet document, and the transmitted user actions to generate the rendered spreadsheet document data for transmission to the second client computing device 1310. The client spreadsheet viewer may then transform the spreadsheet data to a viewable spreadsheet format, and provide viewing capabilities to the viewable spreadsheet document on the second client computing device 1310, where viewing may include viewing spreadsheet cells, associated cell formulas, and the like, and where the user may be able to also extract data as well as view the data.

In embodiments, the client spreadsheet viewer 1312 may enable the user to take photos or screen-shots of the viewed document, such as part of an audit trail, signature verification, and the like. Because the client spreadsheet viewer 1312 is able to view content without the actual application present, the client spreadsheet viewer 1312 may be able to provide these functions without a license to the spreadsheet application use. In embodiments, the client spreadsheet viewer 1312 may be implemented through a browser interface on the second client computing device 1310. In such embodiments, server-side processing and execution may run the application, taking mouse clicks, touches, keyboard inputs and the like from the client computing device interface, performing functions, and rendering views back to the client spreadsheet viewer 1312. Thus, a user of the second client computing device 1310 may see calculations, view formulas (such as by mousing over a cell), and manipulate data, but the execution of such interaction takes place on a version of the spreadsheet application 1302 that is associated with the server 1304, such as behind a firewall in a secure data location. Among other things, this capability allows users to temporarily access spreadsheet content, while assuring the security of such content, including making it more convenient to revoke access to content without leaving versions of an important spreadsheet.

Figure 13A:
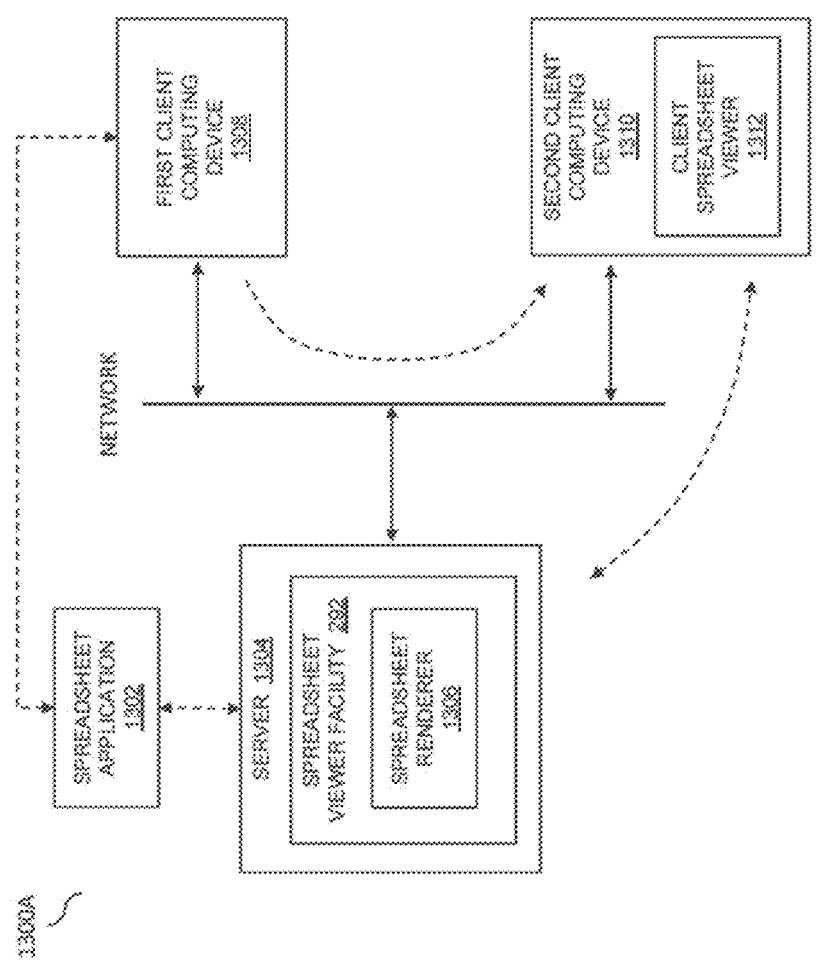
FIG. 13A depicts a functional block diagram for an exemplary spreadsheet viewer facility in an alternate embodiment of the present invention.

Referring to FIG. 13A, in embodiments the first client computing device 1308 may send the original spreadsheet document directly to the second client computing device 1302. In this instance, the second client computing device 1310 may transmit the spreadsheet document to the spreadsheet viewer facility 292 for rendering as described herein.

In embodiments, a method for rending a spreadsheet document may be provided, comprising providing, on a server-based computing device, a spreadsheet viewer facility configured to render a spreadsheet document created by a spreadsheet application as an actively rendered spreadsheet document in a client spreadsheet viewer running on a client computing device without the use of the spreadsheet application running on the client computing device; rendering the spreadsheet document as an actively rendered spreadsheet document from the spreadsheet viewer facility to the client spreadsheet viewer; transmitting at least one keyboard and mouse action on the client computing device to the spreadsheet viewer facility, wherein the at least one keyboard and mouse action is associated with a selection of a cell in the actively rendered spreadsheet document subsequent to the rendering of the spreadsheet document; and transmitting a spreadsheet data content for the selection of the cell of the actively rendered spreadsheet document from the spreadsheet viewer facility to the client spreadsheet viewer. In embodiments, the spreadsheet document may be received at the client computing device from a second client computing device, where the second client computing device sends the spreadsheet document to the spreadsheet viewer facility for rendering. The spreadsheet document may be received at the server-based computing device for rendering to the client-computing device. The spreadsheet document may be disabled from being opened by the spreadsheet application running on the computing device. The spreadsheet viewer facility may provide permission for access to the spreadsheet document as an actively rendered spreadsheet document. The spreadsheet document may be disabled from being opened by the spreadsheet application of a software-as-a-service application. The spreadsheet viewer facility may provide permission for access to the spreadsheet document as an actively rendered spreadsheet document. The spreadsheet application may be run directly on the server-based computing device, run remotely as a software-as-a-service from a remote networked location, and the like. The spreadsheet data content may be numeric data from the cell, text data from the cell, a formula associated with the cell, and the like. The rendering of the spreadsheet document may transform a plurality of spreadsheet data comprising with the spreadsheet document into the actively rendered spreadsheet document. The transformation may be on a cell-by-cell basis and dependencies among cells are maintained in the transformation. The client spreadsheet viewer may be adapted to provide permission to copy the spreadsheet data content. The client spreadsheet viewer may be adapted to provide manipulation of the spreadsheet data content in the cell. The client spreadsheet viewer may be adapted to provide permission to take screenshots of the actively rendered spreadsheet document. The client spreadsheet viewer may run through a browser running on the client computer device.

Virtual Machine/Container Digital Rights Management

In embodiments, a virtual container digital rights management (DRM) facility 209 may be provided that utilizes a virtual container environment (e.g., virtual machine, drive 'x' partitioning) to provide DRM control over content, such as to provide a facility for editing, but still blocking the ability to print, save, print screen, and the like. Special plug-ins to an application may be used for such purposes, but although this configuration may still enable a user to read the content, they may not be able to make updates, or send it back to the originator. However, through the use of a virtual container environment, a proxy to the application system may be created that would mount an encrypted file, such as a protected 'drive X' item, enabling the control and/or prevention of operating system calls (e.g., in the Windows O/S the Win32 calls to save files, access the network, and print screen), but allow applications to work with the content. For instance, while the file is protected as a drive X item, the application may work with the content while protecting the document. Formatting, updating documents, and the like may thus be allowed, enabling the system to save it back, encrypt it, and the like, enabling the document to be sent to the creator of the protected package, allowing someone to edit a file, even when they can't copy, print, and the like.

In this way, the virtual container environment may control further dissemination of the document that a user is sharing by blocking the various operating system commands (e.g., print, print screen, save, send, and the like) that are the normal mechanisms by which a recipient of a sensitive document would save or disseminate a copy, even though the recipient may only supposed to have temporary, limited access. A plug-in to an application that is being used to interact with the content can accomplish blocking the operating system calls, but may do so mainly by creating 'read only' versions. Often, the original sender of the document wants feedback from the user, such as edits or annotations, which could be embodied in the document if the user were able to edit. The virtual container may be used to create a virtual drive, encrypted version of the content (e.g., document). The virtual container may allow applications (e.g., office applications and editing applications) to edit the content, annotate the content, and the like, but where it can only be saved back to an encrypted form on the virtual container, so that when a virtual container permission expires, only the original sender has access to the edited version.

Figure 15:
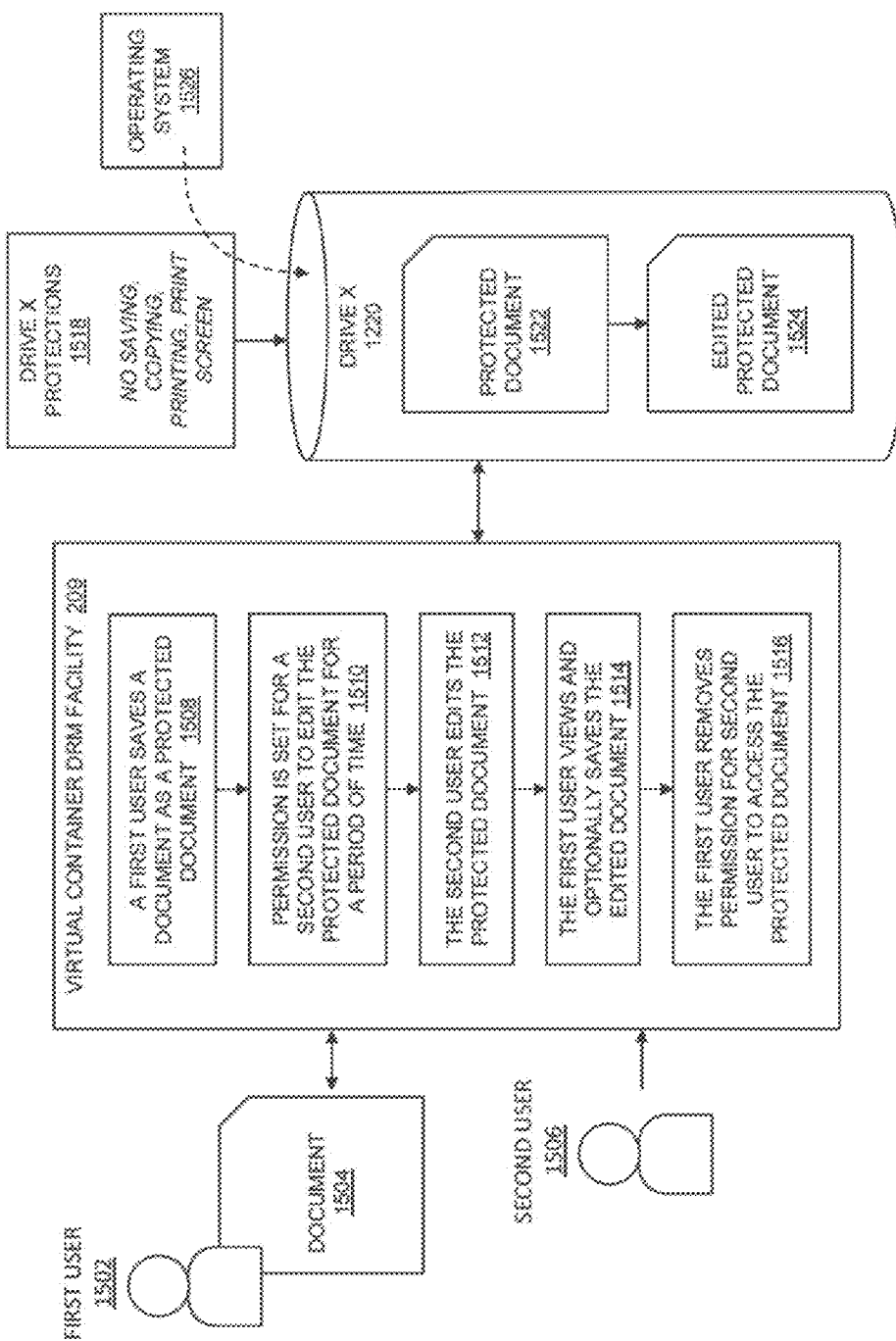
FIG. 15 depicts a functional block diagram for an exemplary virtual container DRM facility in an embodiment of the present invention.

Referring to FIG. 15, a non-limiting example functional flow diagram depicts an embodiment process flow for a document 1504 being edited through the protective virtual container DRM facility 209. In this instance, a first user 1502 utilizes the virtual container DRM facility 209 to permit a second user 1506 to edit a protected document 1522 version of the document 1504 while protecting the document 1504 from saving, copying, printing, print screen, and the like functions as applied to the protected document 1522. As depicted in this instance, in a first step 1508 the first user 1502 may save the document 1504 as a protected document 1522, where the document is protected by being configured as or as part of a drive X 1220 storage location. The drive x 1220 may have drive x protections 1518, such as disallowing commands from an operating system 1526 from the second user 1506 saving the protected document to a location other than the drive X 1220, copying the protected document, printing the protected document, print screening while the protected document is being accessed, and the like. In a second step 1510, permission may be set for the second user to edit the protected document 1522, such as for a period of time (e.g., one day, a week). Alternately, permissions may be restricted to a number of accesses the second user 1506 is permitted, such as limited to one access, three accesses, and like, where the second user 1506 then has that many accesses to edit the protected document 1522, such as representing the number of editing cycles the first and second users have in editing the protected document 1522. In a third step 1512, the second user 1506 may edit the protected document 1522 to create an edited protected document 1524, where the second user is restricted from anything but editing the protected document 1522 by way of the drive X protections 1518. In a forth step 1514, the first user 1502 may view and optionally save the edited document 1524, where the first user 1502 may maintain all of the functions of saving, copying, printing, print screen, and the like, that the second user is blocked through the drive X protections 1518. In a fifth step 1516, the first user 1502 may remove permission for the second user 1506 to access the protected document 1522 or edited protected document 1524, thus eliminating all access to any version of the document 1504 that the second user may have been previously granted.

In embodiments, a method for securely sharing documents among users within separate business entities may comprise providing a virtual container control facility, on a computing device with an operating system, and at least one virtual container where commands from the operating system for saving, copying, and printing of computer files are restricted for users other than unrestricted users; storing by a first unrestricted user of a first business entity a computer file in the virtual container; granting access permission by the first unrestricted user to view and edit the computer file by a restricted user of a second business entity; and receiving editing of the computer file by the restricted user, the editing creating an edited computer file within the virtual container that is accessible by the unrestricted user. In embodiments, the first unrestricted user may save, copy, print, print screen, and the like, the edited computer file by the first unrestricted user, including any portion of the edited computer file. Access permission may be removed for the first unrestricted user to the computer file and the edited computer file. The data file may be encrypted with digital rights management protection. The virtual container may be a file location within a virtual machine configured to restrict the commands from the operating system. The virtual container may be a file location within a computer drive configured to restrict the commands from the operating system. Editing the computer file may be through a source application for the computer file, where the source application is permitted to edit the computer file. The granted access permission may be for a limited time period. The granted access permission may be for a limited number of accesses to the data file. The granted access permission may be based on a role of the restricted user within a transaction process involving the first and second business entities.

In embodiments, a method for securely sharing documents among users may comprise providing a virtual container control facility, on a computing device with an operating system, and at least one virtual container where commands from the operating system for saving, copying, and printing of computer files are restricted for users other than unrestricted users; storing by a first unrestricted user a computer file in the virtual container; granting access permission by the first unrestricted user to view and edit the computer file by a restricted user; and receiving editing of the computer file by the restricted user, the editing creating an edited computer file within the virtual container that is accessible by the unrestricted user. In embodiments, the first unrestricted user may save, copy, print, print screen, and the like, the edited computer file by the first unrestricted user, including any portion of the edited computer file. Access permission may be removed for the first unrestricted user to the computer file and the edited computer file. The data file may be encrypted with digital rights management protection. The virtual container may be a file location within a virtual machine configured to restrict the commands from the operating system. The virtual container may be a file location within a computer drive configured to restrict the commands from the operating system. Editing the computer file may be through a source application for the computer file, where the source application is permitted to edit the computer file. The granted access permission may be for a limited time period. The granted access permission may be for a limited number of accesses to the data file. The granted access permission may be based on a role of the restricted user within a transaction process.

In embodiments, the offline file access facility 288, the spreadsheet viewer facility 292, and the virtual container DRM facility 209 may be combined to provide a comprehensive method for secure viewing or editing of a document, such as a spreadsheet, where the spreadsheet viewer facility 292 provides secure viewing, and in some embodiments editing, of a document when a client computing device is online, and the offline file access facility 288 and virtual container DRM facility 209 provide secure viewing, and in some embodiments editing, of the document when the client computing device is offline. For example, in order to provide secure access to a document, the display of the document may be rendered from a secure server to the client computing device rather than downloading the document to the client computing device. Remote screen rendering may be enabled by protocols known to those of ordinary skill in the art, such as the remote desktop protocol of the Windows® operating system, similar protocols in Linux operating systems, or various server- or software-as-a-service-based protocols for such rendering. Such protocols may allow not only viewing, but editing of the document from the client computing device, without having the document itself reside on the client computing device. In this way, access to the underlying document and its file, apart from the view currently being displayed (e.g., a particular page or screen view of the document), is controlled by the secure server. In embodiments, the spreadsheet viewer facility 292 may be used to render a plurality of different types of documents (e.g., spreadsheets, word processor documents, presentation documents) to a document viewer on the client computing device, such as in conjunction with a web browser on the client computing device. However, the rendering process described for such online access does not result in updating the rendered document on the client computing device when the client computing device is offline. For the offline case, the secure server, upon notification by a user of a connected client computing device that the user wants access to the document while offline, may provide an encrypted version of the document along with a limited use encryption key. In that case, the offline file access facility 288 enables the client computing device to download the encrypted version of the document along with at least one limited-use key. In this case, the client computing device will have access to the underlying document file, at least one a limited, one-time basis, so that the file can be edited within the viewer. The viewer may thus include appropriate editing functions, as well as viewing functions. The party wishing to share a document may wish to have the recipient user of the client computing device view, and perhaps even edit, a document, but often it is desired to prevent further sharing of the document by the recipient. In order to prevent the user of the client computing device from printing, saving, sending or copying the document while it is stored on the client computing device, the secure server may utilize the virtual container DRM facility 209 to store the document in a virtual container on the client computing device, the virtual container being adapted such that the document can only be edited or viewed within the viewer. The document is now secured whether the client computing device is connected or not to the secure server, where user permissions may be separately controlled for online rendering of a document and for offline access to the document.

In embodiments, a method for secure viewing of a document may comprising rendering, from a networked server-based computing device to a client computing device when the client computing device maintains an online connection to the networked server-based computing device, a document created by an application as an actively rendered document in a client document viewer running on the client computing device without the use of the application running on the client computing device; and upon a request from the client computing device for offline viewing of the document, storing, on the networked server-based computing device, the document as an encrypted document along with a plurality of limited-use encryption keys, each of the plurality of limited-use encryption keys providing access to the encrypted document a limited number of times, the encrypted document accessible as downloaded to the client computing device that is not connected to the network only through use of at least one of the plurality of encryption keys within the limited number of permitted uses, wherein when the encrypted document is downloaded to the client computing device, the encrypted document is stored in a virtual container where commands from an operating system of the client computing device for saving, copying, and printing of computer files are restricted. Further, a user of the client computing device may access the encrypted document stored in the virtual container through the use of the at least one of the plurality of encryption keys, while the client computing device is disconnected from the network.

Email Effectivity Facility

Email can be a convenient method for inviting an individual to view a resource, such as a file, on a secure data exchange. For instance, an email may contain an embedded link, or similar element, allowing the recipient of the email to access a resource by clicking on the link and logging into the secure exchange environment. However, emails may be stored for time periods that exceed the desired time for which access is intended to be permitted. This is particularly true across separate business entities, where a transaction or other collaborative project may call for temporary sharing of information, but once the need ceases, access is no longer intended. For example, in mergers and acquisitions transactions, temporary access may be allowed to designated individuals of a prospective buyer to confidential resources that reflect the condition of a target seller in a "due diligence" process. This access needs to be revoked when the due diligence process ceases. In methods and systems disclosed herein, an effective period may be specified for an email, so that once the effective period ceases (either based on expiration of time, or based on triggering of a condition that ceases the effective period), the email is no longer effective to access the resource on the secure data exchange.

Further complicating exchange of information across business entities over time is the presence of multiple email addresses for a single individual. An individual may have different roles, reflected in different addresses (e.g., personal and business), or may have different email addresses associated with a single role (e.g., bill@companyx.com and William@companyx.com). In embodiments, an email effectivity facility may be provided in connection with the secure exchange environment disclosed herein, where email addresses are linked to the identity of a user, such as a designated individual who will receive email, and the relationship of the email addresses to the user are tracked over time to provide a current association of email address to a designated individual. In embodiments, once email addresses are linked to a person (such as by a business entity associated with the person), then the person may be allowed access to a resource from any current email address, not just the email address to which a link or other access capability was initially sent. Similarly, all email addresses of a user may be "de-commissioned," and all email-based links rendered ineffective, if the role of the individual changes, such as if the individual leaves the business entity that is the intended recipient of access rights.

Thus, in embodiments, access to data by a designated individual may be permitted based on the union of (a) emails or email accounts that are currently effective (that is, within their applicable effective period) and (b) the set of resources for which any valid email address of that designated individual has been granted access. In such embodiments, a user may readily access data relevant to multiple projects and resources, without needing to track down the particular email that allowed the user access to a particular resource, yet the individual is not allowed to access resources that have expired, or to access resources in cases when the role of the individual has shifted (resulting in a change in the identity of the user and the access permissions allowed for all emails associated with that user).

Once an identity has been established for a user, that identity may be tracked over time as the individual moves from company to company, eventually allowing a host to establish a comprehensive, authoritative collection of identities and associated email addresses for a large number of individuals.

In embodiments, the same email address may be used at different times for two different individuals, in which case the methods and systems may include further information, such as metadata, for tracking the real individual that is associated with a particular address at a particular time. Different effective periods may be used to confirm which individual is allowed access to particular resources. A person may have multiple effectivity periods if they work at a company over two different periods of time, e.g., hired January 2000, quit June 2005, then hired again in February 2008 and quit again in December 2012.

In embodiments, the email effectivity facility 294 may track identity and conditional access permissions over time for the different email addresses for the individual as they change roles, as well as tracking the effective dates for those email addresses. The system may track the effective date that a particular email account was active, and/or inactive, the effective date the email account was linked into the email effectivity facility, and the like. The email effectivity facility may extend control of access beyond a user's current association with a business entity, such as an individual having had different email addresses for the different companies the individual has worked for, along with personal emails, each with effectivity conditions. The email effectivity facility may provide an authoritative source of workspace identity, tracking the plurality of email accounts and associated access conditions, and keeping them associated with this one person, and controlling access that this person has over time in association with each email.

The email effectivity facility may aid a user in managing a user's email identities over time, where the user's identity shifts over time, where an individual shifts between roles (e.g., with respect to personal email and work email, for example, or shifting from one company to another). The system may associate a user's permissions for access, editing, and other features based on a correct interpretation of the current role. For instance, an email sent to an individual with a link to content in a data room may have an effectivity date (e.g., the individual's access is between time 1 and time 2). That email and link may also be associated with a catalog of email addresses, so that if the user leaves that role, the link is no longer effective, even if the user attempts to activate it within the originally permissioned time range. For instance, the user leaving a role may be indicated in a catalog by de-permissioning that email address by the user's employer (or other sender of the email) and perhaps also triggered by the appearance of a new email address with a different company domain that is for the same person. In embodiments, the companies that granted the email account may validate the user's workspace identity, and provide a historical access to the workspace identity. In embodiments, effective dates and expiry dates may apply for permissions as well as for documents. For instance, a user may set up a request for proposal, and provide everyone access on an effective date of March 1. The user then sets an expiry date for March 7, at which point all permissions for access are terminated.

In embodiments, effectivity conditions may be managed by a host, such as an intermediate business entity, in response to inputs from multiple distinct business entities. A past employer may allow the individual to receive emails, but not to access any company data, while a current employer may limit email access to time periods associated with specific roles or tasks delegated to an individual. Further, a non-employer, such as a third party involved in a transaction with the company that employs the individual, may set effectivity conditions on specific emails directed to the individual, such as allowing temporary access to the third party's data in a secure exchange environment, such as to enable collaboration or sharing between the third party and the individual's employer. Thus, effectivity conditions for emails directed to an individual may be managed on a per account, per sender, per project, or per employer basis, among other factors, by allowing employers, the individual using the account, email senders (including third parties in different entities) and an intermediate host of an exchange environment to set and manage such effectivity conditions.

Figure 14:
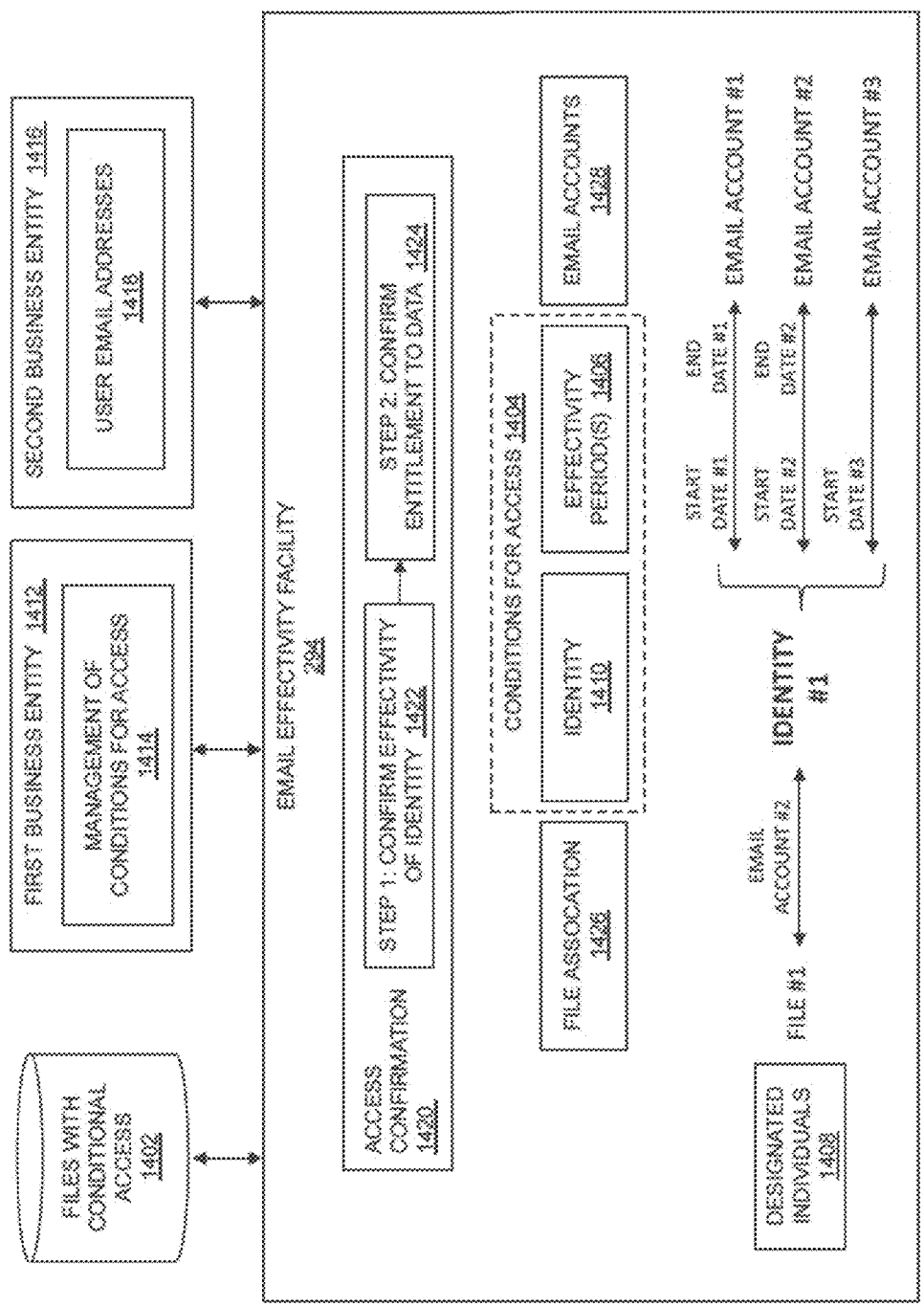
FIG. 14 depicts a functional block diagram for an exemplary email effectivity facility in an embodiment of the present invention.

Referring to FIG. 14, in embodiments an email effectivity facility 294 may be provided for managing access conditions 1404 to resources in a secure exchange environment, where access to the resources is provided through email. In embodiments, methods and systems may use the email effectivity facility 294 to allow a user of a first business entity 1412 to manage access 1414 by specifying conditions for email-based access to at least one resource in a collection of files 1402, wherein the condition expresses (a) one or more effective periods 1406 for using an email providing access to the resource and (b) a condition of email access to the resource by a designated individual 1408 of a second business entity 1416, where the access permission may be assigned using a specific email address 1418 of the designated individual and access may be provided by sending an email to that email address with a link, a log-in credential, or the like that enables access to the resource. Access confirmation for access to the resource, e.g., the file 1420, may include confirmation steps, such as in a first step 1422 where the effectiveness of the identity of the designated individual is confirmed (including based on linking various email addresses to that particular individual) and a second step 1424 where entitlement to access a resource, such as the data file 1420, is confirmed (including checking the effectivity periods that were set for access to each of the resources by the user of the first business entity).

In an example, there may be an association 1426 between the identity 1410 of a designated individual and each of multiple email addresses or accounts 1428, each with effectivity periods 1406. Email accounts, or particular emails bearing access credentials, may have a start date and an end date as their effectivity date range, such as when email accounts are no longer effective, have a future date range, and the like. An email account may also only have a start date, such as when an effectivity period is still current, or has not yet begun. FIG. 14 shows an instance where an identity #1 has a file association with a file #1 through email account #2. In this instance, the confirmation of identity would be passed for access confirmation, but the step of confirming entitlement to the data may fail, such as if it is currently outside the effectivity period between start date #2 and end date #2. However, if the current time is within this date range, the designated individual would have access to the file#1. The association of multiple email accounts with a single identity through the email effectivity facility 294, enables a comprehensive management of a plurality of email accounts, especially important when the email accounts are conditionally associated with emails linked to files.

Figure 14A:
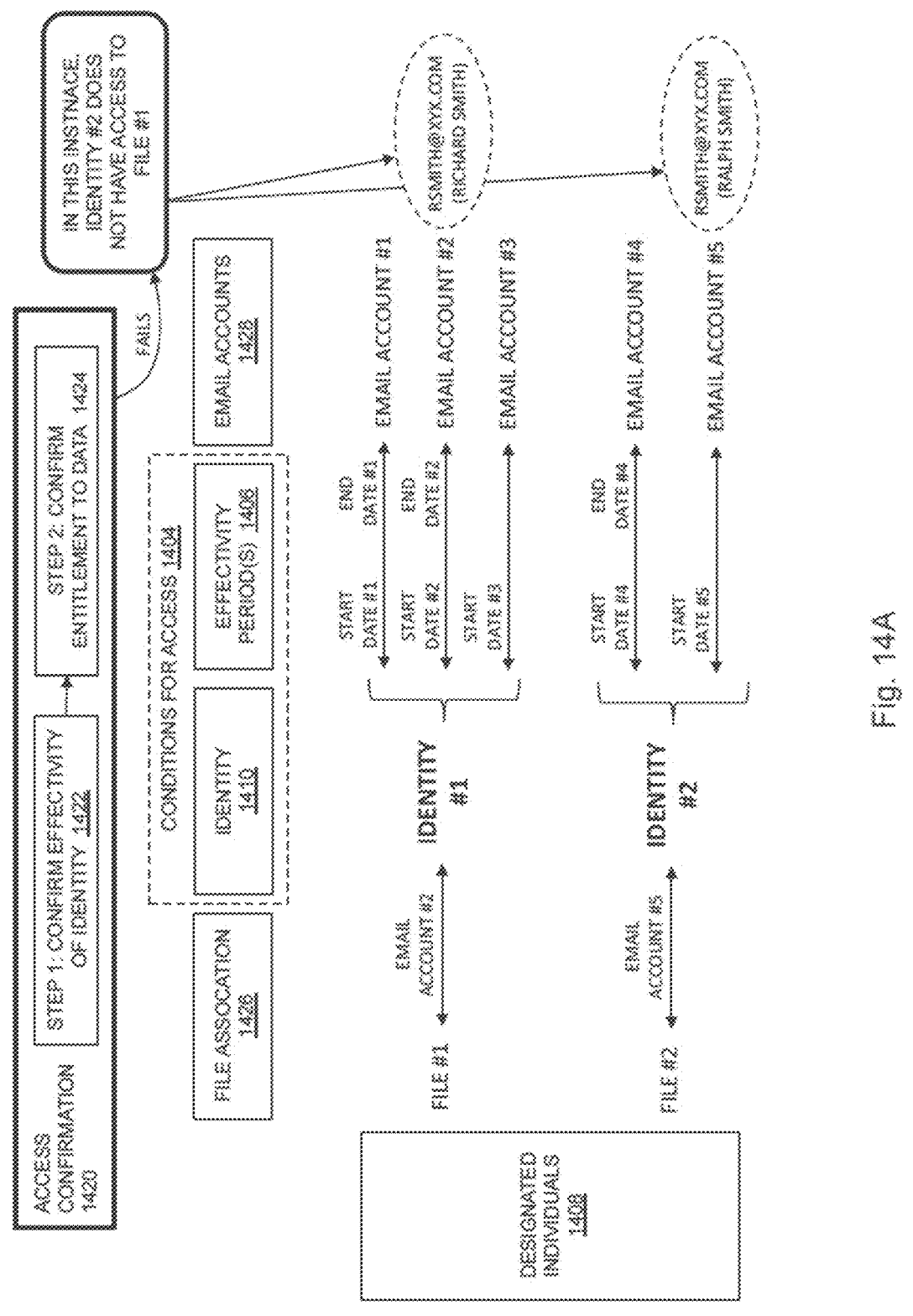

FIG. 14A shows a specific instance when a single business entity has re-assigned a previously used email account name to a second user, such as where a previous employee has a related name, such as rsmith.xyz.com being used for a former employee Richard Smith and a current employee Ralph Smith. In this instance, the access confirmation would fail if Identity #2 tried to access File #1, where the email account name would pass, but the effectivity date range (e.g., equating to their time range for employment with the business entity) would not match, and so failing the confirmation of entitlement to the file.

In embodiments, a method for managing access to a secure exchange environment managed by an intermediate business entity through a user email identity may comprise establishing a secure exchange server hosted by an intermediate business entity, wherein communications and access to a collection of files established by a first business entity are managed for a second business entity; and establishing an email effectivity facility that allows a user of the first business entity to specify a condition for email-based access to at least one resource in the collection of files, wherein the condition expresses (a) an effective period for using an email providing access to the resource and (b) a condition of email access to the resource by a designated individual of the second business entity, wherein the access permission was assigned using a specific email address of the designated individual. In embodiments, multiple email addresses may be associated with the identity of the designated individual of the second business entity. The designated individual may be permitted access to the resource during the effective period of the email that provided access from any current email account that is associated with the identity of the designated individual. Separate access conditions may be managed for each of the multiple email addresses of the designated individual. The first and second business entities may validate the designated individual's permissions associated with the multiple email addresses. Permission to access information on the secure exchange server may be identified by an embedded link in an email from the user of the first business entity to an email address of the designated individual. The first business entity may provide updates to the access conditions as an association of the user of the second business entity with the first business entity changes. The effective period may be a period of employment, a stage of a transaction, and the like. The email effectivity facility may utilize a graphical user interface to manage the access conditions, such as where the graphical user interface indicates the status of the access conditions, where the graphical user interface is integrated into a third-party application as an application program interface (API), and the like. The effectivity condition may be a status of an email account of the second business entity, and the status of the email account is still monitored when the designated individual is no longer employed by the second business entity.

E-Discovery Facility

Figure 16:
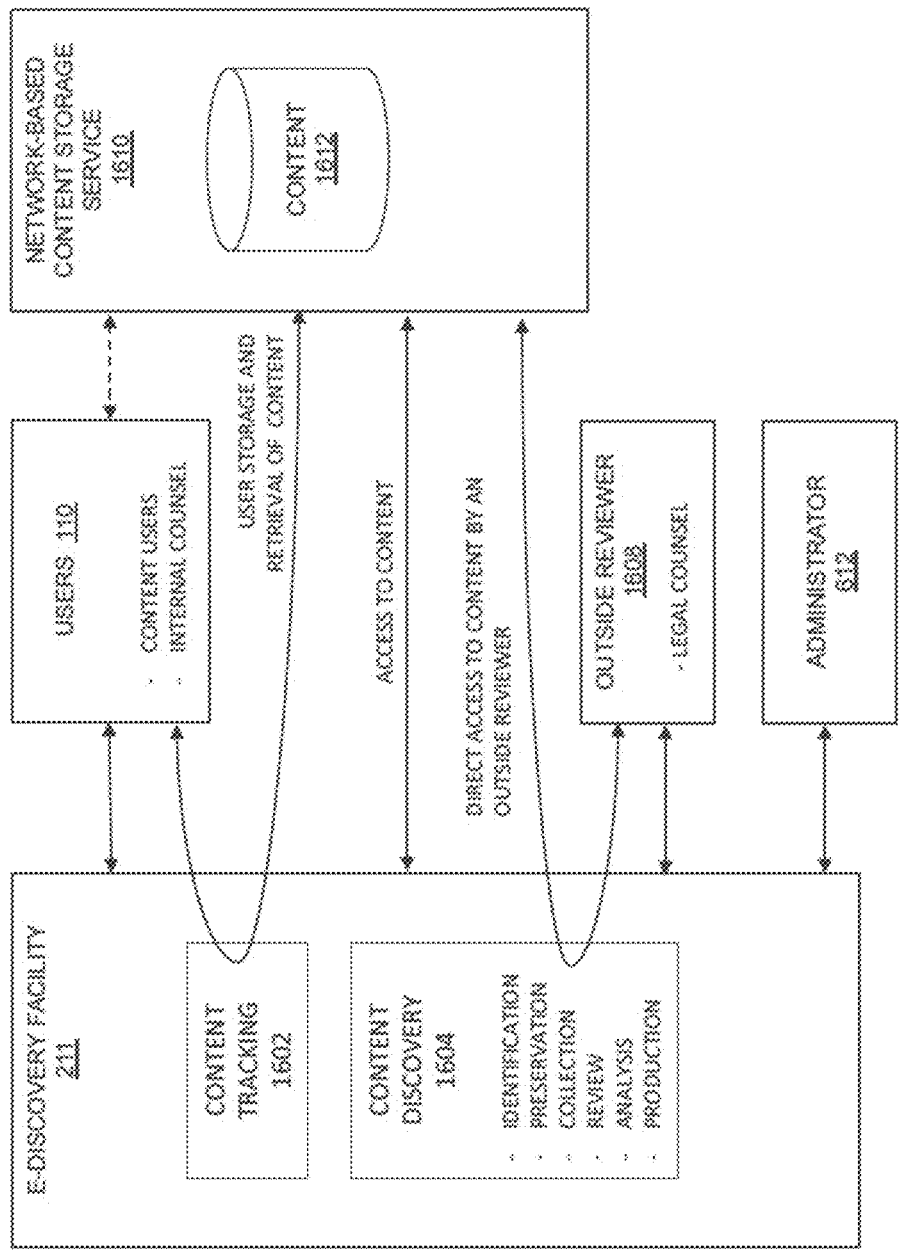
FIG. 16 depicts an exemplary electronic discovery facility in communication with a content storage service that is network-based.

Referring to FIG. 16, in embodiments an electronic discovery (e-discovery) facility 211 may be utilized by users 110 to facilitate the discovery process for digital content 1612 stored in a network-based content storage service 1610, such as in a cloud-based service. In embodiments, a discovery request for digital content may be made by, in association with, for example, an investigation, a lawsuit, an arbitration, a mediation, an audit, or a dispute between entities. In embodiments, a discovery request is for access to digital content by an agent, wherein the agent may be, for example, legal counsel, a legal agent, a paralegal, a legal assistant, a law clerk, a judicial agent, a law enforcement agent, a government agent, an outside counsel, an internal counsel, an internal agent, an auditor, an accountant, a forensic accountant, an expert witness, an employee, a consultant, or an enterprise knowledge worker. The digital content 1612 may be computer data or other content, such as documents, presentations, spreadsheets, emails, blog entries, texts, calendar notes, meetings, social media messages, browser history, bookmarks, and the like.

The content discovery 1604 process may comprise the identification, preservation, collection, review, analysis, and production of content, such as enabled through content tracking 1602 provided by the system for content exchanged between users 110 and the network-based content storage service 1610. For instance, the electronic discovery facility may support or allow response to requirements of a discovery process in civil or criminal litigation that pertains to electronically stored information (ESI), such as with respect to an entity such as an individual, a business, a government organization, a non-profit organization, and the like. In this instance, when responding to a litigation request for discovery, enterprises must identify responsive documents, may place those documents on legal "hold" status to ensure that data cannot be destroyed, and may need to transfer those documents with associated metadata to an outside reviewer 1608, such as their legal counsel (which may be internal or outside counsel). The legal counsel may then determine relevance and disposition of those documents. Documents may then be processed to facilitate the review and culling of documents, for instance, using techniques such as keyword search, date range, meta-data based search, and the like. The resulting documents may then be submitted to opposing counsel, such as in formats that cannot easily be altered, including PDF or TIFF.

In many regards, the use of third-party file sharing tools has made electronic discovery difficult or impractical, and in some cases impossible. For example, any number of different commercial file storage resources (e.g. Dropbox) may be used by individuals of an enterprise for storing and sending files and electronic messages to third parties, many of which may be entirely outside the purview of enterprise Information Technology administrators. As a result, responding in a timely, complete fashion to litigation requests becomes a challenge.

In embodiments, a set of tools may be made available to administrators 612 of an on-line, network-based file sharing and collaboration service that are an aid in responding to a discovery request, such as a litigation request for electronic content, such as files, emails, documents, presentations, calendar notes, meetings, social media messages, browser history, bookmarks, and the like. These electronic discovery tools may be integrated into an existing administrator console, and made available to administrators with the appropriate mechanisms for maintaining legal privilege. From the administrator console, administrators may first be able to identify the relevant individuals who may be in possession of relevant content. Alternately, the electronic discovery tools may be utilized directly as part of compliance with an electronic discovery reference model. Searching may include the ability to search by user, by date range, by topic (e.g., based on metadata or tags) and the like, to limit the scope of the search result. To facilitate content tracking 1602, the electronic discovery facility 211 may apply metadata, tags, global identifiers, and the like, to content being stored in a network-based content storage service 1610. For example, a user may 110 may store an electronic document in a commercial networked content storage service, such as one of a plurality of cloud-based commercial storage providers, where the document is first sent to the electronic discovery facility 211 for tagging with a global identifier to facilitate tracking down the content. In addition, contact tracking may store information associated with the document, users that have access to the document, users that have downloaded the document, and the like, where contact tracking 1602 keeps track of where all copies and versions of the document reside. Users and/or content may be searched directly, such as through a user application or from the administrator console. Once identified, the resulting content may be placed on legal hold, where a legal hold prevents content from being destroyed or modified, such as to protect and document the chain of custody. In embodiments, content with rights management encoding (e.g., information rights management (IRM), digital rights management (DRM), and rights management service (RMS)) may be placed on legal hold through rights management based controls, such as wherever the content is currently stored, as described in this disclosure. Once placed on hold, those identified electronic content may be provided to outside reviewers (e.g. legal counsel) by granting them access directly to the content as they reside in the file sharing service. The outside reviewer may choose to use native search, de-duplication techniques, and analytics tools to further cull the content set.

In embodiments, the relevant content that result from the search process may be exported to removable media as native files (also referred to as 'petrified' files) in JPG or TIFF format to prevent data spoilage. Some content may have a mix of relevant content and other content that needs to be redacted, or for which portions may be reviewed only by a limited set of eyes for the counter-party to a litigation or other dispute. For example, technology trade secrets in an intellectual property dispute may be limited to "counsel's eyes only," so that non-attorney individuals of the counter-party are not supposed to see trade secret portions of materials. In such cases, document editing tools and rights management tools may be used, such as in a secure exchange, to block certain portions of content from access, except by individuals that have appropriate access credentials to view the content.

This identification, preservation, collection, processing, review, optional redaction, and production of electronic content may be conducted through a file sharing service administrator console, through an application, or if required, may allow the user or administrator to identify, legal hold, redact, and export content for review in content review platforms of their choosing. In this way, the culled set of content may be shared with outside reviewers 1608 without the need to export physical media, and as such, may be shared in place without concerns that the content or chain of custody will be modified or that unauthorized users will have access to prohibited portions of content.

Rules-Based Workflow Management within an Exchange

In embodiments, a rules-based workflow management facility 219 may be provided within a secure exchange. For instance, in the case of a private equity fund, a user may be executing a capital call. Rules may be used to automatically permission, automatically alert, and the like, such as for example, alerting those individuals associated with the capital call. In embodiments, the system may trigger rules-based actions on at least one document, where the at least one document is mined for information, such as the investor's name, the deal, the nature of the deal, and the like. Based on this information the system may create a group, such as based on the investor's name. For instance, creation or selection of a workflow may be based on this information and the rules established therefor. Other workflows may relate to completion of debt or equity offerings (including initial public offerings), completion of private equity and other investment transactions, completion of lending transactions of various types, syndication of transactions of various types, mergers and acquisitions transactions, and others. A set of workflow rules for each may be based on organizational policies, transaction terms and conditions, and legal/regulatory requirements. Under such rules, an exchange, such as for a particular transaction, may be automatically provisioned with a suitable content organization structure (e.g., a set of files named with standard naming conventions appropriate for various content normally needed for that type of transaction); individuals having defined roles within each enterprise (such as determined by contact information stored and/or associated with an exchange) may be prompted to populate and/or review the content structure with appropriate enterprise content; and individuals having defined roles within each enterprise may be automatically provided appropriate access credentials to access the content. Rules may also trigger actions based on conditions, such as providing additional access and/or prompting in response to completion of actions (e.g., prompting a reviewer to provide a summary report to a supervisor when the reviewer has completed review of a file).

Improved Methods and Systems for Providing Delivery of Services

In embodiments, improved delivery of services may be provided through the use of a delivery of service facility 221 as shown in FIG. 2a layered over an application program interface (API) layer that is able to significantly accelerate API-based processes. The delivery of service facility may include a bulk operations toolkit that provides bulk operations and various spreadsheet driven operations, where operation steps are validated. The toolkit may provide real-time validation of inputs to an exchange, so a client is able to receive real-time confirmation of the results. The system may enable various operations to be assembled together. The system may also allow a user to set a variety of criteria and transfer them from one exchange to another. The toolkit may include client-specific tools, such as a customer alerts tool, a process steps consolidation tool, and the like. For instance, a client-specific tool may be created to create and populate field information for certification, ingest spreadsheet content, and create an exchange, all in one process. In embodiments, the delivery of service facility may provide a bulk operations toolkit for an exchange, the ability to push custom alerts up to multiple exchanges in real-time, and the like. In embodiments, the system may enable the transfer of data from an exchange via metadata, such as with options to transfer custom fields or their values.
Protected Drive with Encrypted Content and Auditable Access History In embodiments, content may be stored on a secure drive on the exchange server through a protected drive facility 223. This secure drive may also be replicated to an open drive, such as on a user's hard drive. The secure drive may be accessible to anyone who can access it, where the secure exchange server provides a managed service offering resident on the computer platform hosting the encrypted managed device. The drive may have security policies, be remotely administered, provide complete tracking of what goes in or goes out, and the like. Accesses to the drive may be monitored and recorded in an auditable record, including bulk copies. As such, if an unauthorized user gets to the drive, it would be encrypted and so unreadable. Thus, the drive may provide a secure storage facility that is encrypted, remotely managed, policy managed, and the like, providing the user with a controlled secure storage.
Virtual Drive Facility In embodiments, a secure drive on the exchange server may be replicated to a virtual drive through a virtual drive facility 225, such as visible and accessible from a user's desktop computer. In an example, this would allow legal teams to drag emails into an exchange directly or do the same thing from a desktop in a more integrated experience than if they had to work with a dedicated application. In this way the files may be dropped into a secure repository directly from the desktop. The virtual drive may also be integrated with the browser of the user's computer.
Revision Timeline for Handling Version Conflicts In embodiments, the system may provide for a visual revision timeline user interface through a revision timeline facility 227, such as for viewing and resolving document version conflicts. Through use of the visual revision timeline, the system may be able to provide the user with a view into when revisions occurred, and aid in determining how to resolve conflicts between overlapping revisions, and when to merge the changes, thus making collaboration easier. For instance, the system may provide a visual view of when a revision branching occurred between two or more users. Looking at a visual timeline of document versions with snippets of conflicts may allow one user to determine if a conflict exists, and whether to merge the changes from another user, perhaps without looking at the source application. For instance, if a user changed something from italics to bold, the system could help classify whether that change is a conflict that needs to be resolved. That is, there may be different levels of revisions with different conflict resolution priorities, such as formatting level conflicts, content-level conflicts, and the like. Content-level conflicts might be resolved, but if content and formatting changes get mixed together, the system may have facilities to parse these potential conflicts out, such as by categorizing them, applying rules to determine what is a conflict, perform automatic conflict resolution on one category of conflict but query the user for others, and the like. The visual revision timeline user interface may make it simpler for a user to see what changes have occurred to a document in a secure way.
Collections User Interface for Organizing Work Streams In embodiments, a collections user interface may be provided for organizing work streams that allows dragging and dropping of assets, users, and the like, to create automatic permissioning. In this way, a user may be able to utilize a drag and drop action to create 'collections'. For instance, to create a folder, new work stream, or the like, a user may drag one entity on top of the other. A user may create a collection of work streams that they drag items into (e.g., other work streams, contacts, assets, and the like). In this way, a user may drag assets and the people into a collection and automatically create permissions. In an embodiment, a collection will automatically provide permission to all individuals whose contact information is dragged/dropped into the collection, for the individuals to access all content that is dragged/dropped into the collections. Collections may be annotated, such as with messages to the respective contacts. For example, if a partner in a law firm wants two associates to review a set of documents in connection with an M&A due diligence process, the partner may create a new collection in an exchange, drag and drop the documents (e.g., from a section of an exchange) relating to a relevant topic into the collection, drag and drop the names of the two associates into the collection, and write a message to the collection instructing the associates which documents each is to review. In embodiments the creator/manager of a collection may provide other settings, such as allowing read/only access, having time-limited access, or having other features described throughout this disclosure.
Three Dimensional Viewing Facility In embodiments, a 3D viewing facility 229 may be provided, such as for viewing secure 3D documents that are being shared though the secure exchange server. The 3D viewing facility may provide facilities for rendering a 3D document in a secure manner consistent with methods and systems described herein in relation to other digital content, including secure viewing protection, un-sharing control, and the like. The 3D viewing facility may provide a conversion facility for converting CAD drawings into the 3D rendering files for viewing on a user's computing device, mobile computing device, and the like. The 3D viewing facility may provide a storage facility for source CAD drawings and/or the 3D files. The 3D viewing facility may provide for a permissioning mechanism, auditing mechanism, distribution, share/unshared facilities, a business process based on work streams, and the like. In an example, a business may be going out for bids on a design to a number of vendors, and through the secure exchange facility and 3D viewing facility may be able to share the 3D files for the design for the bidding process. Once the vendor is selected, the business may remove shared access to the 3D files, allowing the 3D files to be completely unshared from the losing vendors, such as described herein. In this way, the businesses, people, and devices that the files are shared with can be controlled, as well as un-sharing as needs arise.
Metadata Sharing Facility In embodiments, a metadata sharing facility 231 may be provided, where metadata is sharable without the need to share the documents, files, processes, applications, and the like, that the metadata is associated with. For instance, metadata may be associated with a document that has been shared, such as for scheduling, viewing, reviewing, signing, status, and the like. This metadata may provide insight into the progress of a document review, a signature process, a bidding process, a manufacturing process, a supply-chain status, and the like, without the need to have the document or application that generated the document. Through being able to share metadata, such as across enterprise firewall boundaries, a user may be able to gain insight through the monitoring of the metadata. In an example, metadata may be associated with a document that is in a signature cycle, where each time the document is forwarded, reviewed, viewed, signed, and the like, the metadata is updated. This metadata may then be forwarded to the metadata sharing facility where a report, dashboard updates, alerts, notifications, and the like, may be provided to a user that is monitoring the progress of the signature process. Thus, an individual may be able to indicate whether the signature cycle is nearing completion, without having to have access to the content of the document. This is a simple illustrative example, but one skilled in the art will recognize that this process may be used to monitor much more complex exchanges and processes, such as between enterprise partners, buyers and sellers, and the like, where different users have different applications, but through metadata sharing there may be no need for users to have the application in order to have a view of the metadata and its embedded information. With this system in place, a more time-responsive process may be in place that allows real-time updates of digital content events, and thus enables a user with a view that helps provide real-time transparency of activity to a document, work stream, process, collaboration, and the like.

In embodiments, the metadata sharing facility may provide for a platform for managing assets, policies, work flow, object life cycles, auditing, and the like, such as for collaboration situations. For instance, a user may assign metadata to a community of buyers and documents (e.g., marketing promotions) to those buyers who have registered as such. The metadata associated with those documents may then be sent back to the sender to help assess how the document is being received, such as through pages viewed, time of viewing, number of times viewed, stored, copied, distributed, signed, deleted, and the like. In another instance, documents that represent assets may be assigned metadata for monitoring, such as drawings, CAD models, change requests, deals, and the like. In another instance, metadata associated with documents may provide information about whom the document is being viewed by, and whom that person is associated with. From this information, relationships may be determined, such as how these people are related to one another, why they are connected, and the like. Related people may then be identified as potential contacts in related projects, deals, sales, and the like. Metadata may then be augmented with attributes, fields, and the like, to record these relationships, and thus build as a metadata-held profile associated with the document. In another instance, metadata may include policy information, such as for the life cycle steps or states that a document or entity associated with the document goes through. For example, a form may have different steps associated with the process of using a form, where metadata is associated with the form, the forms use, actions take with the form, and the like. The system may then look at an object that shows up in the form with the relevant data for a given step, stages and relevant actions for each stage, approval steps, people that are allowed to do the next step, and the like. In another instance, metadata may be used to track the lifecycle of an object through its steps, such as in a deal, where a document has a lifecycle. There may be n-levels of hierarchy in the metadata model, where an action, such as a workflow, may be developed from the metadata at each level. For instance, a lifecycle may have states (e.g., done, not done, approved, not approved) as a sub-level of a workflow. In another instance, metadata sharing-tracking may be useful when assets need to know about their relationships to other assets. For instance, a document might know about another document (e.g., the PDF-converted version of the same document). A document might know about a format relationship, if it is an assembly for a 3D model, about the children components of a model, and the like. In embodiments, these relationships might in some cases inherit permissions (e.g., if documents are just two versions of the same content, a PDF version may inherit permissions from the word processor version) while others might not inherit permissions (e.g., a component model might not inherit permissions from the parent model). The system may build asset permissioning relationships into and from the metadata.

Investor Portal

In embodiments, an investor portal may be provided as an investor communications platform for marketing and communicating with their clients. The investor portal may fill a need for financial services organizations. For instance, fund managers need to navigate considerable challenges to raise capital, satisfy important investors, and hold onto assets. To compete effectively, these firms need a client-reporting infrastructure that can accommodate information seeking, sophisticated investors, and the like, and maintain them as clients. The investor portal provides a new way to engage with the investor community, and does so with scalability, security and control, including content management, branding and data delivery tools to help financial managers compete effectively for institutional assets. The investor portal may provide information to investors immediately via a user interface that's customizable to enhance the user's brand while meeting reporting needs of institutional investors. The investor portal may allow for permissioning in a similar way as in an exchange or through the dashboard as described herein. Permissions for these different environments may be automatically matched, such as with a matching algorithm.

Location-Based Storage

In embodiments, a user, such as an enterprise user, may store content to a secure storage facility 233 through the exchange server. Upon request to the exchange server the content may be retrieved and then sent to the user. This process creates traffic through the exchange server, which combined with a plurality of other such requests, may create bandwidth issues at the exchange server. However, the exchange server may store the location of content locally such that when the enterprise user requests the content the exchange server provides the enterprise user with the location for direct access, such as with a time-based token that is good for a period of time. Then the user is able to directly access the content with the secure storage facility, thus removing the exchange server from the pathway, and thus eliminating the bandwidth usage through the exchange server. In embodiments, the content may be encrypted while stored, while in transport, and the like, such as in a request for the content, sharing the content, synchronizing the content with devices, and the like.

In embodiments, there may be a plurality of secure storage facilities in which user content may be stored, and to further reduce traffic and/or time-latency, the exchange server may direct the storage of the content to a location that is closest to the user, such as either geographically or through a network access assessment between the plurality of secure storage facilities and the location or network connection of the user, thus finding the best connection between the requester and the storage facility and improving access time. This location preference may be stored in association with the content through permission attributes, which then determines where the content is to be stored. Permission attributes may also determine other parameters in association with the content, such as who has access to the content, what devices are permitted to access the content, date-time limitations on access to the content, and the like.

Comment Notification

In embodiments, a comment notification facility 235 may be provided, where a user is directed, highlighted, linked, and the like, to a comment in a document created by another user. For instance, a first user may send a document to a second user for review and comment. The second user may then make a comment in the document, and the first user is notified of the comment through the comment notification facility. Notification may be provided to the first user upon the second user sending back the document to the first user, provided to the first user after the second user has saved their comments to the document, provided in near real-time to the first user when the second user makes the comment, and the like. The notification may take the form of a transmission of the comment to the first user, such as through email, through the dashboard, through a text, when the first user receives the document, and the like. The notification may include a link that brings the first user to the comment within the document, such as providing a link to the comment so that the first user only need one-click on a visual icon, link, and the like, and the first user is brought to the comment. The comment may be highlighted in some way so that the first user clearly sees the comment, such as the comment being colored font, colored highlighting, underlined, flashing, and the like. The first user may be provided a highlighted comment to a document so that they are directed immediately to an animated-highlighted version of the comment for expedited review. By providing an expedited access to a comment through the comment notification facility, the users may be provided with a method of review and comment that is quicker and easier to use than traditional methods.

Device Pinning

In embodiments, a device pinning facility may be provided that enables the enforcement of document permissions restricting a user from accessing a document from any computer other than the computer from which the user first accessed the document. The device pinning facility may be implemented without any plug-ins, agents, or any other additional software installation on a client machine, end user device, and the like.

Encryption

In embodiments, the exchange may only be accessed by authorized computers using an acceptable log-in procedure, including user name and password. Communications within the exchange may establish a communication session based upon a selected security protocol, and thereafter messages are transmitted between using such secure encryption. Communications may be exchanged via a secure encrypted communication session using a selected encryption protocol, and may deny access if a secure session cannot be established at a desired secure level. In embodiments, encryption may include the implementation of cipher block chaining (CBC) with keys of various lengths, e.g., with 256-bit encryption keys. The host server may offer a high level of security for all data by employing substantially secure network connections, and by using security and encryption technologies developed for networks such as may be readily incorporated in the encryption facility 232. Encryption of files may be provided in a cloud (e.g., enterprise-to-cloud, cloud-to-cloud, cloud to enterprise, for all devices). Encryption may be implemented without any plug-ins, agents, or any other additional software installation on a client machine, end user device, and the like, such as in combination with DRM protection, content sharing (e.g., user-to-user, user-to-many, many-to-many), watermarking, and the like.

Cross-Enterprise Collaboration combined with Unified Activity Workspaces

In embodiments, a cross-enterprise collaboration facility 298 may include unified activity workspaces, such as content management, activity management, workflow management, identity, entitlement, enforcement, and the like, where these activities may plug into the system as modules. This extended environment may also extend beyond the enterprise firewall, allowing user access when outside the secure network of the enterprise.

Cross-enterprise collaboration in a networked secure collaborative exchange environment refers to the methods and systems disclosed herein, and elements thereof, in the general domain involving secure collaboration among individuals (e.g., workers) across two or more business entities across enterprise firewalls and other elements that would otherwise provide security if the individuals were working inside the network of one company. Unified workspaces may be provided for a given type of activity within the secure collaborative exchange environment that can be accessed from various types of systems, with full management of the activities that happen in the workspace (e.g., permissioning of users and groups, control of access, tracking and auditing). For that selected type of activity, all of the necessary resources may be organized so that the activity type may be 'pluggable' into the workspace. Resources that enable the set of capabilities for each type of activity may be in blocks, plug-ins, sets of services, and the like, that can be pulled for use by the workspace, such as from the cloud, from behind a firewall, or from another resource as needed to assemble the 'pluggable' activity for the workspace.

Figure 42:
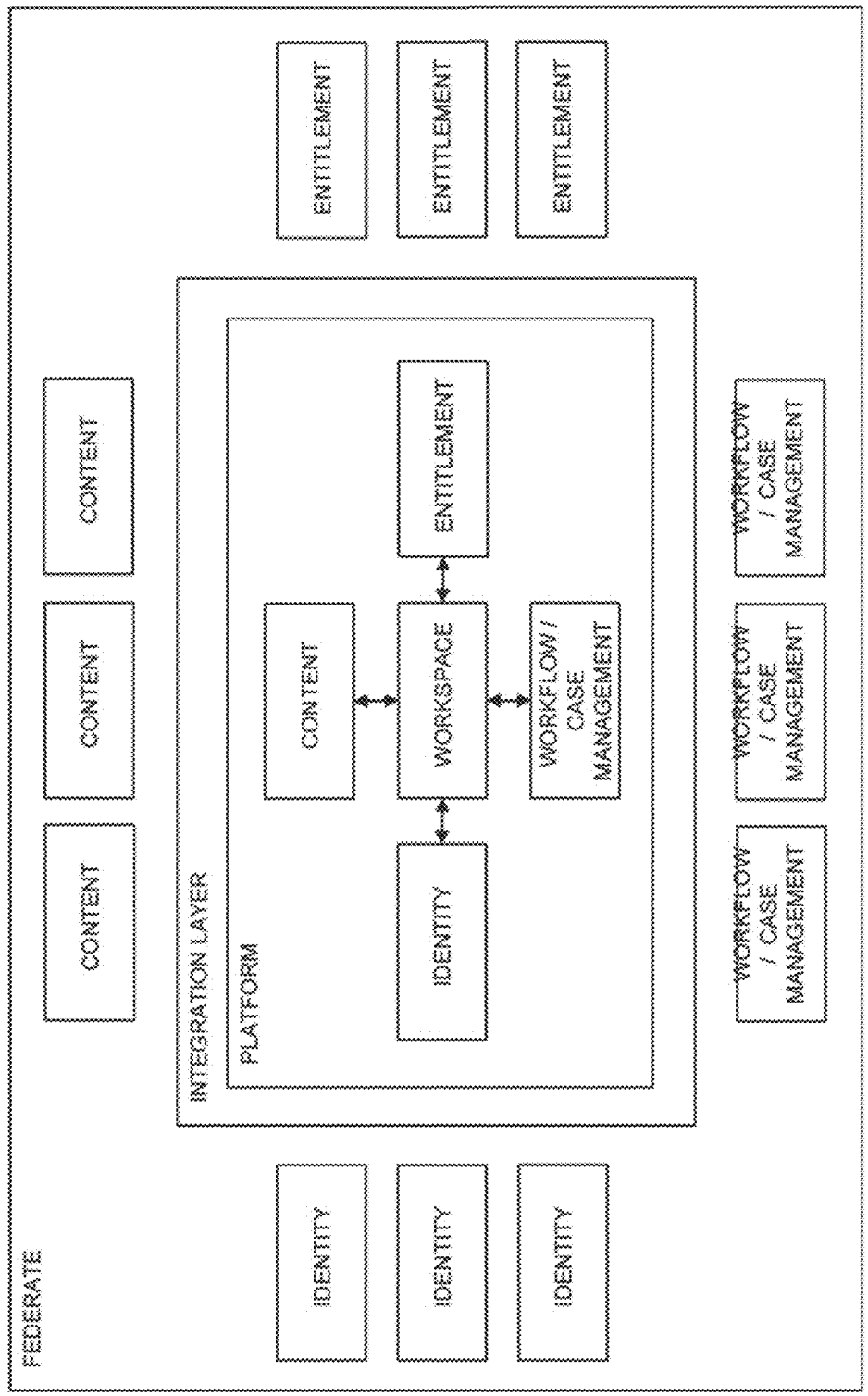
FIG. 42 depicts a functional block diagram for a workflow management workspace.

Referring to FIG. 42, a workflow management workspace may have pluggable resources to establish and drive the sequence of a workflow, such as for content, entitlement, identity, workflow/case management, and the like. Connectivity of these pluggable resources may be federated together, such as at an integration later, a platform layer, and the like. The pluggable workflow management workspace may provide a many-to-many collaborative environment that may be located beyond the firewall in a secure, auditable collaborative service. This structure may allow for virtually unlimited scalability, extensibility, specialization, and the like. Through the flexibility of this system, customers may provide their own content, entitlement, workflow, identity, and the like, while the system provides compliance across the established domain. In embodiments, customers may choose to build their system outside their firewall (e.g., for multiple enterprise applications) or inside their firewall (e.g., for a content domain controlled by a single enterprise).

Resources may also be provided for identifying the sequence of a workflow (e.g., using Gantt charts, visual tools for depicting flow chart sequences of work (e.g., Microsoft® Visio®), and the like); resources for identifying the input content used at each step in the sequence and the output content produced at each step in the sequence; resources for permissioning the content and issuing appropriate credentials for the content, possibly with triggers based on the timing and sequence of the workflow (e.g., by user, by workgroup, by enterprise, and the like); resources for associating individuals with responsibilities for executing, reviewing and/or approving the completion of the steps in the workflow; and resources for reporting on the status of the workflow (at individual steps, pending status, progress toward completion, and completion). Once in the workflow management workspace, individuals may use the pluggable resources to create the workflow for a given project, and the workspace itself may pull the enabling resources from the appropriate systems (e.g., a cloud or enterprise system) to perform the function of that resource.

In embodiments there may be a plurality of resources that would be appropriate for each kind of workspace. The content management workspace may have various resources that are appropriate for tracking the creation, modification, development, approval, publication, use of content, and the like.

Action Checking

In embodiments, an action checking facility 241 may be provided that manages actions to be performed with respect to application capabilities resident on a user's computing device. The action checking facility may include an action command process, such as a pre-check, check, action, post-action, and the like. For instance, an action may be a capability provided by the system. A pre-check may determine whether or not to present that capability (e.g., based on licensing, what applications are installed, whether that behavior or capability should be exposed), such as in the determination whether to display a particular dashboard button. For example, if a user is allowed to read, annotate and approve content, but not take other actions (such as modification or sending the content), then a button/icon for approval might be included, while buttons/icons for printing, sending, or the like might be disabled, or omitted from the interface of the application, based on the pre-check related to deployment of the application to that user. Thus, an application for handling secure content may be configured, based on a pre-check, to have the correct set of capabilities allowed for a particular user when interacting with particular content. An action check may involve the system enabling a host to install business logic that requires a particular action to occur before another action can happen, that prevents an action from occurring if logic dictates, or the like. Thus, workflows can be enabled by action checks that follow client-defined business logic. Post-action checks may enable alerts, sending of logs of actions taken, transferring of data to another system, deletion of data that is no longer relevant, reporting on completion of workflows, initiation of next sets of actions, and the like. The action checking facility may provide a broad set of hooks for extensions from the system, such as from business systems, professional services, client services, customers, partners, and the like, that can provide business logic, work flows, and the like. Each action checking process (e.g., pre-check, check, action, post) may include a list of items to check on. For example, if an application is being installed, pre-check could determine if the application is currently installed in the system, and if so, then display a control button associated with the application. The action checking facility functionality may be interconnected with the application layer, the platform layer, orchestration services, and the like. In embodiments, the action checking facility may provide patterns and constructs as to how capabilities of how aspects of the system will be rendered to the user, such as enabled in a composite services layer.

Secure Mobile Device Environment

Figure 43:
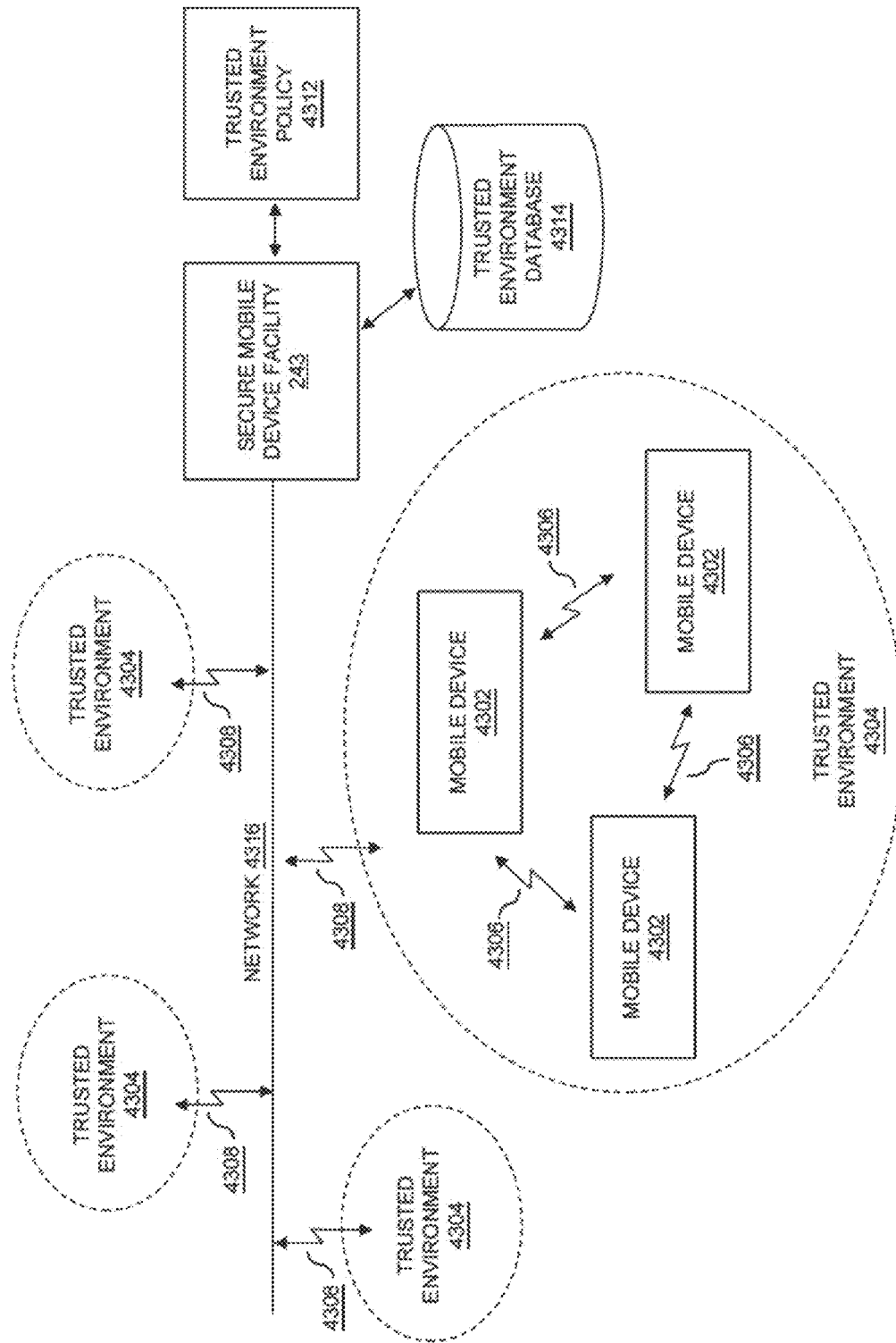
FIG. 43 depicts a functional block diagram for a secure mobile device environment.

Referring to FIG. 43, in embodiments a secure mobile device facility 243 may be provided to manage a trusted environment policy 4312 for a plurality of mobile devices 4302 (e.g., trusted devices as identified by the secure mobile device facility), where the plurality of mobile devices 4302 are able to securely inter-communicate with each other within a trusted environment 4304. The secure mobile device facility 243 may enable users with mobile devices, such as smart phones, to more easily communicate securely (e.g., communications, file transfers) once each of the mobile devices has been verified as a trusted device. The trusted environment policy 4312 may establish what mobile devices 4302 are included in a trusted environment, the bounds of the trusted environment, the constraints upon mobile devices within the trusted environment, and the like, where a mobile device may be enabled to operate within more than one trusted environment, and where trusted environments may have overlapping bounds. The 'bounds' of the trusted environment may be defined as a physical location (e.g., range around a physical location point, a geographically defined area or region), as a network connection (e.g., connected to a trusted network), as proximity to another mobile device of the trusted environment (e.g., within Bluetooth range, near-field communication range, RFID tag reader range), and the like. Constraints upon mobile devices operating within a trusted environment may limit communications connectivity (e.g., only available if the mobile device is online), require updated software (e.g., having software current with respect to available updates, versions, and the like), require an anti-malware scan within a defined period of time (e.g., having an anti-virus scanner that has scanned the mobile device within the last day), require that authentication procedures be followed and/or verified (e.g., by verification that the device is being operated by the owner), and the like. Bounds and constraints for each trusted environment 4304 may be stored in a trusted environment database 4314.

The inter-environment communications connectivity 4306 between mobile devices 4302 of a trusted environment 4304 may be through any wireless connection media approved by the trusted environment policy 4312, such as through a wireless network, WiFi connection, Bluetooth connection, near-field communications (NFC), cellular network, and the like. Communications between mobile devices within a trusted environment may be through a peer-to-peer (P2P) network, where communications are decentralized and distributed, and may offline with respect to connectivity with the secure mobile device facility 243 (e.g., such as a group of mobile devices being collectively off-line, but able to communicate P2P. The network 4316 connection of the plurality of mobile devices 4302 to the secure mobile device facility 243 may be via the Internet, a wireless network, WiFi, cellular network, and the like.

In embodiments, the trusted environment policy may allow mobile devices 4302 within a trusted environment 4304 to operate in either a constrained or unconstrained mode, where the mobile devices may utilize partitioned secure memories, cryptographic methods, multi-level access controls, and the like, to manage operations in a constrained versus unconstrained mode. For instance, a mobile device may have secure and unsecure memory allocations and may use separate communications protocols for communicating with trusted devices versus devices that have not been certified as trusted devices. A mobile device 4302 may be determined to be a trusted device for possible use in a trusted environment 4304 through a certification procedure, such as establishing a key certificate to confirm that the device is a trusted device. When a first and second mobile device 4302 initiate a secure exchange within a trusted environment 4304, a multi-factor authentication process may be executed, such as including a password (e.g., with a single sign-on for multiple trusted environments), a token exchange, location, personal knowledge answer, biometric authentication (e.g., fingerprint), and the like. However, the trusted environment policy may require only a single verification, such as verifying that both the first and second mobile devices 4302 are trusted devices as defined by the trusted environment policy 4312, and thereafter allow the devices to exchange files without further security verification steps, thus establishing a secure dynamic group membership amongst the two trusted devices. The trusted environment policy may dictate secure operations periods, such as 'crypto-periods' for temporal exchange constraints. For instance, files allowed to be exchanged only between the hours of 8:00 a.m. and 5:00 p.m., and the files must be encrypted.

In a use-case example, a trusted environment may be defined as a team of individuals working for a company, where the bounds include all of their mobile devices being certified as trusted devices, are only allowed to communicate securely while located at the company (e.g., determined by GPS, network connectivity), and require an initial multi-factor authentication including a biometric authentication with the device, a single sign-on with the secure mobile device facility 243, and an exchange of a token during sign-in. In another example, the team may be the Board of the company, and the physical location may be constrained to the Board Room. In another example the team may be a combination of company members and visiting counsel to the company in a location-limited diligence project. In another example, the team may be spread out across the world, and the constraints include certain identified trusted network connections, encryption protocols, and biometric verifications. The secure mobile device facility 243 may enable a plurality of mobile devices 4302 to operate 'freely' within pre-established bounds and constraints, making secure ongoing collaboration possible without the necessity of secure procedures for each communication.

Workstream Synchronization

In embodiments, a workstream synchronization facility 247 may provide the ability for a user's secure collaboration container (e.g., such as stored in the cloud) to be synchronized onto the user's desktop workstream channels, such as for conflicts management. The resulting synchronized container of work available on the user's desktop may allow the collaborating group of users to synchronize files, events, calendars, activity feeds, and the like. Synchronization may also take the current risk profile of a computing device into account (e.g., a user is on travel in China versus they are in the corporate home office). A notification component may be provided that enables multiple users to work together more efficiently by users letting each other know what actions are occurring in the work container (e.g., a messaging function associated with the container. A proactive component may be provided that pushes an alert to a user's desktop (e.g., rather than just an email). Alerts may also be provided based on changes to the container, that on-going work is occurring (e.g., to create awareness that someone else is working on files in the container), and the like.

Contextual Sharing Facility

Figure 44:
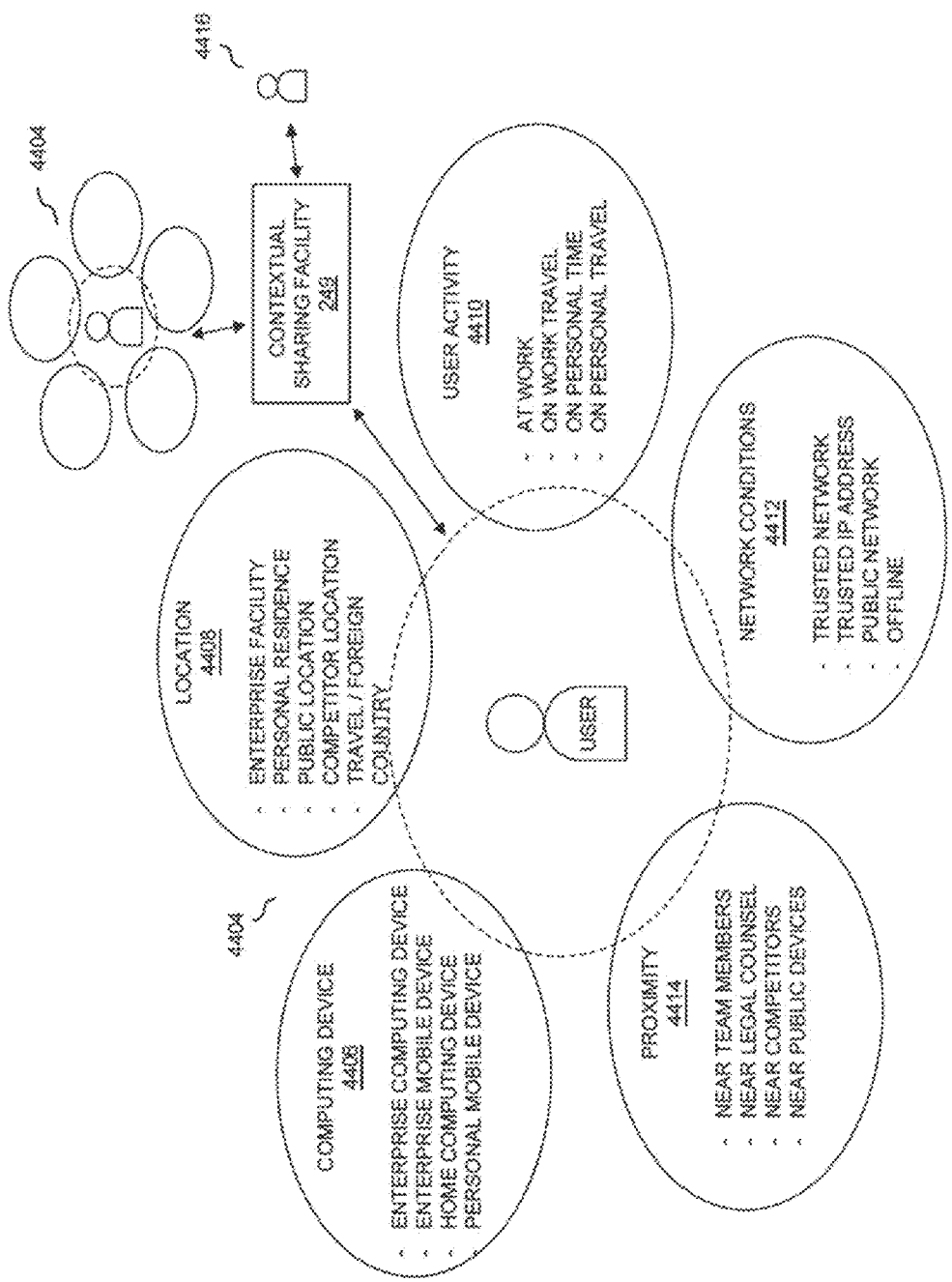
FIG. 44 depicts a functional block diagram for a contextual sharing facility.

Referring to FIG. 44, in embodiments a contextual sharing facility 249 may be provided that manages the sharing of data based on the contextual environment 4404 of a user, such as based on what computing device 4406 the user is utilizing when attempting to share information (e.g., enterprise computing device, enterprise mobile device, home computing device, personal mobile device), the location 4408 of the computing device (e.g., enterprise facility, personal residence, public location, competitor location, on travel, in a foreign country), the user's current activity state 4410 (e.g., at work, on work travel, on personal time, on personal travel), network conditions 4412 (e.g., connected to a trusted network, using a trusted IP address, connected to a public network, operating offline of a network), proximity 4414 (e.g., near team members, near legal counsel, near competitors, near public devices), time (e.g., during regular work hours, on weekends, during normal sleep time), based on a restrictive list (e.g., a white list, a black list, a combined listing of individuals by sharing privilege), and the like. For instance, a user may be constrained from sharing information with a second user because the first user is at home, but whose sharing privileges become unconstrained when they get to work. The contextual sharing facility may be utilized in file sharing or workstream collaboration, applied to individuals of the same or different enterprises, utilized for managing the sharing as a user transitions between work and personal use, utilized to restrict or to enhance sharing opportunities, and the like. For instance, the contextual sharing facility 249 may be applied to sharing in a workstream, where sharing may be restricted based on the conditions under which users are working. However, because the users contributing to the workstream may have disparate home-office locations, the contextual sharing facility may enhance sharing by alerting users of changes in the environment of other users that may foster sharing, such as alerting another user of the workstream that a user is currently near the same location, and so encouraging an opportunity for direct interaction. The contextual sharing facility may also apply to other access related facilities as described herein, such as for managing the synchronization of documents to a computing device, to determine access control to files, to determine viewing privileges of a document, to control e-signature privileges, secure viewing on a mobile device, and the like.

The contextual sharing facility may allow, restrict, deny, and the like, the sharing of information with a second user based upon the parameters 4406, 4408, 4410, 4412, 4414 or other contextual environment parameters under which users finds themselves. The second user may have contextual sharing constraints placed upon them as based upon their contextual environment 4404, or the second user may be an unconstrained user 4416. For instance, two users, attempting to share information between them, may both be operating under sharing constraints placed upon them by different contextual environments. The first user may, for instance, be using their personal mobile device (e.g., their smart phone) connected to a public network on personal domestic travel, and the second user may be on an enterprise mobile device (e.g., their company laptop), at a competitor location. In this instance, the contextual sharing facility may determine the sharing privileges between the two users based on both contextual environments, such as one sharing level for information allowed to be shared from the first user to the second user, and a second sharing level for information allowed to be shared from the second user to the first user.

An unconstrained user 4416 may also have sharing allowed, restricted, denied, and the like, with a second user whose ability to be shared with is constrained by their contextual environment 4404. For instance, all users may be considered to be unconstrained (or relatively unconstrained) under a certain set of conditions, such as being at their own desk in their enterprise facility connected to the trusted enterprise network. However, when an unconstrained user attempts to share data with a user constrained by a contextual environment, sharing may be restricted. One of the contextual environment's parameters may also be time, such as a user being able to share under certain parameter conditions during regular working hours. A set of conditions may be set for special team members, or types of team members, such as for legal counsel (e.g., as determined by proximity to the legal counsel or for a location of the legal counsel's work place). In this instance, a user may only be allowed to share information under these limited conditions, where outside of these conditions the information is protected from being shared. The ability to disallow sharing may provide protection for private information not only through transfer of the information, but also for storage of information. For instance, during conditions where sharing is not allowed, information stored on the computing device may be protected (e.g., via encryption, stored in a virtual or protected drive), such as from someone trying to hack their way into the computing device to steal information. One example of information where privacy may be enhanced with contextual restrictions is medical information. The contextual sharing facility may provide a restricted access to the medical information stored on a computing device (e.g., a mobile computing device) of a patient, doctor, or other user that has need to store a patient's medical information. For instance, medical information may only be enabled for sharing from a patient to a doctor when the patient is in the doctor's office, and otherwise it is placed in a secure storage container on the patient's computing device. Through use of the contextual sharing facility, sharing privileges, as well as information protection states, may dynamically shift as the context of the user's environment changes.

In embodiments, a combination of the user-selected and automatic parameter-determining facilities through the computing device may determine the user's current environmental context for the purposes of sharing. For instance, location 4408 may be determined by GPS functions one the device (e.g., GPS functions provided on a smart phone). The computing device 4406 being used may be determined automatically, or input one time into the system for each device the user accesses. The computing device may also be able to automatically determine network conditions 4412. User activity 4410 may be input by the user, determined by a combination of calendar date and time, input through voice command, and the like. Proximity 4414 may be input by the user, automatically detected though services provided by a cellular network service provider, determined through near-field communications (NFC), determined through the user of RFID technology, automatically detected through network services, and the like.

In embodiments, the contextual sharing facility 249 may reside on a secure server, where the users' computing devices provide the parameters that comprise the current contextual environment. The server-based contextual sharing facility may then continuously gather contextual parameters from the users' computing devices, and manage the sharing permissions for devices. In another embodiment, the contextual sharing facility may be located, at least in part, on the user's computing device. With this configuration, the contextual sharing facility residing on the user's computing device may provide the user's current contextual environment state to a server-portion of the contextual sharing facility, or directly to other user computing devices, such as directly to another user whose computing device also has access to a contextual sharing facility (e.g., located on the second user's computing device, located on a server across a network). For instance, a first and second computing device may both be running client versions of the contextual sharing facility, where they can both assess the other's contextual environment information for determination of sharing permissions with the other. In this way, the contextual sharing facility may provide for dynamic group sharing privileges, where a group's sharing privileges are determined dynamically through the contextual sharing facility (e.g., through client and/or server-based facilities), and thus not require permissions to be stored in a database for retrieval. So a group of individuals, each with access to a contextual sharing facility, may share information amongst themselves, such as upon meeting, based on each of their permissions determined by their current environment.

In embodiments, the contextual sharing facility may provide a user interface that provides a status of other users' contextual environments; so as to help manage sharing planning between users. For instance, a group of users may be a sales group, where individuals from the sales group are often out of the office making sales calls. In this instance, users' environments may continually change, such as being at the location of another company, on foreign travel, working from a public WiFi, at the home office, working from a personal residence, and the like, where it may be desirable to restrict sharing of information under some environmental states. In another instance, the group of users may be attorneys, where much of the information being shared is confidential to only one client, and where a strict policy related to sharing constraints needs to be in place. For example, privileged information, such as medical information, sensitive company information, information relevant to a business deal, or the like, may only be shared when an attorney is in the room, or not shared except when specified other individuals are present (e.g., CEO, in-house counsel). Not only can the contextual sharing facility automatically aid in preventing undesirable sharing conditions, but through the user interface users may be able to track changing environmental sharing conditions that allow users to better plan sharing. For example, a personal assistant to an attorney may monitor the environmental conditions for the attorney, and only attempts sharing with the attorney when the attorney is in an environmental state to accept sharing of confidential materials. In embodiments, the user interface may include visual indicators for different environmental states of different users, such as color-coding for different combined states that may be customizable for each user or group of users. For instance, a green colored visual indicator may indicate that the attorney is in an environmental state that permits unconstrained transfer of confidential information (e.g., not currently at a client site, and on a trusted network). The user interface may provide for status alerts, messaging, personal setup of environmental conditions with respect to sharing, visibility into policy, and the like. In embodiments, the contextual sharing facility may utilize a contextual sharing policy that determines sharing privileges for an individual, group, enterprise, collaboration, private vs. public data, and the like, where the environmentally determined sharing privileges may be tied to an access-control facility, such as described herein.

Study Space and Electronic Investigator Site Files (eISF)

In embodiments, the present invention may enable uses and applications and may be deployed in environments and systems related to clinical trial management, safety document exchange, and collaboration for life sciences, pharmaceutical, biotechnology, and related industries. For instance, a clinical trial management facility may be provided, where specialized documentation management control for clinical trails may be enabled in the secure collaborative environment, such as provided through the intermediary use of the secure server of the present invention, such as to safeguard critical information, reduce costs, and streamline operations, as well as for secure exchange of information both inside and outside of the network and firewall of a particular user, such as a pharmaceutical company, a regulatory body, or the like. Further, the use of functionally integrated user interfaces with existing user applications may promote adoption of new site users that have traditionally employed paper-based documents in clinical studies, as well as help maintain existing site users where administrative burdens placed on sites due to a paper-based process has been shown to cause a high turnover of investigators. The clinical trial management facility may provide a convenient, secure way to manage critical information during clinical trials, such as in support of bringing new drugs and therapies to market, where automated workflows help to move critical documents from one phase to the next, easing the flow of information between organizations and saving time. In addition, audit and reporting capabilities may be provided to support transparency and compliance, which leads to faster approvals by regulatory agencies.

The distribution and collection of documents during initiation of a clinical trial has traditionally been a highly manual, time consuming process, prone to risk. The challenge grows with the additional dimensions of multiple sites and multiple simultaneous studies. The clinical trial management facility provides a secure, online repository that can ease the study start up process, enabling centralized collaboration for documents and communication. On an industry-wide basis, clinical trials often fall behind their timelines from the very beginning, such as during protocol development, site selection, study start-up, and the like. Keeping track of a growing number of study start-up documents across multiple studies, with many, sometimes even thousands of clinical sites, while ensuring the most recent versions, presents a challenge to sponsors, researchers, and site investigators. The clinical trial management facility may provide solutions for issues facing clinical trial study management through high site-usability to drive adoption, rigorous role-based controls on document access, comprehensive compliance reporting, and the like.

The clinical trial management facility helps improve operational efficiency, reduce cost, and shorten document review cycles involved in clinical trials, such as by supporting the creation of secure investigator portals. The clinical trial management facility enables users to better manage the distribution, collection, and tracking of critical information, such as related to site recruitment, site activation, safety, and the like, while also adding a layer of security. The clinical trial management facility improves communication, collaboration, and document exchange between users involved in a clinical trial, from study team personnel and clinical research organizations to investigative sites and institutional review boards (IRBs). For instance, managing the distribution and collection of feasibility surveys online in a secure, centralized location may shorten the site recruitment process. The status of site surveys may be more easily tracked so users can follow-up and get sites on-boarded quickly. Regulatory documents, such as study protocols, may be more easily distributed and collected. Studies may be more easily kept on track, such as through real-time visibility into user accesses and reviews of content, and to better ensure follow-up action is taken. Investigator sites may be provided with a personalized view of tasks, requests, due dates, and the like, for easy study management. Reminders and alerts may be sent when documents are due, or ready for review. In addition, the clinical trial management facility may better ensure that sensitive patient information is secure, and can't be shared with unauthorized parties, such as with role-based permissioning and digital rights management (also referred to as information rights management).

The growth in global site participation has added complexity to the process of clinical trial management. Delays in reporting can impact both patient safety and institutional/corporate reputations, including safety document distribution to investigator sites, IRBs, and clinical research organizations (CROs). Additionally, the expanding number of subjects enrolled in development programs has increased the level of complexity of effectively managing the process. The clinical trial management facility may provide for investigators to securely submit reports to sponsors in real-time, speeding information exchange and collaboration when serious events occur, decrease the time needed to receive and disseminate severe adverse effect (SAE) reports, ensure secure communication, provide automatic notification of reports and receipt, help ensure documents are reviewed in a timely fashion, and the like. In addition, sponsors of widely dispersed global trials using multinational CROs may track document distribution with full audit trails, and ensure regulatory compliance across multiple jurisdictions. The clinical trial management facility may enable workflows in support of collaboration, such as by automatically routing SAE reports for internal review; provide automated distribution of complete SAE reports to investigators, IRBs, and CROs; provide audit reports that maintain records of report distribution, recipient delivery status, document access, and timing to improve compliance; provide a centralized, repeatable, scalable platform for managing SAEs; provide interconnections to safety systems that facilitate the seamless routing of SAEs to the sponsor's review team for evaluation; and the like.

The clinical trial management facility may improve efficiency and effectiveness of the different phases of a clinical trial, such as study start-up and site activation, study conduct and site monitoring, safety documentation distribution, management of trial master files and investigator site files, and the like.

Site selection is the process of identifying a sufficient number of and good-quality investigators to conduct the trial. This is one of the greatest challenges in clinical trial execution. Trial managers need to find individuals with considerable medical skills, commitment to research, good facilities, willingness to support documentation requirements, access to patients who fit the patient selection standard and will agree to enroll, and the like. The clinical trial management facility may improve this process through enabling centralization of management (e.g., single ID and password access to clinical trial documents), standardization (e.g., standardization of templates, document formats and naming), automation of the process (e.g., study start-up packages automatically distributed), monitoring of the trial (e.g., clinical trial lead and project leads able to view the status of each site, number of outstanding tasks), collaboration (e.g., site specific tasks enabling a clinical study associate to have guided collaboration with investigator sites), and the like.

Once an investigator site has been activated for a clinical trial, the investigator enrolls patients and monitors the study, including ensuring that the staff is well versed with the trial's documentation (e.g., the protocol, informed consent forms, safety guidelines, case report forms), managing the product and drug inventory, scheduling patient visits, gathering data, reporting adverse events, and the like. The clinical trial management facility may improve this process through providing secure mobile platform facilities (e.g., mobile access to documentation associated with investigator sites), centralized management of site documents, permission access control (e.g., quickly verify if an investigator site has access to the latest study documents, and if not, grant them access and notify them via email), and the like.

While conducting the clinical trial at investigator sites, patients may experience side effects or adverse events (AE or adverse change in patient health) while the patient is receiving the treatment. AEs must be reported by the investigator site to IRB/EC and sponsor/CRO. The clinical trial management facility may improve this process through centralized management of safety documentation and distribution (e.g., each exchange represents a study that may be organized into a collection, such as studies organized by product or compound, allowing study teams to focus on their study and specific sites, while the safety team distributes safety reports across study), safety report automation (safety reports automatically distributed to the appropriate sites, such as when an investigator site from a specific country is activated, and users are automatically granted access to relevant safety reports that were distributed prior to their activation), visibility (e.g., a user may quickly identify that the distribution of a safety report was successful, where the advance report provides information such as when safety report was distributed, when investigator site was alerted, if alert was sent successfully or if it was sent back, and if sent back, what was the reason for the return), and the like.

At the start of the trial, a trial master file (TMF) must be established at the sponsor organization and at each investigator site. The TMF is normally composed of a sponsor file, held by the sponsor organization, and an investigator site file (ISF), held by the investigator. These files together are regarded as comprising the entire TMF for the trial and should be established at the beginning of the trial. In most cases it is essential to segregate those documents that are generated or held by the sponsor of the trial from those of the investigator. This requirement is firstly due to subject confidentiality issues, for example, the sponsor must not have documents such as consent forms and subject identification lists if the subject has not specifically consented to them holding this information. Secondly, where the investigator site file contains source documents, the case report forms (CRFs) contain source data or the CRFs are the investigator's independent copy of the transcribed data, providing this to the sponsor would remove the investigator's control.

Filing essential documents at sites in a timely manner can greatly assist in the successful management of a trial by the investigator, sponsor and monitor. Trial master files should be established at the beginning of the trial, both at the investigator/institution's site and at the sponsor's office. A final close-out of a trial can only be done when the monitor has reviewed both investigator/institution and sponsor files and confirmed that all necessary documents are in the appropriate files. The clinical trial management facility may provide for an electronic trial master file (eTMF), electronic investigator site file (eISF), and the like, where a clinical trial management facility's secure collaborative environment may not only improve the efficiency of the clinical trial, but also decrease the risks endemic in a paper-based system (e.g., it has been found that more than 20% of the issues identified by sponsors refer to document control). In addition, providing site-controlled eISFs, private documents for sponsors and for investigator sites may be kept separate though a secure integrated system, and where all documents may then be archived at the end of the trial.

Just as a site's data validates or invalidates the study hypothesis, the documentation validates or invalidates the data. Regulatory documentation at least in part contributes to validation of the data. From this documentation, monitors and inspectors may assess many aspects of investigator and sponsor responsibilities and the conduct of the study, including the non-bias of the investigators, training and qualifications of study staff, appropriate recruitment and enrollment of study participants, adequate accountability of the test article, adequate oversight by a principal investigator, and the like.

Data that cannot be validated cannot be used to answer the study question. The only way for an outside person (such as a sponsor monitor, auditor, or FDA inspector) to assess the quality of the study and its results is through the site's documentation. A complete investigational site file provides documentation to support that the investigator adhered to their responsibilities under jurisdictional laws and international guidance for conduct of human subject research. An up-to-date eISF facilitates the effective and efficient management of studies, and helps decrease procedural errors. Investigator sites must maintain full control over their eISF without the sponsor ever having uncontrolled access, even decades after the completion of the study. The sponsor is responsible for ensuring agreements are in place for the long-term storage whilst always meeting this key requirement. Investigator site files may have the requirement to be reviewed by the sponsor's monitors, as they are responsible for maintaining an adequate level of oversight.

The site investigator or site coordinator is responsible for storing and organizing of all essential study documents and correspondence, such as entering adverse event information into a safety database; following-up with the investigator site for additional information or clarification; support the review, generation, and distribution of the safety report; and the like. A monitor or clinical research associate (CRA) may spend a majority of time traveling to investigator sites. They have to know all aspects of the clinical trial and any other instruction or clarifications that have been communicated to the site by the in-house team (e.g., clinical study associate), and needs to ensure that the investigator site is complying with protocol, that the latest form (e.g. informed consent form) is being used, review the investigator site file for completeness and accuracy, review the status of the investigator site with the IRB, and the like.

The clinical trial management facility may improve the process of maintaining a clinical trial's TMF and site's ISF by proving centralized electronic management through the eTMF and site ISFs through the secure server. For instance, through filing and managing of essential documents in the electronic investigator-controlled site file (eISF), including through easy-to-use desktop integrated browsing of the electronic investigator site file, integrating the process by saving a document into the appropriate investigator site file sub-folder on the exchange, being able to scan a document directly into an investigator site file, and the like. Remote monitoring of the eISF may be provided through a secure mobile interface, secure desktop interface, and/or secure web interface, where monitors may be provided secure and controlled access to their investigator site clinical documents, remote and immediate access to navigate the latest site-based documents, secure granting of access to sensitive site documents (e.g., tighter than available when the ISF is in a paper form), and the like. Using a single ID and password, both clinical study associate and investigator sites may have access to a central area that contains their clinical trials, such as those for the sites that have other sponsors. By using standard templates, folder structure and document naming convention across all studies, site teams may be able to establish a common framework and a consistent approach to eliminate confusion and enable automation.

Benefits of the clinical trial management facility, through use of eTMFs and eISFs include the ability for sponsors to maintain synchronization with the eTMF and eISFs, all documents being provided online for site investigators, reduction of storage costs for archiving, improved facility for site monitoring (e.g., remote review of CRAs, controlled access to documents, perfection of documents for site visits, status reports derived from e-reports), improved facility for auditors and inspectors (e.g., user-friendly user interface, automated summary and completeness reports, direct access to previous versions of documents), and the like.

Secure Enterprise Content Portal

Enterprise sharing of confidential documents comprises a significant activity within certain business sectors, such as in finance, legal, governmental, and the like. The secure sharing of 'sworn documents' (or 'formal,' 'affirmed,' 'notarized,' or any other types of 'official' documents, whether or not they are 'sworn') is especially a concern, where sworn documents may be sworn signed documents in a financial transaction, a sworn declaration in a legal proceeding, an affidavit, and the like. As part of a business transaction the enterprise may need to share a sworn document with an outside counsel or with partners, such as part of a financial or legal transaction, where it is essential that security and confidentiality be maintained. Direct access to sworn documents is also risky, as any alteration to the sworn document could affect its validity as a legally binding document. In addition, such documents may contain personal or confidential information that needs to be securely maintained. Thus it is essential that the process of sharing sworn documents be secure, auditable, and confidential.

A secure enterprise content portal, such as portal 255 of FIG. 2A, may be provided as a service to an enterprise as a collaborative portal for transporting and distributing content between an enterprise and external entities (e.g., law firms and partners). The secure enterprise content portal may reduce regulatory risk to the enterprise as associated with sworn documents, be able to allocate functionality associated with sworn documents back to individual business units within the enterprise, manage third-party professionals separately from core enterprise systems to provide for a quicker on-boarding processes while lowering security risks, and the like.

Figure 45:
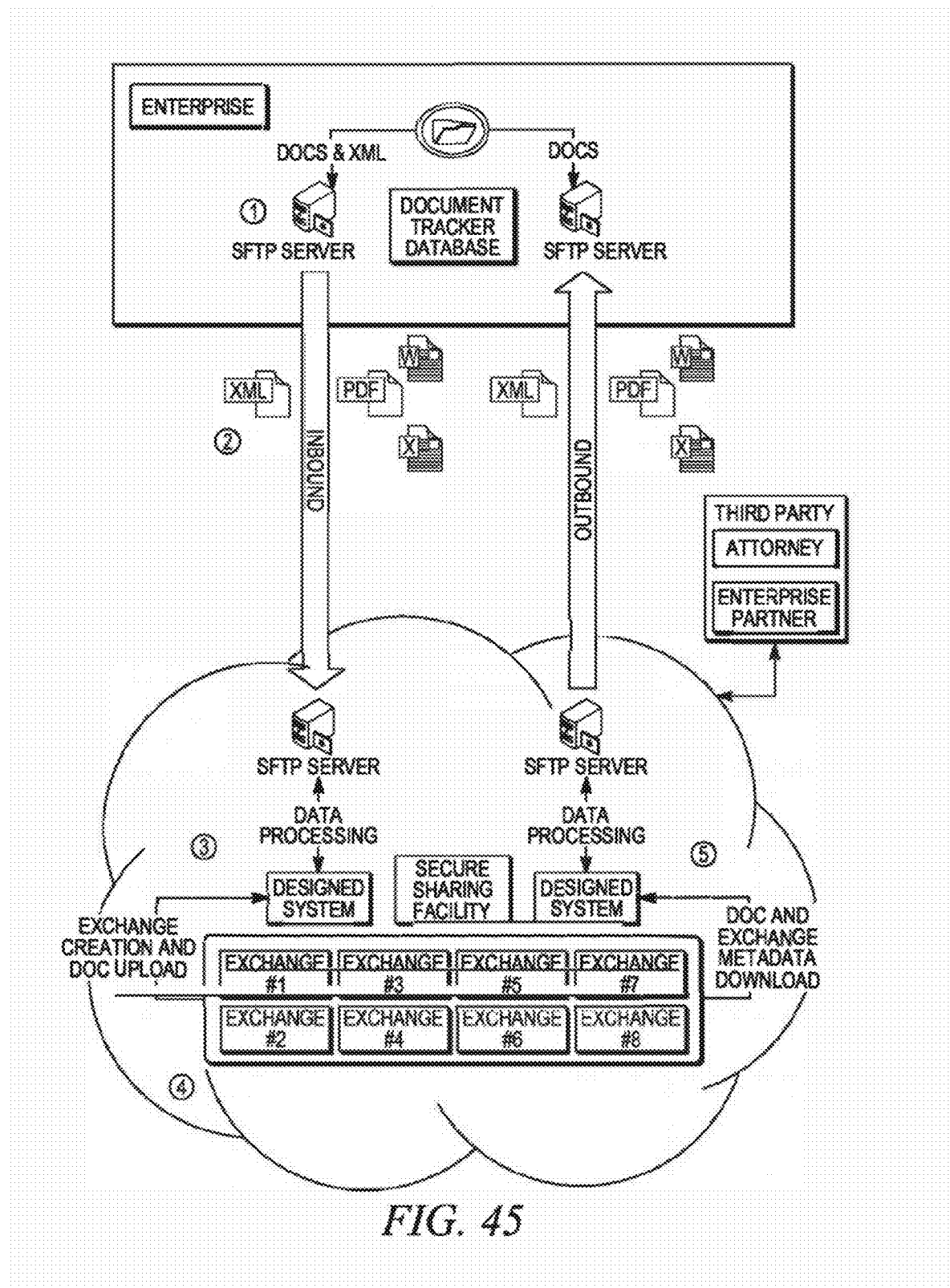
FIG. 45 depicts a functional block diagram for a sworn documents sharing facility.
Figure 46:
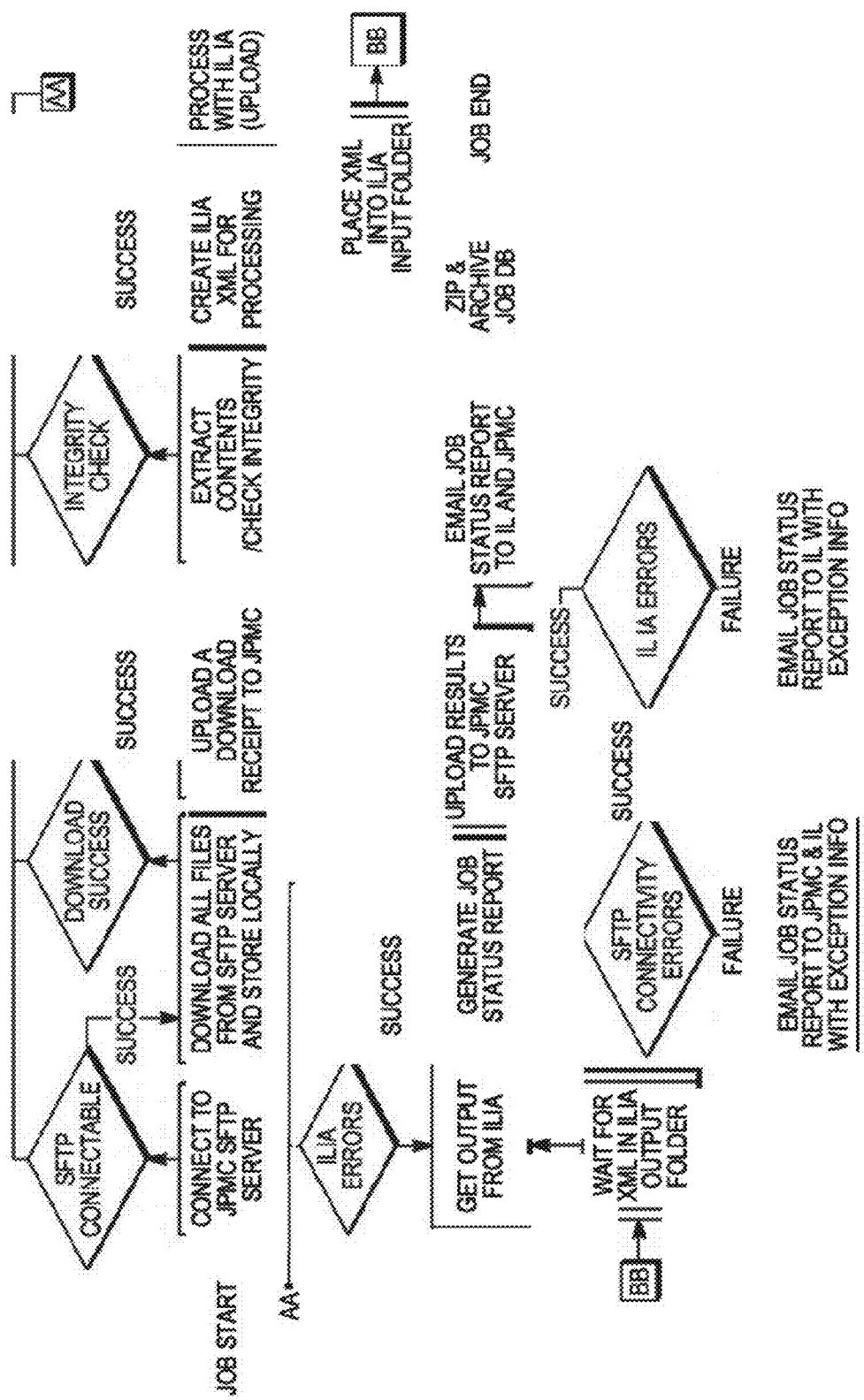
FIG. 46 depicts a workflow diagram for transport and provisioning in a sworn documents sharing facility.
Figure 47:
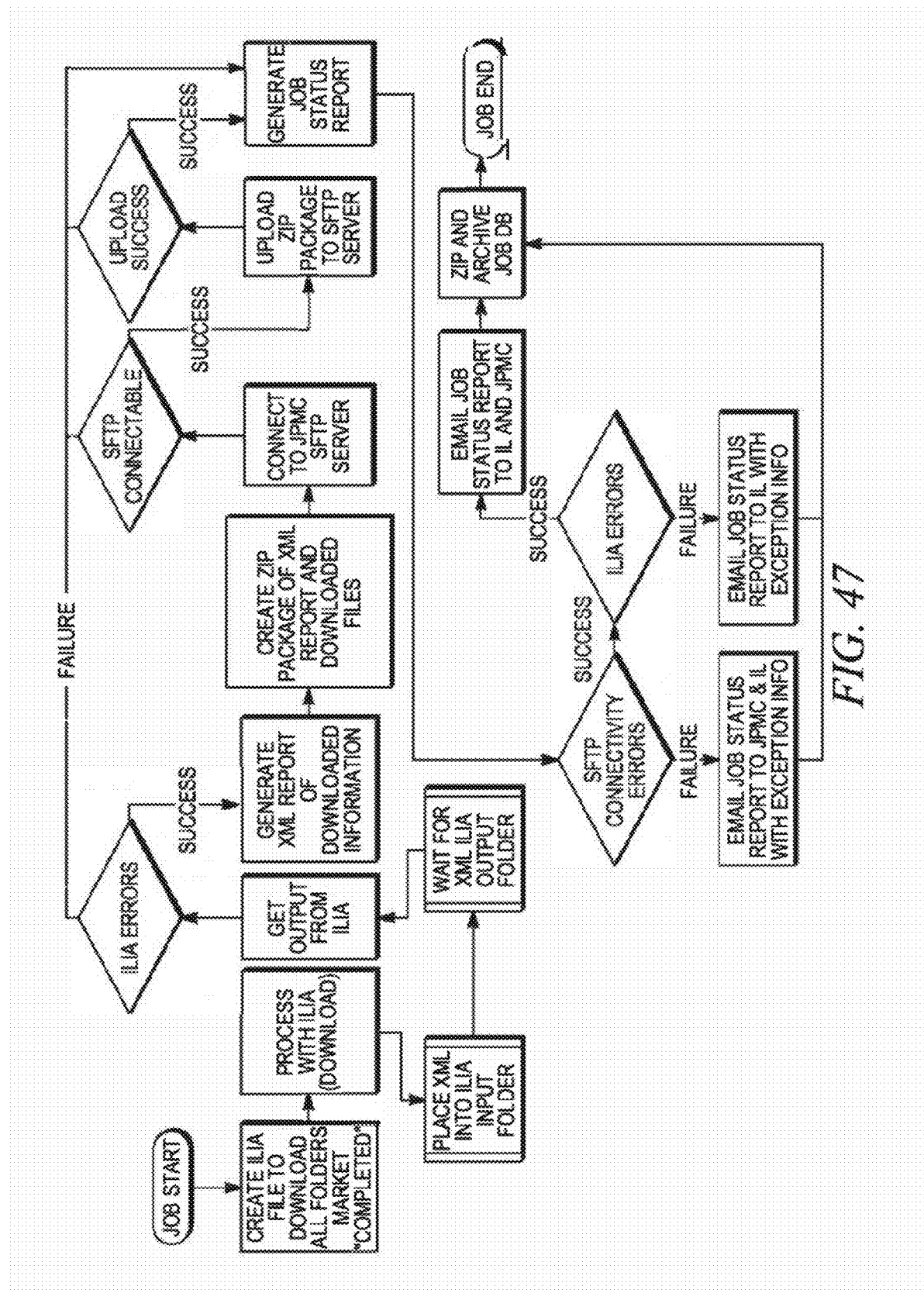
FIG. 47 depicts a workflow diagram for extraction in a sworn documents sharing facility.

Referring to FIG. 45, the secure enterprise content portal may provide for a stateless bi-directional closed loop document transport cache as an intermediary transport mechanism between an enterprise data storage facility for the storage of sworn documents and a third party. The secure enterprise content portal may be provided as a stateless process in order to establish the portal as a transport mechanism, without requiring that it become a source system of record. Traceability is maintained through the transport process, but the design of the system may be such that the portal is not considered a legal repository for the document, but only a mechanism for providing secure sharing access between the enterprise and the third party. As such, the secure enterprise content portal is also bi-directional and closed-loop, where the system acts as a machine process that progresses through the same closed-loop sequence for each retrieval-sharing-return process of the sworn document. For example, and referring to FIG. 45, in a first step (1) the sharing process is initiated at the enterprise with the transfer of the sworn document from a document tracker database. In a second step (2) the sworn documents are transferred along with provisioning details from the document tracker database. In a third step (3), and also referring to FIG. 46, the sworn documents are uploaded to a secure sharing facility where permissioning is assigned for third party access. In a forth step (4) a collaborative environment is established between the secure sharing facility and the third party using the established access permissions. At this point, the third party may access the document as determined in the access permissions (e.g., view, copy, edit, print). In a fifth step (5), and also referring to FIG. 47, the sworn document is extracted and downloaded along with metadata from the secure sharing facility back to the document tracker database. This machine process acts as a secure cache, providing a temporary data holding between the enterprise document tracker database and the third party that maintains a secure and auditable access facility for the third-party that is isolated from any direct interface with the enterprise document tracker database. Once the sworn document is transferred back to the document tracker database, there may be no trace of the document left within the secure sharing facility. In embodiments, one exception to this may be a document audit history being retained, such as for a period of time, until a verification step is completed in association with the document being stored within the document tracker database.

The secure enterprise content portal thus provides a secure mechanism for a third party to access a sworn document stored with an enterprise, such that the sworn document is only indirectly accessed through the portal so that there is no risk to the source document stored in the enterprise database. The portal provides a stateless machine process that does not need to constitute a source system of record, but it provides a mechanism for executing permissions to third-parties at least in part through metadata stored with the document in the enterprise database, secures confidentiality of the sworn document through implementation of the portal as a machine transport process, and the like.

Managing Access to Content through Digital Rights Management

Digital content sharing is a convenient and easy way to exchange information between people, organizations, companies, or any other entities. However, sharing content over digital media, such as the Internet, may expose the content to untrusted users. Many digital rights management (DRM) technologies provide solutions to limit access to shared content to trusted users.

A typical digital rights management (DRM) system includes a rights-issuer configured to create and provide access policies, or permissions, associated with corresponding content items, and a DRM engine that typically encrypts content items and manages users and access policies. The typical DRM system also includes DRM clients, or agents, for enforcing access policies, associated with content items, within a client device. Within each DRM system, the corresponding rights issuer, DRM engine, and DRM agents are expected to comply with proprietary, or standardized, specification requirements that are specific to the DRM system. As such, DRM systems employing distinct DRM technologies are not interoperable.

Also, once access policies are provided to a DRM client device, management of the access policies is handled by the DRM engine. Dynamically modifying the rights policies once they are delivered to a client device is either impossible, or calls for an active role by the rights issuer to synchronize with the DRM engine and/or the DRM agents in order to revoke previous access policies and provide new ones.

In embodiments, a DRM system may be provided with a middle layer enabling support of, and interoperability between, different DRM technologies presented by applicants. In the embodiment DRM system, DRM engines do not perform encryption, user management, nor access policies' management. Each time a protected content item is opened on a client device, corresponding access policies are requested from a corresponding DRM engine. The DRM engine forwards the request to a content protection server. The content protection server retrieves the access policies from the rights issuer, and provides the retrieved access policies to the DRM engine in a format readable by the DRM engine. The access policies are then provided to the DRM client, or agent, to be enforced in the client device. As such, the rights issuer is enabled to dynamically modify access policies at any time. At each attempt to access the content item, the most recent access policies are retrieved from the rights issuer and enforced at the client device.

According to at least one example embodiment, a method and corresponding content protection server for managing access to electronic content comprises retrieving access policies, or permissions, associated with a content item from a corresponding content sharing application, or rights issuer. The access policies are translated into a format recognizable by a digital rights management (DRM) engine, and forwarded to the DRM engine. The translated access policies are then provided by the DRM engine to a client device where the translated access policies are enforced in managing any potential access to the content item.

In order to retrieve the access policies, the content protection server receives information identifying the content item from the client device. The content server then requests from the corresponding content sharing application, or rights issuer, the access policies associated with the content item based on the received information identifying the content item. In response to the request, the rights issuer, or the content sharing application, sends the requested access policies to the content protection server.

Retrieving the access policies includes receiving the access policies in a format recognizable by the content protection server. The access policies are translated into the format recognizable by the content protection server by an interface associated with the content sharing application, or rights issuer. The access policies in the format recognizable by the content protection server are then translated, by the content protection server, into a format readable, or recognizable, by the DRM engine.

Prior to retrieving the access policies, the content protection server receives, from the DRM engine, user credentials for authentication. The content protection server may handle the authentication of user credentials locally. Alternatively, the content protection server forwards the user credentials to the content sharing application for authentication. Once user credentials are successfully authenticated, the content protection server receives information identifying the content item. The content sharing application, or system, is identified based on the received information identifying the content item.

Also, prior to retrieving the access policies, the content item is encrypted by the content protection server. Encrypting the content item includes receiving the content item from the content sharing application. An encryption protocol is then determined based on a type of the received content item. The received content item may be preprocessed based on the content item format. The content item is then encrypted based on the determined encryption protocol. The content item may further be post-processed based on the content item format. The encrypted content item is provided to the user/client device. The content protection server also causes the encrypted content item to be registered at the DRM engine.

The access policies are dynamic. That is, on a subsequent attempt to access the content item at the user device, the access policies are automatically retrieved again from the content sharing application, translated and provided to the DRM engine by the content protection server. So, any modification of the access policies by the content sharing application, or rights issuer, is included in the access policies retrieved by the content protection server upon a subsequent attempt to access the content item.

According to at least one example implementation, the content protection server is coupled to two or more DRM engines. The content protection server is also coupled to two or more content sharing applications, or systems.

Digital rights management (DRM) technologies provide solutions for secure content sharing, electronic content protection, and user access control to electronic content. With such solutions, an entity may be able to manage who has the right to access content circulated over the Internet or other digital media, and what kind of rights are granted to each potential user. Electronic content herein refers to one or more media objects, such as, music files, images, video files, text documents, or the like.

In a typical DRM system, a rights issuer issues access rights, or permissions, associated with a content item, or object, and provides the access rights to a user device. The DRM rights are enforced at the receiving user device through a DRM client, or agent. A DRM engine coupled to the DRM clients is configured to encrypt content items and manage users and access policies. Each DRM engine typically has proprietary, or standardized, architecture, protocols, encryption methods, policy management and processing methods. The corresponding DRM agents and rights issuer are expected to be compliant with the specificities of the DRM engine and the DRM technology employed by the DRM system in general. As such, DRM system employing distinct DRM technologies are not interoperable. In order for a user device to consume protected content by a given DRM system, the user device is expected to have a complying DRM agent.

Some typical DRM systems do not enable dynamic access policies, and, as such, access policies may not be modified once they are distributed to DRM agents. Other DRM systems require synchronization between the rights issuer and the DRM engine.

Figure 35:
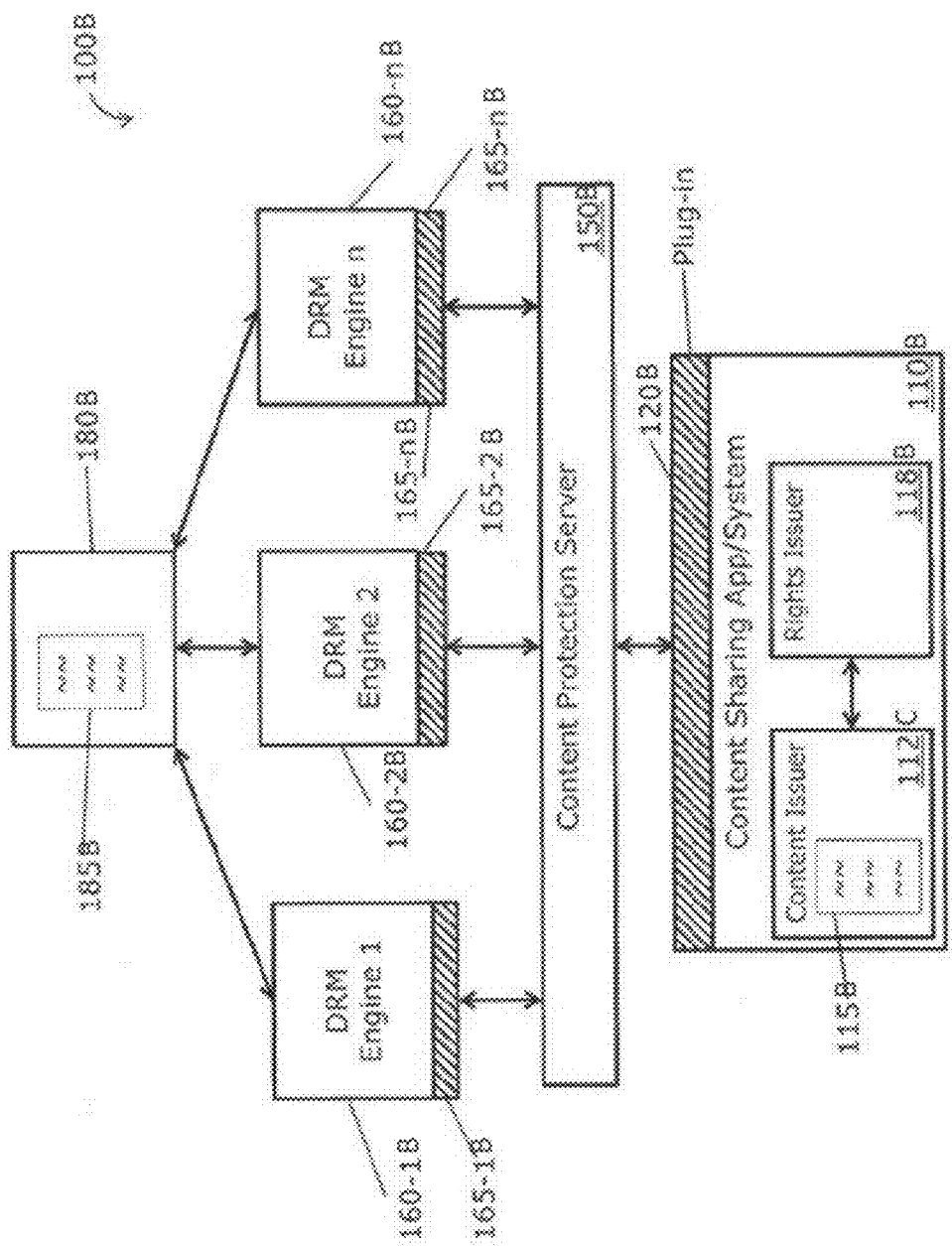
FIG. 35 is a block diagram illustrating a digital rights management (DRM), or Information Rights Management (IRM) according to at least one example embodiment.

FIG. 35 is a block diagram illustrating a digital rights management (DRM), or Information Rights Management (IRM), system 100B, according to at least one example embodiment. The DRM system 100B includes a content sharing system, or application, 110B, a content protection server 150B, one or more rights management services (RMS), servers, also known as DRM engines, e.g., 160-1B-160-nB, and a content rendering system, or application, 180B. The content sharing system 110B is configured to share content 115B with client users. Specifically, the content sharing system is configured to circulate protected content 185B to user/client devices 180B through the content protection server 150B and a RMS server, or a DRM engine, e.g., 160-1B, 160-2B, . . . , or 160-nB.

The content sharing system, or application, 110B is configured to act as a content issuer and a rights issuer. For example, the content sharing system 110B includes a content issuer module 112C and a rights issuer module 118B. The content issuer module 112C is configured to circulate content 115B over the Internet, or any other communications medium, for sharing with potential users. The rights issuer module 118B is configured to issue permissions, or access rights, in association with content 115B for sharing by the content issuer module 112C with client users. The content issuer module 112C may include, or be coupled to, a content repository containing content 115B for sharing. The content issuer module 112C and the rights issuer module 118B may reside on the same device, e.g., enterprise server, personal computer, or the like, or on different devices.

According to at least one example embodiment, the content protection server 150B is coupled to one or more content sharing systems 110B and one or more RMS servers, or DRM engines, e.g., 160-1B-160-nB. The content protection server 150B represents an intermediate layer, between the DRM engines 160-1B-160-nB and the content sharing system(s) 110B, that is agnostic to the DRM engines 160-1B-160-nB and the content sharing system(s) 110B. The middle layer is configured to normalize content processing, irrespective of the content type, and handle content encryption instead of the DRM engines 160-1B-160-nB. Specifically, during a publishing phase, the content protection server 150B is configured to encrypt the content 115B, irrespective of the corresponding content type, and provide a corresponding protected, or encrypted, copy 185B of the content to the content sharing system 110B. The content sharing system 110B may then share the encrypted content 185B with client users.

Also, when the client user attempts to access the encrypted content 185B, the content protection server 150 acts as an inter-operability layer between a RMS server, or a DRM engine, e.g., 160-1B, 160-2B, . . . , or 160-nB, and the content sharing system 110B associated with the protected content 185B. In other words, during a consumption phase of the protected content 185B, the content protection server 150B translates policy objects received from the content sharing system 110B, or the rights issuer module 118B, into a format, or language, recognizable by the DRM engine, e.g., 160-1B, 160-2B, . . . , or 160-nB.

According to at least one example embodiment, the content protection server 150B provides an interoperability interface between fundamentally different DRM technologies, at the protection layer. That is, the format and/or language employed in creating the access rights, or permissions, by the rights issuer 118B and the DRM technologies supported by a given DRM engine may be fundamentally different and non-compliant to each other's requirements, yet, the content protection server 150B provides an interface that enables interoperability between the given content sharing system 110B and a given DRM engine.

The content protection server 150B is configured to support multiple DRM technologies and corresponding DRM engines 160-1B-160-nB. For example, the RMS servers, or DRM engines, 160-1B-160-nB include a "LiveCycle" server from Adobe, a Microsoft RMS server, and/or other proprietary or standardized DRM engines. The content protection server 150B is also configured to support multiple content sharing systems 110B.

According to at least one example embodiment, the DRM engines 160-1B-160-nB are used to register documents and reroute access requests from client devices to the content protection server 150B. The DRM engines 160-1B-160-nB do not perform content encryption, user management, nor policy management. However, the content protection server 150B may employ software development kits (SDKs) to match the particular DRM technology for that DRM engine. Encryption is done at the content protection server side, yet the employed encryption techniques are expected to be compliant with the techniques supported by the DRM engines. When a client user attempts to open the protected content 185B, the user device 180B sends a request for corresponding DRM policies, or permissions, is sent to a corresponding DRM engine. The DRM engine forwards the request to the content protection server 150B, which requests the DRM policies, or permissions, from the content sharing system 110B, e.g., from the policy issuer 118B. Upon receiving the requested access policies, the content server 150B provides the access policies to the DRM engine, which provides them to the user device to be enforced. In response to each subsequent attempt to open the content item again, the same process is repeated and access policies are obtained again from the content sharing application 110B, or the rights issuer 118B. Such scheme enables the content sharing application 110B, or the rights issuer 118B to dynamically manage and control the access policies with the certainty that the latest updated version of the access policies is employed by a user device attempting to access the content item. For example, the content sharing application 110B, or rights issuer 118B, may update access policies associated with content items once the content items and the corresponding policies have been distributed. The access to already distributed content items may also be revoked by the content sharing application 110B, or rights issuer 118B.

Figure 36:
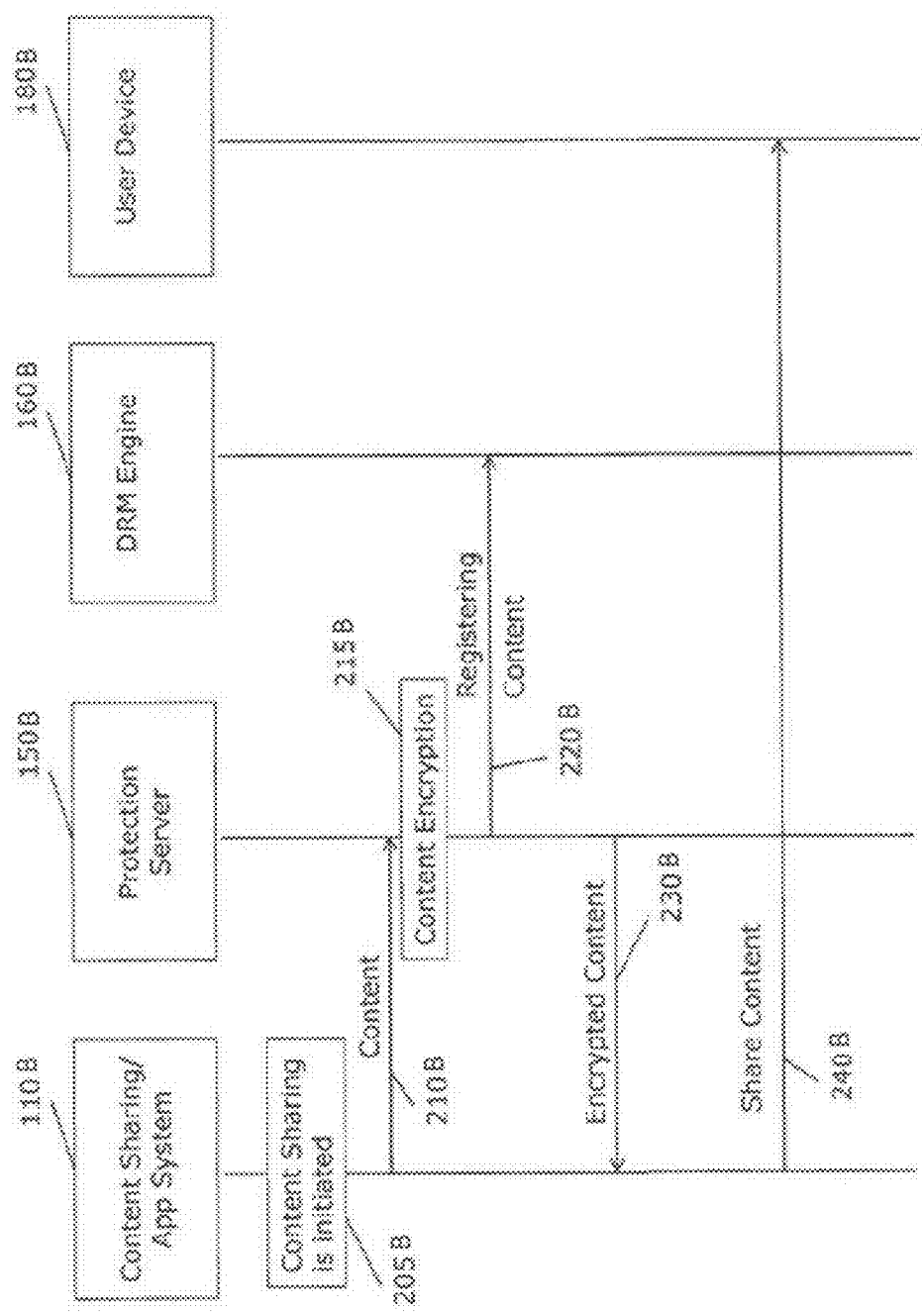
FIG. 36 is a signaling flowchart illustrating communications between different entities of a DRM system during a publishing phase, according to at least one example embodiment.

FIG. 36 is a signaling flowchart illustrating communications between different entities of the DRM system 100B during a publishing phase, according to at least one example embodiment. The publishing phase refers to the protection and circulation, or sharing, of a content item. Upon initiating a process of sharing a content item 115B, at 205B, the content item is sent 210B to the content protection server 150B. Initiating the process of sharing, or circulating, a content item includes, for example, attempting to attach the content item to an email, attempting to upload or send the content item to a non-secure device, or the like. The content protection server 150B determines an encryption protocol based on the type and/or format of the content item. For example, for a Microsoft Office document, the content protection server selects an encryption protocol that is supported by Microsoft rights management services (MS RMS). However, for a PDF document, the content protection server selects an encryption protocol that is supported by Adobe LiveCycle RMS. The content item 115B is then encrypted according to the determined encryption protocol by the content protection server 150B at 215B. The content protection server causes the encrypted content item 185B to be registered at a corresponding DRM engine at 220B. For example, if the content item 115B is a Microsoft Office document, then the corresponding DRM engine is a Microsoft RMS server. If the content item 115B is a PDF document, then the corresponding DRM engine is an Adobe RMS server. According to example implementation, the content protection server 150B sends a publishing license identification (ID) and information indicative of existence access policies associated with content item to the DRM engine for registering the content item. At 230B, the encrypted content item 185B is sent to the content sharing application 110B. At 240B, the content sharing application 110B, or the content issuer module 112C, shares the encrypted content item 185B with one or more user device 180B. For example, the content sharing application 110B may send the encrypted content item 185B to the one or more user devices 180B. The content sharing application 110B may, alternatively, make the encrypted content item 185B available to the one or more user devices 180B, for example, by uploading the encrypted content item 185B on the Internet.

Figure 37:
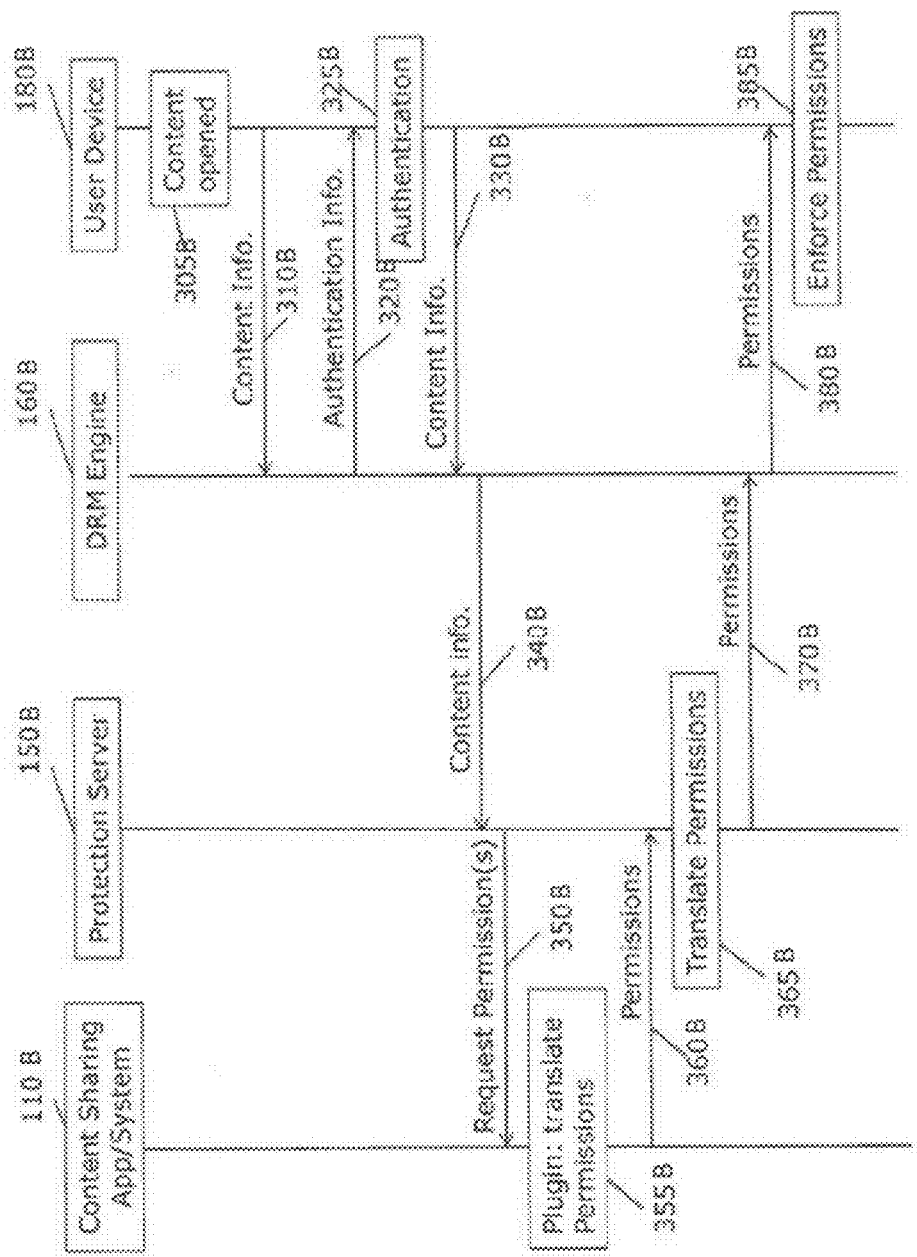
FIG. 37 is a signaling flowchart illustrating communications between different entities of a DRM system during a consumption phase, according to at least one example embodiment.

FIG. 37 is a signaling flowchart illustrating communications between different entities of the DRM system during a consumption phase, according to at least one example embodiment. Once the encrypted content item 185B is opened, at 305B, in the user device 180B, information identifying the encrypted content item 185B is sent at 310B to a corresponding DRM engine 160B. In this case, the corresponding DRM engine 160B may be determined based on a rendering application used to open the encrypted content item 185B or DRM agent associated with the encrypted content item 185B. For example, Microsoft Office will automatically contact a MS RMS server. The corresponding DRM engine 160B responds to the user 180B, at 320B, with authentication information that is determined, for example, based on the information identifying the encrypted content item 185B. The authentication information indicates what kind of authentication is required for the encrypted document item 185B.

At 325B, the user device 180B provides an authentication window or session for the user, and the user is requested to enter his user credentials. The user credentials are then sent to the content protection server 150B for authentication. According to one example implementation, the content protection server 150B may handle the authentication locally if, for example, the content protection server 150B maintains a database of authentic user credentials for each user. Alternatively, the user credentials received by the content protection server are sent to the content sharing application 110B for authentication. Once user credentials are authenticated, an indication of successful authentication is sent to the user device 180B. Once the user credentials are authenticated at 325B, the user device 180B sends, at 330B, the information identifying the encrypted content item 185B to the DRM engine 160B again. The user device 180B may also send a notification to the DRM engine 160B indicating that user credentials are successfully authenticated.

At 340B, the DRM engine 160B forwards the information identifying the encrypted content item 185B to the content protection server 150B. The content protection server 150B sends a request, at 350B, to the content sharing application 110B requesting access policies, or permissions, based on the information identifying the encrypted content item 185B. The content protection server 150B stores, for example, a database mapping information identifying content items to corresponding content sharing applications 110B, rights issuers, or corresponding plug-in modules 120B. At 355B the plugin module 120B translates the requested access policies into a format, or language, recognizable by the content protection server 150B, and the translated access policies are sent at 360B to content protection server 150B. Alternatively, the translation to a format, or language, recognizable by the content protection server 150B may be performed by a translation module within, or associated with, the content protection server 150B.

The plug-in module 120B resides at the content sharing application 110B. The plug-in module 120B is implemented, for example, as an application on top, a plug-in, an extension of the content sharing application 110B, or the like. The plug-in module 120B translates 355B permissions, or DRM policies, specific to the content sharing application 110B, or the corresponding rights issuer 118B, into a format, or language, recognizable by the content protection server 150B. The content protection server 150B stores information that enables mapping the encrypted content item 185B to a corresponding content sharing application 110B, or plug-in module 120B. Upon receiving permissions for a specific document, the plug-in module may be able to identify what content sharing application or plug-in to call for the specific document in the authorization phase.

The content protection server 150B translates, at 365B, the access policies into a format, or language, recognizable by the DRM engine 160B, and sends 370B the access policies in the format, or language, recognizable by the DRM engine 160B to the DRM engine 160B. The DRM engine forwards 380B the access policies received to the user device 180B. The access policies are enforced 385B in the user device 180B, for example, by a corresponding DRM agent.

The process described with respect to FIG. 37 is performed again with each subsequent attempt to access the encrypted content item 185B in the user device 180B, and each time, the latest version of the access policies is obtained from the content sharing application and enforced at the user device 180B, therefore enabling dynamic access policies that are managed by the content sharing application 110B, or the rights issuer.

The content protection server 150B includes a set of application programming interfaces (APIs), which provide to third parties a public interface for accessing functionalities associated with the content protection server. Such APIs include analytics APIs, policy management APIs, document management APIs, and user management APIs. Analytics APIs provide third parties with access to a set of functions that upon use by a developer of a content sharing application 110B return a set of data which represents the information that a user device conveyed to a DRM system regarding usage of a content item. Policy management APIs provide a third party with access to a set of functions that enables the developer of a content sharing application to manage local policies or access rights. Document management APIs provide access to a third party to a set of functions that enables a developer of a content sharing application through a customization module to encrypt content items. The user management APIs provide access to the a third party to a set of functions that helps a developer of a content sharing application to implement functionality related to managing users in a DRM system 100B.

The content protection server 150B has queuing services built-in that enable processing one or more content items, received for encryption, asynchronously and in a scalable fashion. The content protection server 150B also provides encryption services including algorithms and DRM specific protocols for encrypting content items received by the content protection server 150B. The content protection server 150B is also configured to process documents. Specifically, the content protection server 150B is configured to provide logic and algorithms to pre-process or post-process content items that are received by the content protection server 150B before or after encryption. According to at least one example embodiment, the content protection server 150B is a computer cloud server. Alternatively, the content protection server 150B is a computer server residing on the same network as the content sharing application 110B. According to yet another example embodiment, some modules of the content protection server, e.g., an encryption module for performing encryption, is implemented within the same computer network as the content sharing application 110B, while other modules are implemented on a cloud computer server.

In embodiments, a method of managing access to electronic content may comprise retrieving, by a content protection server, access rights associated with a content item from a corresponding content sharing application; translating the access rights retrieved into a digital rights management (DRM) format recognizable by a DRM engine; and forwarding, to the DRM engine, the translated access rights, the translated access rights being provided by the DRM engine to a user device and employed by the user device to provide access to the content item. Retrieving the access rights may include receiving information identifying the content item from the user device; requesting, from the corresponding content sharing application, the access rights associated with the content item based on the received information identifying the content item; and receiving the access rights requested. The determining of the corresponding content sharing application may be based on information accessible to the content protection server, the information mapping the information identifying the content item to the corresponding content sharing application. Translating the access rights retrieved into a DRM format that may be recognizable by the DRM engine may include, for example, first translating the access rights retrieved into a format associated with the content protection server, and then translating the first translated access rights in the format associated with the content protection server into the DRM format recognizable by the DRM engine. An instance of user credentials may be received, and the received instance of user credentials may be authenticated based on stored information indicative of corresponding authentic user. An instance of user credentials may be received, and the received instance of user credentials forwarded to the content sharing application for authentication. The access rights may be managed dynamically by the content sharing application. The content protection server may be a cloud server. The content protection server may reside in the same network as the content sharing application. The content item may be encrypted, and the encrypted content item may be provided to the user device prior to retrieving the access rights. Encrypting the content item may include receiving the content item from the content sharing application, determining an encryption protocol based on a type of the received content item, pre-processing the content item by employing one or more predetermined logic based on the content item format encrypting the content item based on the determined encryption protocol, post-processing the content item by employing one or more predetermined logic based on the content item format, and the like. The content item may be registered within the DRM engine. In embodiments, an apparatus for managing access to electronic content may comprise a processor and a memory with computer code instructions stored thereon, the processor and the memory, with the computer code instructions stored thereon, being configured to retrieve access rights associated with a content item from a corresponding content sharing application, translate the access rights retrieved into a digital rights management (DRM) format recognizable by a DRM engine, and forward, to the DRM engine, the translated access rights, the translated access rights being provided by the DRM engine to a user device and employed by the content rendering system to provide access to the content item. In retrieving the access rights, the processor and the memory, with the computer code instructions stored thereon, may be configured to receive information identifying the content item from the content rendering system; to request, from the corresponding content sharing application, the access rights associated with the content item based on the received information identifying the content item; and to receive the access rights requested. In retrieving the access rights, the processor and the memory, with the computer code instructions stored thereon, may be configured to determine the corresponding content sharing application based on information accessible to the content protection server, the information mapping the information identifying the content item to the corresponding content sharing application. In translating the access rights into the DRM format recognizable by the DRM engine, the processor and the memory, with the computer code instructions stored thereon, may be configured to first translate the access rights retrieved into a format associated with the apparatus, and translating the first translated access rights in the format associated with the apparatus into the DRM format recognizable by the DRM engine.

The access rights may be dynamically managed by a rights issuer module associated with the content sharing application. The apparatus may be a cloud server. The apparatus may reside in a same network as the content sharing application. The processor and the memory, with the computer code instructions stored thereon, may be configured to encrypt the content item, and provide the content item encrypted to the user device prior to retrieving the access rights. The processor and the memory, with the computer code instructions stored thereon, may be configured to receive the content item from the content sharing application, determine an encryption protocol based on a type of the received content item, and encrypt the content item based on the determined encryption protocol. The processor and the memory, with the computer code instructions stored thereon, may be configured to cause the encrypted content item to be registered at the DRM engine. The apparatus may be coupled to two or more DRM engines. The apparatus may be able to be coupled with two or more user devices or content applications.

Dynamic Entitlement Management

In embodiments, a dynamic entitlement management facility 239 may provide greater control over end-point or recipient content access through a community of users, work-stream, domain, geography, such as through digital rights management (DRM) contextual control or information rights management (IRM). IRM may be used herein as an alternative wherever DRM is used. Contextual content management and collaboration may be managed for communications, coordination, and collaboration of content, context, and community. For instance, contextual control may be managed for communications comprising content entitlement, distribution, collection in the context of real-time communications (e.g., instant messaging), notifications, activity streams, tagging of content, and the like, for a contact, network of users, subscribed set of users (e.g., blogs, news), and the like. Contextual coordination management may involve content with respect to work-streams, work-flows, approvals, compliance in the context of calendars, action items, dashboards, archiving, retention, compliance within directories, groups, memberships, and the like. Contextual collaboration management may comprise content with respect to editing, redlining, annotation in the context of group calendars, team wikis, meeting management, within portals, discussion boards, expert networks, dashboards, analytics, and the like. Collaboration, coordination, and communication may be managed with respect to the context of content usage amongst a select number of users or within a community. In embodiments, dynamic entitlement permissioning may be based on groups that are dynamically created to assign rights, where groups may cross organizational boundaries, where assignments are based on collaboration relationships that are not stable, and the like, where group enablement is made to be dynamic to changing conditions.

The dynamic entitlement management facility may utilize an enterprise policy to override a user's personal DRM-based entitlement permissions (e.g., access, sync, share, and the like). For example, an enterprise policy may dynamically override a user's entitlement permissions to ensure intellectual property protection/leakage protection, where the user is dealing with content in an enterprise context. At the same time, the enterprise is dealing with the content context of a user's entitlements. The organization's policy on people, context, and content may be enabled to override the individual user's choices, such as based on geographic location, location context, network conditions, collaboration connectivity, and the like. For instance, a user may have personal-level of permission to access a document because they are the owner of the document, but the enterprise may deem through a policy facility that the user should not be able to access the document within the context of their current location (e.g., foreign country, competitor enterprise location, public network, and the like). In embodiments, dynamic entitlement may be determined based upon dynamic risk-rated DRM protection, where the system assigns a dynamic risk rating (DRR) to a user, and based on that DRR, apply dynamic DRM protection controls. For instance, a DRR may be assigned to a user when they login, sign-in, authenticate, and the like, and may change as conditions associated with the user change. The level of control applied to a document (even if the person is the owner of the document), may be based on their current risk profile as determined by the assigned DRR. For example, the user may be in China, and the system may assign a DRR that only permits a user to access documents in a certain format. The DRR may be based on IP address, geography, data node factors (e.g., who controls the nodes that data has to travel across), type of data, metadata, action the user wishes to take, and the like. In embodiments, there may be a matrix of DRR states, such as where the DRM is based on a current DRR. In embodiments, DRR may be extended beyond document access, such as being associated with different features in the system. For example, if a user's risk score is not higher than X, they may not be enabled to start a work-flow, and they might have to go to an organizational level administrator to start work-flow if their risk level is high (e.g., due to being in a risky place, geographically or where the user is on the network). The DRR may have a classification such as highly sensitive, low sensitivity, and the like. A DRR risk score for a document may be based on the content, based on who handles it, key words, presence of CVV or SSN numbers, document type, document metadata, size of document, presence of types of information (e.g., code, and the like).

In embodiments, dynamic entitlement may involve extending a user's personal DRM-based entitlement permissions (e.g., access, sync, share, and the like). For example, an enterprise policy may dynamically extend or open up a user's permissions to a set of DRM documents within a computing environment, such as based on a policy, a user's profile (e.g., a user's position in the company, a user's access level, a user's work group or division, or the like), a user operating criteria (e.g., automatically providing access to DRM documents based on the user working in a secure computing environment), and the like. Extending a user's DRM-based entitlement permissions may relate to DRM documents that the user has permission to access or to DRM documents that they do not have explicit permission to access. For example, a user may normally have to provide authentication each time they access a new DRM document. However, the dynamic entitlement management facility may provide, such as through a policy and after a single authentication, automatic access to all documents the user has DRM permission to access within a predefined computing environment. For instance, the user may be provided permissions to all DRM documents to which the user has DRM, such as saved on the user's hard drive, while the user is in communication with the dynamic entitlement management facility; to all DRM documents the user has DRM access to that are stored within an enterprise network while the user is behind the enterprise's firewall; and the like. In this way, the user may be saved from having to provide authentication for each document they have DRM permission to access while the user is within a policy-determined secure computing environment. In another example, the dynamic entitlement management facility may extend a user's DRM permissions beyond the permissions explicitly determined in the DRM permissions of a document. For instance, the DRM permissions of a document may explicitly specify one or more users with permissions associated with access to the document, and upon authentication, those users are able to access, edit, print, and the like, the document. However, the DRM permissions may also provide for a policy-determined access by users other than those with explicit permissions. For instance, the CEO of a corporation may have global permissions to access a DRM document, an engineer of an enterprise may have permission to open any of a class of DRM protected technical documents, an employee of an enterprise may have permission to open any of a class of DRM protected documents created by the enterprise while the user is inside the enterprise network firewall, and the like. In this way, an enterprise may specify extended permissions for DRM protected documents to accommodate specific needs for document access.

Access to a DRM-protected document may require a user to authenticate. Authentication has traditionally been provided at the document level, where a user would need to authenticate for each document the user accesses. In addition, DRM-protected documents downloaded from a remote location, such as from the secure server of the present invention, may have required the user to authenticate twice, once on the remote location to gain access to download the document, and once on the user's local computer storage to access the downloaded document. Although the DRM protection may offer needed security, the user experience can become burdensome with regard to this need to continually authenticate on a document-by-document basis. In embodiments, a DRM authentication service may be provided to keep a user authenticated as long as a set of authentication conditions, or 'context', are maintained. Context may involve the user maintaining an active session with the service, the user remaining in a particular computer environment (e.g., uniquely logged into their machine), and the like. One of the ways the DRM authentication service may provide this continued authentication is by loading a unique machine registration token onto the user's computer environment (e.g., a combination of computer hardware and operating system), thus allowing the DRM authentication service to see that the user is working from a computer environment that has been verified. As long as the user maintains these conditions, the user may seamlessly navigate amongst documents to which they have DRM permission to access. For instance, a user may log into the service at the beginning of their day from their personal computing device, authenticate for a first access to a first DRM document, and then, as long as the authentication conditions don't change (that is, as long as the user is still logged into the same device), the user maintains the ability to access this document a second time, to access any other DRM document for which the user has rights to access, download a DRM document from the secure server to their local machine and open the document, and the like, without re-authenticating. Thus, in this example, as long as a user is logged into the DRM authentication service, such as located on the secure server, the calls made by application DRM agents to the DRM authentication service are validated by the document application (e.g., Microsoft Office, Adobe Reader).

In embodiments, the information provided in an authentication context may include a machine registration. For instance, the first time a user accesses a protected document on a given machine a machine ID may be generated and stored on the physical machine. The association between machine ID and the user ID may be stored with the DRM authorization service (e.g., on the secure server) for validation of future authentication requests. The machine ID is unique, such as tied to the combination of a physical machine and OS user login. For example, in the case of two different users sharing the same physical machine but each logging in with his/her own username/password, there will be two distinct machine IDs issued to the two users. The same user logging into two different machines with the same credentials will have two distinct machine IDs. The machine is ID persistent, survives machine restarts, upgrades, and is not easily removed from a machine. With the machine ID included in an authentication context, the DRM protection is maintained even when one physical machine is used by a number of different users. In embodiments, other ID capabilities may be utilized, such as through the user of biometric identifiers.

Figure 48A:
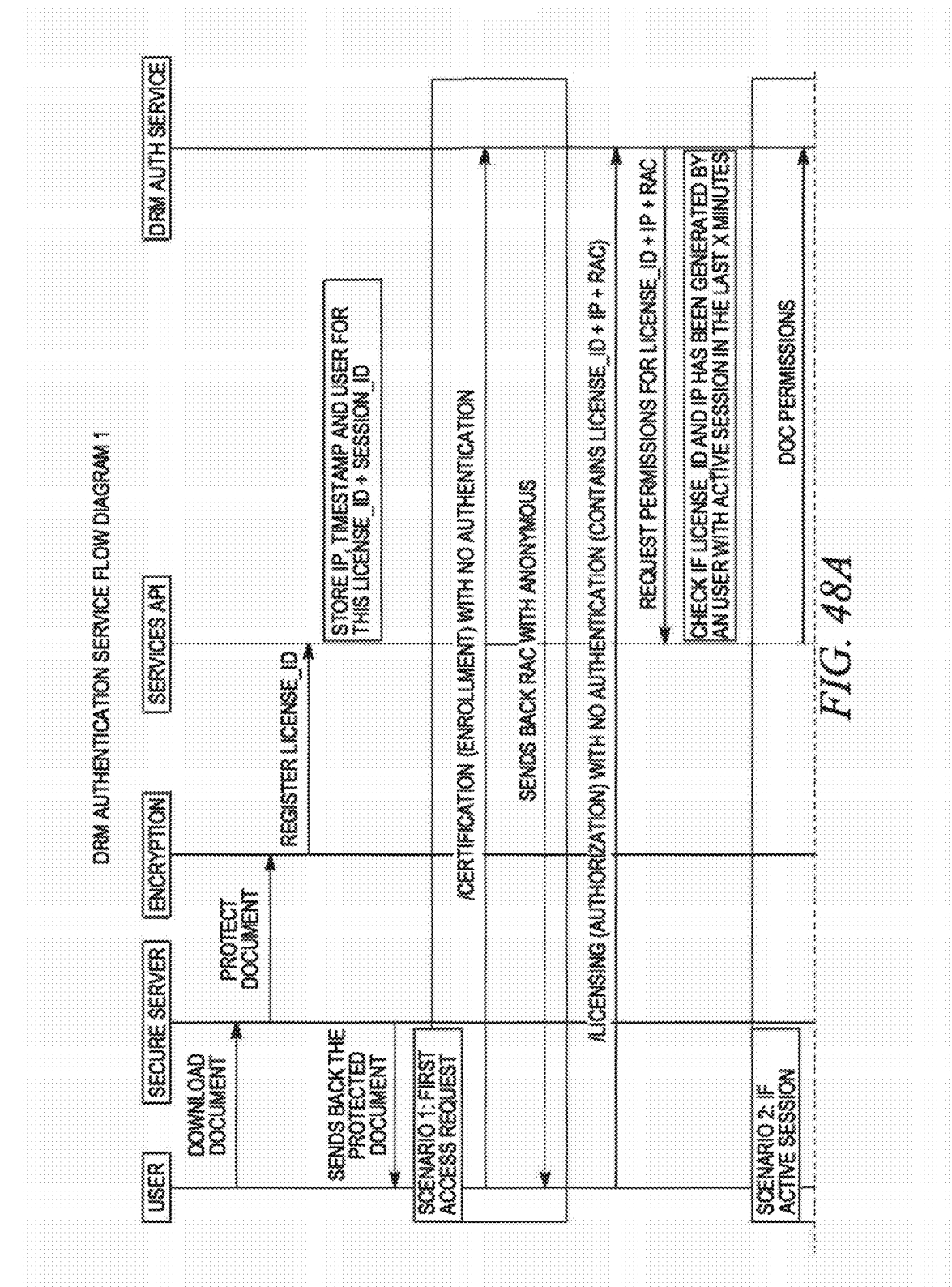
Figure 48B:
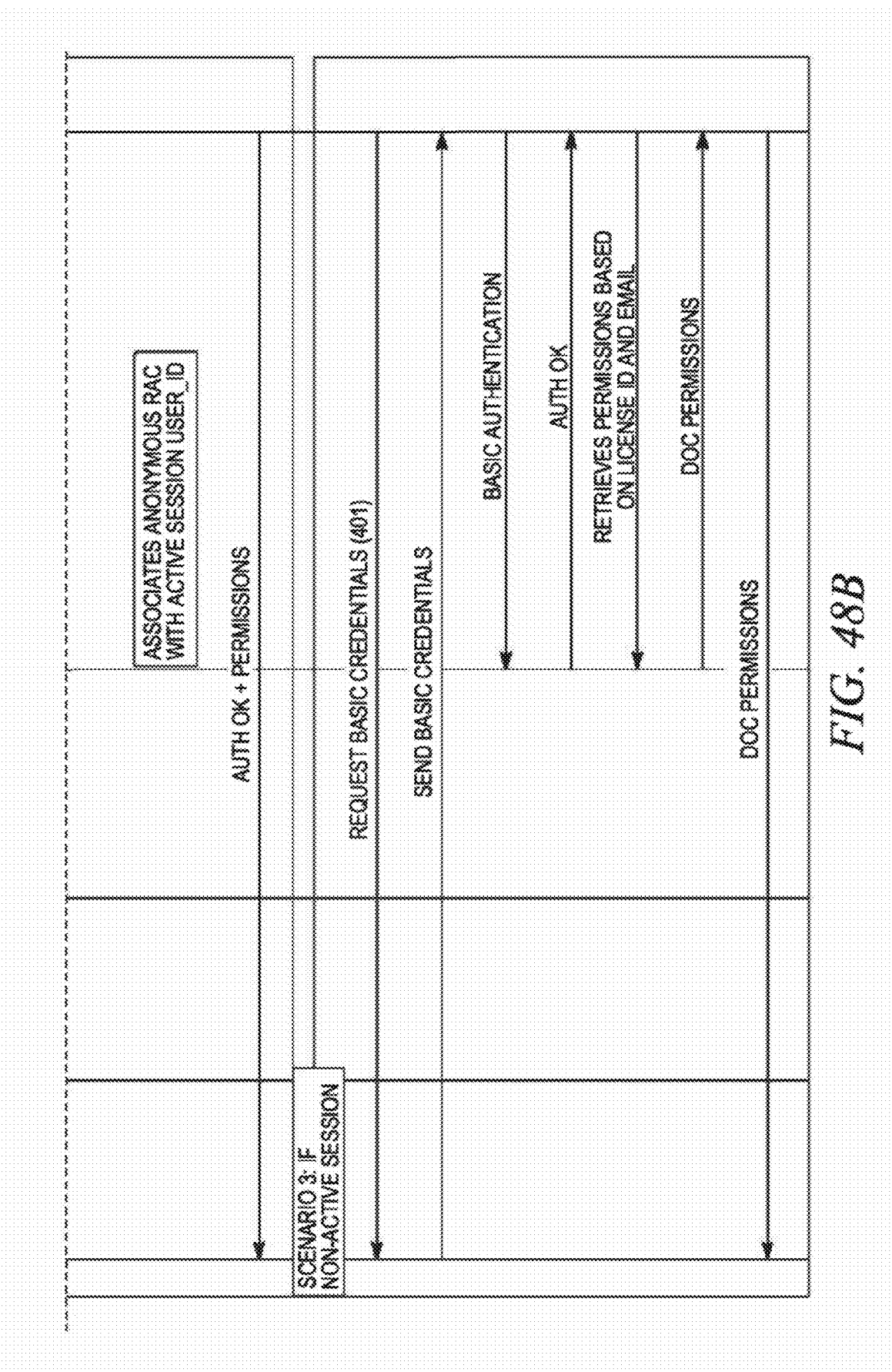
Figure 49A:
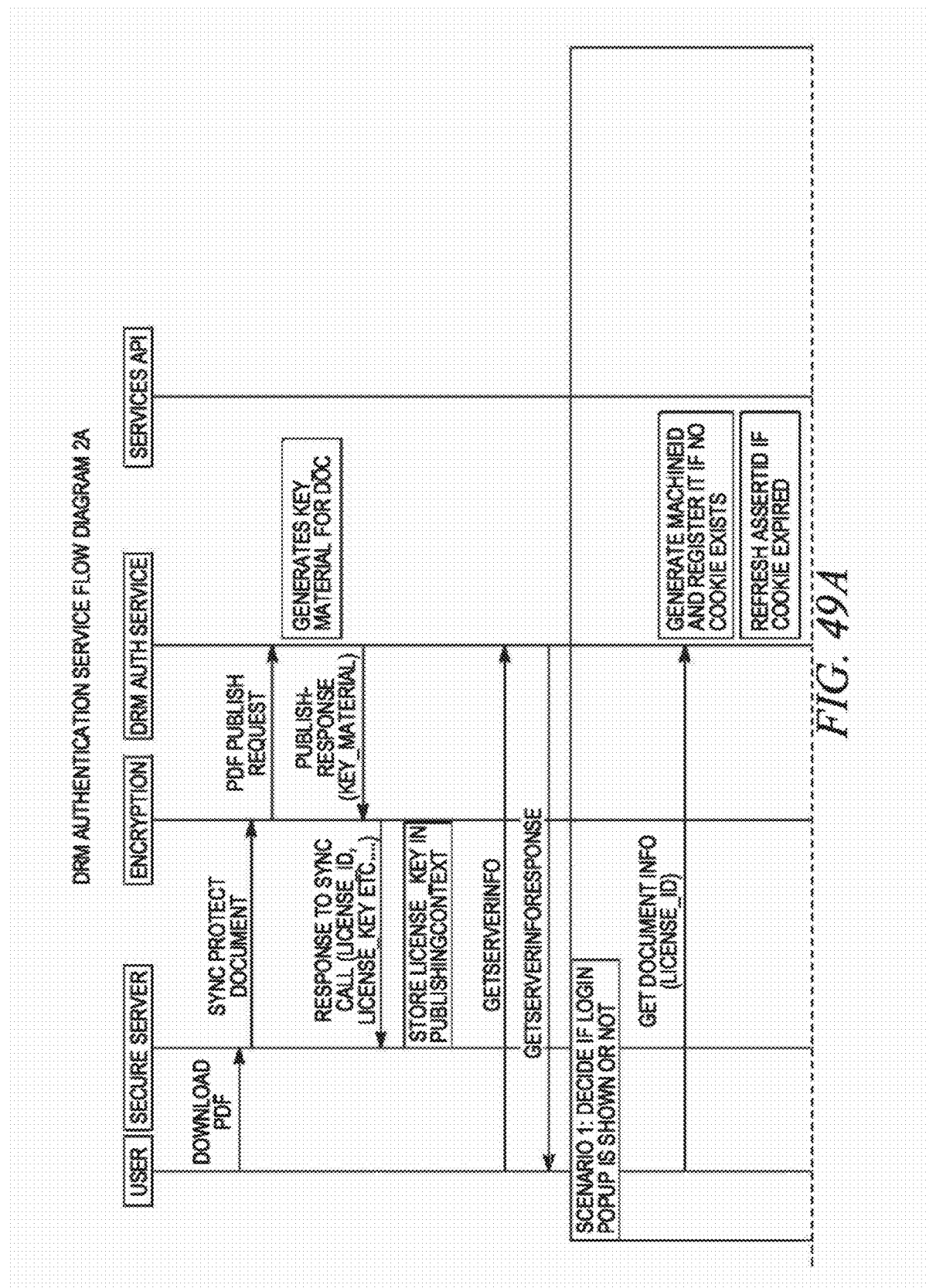
Figure 49B:
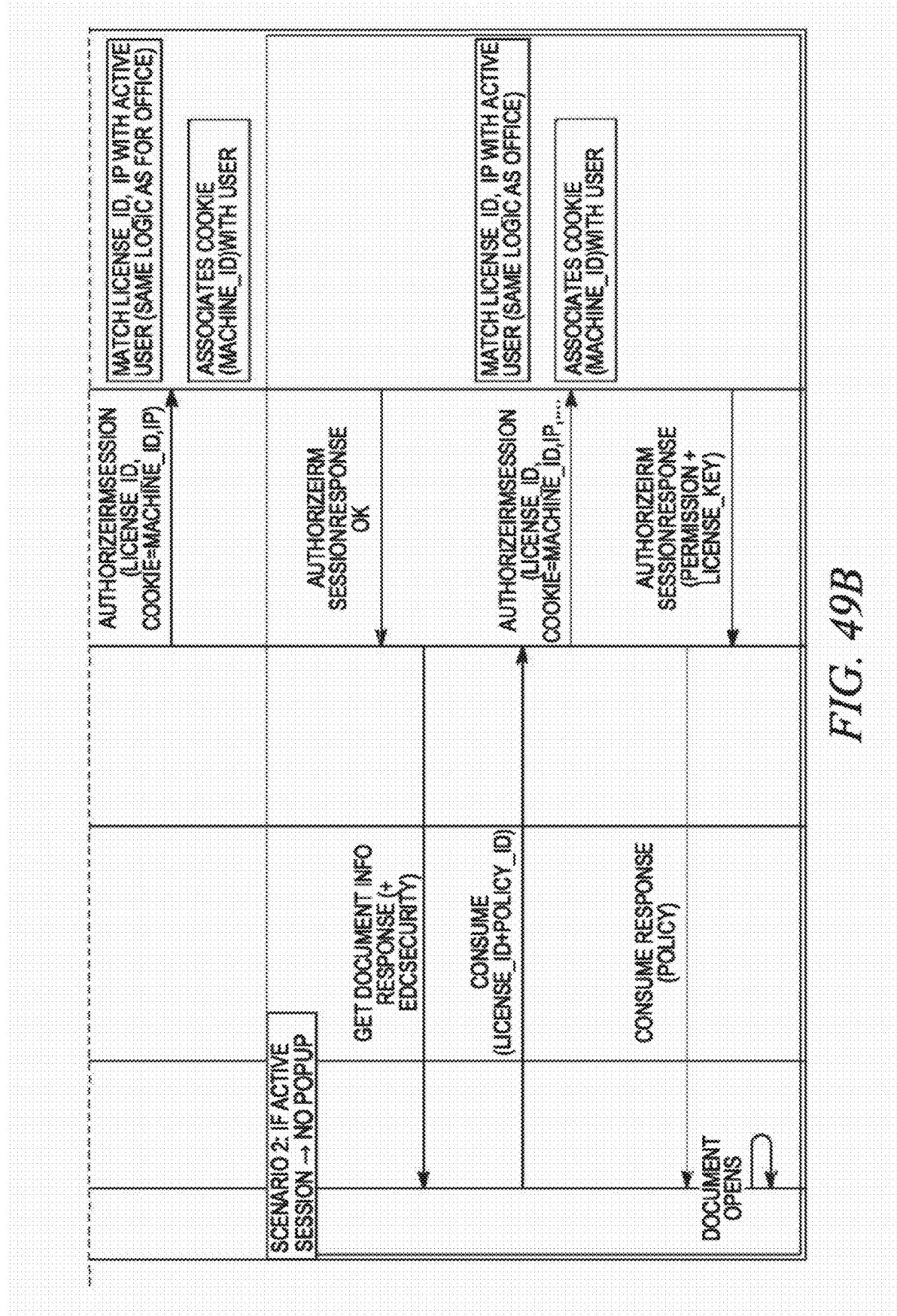
Figure 50:
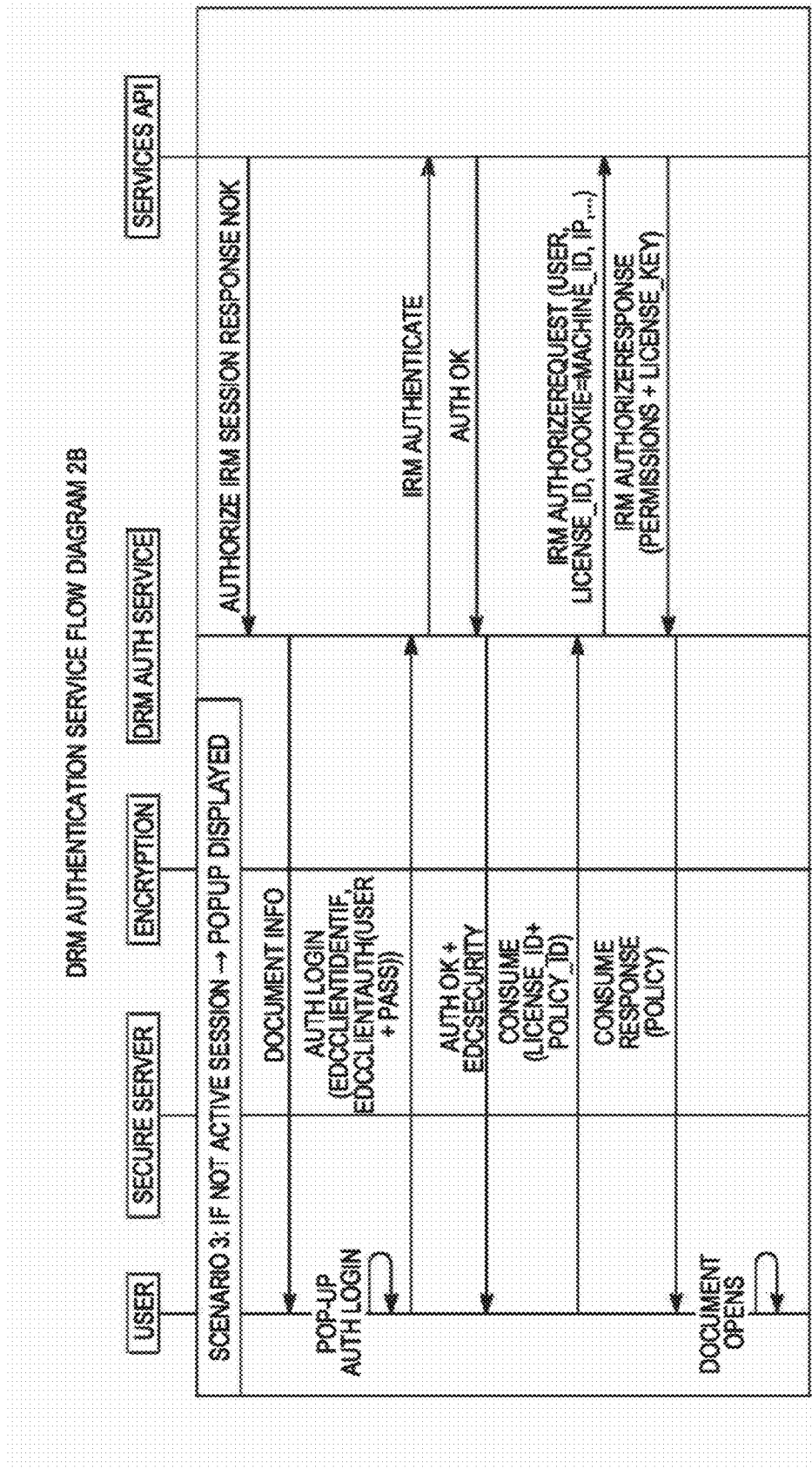
Figure 51A:
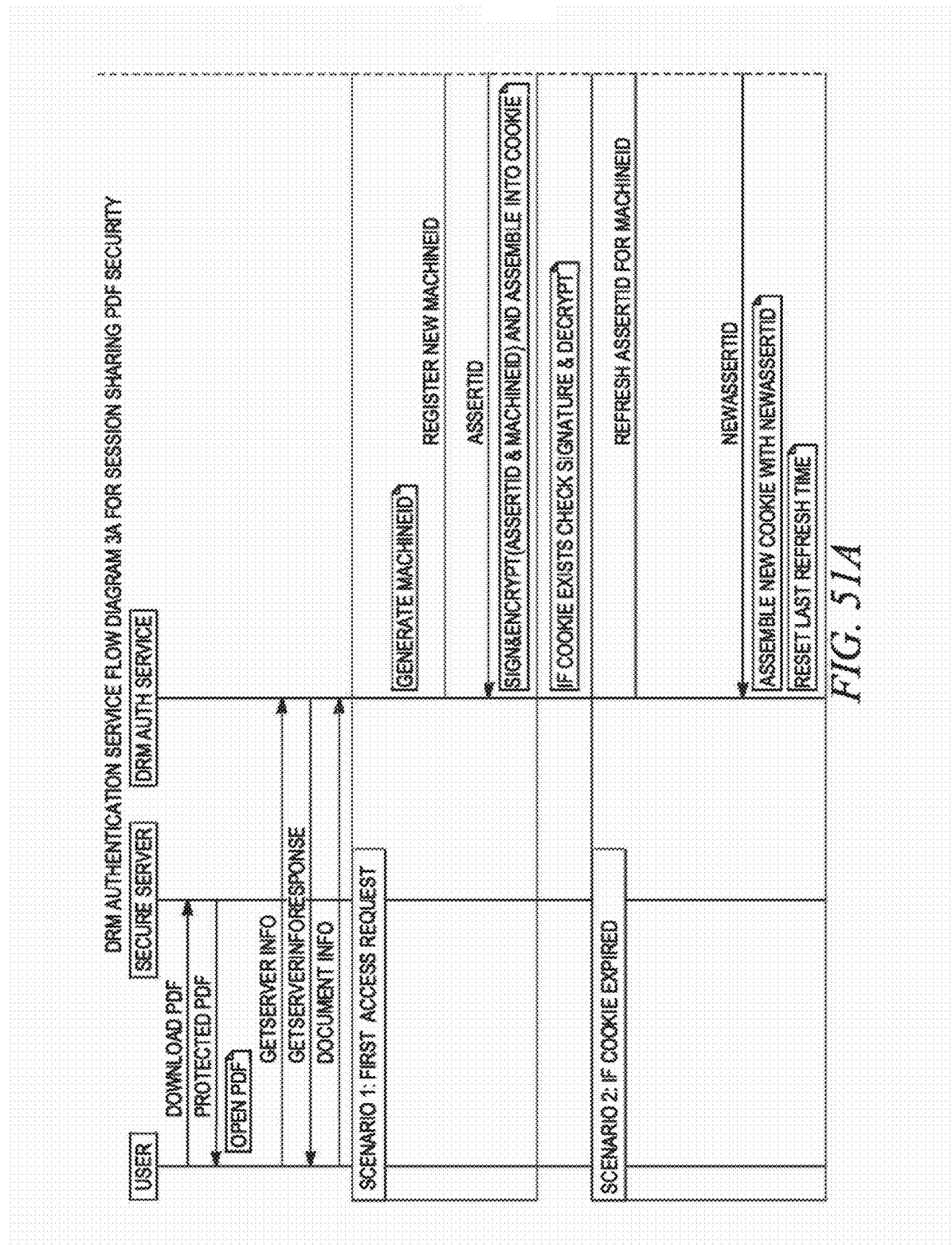
Figure 52:
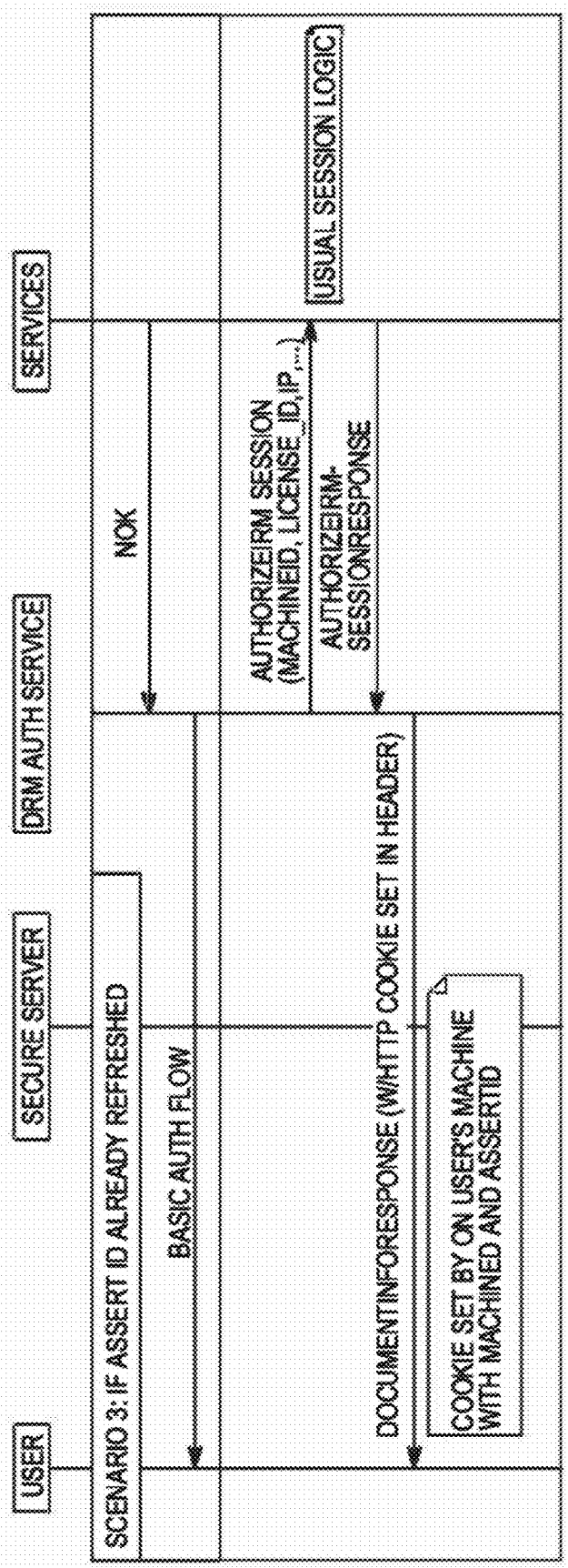

In embodiments, the DRM authentication service may provide a user with access to DRM protected documents without having to explicitly provide their credentials in an authentication as long as it can be validated that they have maintained an active session with the DRM authentication service. Authentication may be required only at the start of an active session, such as with the first requested access to a DRM protected document. At the time of this first user authentication, the DRM authentication service may store a context for the authentication that is used to authenticate future access requests by the user. For example, a user may request access to a document stored on the secure server, and download the document to the user's local disk. Recall that in past systems the user would have had to authenticate at the time of access for the download as well as when they subsequently open the document on their local disk. However, the DRM authentication service utilizes context from the first access to authenticate the second access. For instance, at the time of download, a 'context 1' may be recorded as a record of the context of the access, such as including a download ID, timestamp, client IP, user ID, token, and the like. The downloaded document may be encrypted and have the download ID embedded in it. The user then opens the document through the document's source application, which makes a call to the DRM authentication service to authenticate and authorize access. The DRM authentication service may then generate a 'context 2' for this second access request, such as including a download id, timestamp, machine id, client IP, user id, and the like. With the information from 'context 1' and 'context 2', the system is able to validate the second access if the conditions for access have not changed. For instance, if the information from 'context 1' is consistent with the information from 'context 2', the second access is granted. However, if when the DRM authentication service finds a difference, or finds no record of a 'context 1', then the user would be prompted to provide authentication. In embodiments, once the second context, 'context 2', has been utilized to access the document, one of the 'context 1' and 'context 2' may be invalidated or deleted so that there is only one current context for future access authentications. For example, the 'context 1' may be invalidated for subsequent access authentications once the 'context 2' information is obtained, where 'context 2' is then used for a next access request. This non-limiting example is meant to be illustrative of the system's process, but one skilled in the art will appreciate that other access scenarios may also be accommodated. For instance, the example describes a scenario where the user downloads and accesses a protected document on their local disk, but the system may similarly enable a user to access a second protected document on their local disk, a second protected document stored on the secure server, a protected document received from another user, and the like. As long as the context established in a previous access authentication matches the context for a current access request (e.g., the user is still logged onto the DRM authentication service, the ID for the user matches, the ID for the machine matches), the current access request may be granted without the user being prompted for authentication. FIGS. 48A-B provide a DRM authentication service flow diagram with three illustrative access request scenarios in relation to use of the DRM authentication service after a document has been DRM protected, including interactions between the user, the secure server, encryption process, a services API, the DRM authentication service. Scenario 1 is where the user is making a first access request under a set of contextual conditions, such as in the first access request in a session with the DRM authentication service; scenario 2 is where the user is making an access request in an active session; and scenario 3 is where the user is making an access request in a non-active session. FIGS. 49A-B, 50, 51A-B, and 52 provide alternate DRM authentication service flow diagrams, where the document is a PDF document.

In embodiments, DRM protection in combination with dynamic/adaptive multi-factor authentication may be provided through a browser view of a protected file. For instance, a user may restrict access by providing a second user only a portion of a file, rather than the whole file, based on the second user's risk level. Alternatively, a user may provide a second user with extended permissions, such as based on the second user's profile (e.g., the CEO of the company), geographic location (e.g., the second user is inside the firewall of their enterprise), secure network connection (e.g., inside the enterprise firewall), and the like. In embodiments, DRM protection may be used to restrict or extend DRM protection through policy, user profiles, a current state of a user, and the like.

In embodiments, the dynamic entitlement management facility may include a document destruction and retention policy, where DRM policies are utilized for archiving and destruction of documents. For instance, information is stored with DRM, so that the file will expire based on its DRM when the time is right, without further action, so that self-destruction of the document is based on DRM. This self-destruction DRM mechanism may be able to be overridden. A user may be able to set up an auto-reminder to the central storage location to confirm that the destruction policy has been carried out, is still valid (e.g., not suspended by a litigation order), has been overridden, an the like. In embodiments, a corporate record, such as recorded in metadata with the document, may be kept with a document, such as where the corporate record includes a history, annotations, and the like, of the document, e.g., who looked at the document, under what conditions the document has been viewed, who has set or altered a self-destruct parameter, the date for self destruction, and the like. In embodiments, the annotations and/or history of a document may be separately protected. For instance, there may be one DRM protection assigned to the document and another assigned to the information stored in a related file or as metadata attached to the file, such that a user may be able to access the document but not the information, or be able to access the information but not the document. In this way, an enterprise would be able to assign permissions based on a need to know, where an administrator, for instance, may be permitted to view metadata for a document but not the content of the document, and a user or editor of the document may be able to view the content of the document but not be permitted to view the metadata for the document.

In embodiments, the dynamic entitlement management facility may be implemented on a secure server remote from an enterprise, in the cloud, local to the enterprise (e.g., inside the enterprise firewall), on a user's computing device, through a web browser, and the like. Implementation of the dynamic entitlement management facility may not require the use of a plug-in, such as by extending native APIs extended to provide DRM on content. The dynamic entitlement facility may be implemented without any plug-ins, agents, or any other additional software installation on the client making, end user device, and the like. For instance, in a traditional DRM configuration, a client device attempting to open a DRM document may have to access services (e.g. for encryption, authentication, active directory) in order to gain permission to open the document, such as through utilization of a plug-in for that specific DRM technology. The dynamic entitlement management facility may comprise DRM services internal to the secure server configuration such that the user's client device does not have to access any external services, such as for encryption, authentication, permissions, and the like. For example, once the user is logged into the system, the user may not have to authenticate again when the want to open a DRM document because the system already knows the user's permissions (e.g., through a one-time token, password, and the like).

In embodiments, the dynamic entitlement management facility may enable an offline mode while allowing a user to work in a protected environment (e.g., online and offline modes while in a protected mode). The dynamic entitlement management facility may provide for group level policy control with policy set ranking, external share restrictions, device location restrictions, policies that permit sharing by device, access to approved domains to restrict browser and kiosk asks, secure shared link policies, password, password strength, link expiration, mobile data plan policies, mobile editing policies, restricted third-party applications, mobile sync controls, automated deletion, file control policies, and the like.

Key Management in a Secure Content Environment

Figure 53:
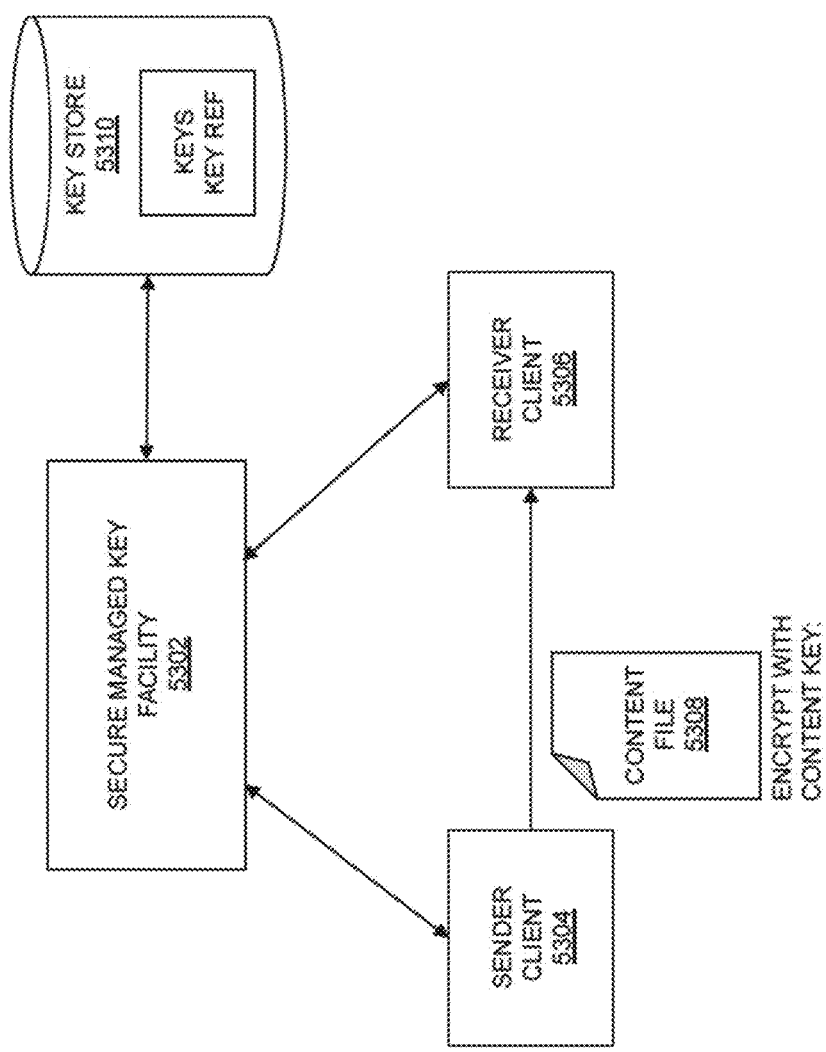
FIG. 53 depicts an embodiment diagram showing key management in a secure content environment.

In embodiments, a secure managed key facility may be provided for managing the use of encryption keys, such as for managed content sharing between users in a secure sharing and un-sharing facility, managing access to content through digital rights management, content sharing amongst users in a customizable secure exchange platform (e.g., exchange of content between data nodes), sharing data across heterogeneous content repositories in a federated access environment, and the like, such as described in this disclosure. Encryption keys may utilize symmetric-key algorithms (e.g., use of the same key for both encryption and decryption), asymmetric-key algorithms (e.g., public-private key usage, with a public key for encryption and a private key for decryption), and the like, to provide secure communications and encrypted content files between users and systems. FIG. 53 depicts a functional flow diagram of an embodiment for the secure managed key facility 5302, involving managing key usage between two user clients, where in this embodiment one user is a sender client 5304 and the other user is the receiver client 5306 of a content file 5308. Both users, in addition to the sender communicating the content file to the receiver, also communicate with the secure managed key facility as part of a secure management protocol, which in turn communicates with a key store 5310.

The secure management protocol may involve the exchange of various certificates between the secure managed key facility and the users. For instance, the secure management key facility may provide account certificates, licensor certificates, user licenses, and the like, to the users as part of the process of securely exchanging documents between users, as well as utilizing different encryption key algorithms used in the communications and encryption of information and content files. For example, the sender client 5304 may request to the secure managed key facility 5302 to send a document securely to the receiver client 5306. The secure managed key facility may then send both the sender client and the receiver client various certificates that enable or validate the secure communication of the file content from the sender client to the receiver client. Amongst the certificates to the sender client the secure managed key facility may provide the sender client with a content key for encrypting the content file for transmission to the receiver client. The sender client may then use the content key to encrypt the content file and transmit it to the receiver client. In addition, the sender may provide an access policy with the encrypted content file, which the receiver client must comply with in order to be granted access to the content file. The access policy may be a digital rights management access policy, such as described in this disclosure.

One aspect of the secure management protocol is the management of the content key. For instance, one possible method for management of the content key is to provide the content key to the sender client, have the sender client encrypt the content file with the content key, and send the receiver client the encrypted content file along with the content key, such as where communications are encrypted with a public key. In addition, the communication may also include an access policy selected by the sending client. The receiving client receives the encrypted content file, encrypted with the content key. The receiver client may then communicate with the secure managed key facility (e.g., the receiver client providing the secure managed key facility with the encrypted content key and access policy) to determine whether it has the right to access the content file, and if access is granted, such as per the access policy, the secure managed key facility may then provide the receiver client with a decryption key. However, this process involves transferring the content key amongst the various parties and thus exposes the content key to unauthorized capture (e.g., through computer hacking). Further, if the content key is used for multiple document exchanges, multiple clients, and such, then the unauthorized capture of the content key potentially places many communications at risk.

In an alternate protocol, reducing the extent to which the content key is exposed to other parties, especially the receiving client, may better protect the content key against unauthorized capture and subsequent hacking. In embodiments, the content key may be generated by the secure managed key facility, such as when the sending client requests a secure transfer, and is stored in the key store along with a content key reference. The secure managed key facility then sends the content key and the content key reference to the sender client, which then encrypts the content file as in the first example. However, this time the sender client does not transmit the content key to the receiver user, but rather transmits the content key reference to the receiver user. In embodiments, the sender client may then discard the content key. The receiving user may then communicate with the secure managed key facility for access as before, but with the content key reference rather then the content key itself. The secure managed key facility may then use the content key reference to retrieve the content key from the key store, and provide the receiver user with a decryption key if access is permitted. Thus, by transferring a content key reference in the content file exchange, the content key is more secure, creating a more secure content exchange environment. In embodiments, encrypted communications between the secure managed key facility and the sender and receiver clients may be encrypted with a key (e.g., a public key) provided by the secure managed key facility.

Various rights management services exist, implemented to manage the exchange and uses of rights-protected content that is distributed through computer networks, such as the types of content shared in the environments described throughout this disclosure. An example, used in connection with servers that employ the Windows® operating system, relates to Active Directory Rights Management Services (AD RMS, or RMS). Components of computer networks that employ RMS have trusted connections among each other that are implemented by a set of certificates. Enforcing the validity of these certificates is a core function of RMS technology. Each item of rights-protected content, such as a file a sender wishes to share with a receiver, is published, along with a license that expresses the conditions that apply to the use of the content. Each consumer of the content receives a form of license that reads, interprets, and enforces the usage rules. Thus, a given type of license corresponds to a particular type of certificate. License rights can be expressed in computer-readable forms, such as expressed in a mark-up language, such as eXtensible rights Markup Language (XrML). The certificates and licenses used in RMS may be connected in a hierarchy, so that a client can parse a chain from a particular certificate or license through a series of trusted certificates, arriving at a trusted key pair.

One type of certificate is the server licensor certificate (SLC), which typically contains a unique public key that corresponds to a server (or a cluster of servers that operate as a single logical server). In the example of AD RMS, the SLC is created when the AD RMS server is configured (or the first server in a cluster). The server generates a unique SLC for itself that establishes its identity (referred to in some cases as self-enrollment). The public key is provided for long-term validity, such as two hundred fifty years, so that rights-protected content can be archived for long durations. In embodiments, a root cluster handles both certification, by issuing a rights account certificate (RAC), and licensing of rights-protected content. Other servers added to the given root cluster may share an SLC. In complex environments, licensing-only clusters can be deployed, each of which generates an SLC. Thus, a fundamental characteristic of conventional implementation of RMS is that each entity that interacts with the RMS system is represented by a single, specific certificate.

SLC certificates use the eXtensible Rights Markup Language (XrML) rather than a more standard form of certificate, which allows SLC certificates to express complex lists of RMS access rights. The SLC is a self-signed certificate, and the private key corresponding to this certificate is used by the RMS server to protect other certificates used in the RMS system. The public key in this certificate is then typically used by RMS clients to encrypt materials that only the RMS server can decrypt. Client machines have an RMS machine certificate (sometimes referred to as a Security Processor—SPC). The SPC is used to authenticate each machine to the RMS system and allows machines to encrypt other RMS-related data that's stored locally on the computer.

Another aspect of the secure management protocol involves the use of an asymmetric public-private key pair to encrypt communications and content between different parties, such as provided in connection with at least one of the certificates, such as SLC certificates, issued in the secure management protocol. For instance, the secure managed key facility, after it determines that the receiver user has permission to access the content file, may send the receiver user the decryption key to decrypt the content file, encrypted with the public key associated with the SLC certificate containing the public key issued by the server that is capable of decrypting the content file. However, if the same public key is used for all of the communications for a plurality of users of a given server, there is a risk that an unauthorized user may obtain the key and hack it, such as using brute force decryption methods, thus compromising the security of all content for the plurality of users that is secured by that particular server or cluster of servers. An improvement to the protocol can be made to increase the security of the certificate of a given server (typically the SLC certificate) by splitting the certificate of a given server or cluster into multiple virtual certificates. Since a certificate is comprised of a certificate chain (containing the public key and the expression of the rights management rules and licenses for the content in question), a certificate, with a different pair of public-private keys, may be generated on a per user basis (e.g., a particular company, individual or group), even if there are different users that use the server or cluster to secure content. Therefore all the operations that the particular virtual certificate was used for will be used with a specific user pair of public/private keys. If a given user's public-private key is compromised, only the documents that were generated for that user will be compromised, thus not affecting other documents generated from that server or cluster within the secure managed key facility. The virtual certificates containing pairs of public/private keys for a given server or cluster may be stored independently in a different storage system according to the user's security requirements. In addition, hardware security module solutions could be used in conjunction for increased confidentiality.

Customer Managed Keys (CMK)

Figure 39:
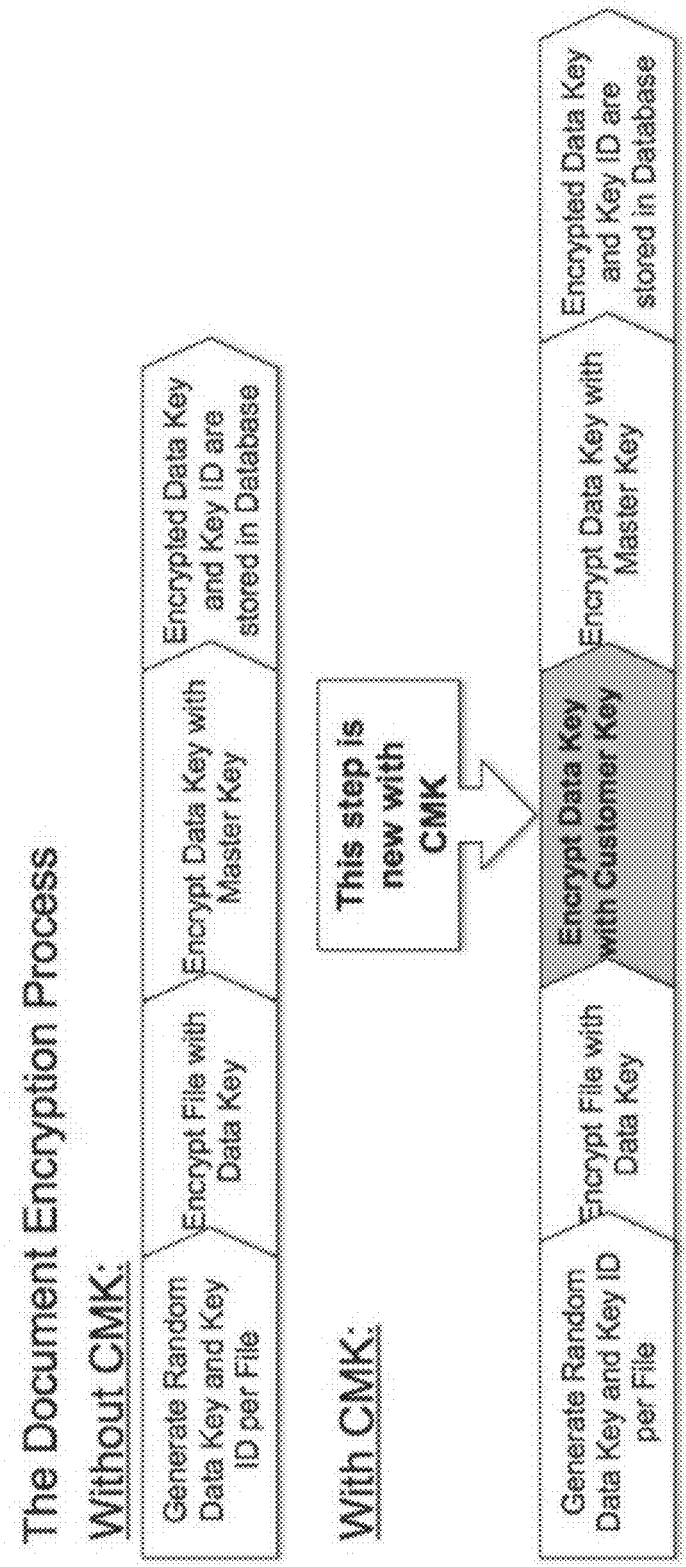
FIG. 39 depicts comparison of a document encryption process with and without customer managed keys.

Customer managed keys (CMK) may provide the ability for customers to control their own data encryption keys (i.e. for data at rest), such as provided by inserting an additional step in the basic encryption process, such as shown in FIG. 39. In this way both the system-provided keys and the customer keys are needed in order to access the data, such that neither can do it alone. An example sequence of the encryption processing may include the steps of generating random data key and key ID per file, encrypting the file with the data key, encrypting the data key with a customer key, and encrypting the encrypted data key with a system master key, where the doubly encrypted data key and key ID are stored in a database. Customers may be provided a partition of keys, such as through a hardware security module that safeguards and manages digital keys for strong authentication and provides crypto-processing, an encrypted secure partition in memory for key storage for document management, and the like. These modules traditionally come in the form of a plug-in card or an external device that is separate from and attaches directly to a computer or network server. Customer keys may be partitioned such that users on the secure server side may be able to access the partition (e.g., to identify to what parties sets of keys have been provided), but such that the users on the secure server side are not able to see the actual keys. The customer may be able to access the partition through an external device, such as a USB key into a laptop, encrypt with the customer's key, then encrypt with the secure server master key, thus creating a double-encrypted key at their own site. Customers may be able to generate a new key on demand, supply an existing key, rotate a key, disable a key, manage multiple keys per organization, per business group, and the like. Key management, such as in key-based service versions, helps keep distributed attacks from succeeding. For instance, when a new key is introduced into services, the older keys may be such that they no longer work, so even if there is an attacker in the system, it can't use the same keys for repeated attacks. As a further protection of the customer's keys, unencrypted or decrypted keys may be stored apart from the secure server or orchestration services layer, such as only with the customer on their enterprise premises or network, such as in a data node controlled by the customer, and the like. As such, the unencrypted or decrypted keys are prevented from being compromised from the orchestration server side and remain in control with the customer.

In embodiments, a CMK implementation may use a data key to encrypt content that is separate from the master encryption key and also separate from the customer encryption key. This separation has a number of advantages. By having a data key that is used to encrypt the files in the file processing servers, the system is able to apply significant processing power to the encryption and decryption of files, (e.g., outside of the hardware security module (HSM)) in order to achieve high throughput. The HSM encryption processing may be limited to encrypting and decrypting the data key, which may be done by passing the data key (e.g., a very small number of bytes when compared to MB/GB/TB of content files) into the HSM and requesting it to encrypt or decrypt the data key. The HSM then returns the result, which the system is then able to use to encrypt or decrypt the actual content files. By having the customer key stored inside the HSM and restricting system access to that key to only use the key within the HSM, the system provides customers full control over whether their content can be decrypted or not without the system ever having access to the customer key. This approach has benefits during key rotation because customers are able to define a "new key" while their "old key" is still active. During the key rotation process, the system keeps track of which key was used to encrypt each unique data key using a "key ID" for reference. When a user requests viewing a file, the system looks to see which customer key (old or new) was used to encrypt the data key and asks the HSM module to use that key to decrypt the data key so the system can then decrypt the file. Once all the data keys have been rotated (decrypted with the old key and re-encrypted with the new key), the customer can tell the HSM to delete the old key, and the rotation process is complete without the system ever having access to either the old or new key, and without the system ever being required to deny access to the files. Service providers who do not have unique data keys per file, and instead encrypt and decrypt files directly within the HSM server, would be limited by how much data they can process at any given time (throughput of HSM being defined by the rate at which files can be encrypted/decrypted). Since the system data keys are small, such as just a few hundred bytes each, the system may be able to process all data keys for a customer's entire service in a very short period of time (e.g., tens of minutes). Without this system in place, a system would potentially need weeks/months to do the same, or be limited to other key rotation processes, such as requiring the old keys to stay in service as long as the files need to be accessed.

Figure 40:
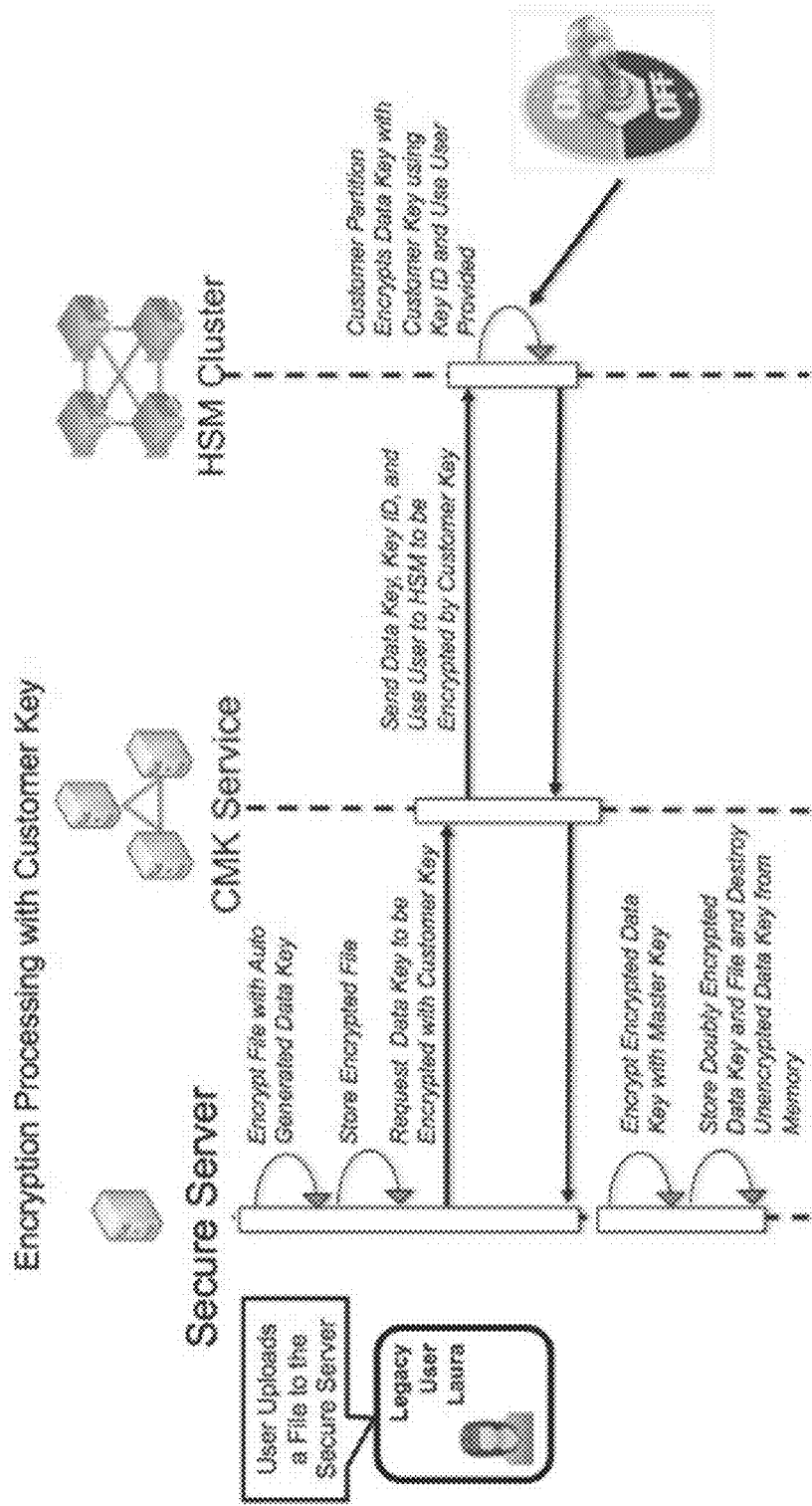
FIG. 40 depicts an embodiment sequence diagram showing process steps associated with customer managed keys. This type of diagram is often called a "Sequence Diagram." It shows the systems involved and the communications between such systems.

Referring to FIG. 40, a process for encryption processing with a customer key is shown, where a CMK service is inserted between the secure server and the customer HSM devices. Here, a user is shown uploading a file to the secure server, which encrypts and stores the file with an automatically generated data key. A request is then made to the CMK service for the data key to be encrypted with the customer key. The CMK service then sends the data key, key ID, and the use user to the HSM to be encrypted by the customer key. In embodiments, a "use user" may be provided to serve in a special role that can request the HSM to encrypt and decrypt data. However, the use user may be bared from any activity related to managing the encryption keys (e.g. view, disable, delete, or create), but they are able to ask the HSM to use a key based on the key ID the system passes in. In an example, each customer partition may have two types of users: (1) a Partition Owner who manages the keys (i.e. the customer) and (2) a use user who is able to call the HSM and have processing done for it without actually having access to the key values.

Figure 41:
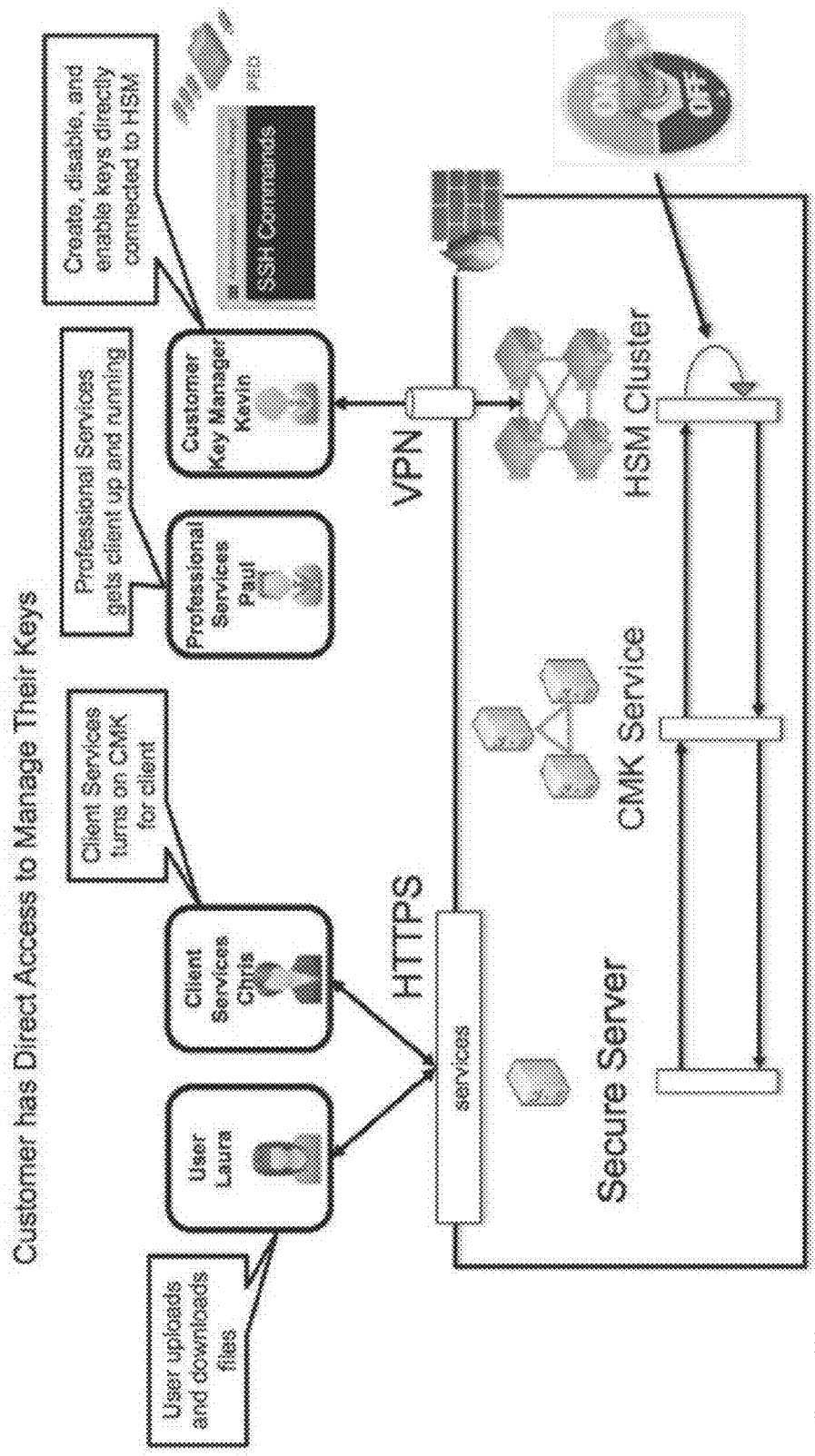
FIG. 41 depicts an embodiment top-level diagram showing how a user is provided direct access to manage their keys.

Continuing to refer to FIG. 40, the HSM then encrypts the data key with the customer key using the key ID and use user provided, which is then passed back to the secure server where the encrypted data key is encrypted with the master key. The doubly encrypted data key and content file are then stored, and the unencrypted data key from memory is destroyed. FIG. 41 shows a top-level diagram of how a customer has direct access to manage their keys, where a user uploads and downloads content files and client services turns on CMK for the user. In addition, professional services may be used to configure the system, where a customer key manager may create, disable, and enable keys directly through the HSM.

In embodiments, customer managed keys may be assigned at any level of granularity, such as at the organization level, per business group, at an exchange level, per content item, and the like, providing the highest level of possible control, and yielding the smallest possible exposure if any one key is compromised. In this way the secure exchange may provide customers with multiple-level CMK protection in order to prevent anyone from improperly accessing documents stored within the secure exchange environment. For example, a law firm utilizing the secure exchange may have many clients, each with many cases. Within each case there may be different aspects that need to be separately protected, specific documents that are particularly sensitive, and the like. Granular control of CMK enables the law firm to apply individual CMK to each of their clients, for each case within a client, to groups of documents, to collaborative exchanges, to individual documents (e.g., word processing documents, spreadsheets) or content items (e.g., photos, audio files). In another example, multiple organizational entities, acting in a collaborative relationship and sharing content through the secure exchange may implement levels of CMK control that not only includes granular control within each of their organizations, but for shared content, again at any level of granularity. For instance, some content may be CMK controlled by a first organizational entity, some by a second, and some jointly between the two. In this way organizations may utilize CMK to control protection to content from the intermediate entity managing the secure exchange, from other collaborative organizations, between departments, and the like, as well as to specific content. At all levels of CMK control there may be different individuals with control over keys. CMK may be applied at multiple layers, and amongst different collaborative entities. For instance, a manager of a department may have control of keys to content related to their department, but there may also be a company-wide CMK control over all company content, individual CMK control for a specific content item, and the like. By offering CMK at all levels of organization and content, the secure exchange maximizes the ability for organizations to protect their content against the threat that any one key or group of keys is compromised. In addition, CMK granularity enables different levels of access protection, providing a means for organizations or individuals to immediately block access to CMK protected content, acting as a type of 'kill-switch' or 'red-button' to deny access to all content protected through that key at that granular level of protection.

Customer managed keys may provide the ability for customers to control their own data encryption keys, where the customer managed keys are protected through DRM technologies. In addition to system-provided keys and customer keys needed in order to access the data, DRM protection may be utilized to increase the protection and the access control for key management. For instance, DRM protection for customer managed keys may provide access control that is controlled through a listing, a policy, and/or contextually (e.g., the user's location, the security level provided by a network connection).

In embodiments, the system may authenticate request messages at the application layer using a cryptographically secure keyed hash, such as HMAC-SHA1, which may enable protection from illegitimate requests.

Collaborative Customer Relationship Management

In embodiments, a collaborative customer relationship management (CRM) facility may be used in conjunction with a multi-party collaboration in order to track contacts and communications of participants. For example, CRM may be used in conjunction with a deal amongst enterprises, such as in putting together a merger, syndicated loan, and the like. A data room for a deal normally has all of the relevant documents, with rights and permissions assigned based on the role of individuals who support the deal (e.g., an enterprise user 1 can look at IP diligence folder X as part of Task Y from a due diligence checklist). As described herein, the data room may carry through a work flow of a deal from stage to stage, so that the documents not only get to the right people, but the whole process moves from stage to stage in an organized way. CRM may be included in this process, such as when the deal involves a 'sales' process or other process that benefits from storing information about the relationships of an entity to another entity, or to the individuals within the other entity, including tracking the interactions with such other individuals, the role and status of such other individuals, the opinions or positions of such other individuals, the plans of such other individuals, the need of such other individuals, and other relationship-relevant or project-relevant information. For example, in a big loan deal, individuals are responsible for filling out tranches of debt by getting other individuals to commit to making a portion of the loan. So, within the data room work flow, it may be good to have CRM information, such as contact information, but more importantly, information about the ongoing interactions with each contact person involved in the piece-by-piece building out of the transaction. (e.g., a CRM system may store information like the fact that "Person A at bank X is looking to take 20% of loan tranche Y, but he needs to look at documents P and Q, then get approval from his boss, Person B" and "Next steps include checking in with Person A and Person B", etc.). The CRM information can be consulted to develop an appropriate workflow, and to initiate a series of actions within an overall collaborative exchange environment that complete the workflow. The CRM facility may track interaction characteristics with respect to participants, gauge participant interest, control what content individuals are able to view and access, record conversations between individuals (e.g., conversations with potential borrowers and investors in a syndicated loan deal), and the like. The CRM facility may provide for communication and collaboration facilities, including live messaging capabilities, such as a secure messaging service, including instant messaging or associated with commercial instant messaging platforms, and the like. Integration services may be provided that enable users to embed messaging and directory functionality into third-party applications (e.g., word processing applications, presentation applications, spreadsheet applications, and various enterprise software applications) and workflows (including workflows associated with various functions of an enterprise, workflows associated with transactions, and various others). Messaging facilities may be collaborative, secure, and fully auditable (e.g., one-on-one, multi-party, blast, chat rooms, and the like). Control of permissions for communications between individuals may be controlled through preferences, determined by exchange participation, enabled through contact parameters, and the like.

In embodiments, the CRM facility may provide collaborative interconnection with individuals within a marketplace, such as a loan marketplace, such as in a centralized global network of organizations and their contacts, including borrowers in need of debt financing (e.g., credit); banks in need of business (e.g., deals, fees and league table status); investors/lenders in need of debt portfolio growth and/or corporate relationships; legal counsel in need of business and reputation; sponsors in need of corporate relationships, revenue, and reputation; and the like. Individuals within the marketplace may be provided contact information, such as the individual's organization role (e.g., borrower, arranger, investor lender, counsel, arranger and lender, bank lender), client relationship, client profile, status (e.g., active vs. inactive, interested vs. not interested, etc.), hierarchy of entities, roles and personnel, historical deal association, deal specific contacts, contact types and roles, and the like. The CRM facility may provide control facilities for contacts such that users are incentivized to maintain their own profiles and connect with other community members. The CRM facility may provide a secure collaborative environment where community members choose their own privacy settings and control how they interact and are viewed by others. The CRM facility may provide search criteria with respect to contacts within the system, invitation and solicitation features, visibility settings, advanced data mining, and the like, such as based on industry preferences.

IP Address and Domain Rule Based Access Restriction

In embodiments, a secure exchange facility with various features and functions described throughout this disclosure may implement access rules that utilize a combination of IP address, domain name, and the like, to restrict access to the secure exchange facility, such as where a business entity restricts access to a specified set of IP addresses associated with a specified domain name. For instance, an organizational entity (e.g., a business entity, governmental agency, or the like) utilizing the services of the secure exchange facility may provide a list of acceptable IP addresses for specified network domains that the secure exchange facility may then use to establish an access restriction rule. For example, the rule may be applied to ensure that any user accessing the secure exchange facility using an email address from one of the domains specified in the rule can only do so if the device through which the user is seeking access is utilizing one of the IP addresses specified in the rule for that domain. Similarly, a rule may be applied to ensure that any user accessing the secure exchange facility utilizing one of the IP addresses specified in the rule must be logging in using an email address that belongs to one of the domains specified in the rule for that set of domains, and the like. As a result, the organizational entity may benefit by restricting a user from accessing the secure exchange facility from a personal computer or other device that may be unauthorized or unsecure and downloading confidential or sensitive work documents. Similarly, such rules may restrict a user from accessing the secure exchange facility from their work computer and uploading confidential work documents from their work machine to an account that they can later access from a personal computer at home, and the like. These IP- and domain-based restriction rules may prevent users from sharing confidential work information (including with themselves, such as through alternate accounts) in such a way that the users can further share it with someone outside the business who should not have access to the information. For example, this type of IP-based or domain-based restriction may benefit a wide range of entities that are charged with avoiding leakage of confidential information, such as large financial institutions, secure facilities, government entities, and many others. In embodiments, these complementary IP- and/or domain-based restriction rules may work in conjunction with the organizational entity's information technology physical security. For example, companies that leverage a domain plus IP range rule are also likely to turn off their users' ability to plug devices into the USB ports. USB ports are one way for users to steal company information, and the IP- and/or domain-based restriction rules compliment the IT process that restricts USB stealing by also preventing an Internet-based approach to the same activity.

API Wrapper

In embodiments, the secure exchange facility may provide application programming interface (API) functionality, such as to provide various interfaces to secure exchange functions, components, modules, services, applications and the like that are accessible to other applications simply by calling the appropriate API. API calls may be public or private, used internally within the secure exchange facility or provided to outside business entities and users. The system may utilize language-specific APIs, such as a RESTful API, that makes it easier to integrate into or with various applications. In embodiments, the secure exchange server may provide various building block application components that are capable of interfacing through an API of the secure exchange server and through which an outside user may access one or more of the components, and/or assemble multiple components, to create or enhance a customized application, where the application maintains the security of exchanged information while running the application, or components thereof on the secure exchange platform or other secure server. Secure exchange services may be capable of using multiple versions of APIs, so that new services can be brought online before older versions of the service are taken offline.

In embodiments, the secure exchange facility may include or be provided with an associated software development kit (SDK), which may include components, functions, services, or the like that facilitate the development of applications that integrate with the secure exchange facility or that take advantage of the aforementioned APIs. In many cases, a developer may wish to have a program simultaneously interact with more than one API; for example, a developer may want an application to retrieve documents or files from various locations or deliver documents or files to various locations (e.g., storage locations on premises, cloud storage locations, and locations on a server of the secure exchange platform), but each of the various locations may have its own distinct API or set of APIs that is suitable for enabling communication and/or integration with the language(s), application(s), storage type(s), operating system(s), and other aspects of the computing environment of that particular location. To enable that capability, the secure exchange facility, optionally through the SDK, may provide one or more API wrappers to simplify interfacing with the secure exchange facility or various components thereof, such as through providing the ability to make multiple API calls through a single function of a single software programming language of a user. A given function in a given programming language may be mapped to various different APIs, so that the function is executed across multiple APIs and platform components but requires programming only once, in the native programming language of the application of the developer. Thus, an API wrapper may provide an interface for the user of the API wrapper that is less dependent upon the understanding of the internal workings of the functionality of the secure exchange facility. For instance, an interface with even one functional component within the secure exchange facility may utilize dozens of API calls. An API wrapper may encapsulate all of these API calls into software code ready to use (e.g., in Java, C, C++, C#, or Python, and the like). In an example, an API wrapper function getDocuments(connection, session, exchange) may wrap API calls to one or more HTTP APIs, where a program may now retrieve a list of all the documents from a particular exchange (e.g., exchange #12345) using a very short code instruction, such as (in a Python example): documentList=getDocuments (connection, session, 12345), instead of calling a long, complex URL using an HTTP method, such as a GET method with the cookie ssoGlobalSessionID and then parsing an XML result as Python objects, e.g.:

```
<?xml version="1.0" ?>
<documentListResponse>
  <status>
    <code>200</code>
    <message>Request completed fine, no errors</message>
  </status>
  <document>
    <id>11111</id>
    <indexNumber>1.1</indexNumber>
    <name>Document Name</name>
    <orderNumber>1</orderNumber>
    <version>ac3478d69a3c81fa62e60f5c3696165a4e5e6ac4</version>
    <createdBy>
      <firstName>John</firstName>
      <firstNameSort>John</firstNameSort>
      <lastName>Doe</lastName>
      <lastNameSort>Doe</lastNameSort>
      <organization>Company Inc.</organization>
```

-continued

```
    <organizationSort>Company Inc.</organizationSort>
  </createdBy>
  <createdOn>
    <milliseconds>1354013928000</milliseconds>
  </createdOn>
  <documentHash>0</documentHash>
  <extension>.pptx</extension>
  <fileHash>2e45oIO5+lCLXLlvzfHaSt4fNiA=</fileHash>
  <fileSize>1407779</fileSize>
  <hasNote>F</hasNote>
  <isBusinessProcessEnabled>F</isBusinessProcessEnabled>
  <isDeleted>F</isDeleted>
  <isFavorite>F</isFavorite>
  <isIrmSecured>T</isIrmSecured>
  <lastModifiedBy>
    <firstName>John</firstName>
    <firstNameSort>John</firstNameSort>
    <lastName>Doe</lastName>
    <lastNameSort>Doe</lastNameSort>
  </lastModifiedBy>
  <lastModifiedOn>
    <milliseconds>1402990995000</milliseconds>
  </lastModifiedOn>
  <mimeType>APPLICATION/VND.OPENXMLFORMATS-OFFICEDOCUMENT.PRESENTATIONML.PRESENTATION</mimeType>
  <noteRequired>F</noteRequired>
  <pageCount>0</pageCount>
  <parentId>222222</parentId>
  <pdfProtection>NOSAVENOPRINT</pdfProtection>
  <sharedResourceCount>0</sharedResourceCount>
  <sharedResourceId>333333</sharedResourceId>
  <submittedBy/>
  <submittedOn/>
  <submitterGroups/>
  <unread>F</unread>
  <versionNumber>3</versionNumber>
  <workspaceId>12345</workspaceId>
  <xmlLock>
    <contentLockStatus>UNLOCKED</contentLockStatus>
  </xmlLock>
</document>
...
</documentListResponse>
```

In embodiments, the API wrapper may be made available under an open source software license or similar licensing arrangement, making it easier for users to develop interfaces with the secure exchange facility, thus avoiding the inefficiencies of different users needing to create their own translation system, allowing users to contribute to the development or refinement of new or modified API wrappers, and the like. API wrappers may provide an improved method for integration with the secure exchange facility functionality, thus avoiding an interface that may be otherwise perceived as complex and difficult to use.

End-to-End Encryption

Figure 54:
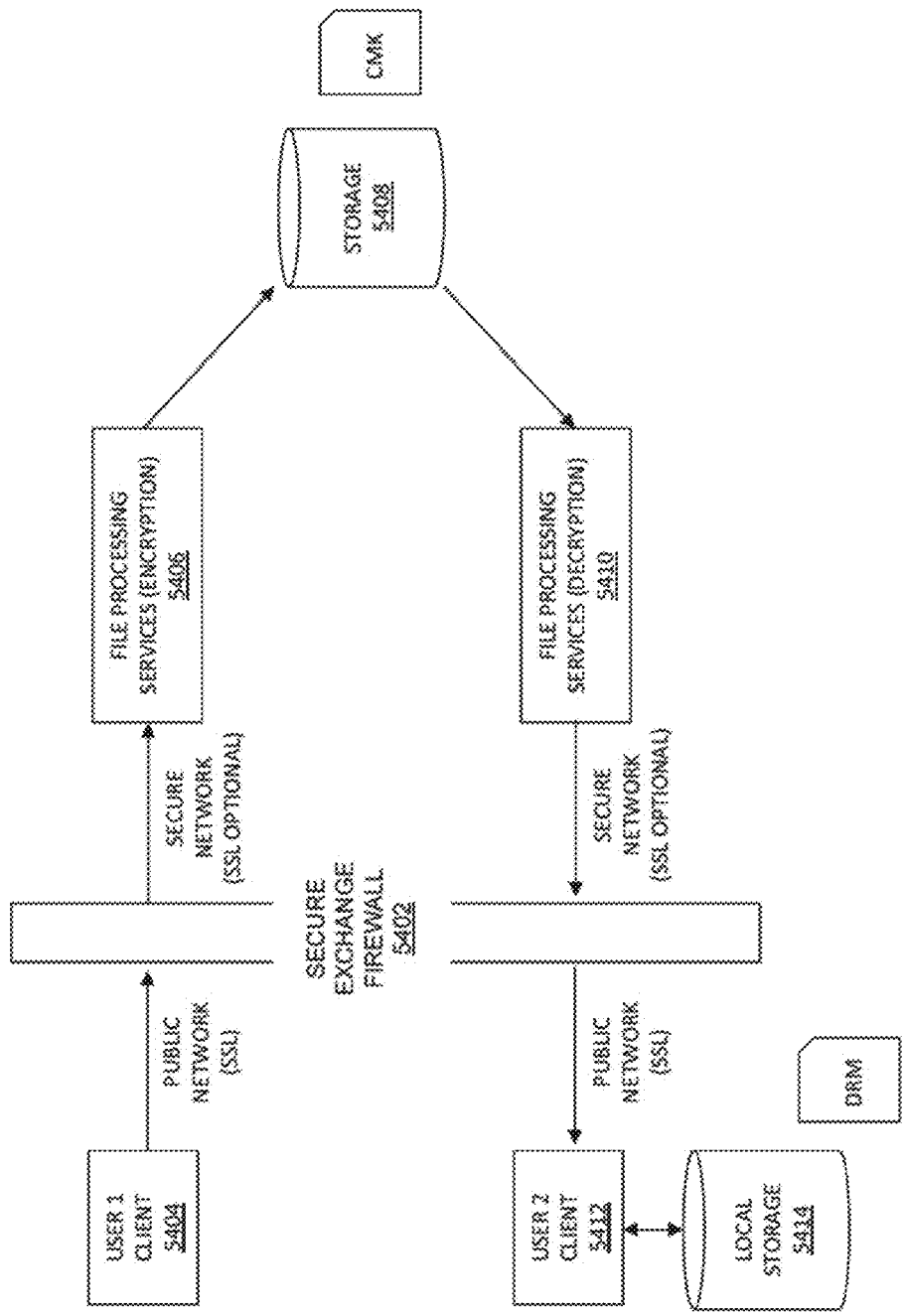
FIG. 54 depicts an embodiment workflow diagram for end-to-end encryption.

The secure exchange may provide end-to-end encryption as part of computer data content protective services as described herein, such as for not only protecting content being held at rest within the system, but in the transfer of content from a user client device, through the secure exchange infrastructure, and out to a receiving user client device. For instance, once a user initiates a file upload to the secure exchange, that computer data content may be encrypted and remain encrypted/protected for the rest of its lifecycle. With reference to FIG. 54, the secure exchange may utilize secure sockets layer (SSL) encryption while the document is in motion from the moment it leaves a first user client 5404 until it arrives in the secure network. The secure exchange may then apply various encryption technologies through file processing services 5406, including an optional CMK service as described herein, so that the document remains encrypted even while in storage 5408. Then upon a request by a second user client 5412 to download the content, file processing services 5410 may decrypt the content and transfer the file, such as protected through SSL encryption. In addition, DRM protection, as described herein, may be applied so that the document remains encrypted/protected even while stored locally 5414 on the second user client 5412, where the computer data content can only be opened by communicating back through the exchange system's DRM service where the user is authenticated and entitlements checked. End-to-end encryption protects a user's computer data content not only while the document is stored within the secure exchange storage 5408, but in transit to, from, and within the secure exchange, and optionally while transferred to a second user client 5412 through DRM protection even after the content has left the secure exchange and is stored and further shared.

In embodiments, the secure exchange system may provide functions including the use of block chain to document management, risk-based dynamic security for dynamically enabling features based on a hardware profile, mobile security multi-factor authentication for access management as a function of wireless detection or proximity, document management related to application building, and the like.

In embodiments, the secure exchange system may provide functions including one-button launching of a distributed content node stack, asynchronous services, disassembled storage of data as chunks, asynchronous notification process and integrated file upload and messaging facility, handling multiple mount points through a fair share scheduler, enterprise fabric where data taking actions may be based on classifications rather than policies, activity feeds and/or compliance fees for integration with a productivity suite, bringing IRM on Office Online (OO) extending for OO edit and viewing with Microsoft Office Online (e.g., protected document editing), reporting and analytics (e.g., providing deal-flow indicators with a view of raw data feeds to users to integrate with business intelligence systems), security incident event management (SIEM), limited admin, admin lease, ticketed limited admin, E-forms, deal marketing, deal management, IRM/exchange/protection-as-a-service, Anonymous IRM, exchange-facing customer-specific performance dashboards, multi-region DCM services on a content node, identity facility, enhancements to a customizable exchange system, and the like.

Block Chain Applied to Document

Block chain utilizes a distributed database that maintains a continuously growing list of data records that are protected, such as against tampering, revision, and the like. A block chain may utilize one central database split across many computers, such as may be used to certify transactions and, for instance, or to confirm that a transaction happened and that there is a record for it. In embodiments, block chain may be applied to content management, such as to certify transactions, operations, and the like. For instance, block chain could be used to prove a document is real, thus providing a way to certify the document. For example, block chain could certify that a user opened a document at a given time. Block chain may be used to perform analytics and provide a record of the analytics. Block chain may be utilized for document approval, for taking actions on a document, and the like. Utilizing block chain, content may be shared across a plurality of machines. This may be viewed as applicable in a similar way as an electronic "E-Pedigree" in a supply chain, where every change of record modifies the pedigree. This type of validation may be applied to documents within the system, implementing a highly distributed record management for a content system.

Block chain may also implement retention management and apply one or more policies based on the retention management. In embodiments, a document itself may not be in the block chain, but rather a hash of the document is in the block chain. Block chain may provide an alternative method for certifying content. In embodiments, the block chain may reside in a public database, a private database, or may be used in conjunction with a control facility (e.g., eSignature as disclosed herein).

In embodiments, block chain may be used with tagging, where, for instance, if a document is hashed, tags could be stored for that document, such as to classify a document as confidential. This could be applied to an application for referencing that document to check with the database to see how it is treated.

In embodiments, block chain may be used as a system of record, for example to have a passive component that serves as a system of record. A user may then be able to check a hash to see where it comes from, such as for the originator of document, transactions in the document, and the like. In an example, block chain may be applied to loan syndication applications, where a user could replace a contract of group policy in a syndicate of loans with a block chain type mechanism.

One Button Push for Launching a Distributed Content Node Stack

In embodiments, a facility may be provided for one-button push launching of a distributed content node stack. First there may be the provisioning of the content node by the service manager console, where the console includes interface screens that allow the user to discover available content nodes (either manually, such as by searching through a catalog, registry, file system, library, or the like that indicates what content nodes are available to the user, or by automated discovery of available content nodes). The service manager console may also have capabilities for registration of a content node on the service manager, so that a user can manage it. Once a content node is registered to the service manager, there may be interface screens of the user interface of the service manager console that allow the user to set various configuration options desired for the content node, such as assigning the content node to a particular business, assigning resources on a content node to particular projects, configuring the settings of a content node (such as selecting what data or metadata on the content node will be visible to an intermediary, such as one performing orchestration services as described throughout this disclosure, and what data or metadata will be accessible only to the content owner, selecting encryption settings, assigning key management settings, and the like). Once a set of content nodes are thus configured, such as nodes for a business enterprise to be distributed in several locations, the collection, or stack, of content nodes may be launched, such as by a single click of a "launch" button or similar feature in the service manager console. Upon such launch, there may be automation, executed in software, to create and configure the stack, including configuring, based on the settings configured in the service manager console, each content node and processes that will be performed on it, such as to enable the orchestration layer and the content data node itself. In embodiments, this automated launch and configuration may be realized utilizing virtual machines and virtualization layers through the creation of a virtual stack, which may access resources of an entire set of servers, and the like. In this way a user may go from blank virtual machine images on each of the servers to the installation of a stack of properly configured content nodes on those servers, adapted to work with the orchestration services described herein, in a one-touch deployment.

Disassembled Storage of Data as Chunks, Rather than as Files

In embodiments, the secure exchange system or server may provide for the storage of data in chunks rather than as files. One way of storing a file is to receive it in chunks and then assemble the chunks back into files for storage. Alternatively, the system may store each chunk separately into a data store. When the file is to be accessed/downloaded, the system then takes each of the chunks from separate stores and assembles them into the file. A map of where various chunks are stored, and how they are to be arranged to create a file, may be stored separately from the chunks of data, such as by an intermediary or host of the services described herein, with separate encryption, so that it may be made difficult to reassemble the chunks without obtaining secure access to the map of chunk locations. In embodiments, when the system uploads the file, it separates the file into chunks and then stores each chunk along with a map of the locations of the chunks and the sequences of the chunks for the file. At rest, the chunks may be distributed, and individual chunks may be of a size that makes it difficult to comprehend the content of the file without having other chunks. In embodiments, only when the file is downloaded are the chunks assembled into files. In embodiments, the system may store a file entirely disassembled. Another advantage this provides is to better enable scaling while using various kinds of storage (such as being able to use space-limited object stores that only store 5 GB, for example). By keeping data stored in smaller chunks, the system may avoid hitting hard stops or latency in the process of distributing content out to stores.

Distribution of the chunks also may make the system less vulnerable to attacks. In embodiments, the system may have separate keys to different partition areas where the chunks are stored, so keys could be utilized below the file level, as well as at the file level.

Another advantage to chunking is that if the system detects downloading at the chunk level, it could be an indicator of hacking (as compared to downloading the file itself, which a normal user would do), because a hacker (including an automated hacking program) might not be able to distinguish readily between chunks and files. Also, the orchestration services may operate at the chunk level, such as for watching and tracking access to chunks, such as to determine that chunks are being accessed when assembled as files, rather than individually.

Chunking may also allow the ability to manage the content at the chunk level, such as having very high priority chunks and lower priority chunks. For example, chunks of conventional or boilerplate text might be given low priority, while chunks of highly proprietary content, such as trade secrets, could be given high priority. Also, one may use the chunks in the presentation of the content, such as at the level of a secure viewer, such as on a mobile device. For example, the system may present the chunks in the viewer chunk-by-chunk, such as to help enable access controlled viewing. For example, where there is a touch screen viewer, such as on a tablet or smart phone, the viewer may be enabled by the system to view only the chunk that is currently being touched in the view screen.

In embodiments, content may be uploaded and downloaded between a user and the secure exchange server as a file or in chunks, such as all at once or in sessions. For instance, content uploaded to the secure exchange server may be uploaded in chunks. In this instance the process may be a continuous process where the entire content comprising a plurality of chunks may be uploaded at once. Alternately, the content may be uploaded in sessions, in groups of chucked content, and the like. If an upload is interrupted, the process may be continued at another time. Continuing an interrupted upload may be executed more easily because the content is being uploaded in chunks, as each chuck may be stored separately and thus treated as a separately partitioned stand-alone partial content that may be treated as an individual content item by the system. Thus restarting an upload may be made easier by the process of chunking the content.

In embodiments, the process of chunking content may include the process of random-access encryption. Storing file chunks as separate objects may cause inefficiency in accessing the whole file, and especially in accessing parts of the file, as decryption must proceed from the beginning of the file, or of the separately keyed chunk that contains the desired beginning offset. It is desirable for client applications to work with large files (e.g., stored in Object Store) in parts, for both upload and download, such as from an asset service. However, reliance on an encryption mode (e.g., Cipher Block Chaining (CBC)) that requires encryption and decryption starting from the beginning of the object, it is necessary for the Asset Service to maintain and use a manifest for accessing the file. It may be inefficient to serve a portion of the file, and to assemble uploaded chunks into a contiguous object. There are other encryption modes, such as Counter (CTR) or cipher-text stealing (XTS), which allow random-access into a data segment (e.g., modulo a block boundary), for both encryption and decryption. Using one of these modes, uploaded "chunks" of an object could be independently encrypted using the same key, with the final object consisting of a concatenated series of chunks. When downloading, the client may request any byte range (e.g., again, modulo block boundaries), and decryption could proceed from that point on.

In embodiments, a unique, cryptographically random key may be generated and used to encrypt each object. Keys (e.g., with the exception of key encryption keys) are not typically reused with the same data and Initial Value (IV). Dependencies on the cipher block size may be imposed on the client. For instance, the client may be required to begin each chunk on an exact boundary corresponding to the start of an encryption block or, in the case of CTR, the first byte at which a new counter value is used. And the length of each chunk except the last must be an integer multiple of the block size. The final chunk need not end on a block boundary, and it should not be padded out to a full block. A dependency on the IV/counter value may be imposed on the client. In practice, this means that the beginning offset of each block within the overall file must be provided, so that the counter can be calculated from it, and set to the correct value, which depends on its position within the complete file. Underlying Object Store requirements may be imposed on the client. For example, the client may be required to choose a chunk size of at least 5 MB, for all but the last chunk of a file upload (e.g., 5 MB is the minimum chunk size for use of a multipart upload scheme).

In embodiments, "chunks" of a file may be allowed to be uploaded independently, including concurrently, making use of Object Store functionality to "stitch" together all portions into a single, contiguous object. Dependency may be removed to maintain Asset Service knowledge of the uploaded chunks. Ranges of any (e.g., large) object may be allowed to be accessed randomly, such as without having to read or decrypt from the start of the object. An encryption mode may be used which doesn't alter the length of the file, of any separately encrypted chunk of the file, and the like.

In embodiments, a cryptographically strong random encryption key may be generated (e.g., of parameterized size, such as 256-bit/32-byte default), and a similarly strong random Initial Value (e.g., also of parameterized size, such as 128-bit/16-byte default, corresponding to the AES block size), such as at the start of a single-stream file upload, when a client-initiated chunked upload is requested, when it is determined that a single stream upload of a large file would be required to span multiple objects, due to Object Store constraints (e.g. Swift's 5 GB object size limit), for each non-file object to be stored in the Object Store (e.g. Asset metadata), and the like. A per-object key may be encrypted in turn with any master and customer-managed keys, such as using accepted practices and code. The encrypted per-object key may be stored (e.g., plus the IV and cipher parameters) for later use in decryption, in encryption of subsequent chunks, and the like. For each chunk to be encrypted (e.g., including the first), the counter value may be calculated using the formula where the counter equals a counter plus a block offset, where the block office may be a byte offset (e.g., much larger than 4). Since the block size may be 16 bytes, the block offset may be obtained by dividing by 16, shifting right 4 bits, and the like. When all chunks have been encrypted and stored, the chunks may be committed in a manner specified, such as by a Object Store API, so that all future accesses will be with respect to the complete object, no longer as individual chunks. If retrieval of a byte range that is not block-aligned is allowed, then the Asset Service may need to begin streaming (e.g., decrypting) from the nearest previous block boundary, discard the first bytes until the client's requested offset is reached, and read extra bytes beyond the desired length (e.g., the same number as were discarded).

Figure 59:
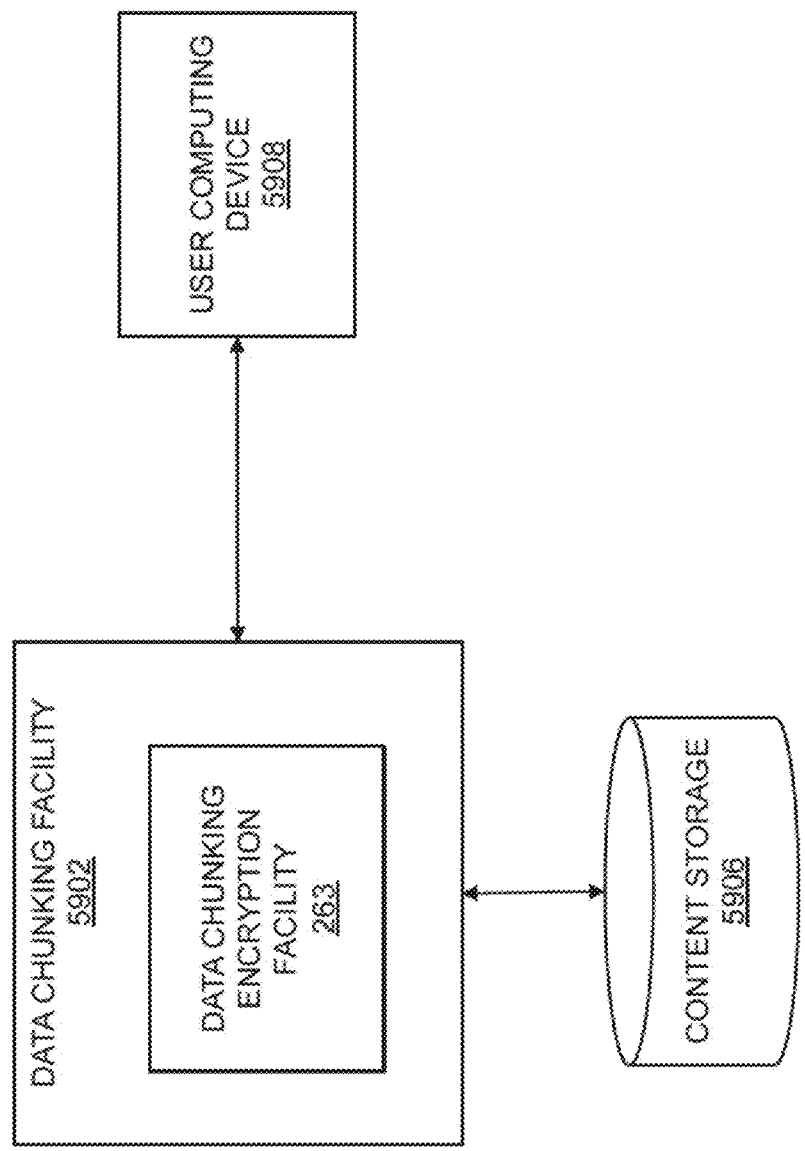
FIG. 59 depicts an embodiment of a data chunking facility.

Referring to FIG. 59, a data chunking facility 263 may be provided by the secure exchange server to partition an uploaded computer data content from a user computing device 5908, such as from one of a plurality of users of the secure exchange server. Each partitioned segment, also referred herein as a chunk, may be encrypted by a data chunking encryption facility 263 and stored in a content storage facility 5906, such as on the secure exchange server, through the secure exchange server in the cloud, through the secure exchange server on a data content facility at an enterprise associated with the user that uploaded the computer data content, and the like.

In embodiments, a secure exchange server hosted by an intermediate business entity may establish a user login data authentication procedure that allows one or more users through at least one client computing device to access the secure exchange server, wherein communications between the secure exchange server and each of the one or more users is through a communications network, wherein the one or more users comprises a user of a second business entity. A data chunking facility may be provided which is adapted to receive and segment a computer data content transmitted from a client computing device of the one or more users, wherein the received computer data content is stored as a plurality of encrypted computer data content segments. Computer data content may be received from the user of the second business entity, wherein the received computer data content may be segmented and each computer data content segment may be separately encrypted to form a plurality of encrypted computer data content segments. The secure exchange server may store the plurality of encrypted computer data content segments.

Asynchronous Notification Process and Integrated File Upload and Messaging

In embodiments, the system may provide for an asynchronous notification process and integrated file upload and messaging facility, such as for uploading files to the secure exchange system or server from a user. When the file is uploaded, a message may be uploaded along with the file, and they may be uploaded together, such as in a single call. In embodiments, when a user is uploading, the message may be transmitted in multi-path, such as to different contact elements for a recipient, such as two different email addresses, or an email address and a file transfer location.

The system may also initiate an asynchronous process where the system continuously messages to the user interface what is happening to the file, so the user can determine actions that are available with respect to the file (e.g., can the file be downloaded?, can it be wirelessly scanned?, and the like). The user may then change the user interface to view whatever they want from this asynchronous notification process.

In an example, a message plus the file is sent, and if the message is returned invalid, it gets sent back. Otherwise it may go to a service associated with a workflow, such as an asset service, and it may be persisted within the system, after which a next workflow step may be requested to create a next task. The system may execute the task and publish the status back onto the registration region, so that a user may poll for the status. Processing may be for search indexing, for a virus scan, for conversion of a document to PDF, and the like. A user may know what part of the process the workflow is in at any time. The file and message may be submitted together in one call, as opposed to in separate messages. In embodiments, the workflow steps may be changing and/or may be application-specific. In embodiments, the system may let the application indicate what it needs to know (e.g., upload, index, virus scan, and the like). The workflow may be based on the type of asset. A folder upload versus a file upload may have different processing. The system may not have to do a virus scan on just creating a folder.

Figure 65:
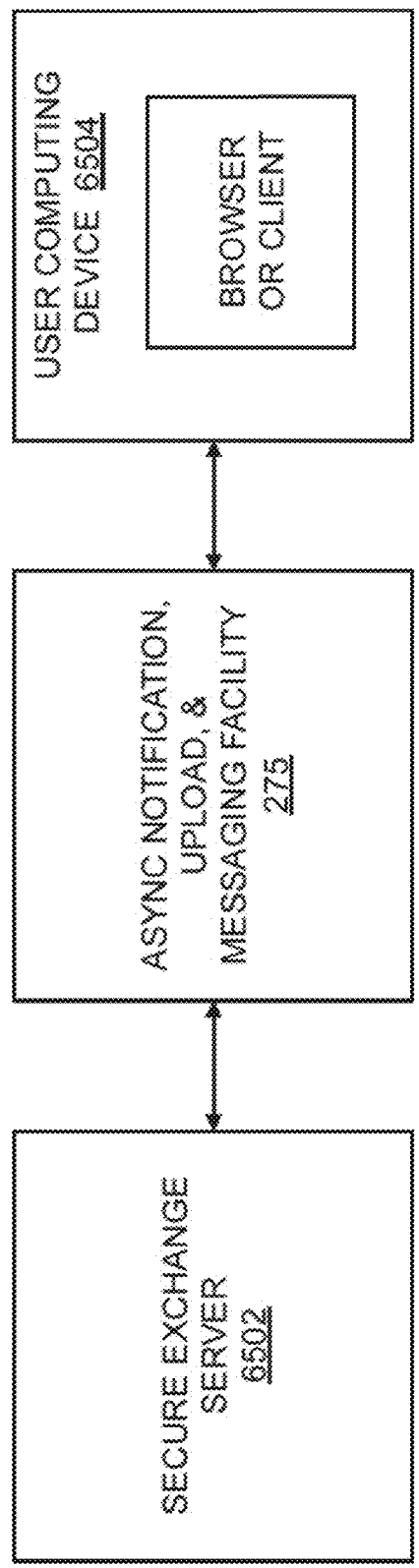
FIG. 65 depicts an embodiment of an asynchronous notification, upload, and messaging facility.

Referring to FIG. 65, an asynchronous notification, upload, and messaging (ANUM) facility 275 may provide for communications between a user computing device 6504 and the secure exchange server 6502 (e.g., the orchestration layer), where a file message may be uploaded along with a file (e.g., uploaded together), such as in a single call. In embodiments, only approved applications, such as provisioned with a shared secret, may be allowed to make asynchronous requests. Signing may rely on generated keys that are automatically rotated (e.g., frequently, such as once per hour). A signed ticket may define identity, content, and action parameters. In embodiments, a data node may validate a signing, but not provide data driven authorization. In embodiments the ANUM facility may first establish a webhook with an authorization location at the secure exchange server. The client computing device may then establish a session and request an asynchronous service through the ANUM facility, which passes along the request to the secure exchange server. The secure exchange server may then make calls to the ANUM facility that then establishes a user asynchronous messaging connection with the client computing device.

Security Incident Event Management (SIEM)

Security information and event management (SIEM) systems (as well as related systems such as security information management (SIM) and security event management (SEM) systems) provide real-time analysis of security alerts ("events") that are generated by network hardware (e.g., firewalls) and software applications, such as to allow security administrators to monitor and help manage user and service privileges, directory services and other system configuration changes, audit logs, review and respond to incidents, and the like. For instance, the system may provide activity feeds on certain events, such as when a user accesses a document, where the system administrator receives immediate notice in an administrator dashboard or similar workspace. In embodiments, the system may provide a SIEM feed (e.g., in a real time notification) to a SIEM system, with respect to security-relevant events, such as accessing a file, sharing a file, sharing a file outside the organization, sharing a file having sensitive content, sharing a file with a large number of addresses, or the like.

In embodiments, there may be a data store associated with a customer, where the system may include user reports, such as activity data (e.g., compliance for what a user is doing as well as activity relating to particular assets).

In embodiments, the SIEM system may have connectivity to third party SIEM systems (e.g., an interface to Splunk, Arcsight, and the like), such as where the third party SIEM system consumes system events for its dashboard (e.g., notifications indicating activities of users or relating to assets, such as in communications or sharing between companies or systems). This may become a mechanism by which, through APIs, a user may find out if there were any new documents created relating to a certain category, including that the person in the other company has done something in that category. Events may be sent to an external system via APIs, so that the events can be treated as feeds, such as event feeds, by the third party system. The system may provide granularity to the events, such as by allowing another system to configure the API to give it certain types of events, allowing granular wrappers for particular kinds of events, and the like. In embodiments, analytics may be included on an activity feed coming from the system in order to develop a better view of activity (e.g., a client may know documents are ready for review as those are stored in the system, and an event is fed into the API of the SIEM). Analytics may identify patterns in the activity feed, such as relating to what assets are most frequently accessed, or the like.

Limited Administrator

In embodiments, the orchestration services described throughout this disclosure may be used to enable the provision of a limited administrator facility, which may allow the system to provide a custom level of administrator control to companies, groups, users, and the like. For example, the capability of the system to allow some parties to access content on a content node, while other parties can view activity on the node without having access to content, allows the designer of a particular system to enable and allocate administrative privileges with this distinction in place.

For example, in many IT environments, there are certain operations that only the system administrator can perform. However, customers may want some instant controls, including on the operations an administrator can perform, such as to enable instant loss of access if a person leaves a company. The system may provide the ability to provide limited administrator facilities to a user, and if an enterprise integrates the system with its own administrator system for its IT environment, the system may enable provision of specific, limited administrator functions, such as being invoked to deal with permissions whenever someone leaves the enterprise.

In embodiments, the system may provide a limited administrator facility to give administrators visibility to all activity occurring with respect to files or other resources on a system, but the administrators may not be provided access to read any content. Similarly, an auditor or compliance office may be given oversight as to what documents have been accessed, by whom, and when, without being able to access the documents themselves. Each company, group, individual, and the like, may decide what permissions different kinds of parties can have, and may constrain access or rights, so that they do not exceed such permissions. The system may provide this function across the whole organization, by business unit, by group, for partners, and the like. As another example, privileges may be assigned so that a partner business may access (e.g., through a multi-tenant system) and manage passwords, but only for the customers the partner business supports, and nothing else.

Administrator Lease

In embodiments, an administrator lease facility may be provided, such as in association with the limited administrator facility. The administrator lease facility may enable the system to assign time-limited administrator privileges, which may be either full administrator privileges or limited administrator privileges as described above. For instance, a user may want to be able to enable an administrator to have temporary permissions to perform certain administrative set-up and configuration operations, such as to configure a content node or a stack of content nodes, such as for purposes of a project, to set permissions for a stack of content nodes, to organize workflows for a process that will use a stack of content nodes, or the like. In embodiments, the system may allow managing administrator privileges, such as by having an administrator lease that lets the administrator perform given operations, but only for a certain time (e.g., permission to perform that operation for only an hour) or only until a defined set of activities are completed (such as launching a stack of content nodes for use by users). In an example, a compliance officer or auditor may be provided limited administrator privileges, such as managing passwords, and the like, where the passwords remain valid only for a limited period of time, after which the system automatically terminates access by the administrator.

Ticketed Limited Administrator

In embodiments, a ticketed administrator facility may be provided, such as enabled by the capabilities of the limited administrator facility, where limited functionality may be provided to an administrator through a ticketing facility. For instance, a user may enter a customer's workspace in the system, where the system then prompts the user to obtain a ticket that will provide limited access to undertake administrative operations in the workspace for the duration and purposes indicated by the ticket. For example, in embodiments a customer may use the workspace to provide a ticket that indicates the need for a specific task to be completed, such as setting up a stack of content nodes, configuring a workflow, or the like. By the customer saying "do this for me," a separate authorization is provided to confirm that the specified task is to be done on a specific request, rather than being initiated ad hoc. In embodiments, the ticket may serve to specify permissions, tasks, actions, and the like that the administrator can perform under it. Upon completion of the same, the system may close the ticket and automatically revoke the temporary privileges offered by the system. In embodiments, the system may provide documentation of the request; serve as an indicator of when the task was complete; and the like.

Deal Manager Groups

In embodiments, a deal manager facility may be provided, which may use the capabilities described herein to allow access to be managed for groups of users who are associated with the progress of a transaction, such as from initial conception of the transaction, to solicitation of interest by parties, such as investors, to pre-transaction activities, such as negotiation of term sheets, negotiation of agreements, and the conduct of due diligence activities, through the completion of a transaction. Various groups may be involved in completing the transaction, such as legal personnel, accounting personnel, business personnel, and technology personnel, and each group may undertake different activities during the progress of a transaction, requiring access to different content, such as legal documents, accounting documents, contracts, technology documents, and other types of content. Over time, the makeup of the groups who need to undertake activities changes; accordingly, the facilities described herein may enable management of the changing makeup of the group, including assigning appropriate levels of permission, and the like, for each user or group. For example, the right to access content on a content node may be allocated to an appropriate group during a phase of the transaction, while other users or groups may have the right to view activity taking place on a content node, but not see the content itself. Typically a company has deal teams assigned to each function of a transaction (e.g., an accounting team, a legal team, a corporate development team, a technology team, and the like), as members to the group come and go from the deal team they may gain and lose access, either to content, or to reports of activities undertaken on content nodes. In embodiments, the deal manager facility may operate globally, such as managed at the business group level, and the like.

Security-As-A-Service (IRM/Exchange/Protection-As-A-Service)

In embodiments, the methods and systems described herein may be employed to enable a security-as-a-service facility, which may be provided to users of the secure exchange facility, such as in the form of a plug-in to a customer's web facility that provides protected service. The security-as-a-service facility may provide IRM-as-a-service, secure exchange functionality-as-a-service, protection-as-a-service, and the like, enabling a third-party to benefit from the secure services described herein without the third-party or a customer of the third party having to login to the secure exchange facility. In embodiments, the security-as-a-service facility may utilize the protection and auditing aspects of the secure exchange facility for any web site or other resource that needs to protect content, allowing third-parties to provide a facility for their users to securely protect documents, share documents, and the like. For example, a service from within the secure exchange platform for allowing access to content, reporting on access to content, enabling sharing of content, reporting on sharing of content, or the like, may be provided as a separate service that is accessible from a third party environment, such as through an application programming environment, without requiring users to use the service manager console. Protection of that document on the third-party site may be executed without any other need for a secure exchange login. For example, the secure exchange facility may provide an IRM-as-a-service as a plug-in to a third-party, where the secure exchange facility provides IRM-as-a-service, but not access to the back-end functionality to secure exchange collaboration. Unbundling protection aspects of the secure exchange facility capabilities may allow third parties to benefit from secure exchange facility services without the need for users to know they are being protected through the secure exchange facility. The security-as-a-service facility may be enabled, for example, by providing direct interfaces, such as application programming interfaces, to particular services, such as IRM services, from the secure exchange facility, as an alternative to providing a user with access via the service manager console.

In addition, the security-as-a-service facility may provide other services, such as an analytics-as-a-service, providing protection around viewing analytics, or other secure exchange facilities. For instance, analytics may be provided in the context of IRM protection, such as collecting information about events that involve viewing content (e.g., access location; access attempts; metadata about interactions between the recipients and the file, and the like).

Anonymous IRM

Information rights management (IRM) systems typically track users by identity, such as by a user name that is associated with a real name of an employee or other individual. However, in some cases it may be desirable to allow parties to access information anonymously, while still providing some amount of control over access and reporting. Thus, in embodiments, the methods and systems for a secure exchange facility provided herein may enable an anonymous information rights management (IRM) facility, where a recipient is allowed to obtain access to a resource (which may be limited access, such as read only access, or access only from a known location), but as long as the user satisfies any other required conditions on the access (such as being a user from a given company, a given domain, a given jurisdiction, or the like), the user does not have to provide further identification, such as a username and password, in order to access an IRM protected document. To enable anonymous access, permissions in the secure exchange system may be set to allow access content, such as on a content node, without entry of a user name, password, or other individually identifying information. Information about the identity of the user may be not collected, or it may be collected anonymously, but the system may still be able to identify and condition access upon other information, such as where the document has been, from what domain it was accessed, from what location it was accessed, where it was shared, when it was accessed, or the like. Information about access may be tracked on an aggregated basis, such as reporting activities for a group of users, without identifying specific users; for example, a report may be provided that, for example, twenty-five users from a company accessed documents relating to a deal, without indicating exactly which users did so. Similarly, a company may allow customers to have anonymous access to documents relating to a product or service, while maintaining the privacy of the customers. Anonymity may be enabled, for example, by the separation of access rights for content on a content node from access rights to metadata about the content node. For example, certain parties may be allowed to access the content anonymously, while others can see only metadata that reports on the general nature of access, without providing any information about individuals. Anonymous IRM may be of value in the context of a transaction, such as where each party may be willing to have the other party be aware of general levels of activity relating to content (e.g., that the content has been reviewed), but not about exactly which people have accessed the content.

Figure 62:
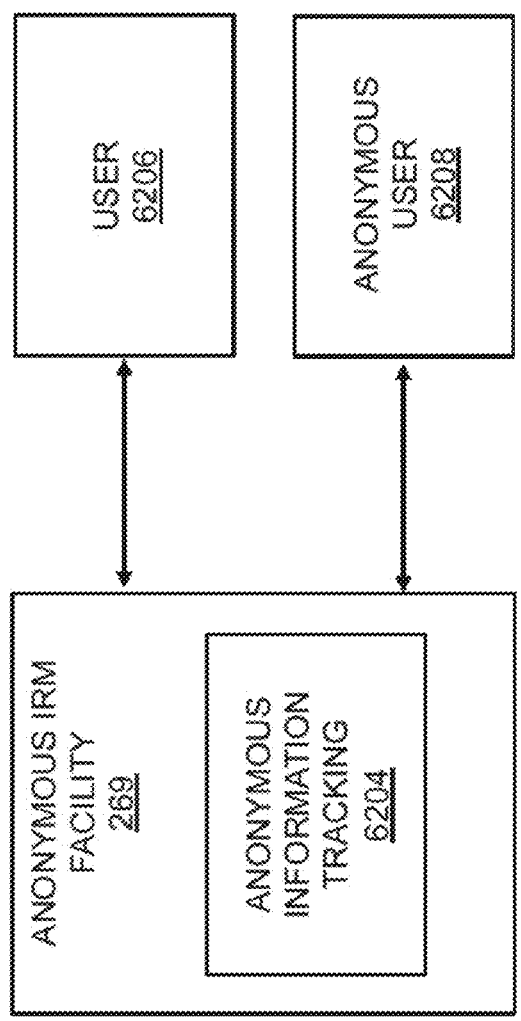
FIG. 62 depicts an embodiment of an anonymous IRM facility.

Referring to FIG. 62, an anonymous IRM facility 269 may provide anonymous information tracking 6204 for computer data content provided by a user 6206 to an anonymous user 6208. In embodiments, a secure exchange server hosted by an intermediate business entity may establish a user login data authentication procedure that allows each of a plurality of users through at least one corresponding client computing device to access the secure exchange server. Communications between the secure exchange server and each of the plurality of users may be through a communications network, wherein the plurality of users comprises a user of a second business entity and at least one anonymous user. Data relating to a user login authentication for the user of a second business entity may be stored by the secure exchange server. Computer data content from the user of the second business entity may be received, and an indication of permission for the anonymous user to access the computer data content through an anonymous information rights management (IRM) facility hosted by the intermediate business entity may be received from the user of the second business entity. The anonymous IRM facility limits the retention of information about the anonymous user, and the indication of permission comprises at least one anonymous access condition. A request to access the computer data content by the at least one anonymous user is received; and access to the anonymous user to the computer data content, through the anonymous IRM facility, may be granted by the secure exchange server, wherein retention of information about the anonymous user is limited and the access is granted based on the at least one anonymous access condition.

Exchange-Facing Customer-Specific Performance Dashboards

In embodiments, an exchange-facing, customer-specific performance dashboard facility may be provided for tracking, analyzing, reporting, and the like on the performance of a secure exchange for a particular customer. The customer-specific performance dashboard facility may enable the system to monitor what functions a customer is using and how the system is performing. For instance, the performance dashboard facility may employ tools to measure the response time for specific business transactions, and those can then be linked to a domain, organization, user, group, functionality, and the like. The system may be able to monitor and parse tracking of functional performance of the exchange, such as by geography, mount point, business group, and the like, such as to provide an indicator as to areas in which the performance of the exchange could be improved, such as by adding more content nodes, adding more bandwidth for data exchanges, adding more personnel to undertake the activities that are being performed on the exchange, or the like.

Sales and marketing teams may use reports from the customer-specific dashboard performance facility to support the case for contract renewals. The performance dashboard facility may enable the system to enter into the more difficult conversation when a customer is dissatisfied, where the performance dashboard facility provides quantitative data on how tools are being used and how they are performing. For example, one may be able to query the secure exchange system and provide metrics in the dashboard, such as on the average response time to known incidents. This capability may help a sales team to describe performance in broad terms. For example, a sales team, armed with the quantitative data from the performance dashboard facility, may be able to address client issues more effectively, such as the system responded with "overall 98% of interactions were under 30 seconds", and the like, providing quantitative data about actual performance.

In the case of a sales-as-a-service or software-as-a-service (SaaS) company, the dashboard performance facility may be able to give updates to a customer for enterprises they serve. The dashboard performance facility may also feed information into incident management dashboards. The system may retrieve the response time data, extract and correlate the data, and overlay the incident data to identify and explain irregularities. When irregularities are revealed, a flag may be raised, allowing the system to act on it.

Identity Facility

Figure 63:
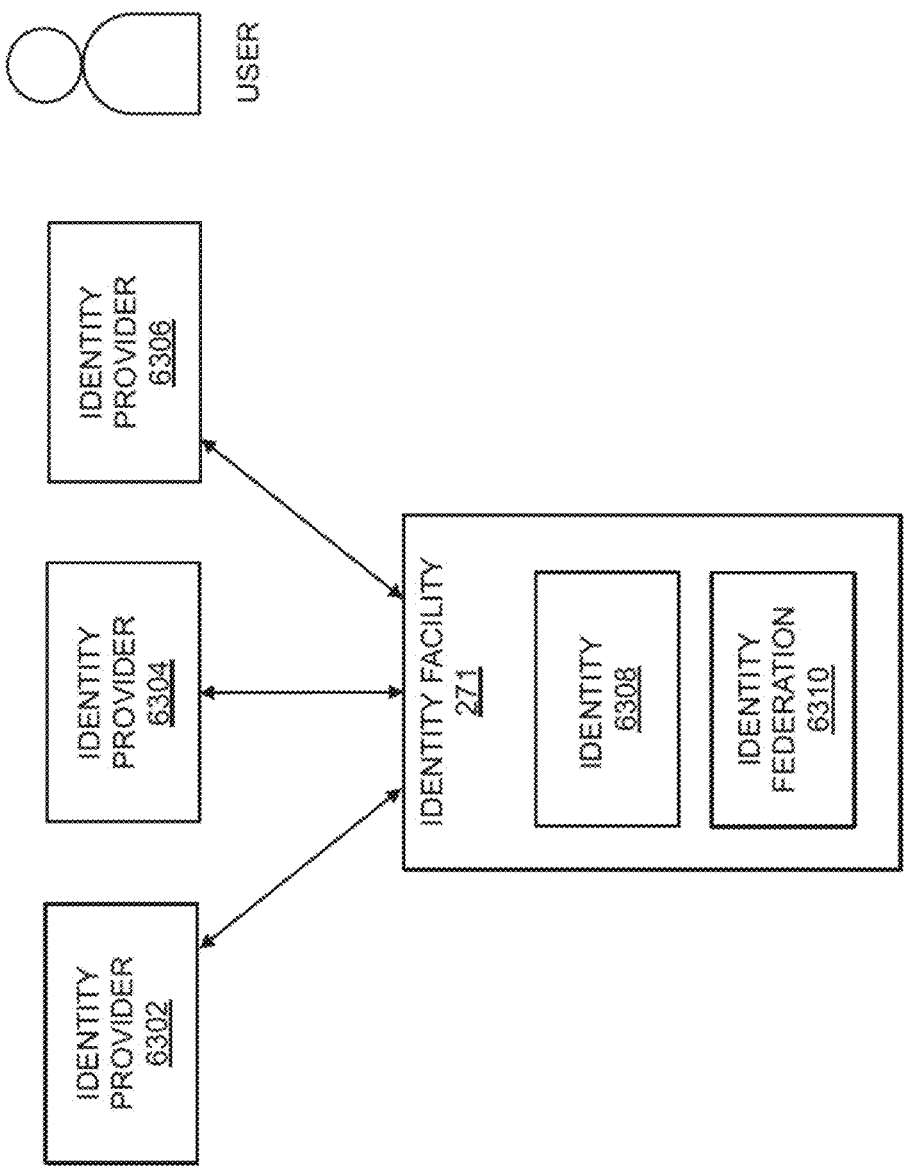
FIG. 63 depicts an embodiment of an identity facility.

Referring to FIG. 63, in embodiments, an identity facility 271 may be provided for unifying a plurality of single-sign-on (SSO) processes/technologies together into one identity 6308, such as in the establishment of an identity federation 6310 for the user. For identity, companies may act as identity providers (IdP) 6302, 6304, and 6306 where each may be executing different SSO technologies. The identity facility may enable different SSOs, but still have a person appear as one user to the system. For instance, to get access to a first exchange and a second exchange, a user might have different SSOs, but want to tie all their SSOs to a main SSO process. In embodiments, a secure exchange facility may thus obtain inputs from one or more identity providers, which may manage one or more identities for a single user, such as correlating various user names and passwords, so that a user may use an SSO. In embodiments, the identity facility may be deployed as a service within the secure exchange environment described herein, or it may be accessed, such as by using application programming interfaces, through a networking environment, such as by accessing identity-as-a-service in the cloud.

In embodiments, an identity provider may provide a user authentication service that maintains accounts (e.g., unique identities) for users that it can authenticate. An IdP also may provide a method, such as a web page, for its users to log in (e.g., authenticate), which may be done using passwords, multifactor authentication technologies, and the like. In a Federated Identity system, an IdP may produce security assertion markup language (SAML) authentication (response) assertions, which are digitally signed statements of authenticated identity. Identity federation may establish a trust relationship between multiple, distributed Identity Providers, such as allowing for a plurality of IdP realms (e.g., a user authentication domain served by a single Identity Provider, which uniquely identifies each user that it can authenticate) to be administered independently of all others. In embodiments, a SAML authentication standard may be used by federated Identity Providers to provide proof of Identity claims (e.g., assertions) to relying applications and services.

In embodiments, the identity facility may include an identity store (e.g., an asset service), which may provide a virtual content node service that is used to manage Identity metadata, such as Personally Identifiable Information (PII), including users' names, email addresses, and other attributes. Exchanges between users and the identity facility may include attributes of an Identity that are unique to an individual person, such as name, address, telephone numbers, email addresses, identification numbers, and the like. In certain jurisdictions, PII must be protected and handled using methods or locations that are different than other types of data. Identity attributes may be subject to data access and locality governance rules. Data may be exchanged through a bearer token, a nonce, or randomly generated sequence, generated by the Session Service, issued to application sessions whose user and application have both been authenticated. A Bearer Token may be provided in service requests made by the application on behalf of the user, such as having a specific timeout duration.

In embodiments, the identity facility may provide an identity service to the orchestration layer of the customizable secure exchange system, as disclosed herein, that assigns a user identifier (e.g., UUID) to each user encountered, and maps the user identifier to and from an Identity (e.g., Realm+User ID). The identity service may manage an identity data model for the user identity and synchronize the identity store across orchestration layer regions, such as in support of consolidation of identities. In embodiments, the identity store may be implemented as an asset type with an asset service, allowing identities to be stored on any content node where asset service and location service messages may be used to maintain and retrieve identity attributes.

The identity facility may support multiple Identity Providers, each identified as serving a different Realm, and administered by various parties, including the secure server, client organizations, resellers/channel partners and potentially other service providers. For instance, the secure server may have several IdPs, located in different geographies. Each IdP that is deemed to be trusted (e.g., allowed to vouch for user identities) may be registered with the platform. In embodiments, identity providers may maintain content on data nodes within the system, where the identity facility is part of the orchestration layer for coordination of a federated identity across the system.

The identity facility may provide for enhanced authentication, such as multifactor authentication where a user's IdP may provide additional assurance. In an example, a user's IdP may not support anything other than password-based authentication. In this case, the system may provide additional authentication as a value-added feature. The platform services may not need to be changed to accomplish this. Instead, the identity facility may provide a Proxy IdP to which the system establishes a trust relationship. The Proxy IdP, in turn, may have a trust relationship established with the customer's IdP, allowing it to receive, for example, SAML authorization failed response assertions for the limited (e.g., single-factor) authentication supported by that IdP. The Proxy IdP may then provide additional assurance, such as by delivering an access code to the user's registered phone via SMS, via email, and the like. In embodiments, only when this is successful will the Proxy IdP generate multi-factor authentication has been performed for the user.

Encryption of the Token Authentication

Various client applications enable users to connect their computing devices (e.g., laptops, mobile devices) to a secure data exchange system for accessing secure content. In some embodiments, in order to access secure content from the secure data exchange system, a user has to authenticate to the secure exchange server, obtain a "token", and use the token to access the secure content. In order to provide improved security for the secured content of the secure data exchange system and aid in preventing an attacker from obtaining a copy of the token and using it to access the content, improved methods for generating and using such a token are called for. These methods of token generation and use may provide protection against so-called "Man in the Cloud" attacks that may take advantage of common file synchronization services (e.g., Google Drive) as their infrastructure for command and control, data exfiltration, and remote access. Without using any exploits simple re-configuration of these services can turn them into an attack tool that is not easily detected by common security measures.

In embodiments, these improvements may include processes where the generated token is random, is encrypted, and is associated with the specific user and the specific machine (e.g., a computing device) from which the token was requested. In other words, a specific machine ID obtained from the machine requesting the token is used to generate and/or encrypt the token, such that each token is tied to a specific user and a specific machine, and access from that specific machine is required to access any secured content using the token. For example, a specific machine ID may be a GUID (globally unique ID) such as a motherboard ID found on the motherboard of that specific machine (similar to an IP address), and may be obtained by the secure data exchange system by querying the operating system (e.g., IOS/Android for mobile computing devices) of the machine for its motherboard ID. The token may be stored locally on the specific machine using machine specific encryption, for example, with the key being the motherboard ID, with other optional machine attributes. The secure data exchange system may register the token, and then validate the token when a user attempts to access secured content from the system (at an initial attempt, and/or at subsequent attempts), such as by ensuring that the token is being received from the specific machine it is tied to. In this manner, content access will be prohibited by an attacker copying a token and attempting to use it from a different machine, as the secure data exchange system will detect the different machine ID and not allow access to the secured content. In embodiments, a sync token is required to be stored and protected on the user machine. A standard windows encryption API may, for example, be used for that purpose except with the introduction of a proprietary encryption key. In embodiments, the standard key that is protected only by the logged in user's identity is not used. Instead, the proprietary encryption key may be generated using local characteristics of the user machine (e.g. motherboard ID or other device ID).

In addition to the improved security provided by generation and use of the token, a concept of device pinning and remote wipe may also be employed. Remote wipe may occur in an online and/or offline mode. Because every machine may be tied to a specific user and a specific unique machine ID, it is possible to pin the devices associated with accessing content in the secure data exchange system. Users and their associated devices are thus known to the system. This device pinning may enable administrative policies to be deployed such as remote wipe, which may occur to remotely wipe the data in various circumstances, such as if a machine is lost without a user's knowledge. Additionally, offline leasing policies for the content may be employed, which may provide for an automatic wipe of data once the policy has expired.

Token-based authentication that provides a token unique to each user and associated machine, in conjunction with device pinning, also may enable such capabilities as offline access to content. In particular, users can sync content from the secure data exchange system, and then take it offline. Additionally, the secure data exchange system may provide each user a unique lease and lease term that is tied to the user's specific machine (e.g., with a lease term of 180 days). Lease information associated with a user may be encrypted and may not be allowed to be modified by the user. The lease information may include an identification of the user, the specific machine of the user, the start and end times of the lease, and the like. Additionally, a standalone service may be provided that runs on the client computing devices (machines) that enables provision of a secure wrapper for authentication in an offline mode, allows for activity monitoring, provides file security, and the like. Once the lease has expired, this wrapper service on the client machine may act to wipe stored data for security reasons.

Adjustable Encryption Key Management

Content encryption and the management of the associated encryption keys are essential components in a secure data system. When the secure data system includes a service provider for data services, such as in a cloud-based secure data storage and exchange system, the location where the content is encrypted and the location where the encryption keys are managed may affect the level of security provided to the content. For example, when encryption is provided on the service provider side, a client may benefit from a set of data management services from the service provider that might otherwise not be available to the client. However, when the client provides the content to the service provider in a non-encrypted form, the content may be exposed to a gap in encryption coverage as the document is transferred in an unencrypted format from the client to the service provider for encryption. Therefore a client may want content to be encrypted on the client side in order to transmit the content in an encrypted form.

In addition, the location where the encryption keys are stored may result in an increased risk for exposing the content (e.g., from hackers). Again, the client may benefit from having the service provider manage the encryption keys, but doing so places the encryption keys outside the control of the client and thus increases the risk that outside agents may gain access to the encryption keys. Thus, the client may gain service capabilities by enabling the service provider to manage encryption facilities but may increase the risk that the content will be exposed to outside threats.

In embodiments, methods and systems may be provided that enable the client to adjust an encryption management configuration such that content may be encrypted through at least one client side facility or on at least one service provider facility based on a selection criteria. The selection criteria may be a level of security for a document, a business group, a company, an individual, and the like. The selection criteria may be a level of key management support, such as the client electing to forgo some key management support functions available from the service provider in exchange for an increased security available through the client providing key encryption services completely inside the client's facilities.

In effect, the ability to adjust between different encryption management configurations may create a hybrid (e.g., including both client-side and cloud-based capabilities), customer-configurable way of handling encryption and key management. In embodiments there may be various options on either the client-side or on the service provider side. For example, one solution to the management of content encryption is for content to be encrypted on the client side, where keys are managed outside of the cloud and not available to the service provider. In this configuration when the content is transferred into the cloud it is already encrypted and essentially opaque to entities outside the client; the service provider cannot decrypt it, since it never holds the decryption key. Another user of the collaboration platform (e.g., a different end user) may be able to decrypt the file because the decryption key is sent to the end user. For example, the service provider may be able to help distribute the keys to that other user, such as without actually having access to that decrypted key itself; or the key may be sent from the first user to the second user in another manner. In embodiments, the client may utilize encryption management equipment such as a hardware security module (HSM), a security application, and the like. The client may also choose to implement multiple encryption schemes for different levels of security, thus creating multiple, selectable encryption management configurations on the client side.

Alternately, the service provider may manage the encryption keys, such as in the cloud. Again, the service provider may utilize encryption management equipment such as HSMs, security applications, and the like. In utilizing an HSM approach, clients may upload content to the service provider, where it is encrypted, and where the encryption uses the key stored in the HSM that lives "in the cloud" (e.g., on the service provider's network or in a separate secure location in the cloud, such as with a different, trusted service provider). This enables the client to manage their keys in the cloud.

The ability to adjust the encryption management configuration also has the benefit of being more flexible to the needs of different clients. For example, for small workgroups with no HSMs, or when marketing to a smaller business group rather than a large corporation, the hybrid solution may enable encryption at the edges (i.e., using the client-side option). For those clients with public key infrastructures and HSMs, the service provider may utilize existing facilities to manage the system as part of the service itself. Either way, in this example, the client has control of their encryption keys, and can choose between a hybrid of storing them on its own systems or in the cloud.

In addition to the architectural flexibility this gives to clients, it also may provide the ability to adjust the "opacity" of certain kinds of content. For example, highly confidential content that meets certain user-specified criteria could be automatically encrypted using the client-side-key approach, so that it remains completely opaque to the service provider (e.g., content is encrypted at the endpoints, but at the compromise that the service provider may not be able to provide certain kinds of support, etc.) The client may also decrease the opacity level, such as to permit encryption that uses keys stored on the cloud for other less sensitive content. The decisions about how high to set this opacity may be time-based (e.g., the HSM provides the cloud a key for a period of time), content-based (e.g., for particular kinds of documents, keywords, or metadata), based on other parameters, and the like.

Figure 57:
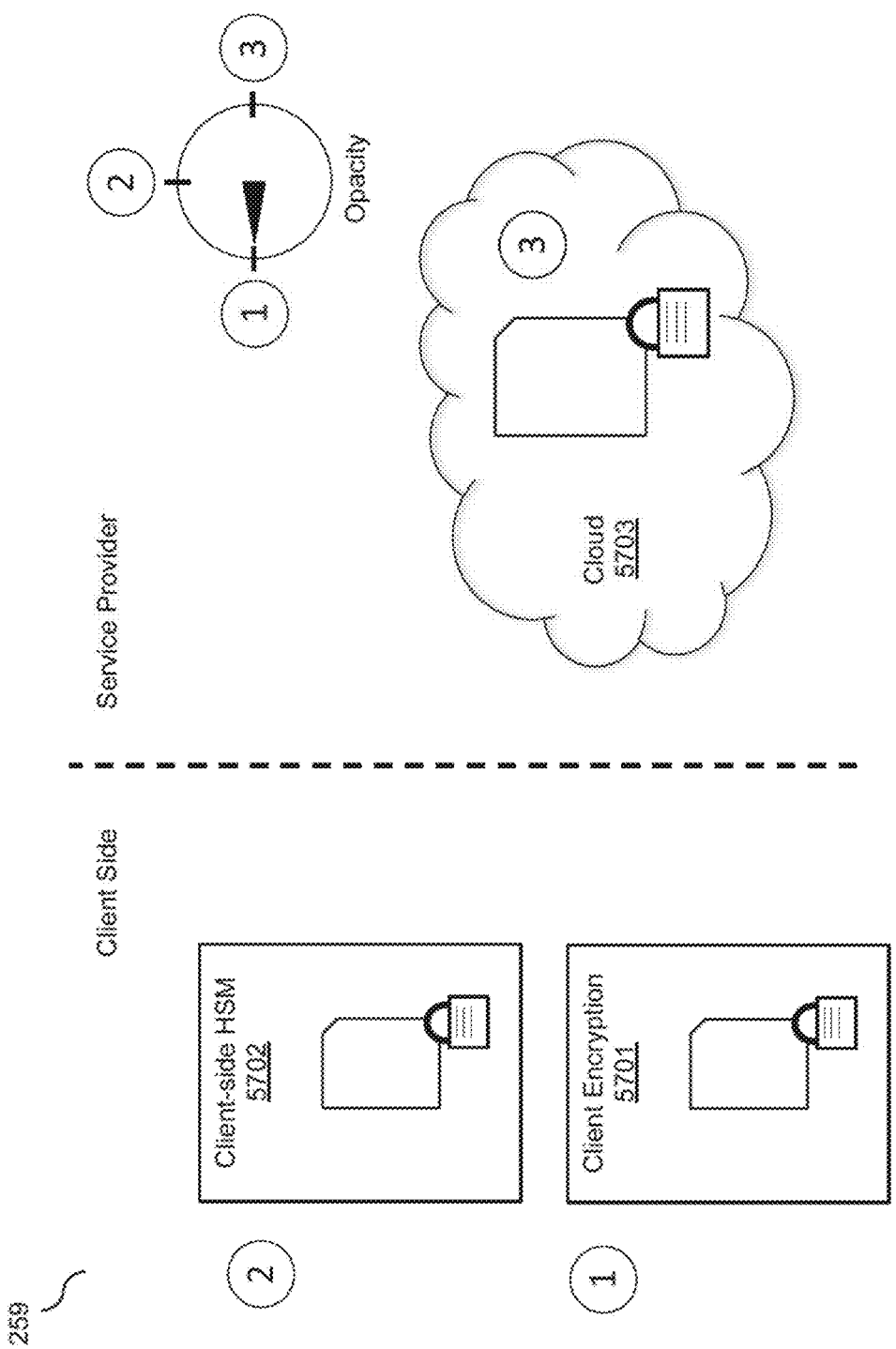
FIG. 57 depicts an embodiment of a hybrid client-side and cloud-based encryption and key management system.

Referring to FIG. 57, an example of an adjustable encryption key management facility 259 as a hybrid client-side and cloud-based encryption and key management system is presented, where on the client side there are two encryption configurations, (1) client encryption 5701 (e.g., utilizing a security application) and (2) a client-side HSM configuration 5702, and one (3) cloud-based service provider configuration 5703. Configurations (1) and (2), on the client-side, may enable the client to deny any knowledge of the encryption keys to the service provider. Configuration (3), on the service provider side, may provide greater encryption key services to the client. The system then provides the ability to dynamically tune which of configurations 1-3 applies, such as based on the type of content. This is meant to be illustrative and not limiting in any way, where one skilled in the art will appreciate that various other combinations of client-side and service provider configurations may be implemented. In this example, the encryption management opacity may be adjusted to provide one of the three configurations, such as based on a selection criteria, selected by the client, provided as a default by the service provider, and the like. In this example the opacity selection is shown on the service provider side, but may rather be on the client side. For example, if opacity is selected on the service provider side, the service provider may make the adjustment based on a pre-selected preference by the client, such as based on selection criteria. If opacity is selected on the client-side, it may also be selected based on selection criteria, but may also be selected through a content application (e.g., a user selecting a level of opacity at the time the document is created, revised, shared, and the like, from the application).

In embodiments, a secure exchange server hosted by an intermediate business entity may establish a user login data authentication procedure that allows one or more users, including a user of a second business entity, through at least one client computing device to access the secure exchange server, wherein communications between the secure exchange server and each of the one or more users is through a communications network. An encryption management facility may be provided, wherein the encryption management facility may be adapted to adjustably configure encryption services based on a selection criteria provided by the user of the second business entity for selection of at least one of: i. secure exchange server side encryption, wherein computer data content is transmitted from the second business entity to the secure exchange server to be encrypted by the secure exchange server, and ii. business entity side encryption, wherein computer data content is transmitted from the second business entity to the secure exchange server as encrypted data that was encrypted by the second business entity before it was transmitted. A selection criteria from the user of the second business entity may be received, wherein the selection criteria establishes the selection of at least one of secure exchange server side encryption and business entity side encryption for a computer data content to be stored on the secure exchange server. Computer data content from the user of the second business entity may be received, wherein the computer data content may be encrypted by the selected mode of encryption based on the received selection criteria.

Mobile Security through Multifactor Authentication

In embodiments, mobile security may be provided through mobile security multifactor authentication, using mobile security multifactor authentication facility 257 (FIG. 2b), for document management applications for a mobile device, such as through augmenting a conventional user ID and password with use of a Bluetooth connection (e.g., Bluetooth low energy (BTLE), such as used in iBeacons® or other BTLE implementations), limited local access keys (such as used for offline access of documents, as disclosed elsewhere herein), an indicator of proximity, and the like. One of the problems that multifactor authentication addresses is that when enabling an offline mode of file access on a mobile device, or any client device, server control is lost, and any capability to remotely leverage client-server cryptography communication is lost. In a non-multifactor authentication model of offline access, an encryption key may be required to decrypt files that are stored on the mobile device and that are encrypted at-rest. In this instance, an encrypted content item and the corresponding encryption key may be downloaded and stored on the mobile device while Internet access is available, where the encryption key is used to access the corresponding encrypted content when the mobile device is offline. However, despite measures to protect the encryption key, there is a significant risk of an unauthorized access from a determined attacker, who may obtain access to the key through use brute force decryption measures and access the content.

Since the basis of this security weakness is rooted in storing both the encryption key and the encrypted content on the same device, essentially presenting an attacker with both the lock (e.g., the encrypted content) and the key (e.g., the encryption key) on the same device, one solution is a multifactor authentication method. With multifactor authentication, an attacker would have to gain possession of both the victim's device and additional factors of authentication that are not stored locally on the device, an arrangement that reduces the risk of intentional or unintentional security lapses. For an improved user experience and maximized compatibility with a wide range of devices, the connection to a second factor of authentication may be set up utilizing an RF connection technology that is already available on a typical smart mobile device, such as Bluetooth Low Energy (e.g., Bluetooth Smart) with proximity capabilities.

Referring to FIG. 56, a multifactor authentication facility 257 may be provided for secure access to a digital content 5604 stored in memory 5606 on a mobile device 5602 based on a combination of factors such as RF connectivity from a communication facility 5608 in the mobile device 5602 to an external communication facility 5610, proximity to an external communication facility 5610, user ID, use of a local stored encryption key, a local stored user identifier (e.g., password, PIN), and the like. In the instance where RF connectivity and proximity detection are utilized, the multifactor authentication facility (e.g., a multifactor authentication application on a smart cellular phone, also referred herein as 'application') may monitor RF connectivity between a communication facility 5608 in the mobile device 5602 and the external communication facility 5610 (also referred herein as 'transmitter'). In an example, the communication facility 5608 may be a Bluetooth facility on a smart phone communicating with the external communication facility 5610 that is an external Bluetooth transmitter. For instance, a BTLE implementation of Bluetooth may utilize both Bluetooth detection and proximity of the device to the transmitter connection point as factors in multifactor authentication. This combination of authentication factors would enable offline access to a document previously downloaded onto the mobile device, where the mobile device may be enabled to continuously look for Bluetooth signals. In another example, the multifactor authentication facility may monitor for Bluetooth signals (e.g., where the range is set in the mobile device) where proximity satisfies one of the authentication multi-factors. In combination, another authentication factor may be used, such as utilization of a user ID. In this way an encrypted, multi-factor protected document may only be accessed when a predefined set of multifactor authentication conditions have been satisfied, such as the user having a key previously downloaded to their mobile device, having the correct user ID, having connectivity with a transmitter, being in predetermined proximity to a transmitter, and the like.

In a non-limiting example, a mobile device may have an application adapted to communicate with a Bluetooth transmitter (e.g., the Lightblue Bean or other like transmitting device) that is integrated into a user identifier device that a user is able to carry with them (e.g., a Bluetooth enabled employee badge clipped onto the user's clothes, a card that can be stored in a pocket/wallet/purse, a tag that can be attached to clothing, or the like). Although Bluetooth is utilized in this example, it is not meant to be limiting any way, where one skilled in the art would appreciate that any like transmitting technology would satisfy the communications requirements between the mobile device and the transmitter. In this example, the transmitter may have a unique identifier (UDID) that is assigned to a user's account, so even with access to the mobile device, documents will only be accessible if the mobile device and Bluetooth transmitter are within range of one another. This system functions as two-layer authentication, first through the access to the application and second through having the Bluetooth transmitter within range of the mobile device. In embodiments, a key used to unlock the application would not be stored on the mobile device, but rather on the Bluetooth transmitter, thus adding an extra layer of security.

In embodiments, the operations between the mobile device application and the Bluetooth transmitter integrated with the user identifier device may include a UUID, such as in an application where the user identifier is associated with an employee number and a user's company badge, and the mobile device is the user's mobile smart phone. The Bluetooth transmitter may be initially configured in a beacon mode (e.g., iBeacon), where it emits the UUID. The UUID may be configured with a format that may be utilized by the application, such as with a "major" portion (integer between 0~65,535) and a "minor" portion (integer between 0~65, 535), where the major portion may be set to a client identifier, such as representing a specific company, and the minor portion may be set to a unique employee ID, such as saved in a user's profile. In addition, after first pairing between the mobile device and the transmitter, the badge's pairing password may be set to a user PIN (e.g., 6-digit PIN). The predetermined proximity range may be set in the application, such as selected from 'immediate' (e.g., from touching to approximately 4 inches), 'near' (e.g., between 4 in and 7 ft), 'far' (between 7 ft and 20 ft), and the like. Upon logging into the mobile application, the mobile device may scan only for the badge with the appropriate UUID using beacon functionality. This type of limited scanning may conserve battery power and eliminate confusion between different badges. When the correct badge is found within the predetermined proximity range, the mobile device may attempt to connect to the transmitter (e.g., via CoreBluetooth) and trigger a Bluetooth Pairing dialog, such as requiring the previously set PIN to securely pair. Once paired, only the current device may be able to auto-connect to the badge. Once connected, if the mobile device is offline it may download encryption keys from the badge into the memory of the mobile device. Then the badge closes the connection and the application monitors proximity, such as through beacon functionality. Once the badge-transmitter moves out of range, the application may release all encryption keys from RAM such as to disable access to offline files. The application then continues to monitor proximity to the badge-transmitter. When the badge-transmitter is in range again, the process is repeated.

In embodiments, a secondary device, such as a card, badge, dongle, or the like, that is used in various embodiments as part of the architecture for multi-factor authentication, may be provided and managed by an intermediate business entity, such as a provider of a secure exchange environment, so that access to documents on the mobile device is managed at least in part by the host of the secure exchange environment.

In embodiments, the mobile device application may be based on an event driven architecture, where events are listened in an asynchronous manner and each time there is a state change a notification is triggered and managed through a notification center. In this way all monitoring devices that are listening to that event receive the notification and may process and replicate it. For example, the application may begin by scanning for any nearby Bluetooth transmitter. Once it locates one, it may ask for the transmitter's UDID, and if this identifier corresponds to the one assigned to the user, the application will connect to the transmitter. Once connected, the application may start reading the transmitter's characteristics, such as battery level, RSSI level, the location where the application's key is stored, and the like. After the application has read this information, it may store the information and proceed to send a notification that the transmitter values have been read. At this point the application may disconnect from the transmitter. The application may now start scanning for the transmitter inside the predetermined proximity range established in the application settings. For instance, if the transmitter is in range as defined in the settings, it may set an application state to connect and send a notification that the application is in range and successfully connected. This way other listening devices may react accordingly. In embodiments, if at any time a transmitter falls out of range for a predetermined period of time (e.g., 5 seconds, 15 seconds) the application may send a notification that the transmitter is disconnected. During the application's execution it may be constantly assessing the transmitter's proximity and sending out corresponding notifications.

In embodiments, a system for providing secure computer content access through multifactor authentication on a mobile computing device may include a multifactor authentication facility on a mobile computing device, wherein the mobile computing device comprises a memory and a mobile device communication facility adapted to wirelessly interface with at least one external communication facility of a plurality of external communication facilities. The at least one external communication facility may be adapted to transmit a unique transmitter identifier that matches a stored unique transmitter identifier in the memory of the mobile computing device, wherein the multifactor authentication facility monitors for connectivity between the mobile device communication facility and the at least one external communication facility, and monitors for the transmission of the unique transmitter identifier. If a communication connection is detected between the mobile device communication facility and the at least one external communication facility, and the transmitted unique transmitter identifier matches the stored unique transmitter identifier in the memory of the mobile computing device, then a digital content stored in the memory of the mobile computer device will be enabled for access if at least one additional authentication factor is provided, the at least one additional authentication factor selected from the group including: (i) a user identifier entered into the mobile computing device, (ii) a user password entered into the mobile computing device, (iii) use of a digital key stored in the memory of the mobile computing device, which is associated with access permission to the digital content, and (iv) a determination that the distance between the mobile device communication facility and the at least one external communication facility is within a predetermined range value.

Multifactor Authentication Utilizing Physiological and/or Behavioral Characteristics In embodiments, multifactor authentication may utilize physiological or behavioral characteristics as personal authentication factors in the authorization to access content through a mobile device. Physiological or biometric authentication factors may be utilized as authentication factors, such as utilizing a fingerprint, palm print, face recognition, DNA, iris recognition, vital signs, skin conductance characteristics, heart rate characteristics, and the like, that can be used in combination with another authentication factor to provide access to content. Physiological characteristics may be determined through a separate wearable device (e.g., a bio-tracking wearable device) communicatively connected with the mobile device or entered through the mobile device itself. For example, a user may request access to a document while the user is offline by providing a thumbprint to the touchscreen of their mobile device and through a fingerprint recognition application, and as long as the user is also in range of a Bluetooth transmitter with a UIID registered with the mobile device, is provided access to the document. Behavioral characteristics may also be utilized in multifactor authentication, such as in providing input to a user behavioral characteristics profile, including contributing factors such as mobile phone typing rhythm, waking gait, voice pattern recognition, and the like. A behavioral characteristics profile may utilize a plurality of personal behavioral contributing factors to build an authentication factor to be used by the multifactor authentication facility in combination with another authentication factor to provide a user with access to content. For example, a behavioral characteristics profile may include four behavioral characteristics that are monitored, and if any three of them are satisfied during a predetermined period of time, the profile may be used as an authentication factor, for instance in combination with Bluetooth proximity as described herein. Similarly, a physiological characteristic profile, or a profile combining physiological and behavioral characteristics, may be used in multifactor authentication, such as monitoring a combination of physiological and/or behavioral characteristic subfactors that contribute to an authentication factor that is used in combination with another authentication factor to provide access to content. For example, a user may be wearing a bio-tracking or activity-tracking device connected to a user's mobile device that senses heart rate and skin conductivity that in combination with tracked mobile device usage characteristics (e.g., typing, movement patterns) creates a monitored condition that if it matches a stored profile may be used as an authentication factor in multifactor authentication.

Customizable Secure Exchange System

In embodiments, a customizable secure exchange system may be provided, wherein methods, systems, and services described herein in association with secure collaboration and sharing may be at least in part modularized and encapsulated in a secure envelope (e.g., where security extends beyond the hosted secure server, out into the cloud computing space, as part of an enterprise computing resource inside the enterprise firewall, or the like), and provided for use to business entities in a location other than the secure server, such as on-site at a business entity, on a secure cloud service, on a commercial cloud service, distributed across a geographic area, in a location local to the business entity, provided through distributed hosting, and the like. This architecture may provide a highly scalable platform upon which business process applications can be built. Further, the functionality provided in secure server hosted embodiments such as described previously herein may be modularized to enable the business entity to select basic services, building blocks, components, toolkits, and the like in building their own secure collaboration and sharing facility that is built to meet the needs of the business entity, such for a specific business market the business entity operates in, a project the business entity is working with, a partnered collaboration between business entities, and the like.

Figure 17:
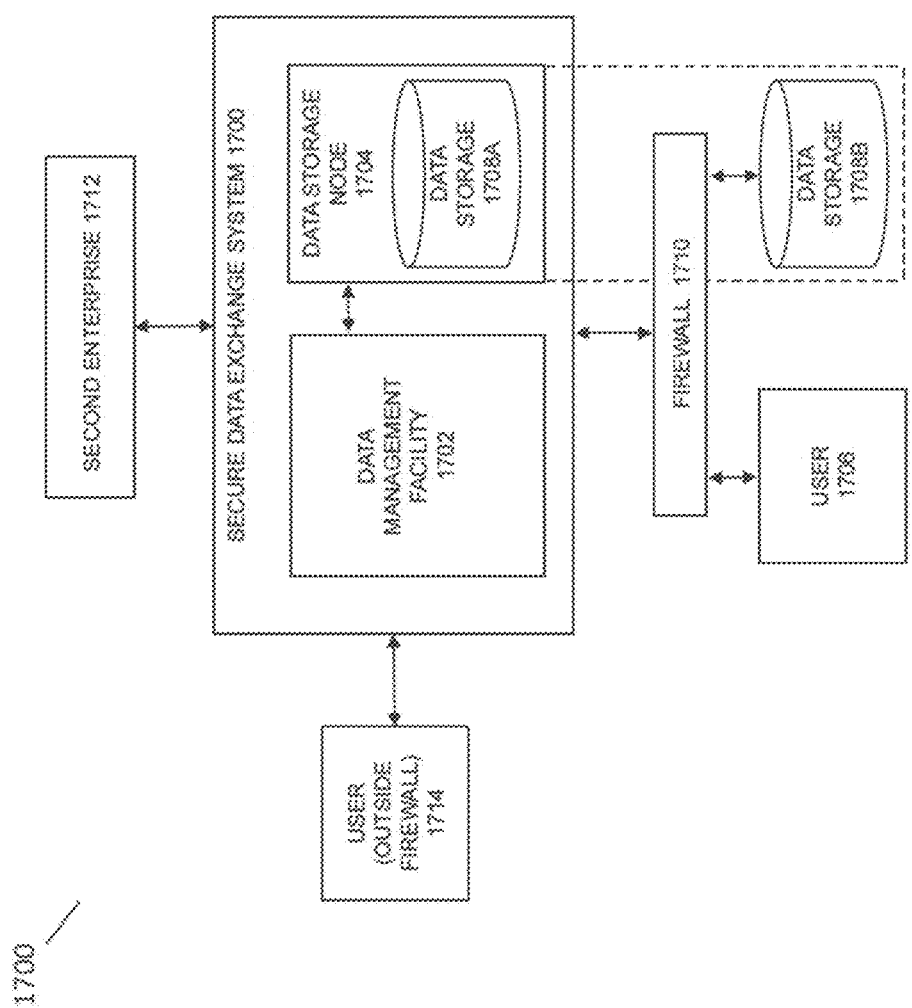
FIG. 17 is an illustration of an exemplary secure data exchange system.

Referring to FIG. 17, system 1700 may comprise a data management facility 1702 and a plurality of data storage nodes 1704, which may be distributed in various locations. The data management facility 1702 may comprise one or more secure servers and may implement an orchestration layer with various orchestration services, as more fully described elsewhere in this disclosure. The data management facility 1702 may manage content sharing between various entities of data that is stored in the plurality of data storage nodes 1704. For example, data may be stored by a user 1706, such as a user associated with a first business entity. The data management facility 1702 itself may be hosted by a separate entity than the first business entity, and may include multiple regional data management sites, each serving associated data storage nodes 1704.

The data may include data content and metadata, and the data management facility 1702 may only have access to certain metadata relating to the data content, such as metadata related to managing of the data in the plurality of data storage nodes 1704. As a result, the data management facility 1702 may have no access to the data content of the data stored in the data storage nodes 1704. In embodiments, the data storage node may be comprised of one or more data storage facilities, such as inside an enterprise firewall 1710 at data storage 1708B, outside the enterprise firewall at data storage 1708A, and the like. Furthermore, the deployment of a data storage node may also be provided inside or outside an enterprise firewall. When deployed outside the enterprise firewall, the data storage node may be implemented in a cloud-computing environment (e.g., through a secure implementation of a commercial cloud-computing provider). When deployed inside the enterprise firewall, the data storage node may be implemented in either a physical configuration (e.g., as physical storage and logic hardware inside the enterprise) or as a virtualized service (e.g., where the physical configuration is in the cloud-computing environment, but virtualized to within the enterprise). In either case, the data storage node may be completely isolated from enterprise systems when deployed on premises.

In embodiments, the user 1706 may select where the data storage associated with the data storage node 1704 is located, such as on-premise, at a server of the entity hosting the data management facility, with a cloud-based storage service, or the like, thereby allowing the user to control where data is stored. The user 1706 may utilize the secure data exchange system 1700 to share data content with another user, such as a user 1714 outside the firewall, or with a user of another business entity 1712, and the like.

The data storage nodes 1704 store the data content associated with various entities (also referred to herein as customers or business enterprises) using the secure exchange system 1700, and this data content may include various types of content such as original files and respective metadata, fully processed files and respective metadata, customer compliance data, customer identity information, metadata generated that relates to files, folders, or other "collections" of data, application related metadata (such as if a customer creates a 'deal', then various deal related metadata may be stored), indexes on metadata, and the like.

In embodiments, content stored on the data storage node may be implemented as object storage, which is a storage architecture that manages data as objects as opposed to other storage architectures such as file systems which manage data as a file hierarchy, and block storage that manages data as blocks within sectors and tracks. Each object may include data, metadata, a global unique identifier, and the like. The object storage systems may enable relatively inexpensive, scalable and self-healing retention of massive amounts of unstructured data associated with the data storage node, and provide fine-grained access control to data stored in the data storage node, where data is exposed and managed as objects instead of files or blocks.

Object storage may enable the creation of redundant, scalable data storage nodes using clusters of standardized servers to store petabytes of accessible data, thus providing a long-term storage system for large amounts of static data that can be retrieved, leveraged, updated, and the like. Object storage may use a distributed architecture with no central point of control, providing greater scalability, redundancy, and permanence. Objects may be written to multiple hardware devices, with software responsible for ensuring data replication and integrity across the cluster. Storage clusters may scale horizontally by adding new storage units. Should a storage unit fail, the system may work to replicate its content from other active storage units.

Object storage characteristics may include that all objects stored in object storage have a URL, are replicated (e.g., x3) in zones (e.g., defined as a group of drives, a node, a rack, and the like, all objects may have their own metadata), interaction may be with the object storage system through a RESTful HTTP, object data may be located anywhere with in the node structure, data storage may scale by adding additional storage units without sacrificing performance, new data storage may be added to without downtime, failed nodes and disks may be swapped out without downtime, the system may run on industry-standard hardware, and the like.

Object storage may separate metadata from content to support additional capabilities, such as additional metadata to capture application-specific or user-specific information for better indexing purposes, additional metadata to support data management policies (e.g. a policy to drive object movement from one storage tier to another), independent scaling of data storage nodes, unified access to data across distributed data storage nodes, centralized management of storage across many individual data storage nodes, optimization of metadata storage (e.g. database or key value storage) vs. data storage (e.g. unstructured binary storage), and the like. Storing content and metadata as objects may enable the creation, modification, and access of objects and metadata by using a object storage API, such as implemented as a set of Representational State Transfer (REST) web services. The system may utilize HTTPS (SSL) protocol to interact with object storage, and use standard HTTP calls to perform API operations. The system may utilize language-specific APIs, such as a RESTful API, that makes it easier to integrate into applications. To assert access and change content, the system may require a user to identify themselves to object storage by using an authentication token. To get a token, the user may be required to present credentials to an authentication service, where the authentication service then returns a token and the URL for the access. As an API-accessible storage platform, the system may be integrated directly into applications or used for backup, archiving, data retention, and the like.

In embodiments, the data storage node may include replicated copies of data, such as onto other disks and hosts, which may provide resiliency against localized disk and host failures. Further redundancy may be achieved by deploying additional content nodes in geographically distributed locations, where the orchestration layer may synchronize data to these alternate locations. For example, three discrete locations may be implemented for data integrity, such as to reduce the risk associated during recovery time in the case of a complete data center failure.

In embodiments, data nodes may be managed by a mount point manager provided to manage differences in data nodes' mount point performance, such as with a fair share scheduler. For instance, systems mounted in different geographic locations may have different performance characteristics, such as if a UK data node mount takes a long time to respond to messages, forcing messages from the US to be held back. In this instance the process that is held back may be put on hold, placed into the fair-share scheduler facility, and the like. This may affect how the system executes processes such as copy/paste functions across different mount points. In this instance, the processing may be kept local for each mount point. For example, assuming there are three mount points (UK, US, and Germany), the system may copy a file from the UK to the US, but maintain segregation of the processing for the files, so that other processes can continue. Similarly, resources available to support operations may be allocated among different mount points to balance performance across them. However, the system may execute this processing in a safe manner, such as without one process reaching out to both, because the system may want to have dependency of one on the other, routing to the correct location and processing locally. In embodiments, routing may be based on a keyword or name that sends processing, content, and the like to the correct location.

The data node mount point manager may enable a combination of data sovereignty while performing the process in a manner that doesn't cause stability problems. If there is a problem on one side, such as with a node in one jurisdiction, the system does not necessarily propagate the problem elsewhere. In embodiments, there may be an API strategy associated with this process management, such as where the system may distinguish between location-aware APIs and unaware APIs. In location-aware APIs, a separated call model, such as a two-call model, may have an API view that the system wants to safeguard.

The types of data kept in the orchestration layer at the data management facility 1702 may include certain metadata that is relevant to the orchestration of file storage and file sharing services, application related identifiers, file, folder, or collection identifiers, user identity information, service monitoring data (such as uptime, service performance and service events), logs indicating history and duration of access to data content, and/or 'normalized' records of compliance events, which are stripped of the content of the data to which each of these relate.

As mentioned, the data management facility 1702 may be distributed geographically, so as to enable regional-specific management of the plurality of data storage environments while enabling a user to securely access only one, or only a particular set, of the plurality of data storage nodes 1704, where each data storage node is securely isolated from other data storage nodes. Each of these storage nodes may be managed by a separate entity.

Each of the plurality of data storage nodes 1704 may be remotely accessed by a user through a secure application program interface (API) to the secure data exchange system 1700, where the secure data exchange system 1700 may utilize a two-call authorization procedure executed between the data management facility and a data storage node 1704 to enable secure access between the user and these data storage environments. The secure data exchange system 1700 may be extendable by a user through modularized application functionality such as a library of selectable applications to allow an entity to create a secure exchange environment customized to requirements of the entity.

In embodiments, this customizable secure exchange environment may be made available to a user through an application-programming interface (API) with a secure server. Further, this system may enable a business entity to share content securely beyond the enterprise firewall boundary, while meeting operational, security, and compliance requirements of entities including global enterprises and financial institutions; enable innovative secure sharing and collaborative document-intensive business processes (e.g., an intent-based work stream), deliver a secure customizable user experience that is on par with consumer-driven (but not limited to consumer experiences) software and services; and the like. The customizable secure exchange environment may provide a framework so business entities are able to build custom business applications that are able to meet the varied time-to-use needs of the business, and which are also scalable to meet varying usage demands. Business compliance may be provided no matter where the modular functionality is located, in order to ensure compliance with the corresponding governance frameworks of various business entities. Analytics may be provided for compliance, business reporting, market reporting, and the like. Implementation of the customizable secure exchange environment may provide basic services, infrastructure, and orchestration of services, such that there is isolation of logic functions, service facilities, and the like, thus enabling the placement of components of the system outside a secure server while still maintaining a secure environment. The data model used in implementation may be modular, flexible, business-centric, customer configurable, architected for scale, premises-to-cloud (e.g., data, metadata, and processing structures implemented to be accommodated in locations outside the exchange server or on-premise of the entity storing the data), highly durable and reliable, highly extensible, and the like, such as with business analytics as a core service.

In embodiments, the customizable secure exchange environment may provide for a secure instant apps library of components for collaboration across enterprises, where the library of components comprises building block functionalities that can be assembled to build a custom secure collaboration and sharing facility, such as for use across an API. Through this facility, a user or application team for an entity may be able to build their own secure facilities, applications, capabilities, and the like, to their own needs. For instance, the secure exchange server may provide building block application components that are capable of interfacing through an API of the secure exchange server, and through which an outside user may assemble components into a custom secure application, and where the application maintains the security and functionality of running the application on the secure server.

In embodiments, the customizable secure exchange environment may allow a user to create a custom application by adding business-specific logic on top of a standard offering layer, such as including assets, content, policies, relationships, and the like, to produce a custom instant application that is customized to their needs, such as accessible through an API to the exchange server.

For example, for a custom application may be created for a production part approval process (PPAP) by an automotive industry user. For example, the system may be applied to a vendor qualification process. In this instance, there may be a set of criteria that qualify a vendor to be associated with the automotive industry user. In another instance, the system may be applied to a production part approval process. In this instance, a manufacturing company may have a part it wants approved, which goes through the PPAP process, where they take the parts to vendors for quoting, and then progress through the approval process, such as including a series of documents, inspections, validation steps, and the like.

Exchange of content associated with this process may be interactive between the automaker, tiered vendors, regulators, and the like. Traditionally, to accommodate this process, there have been stacks of paper forms that are sold as kits. With the present system, the user may be able to build the forms into the application process, distribute content across firewalls according to a work streams, and the like, all customized to the needs of a particular situation.

One of the advantages of the customizable secure exchange system may be the separation of the user interface from the logic from data store capabilities, enabling external developers to build their own secure exchange facility via an API. Thus, the modularity and customizability of the system may be such that a business user may be able to choose to implement a custom environment at different levels of accommodation and complexity, such as a basic service level, a business process application level with a limited number of building block functions implemented, a business process applications level with partners and functional component functions implemented (e.g., where components include a modular set of building block functions), a business process application with partner communities with an application building toolkit (e.g., where the toolkit comprises building blocks, components, or the like). In embodiments, the customizable secure exchange environment may act as a platform from which business users may create scalable solutions to their needs.

Figure 18:
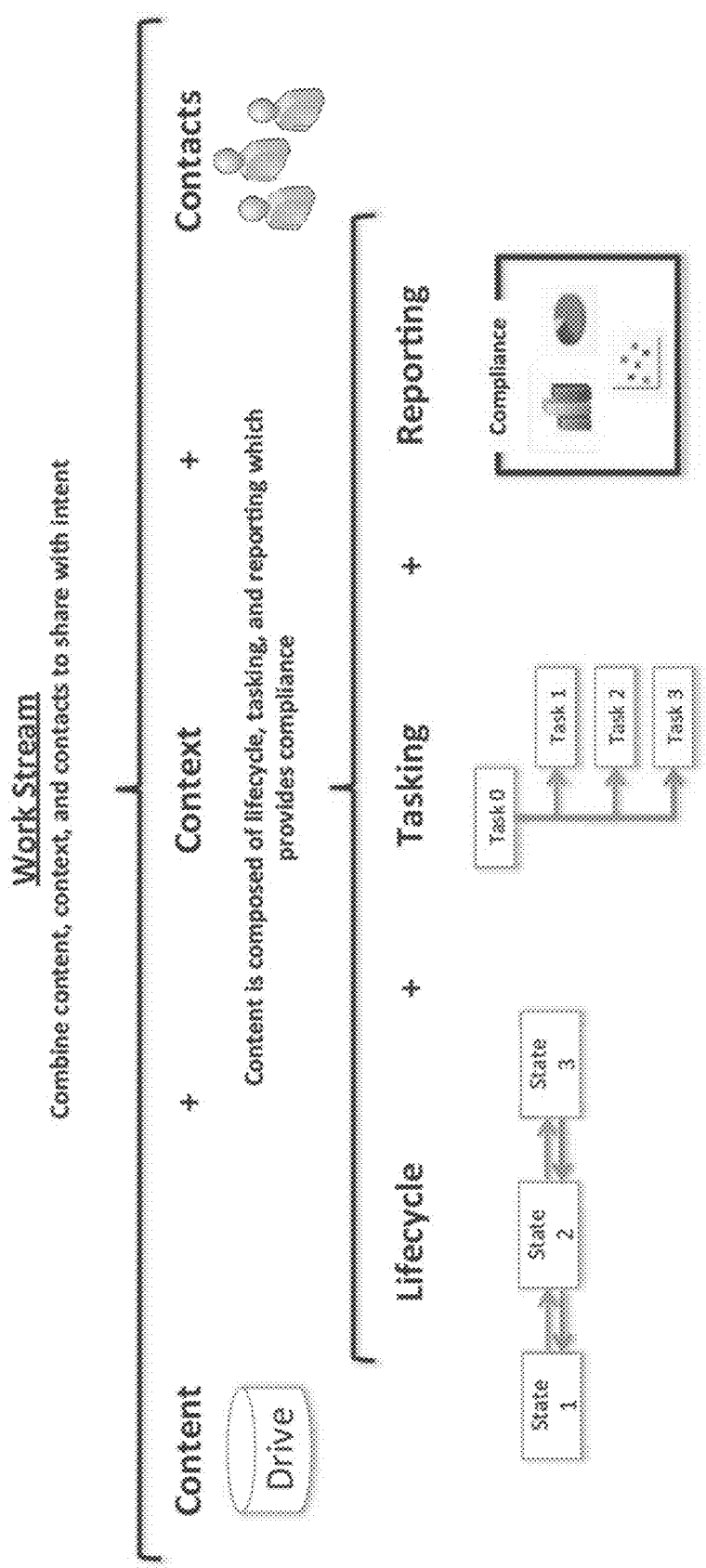
FIGS. 18-30 depict various aspects and features of an exemplary customizable secure exchange system/platform/architecture/environment.

Referring to FIG. 18, a generic example for a work stream of a business entity is presented, where the work stream is shown to comprise content, context, contacts, or the like. Content may comprise lifecycle, tasking, reporting, or the like, such as reporting which provides compliance. In this example, lifecycle is shown to comprise different states for which content may be in, tasking is shown to breakdown into sub-tasks, and reporting is shown to comprise compliance reporting.

Figure 19:
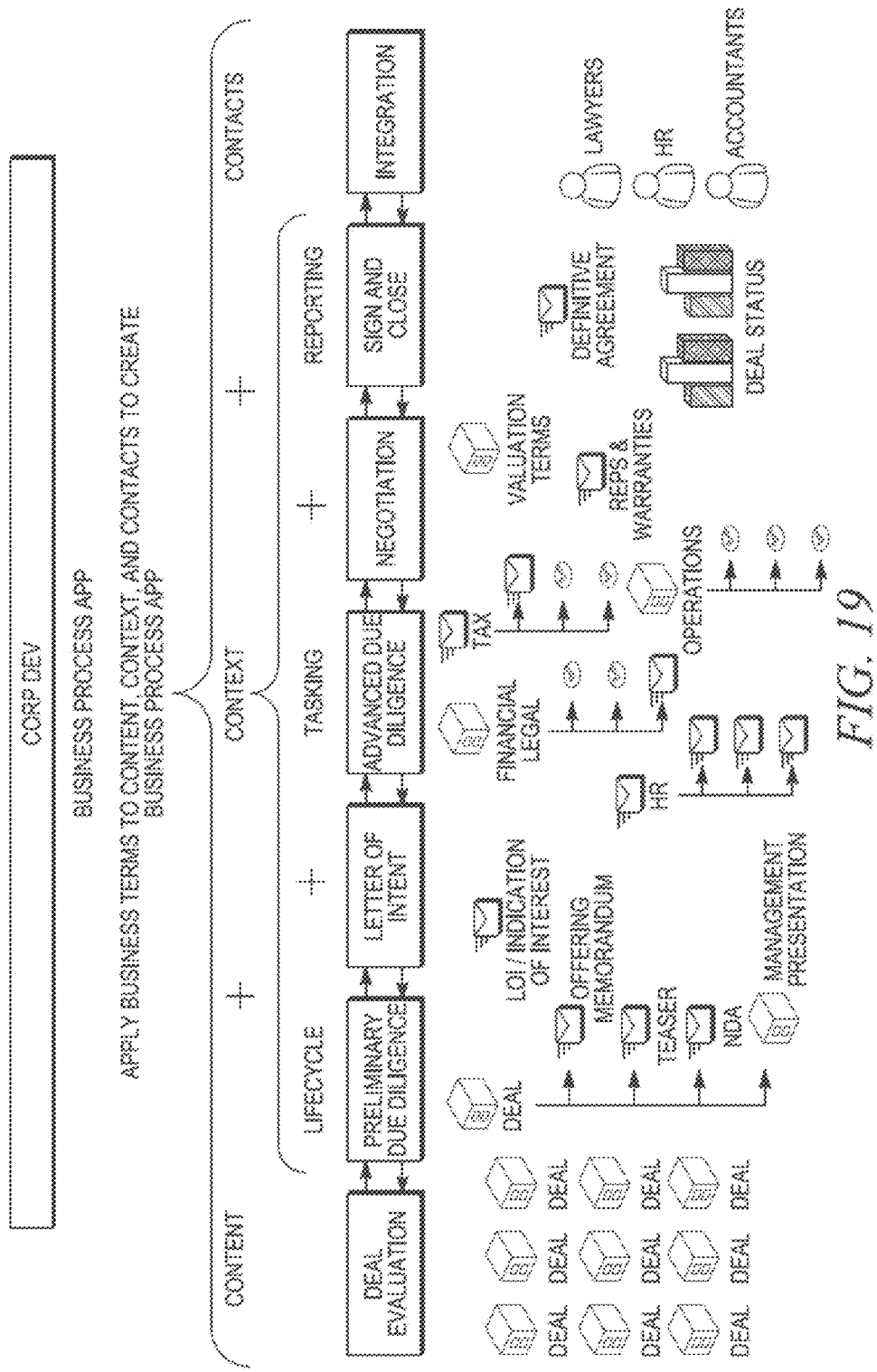

Referring to FIG. 19, a more specific business process application example of a significant transaction of a business entity is presented that requires content sharing between entities, where lifecycle states of the transaction may comprise a deal evaluation, a preliminary due diligence analysis, a letter of intent, an advanced due diligence analysis, a negotiation, a sign and close state, an integration, the like. Each of these states may then include various content, tasks/sub-tasks, reports, or the like. Dependent upon the needs of the business, the customizable secure exchange environment may be used to create a secure exchange for the business that is built with these content, context, and reporting needs in mind.

Figure 20:
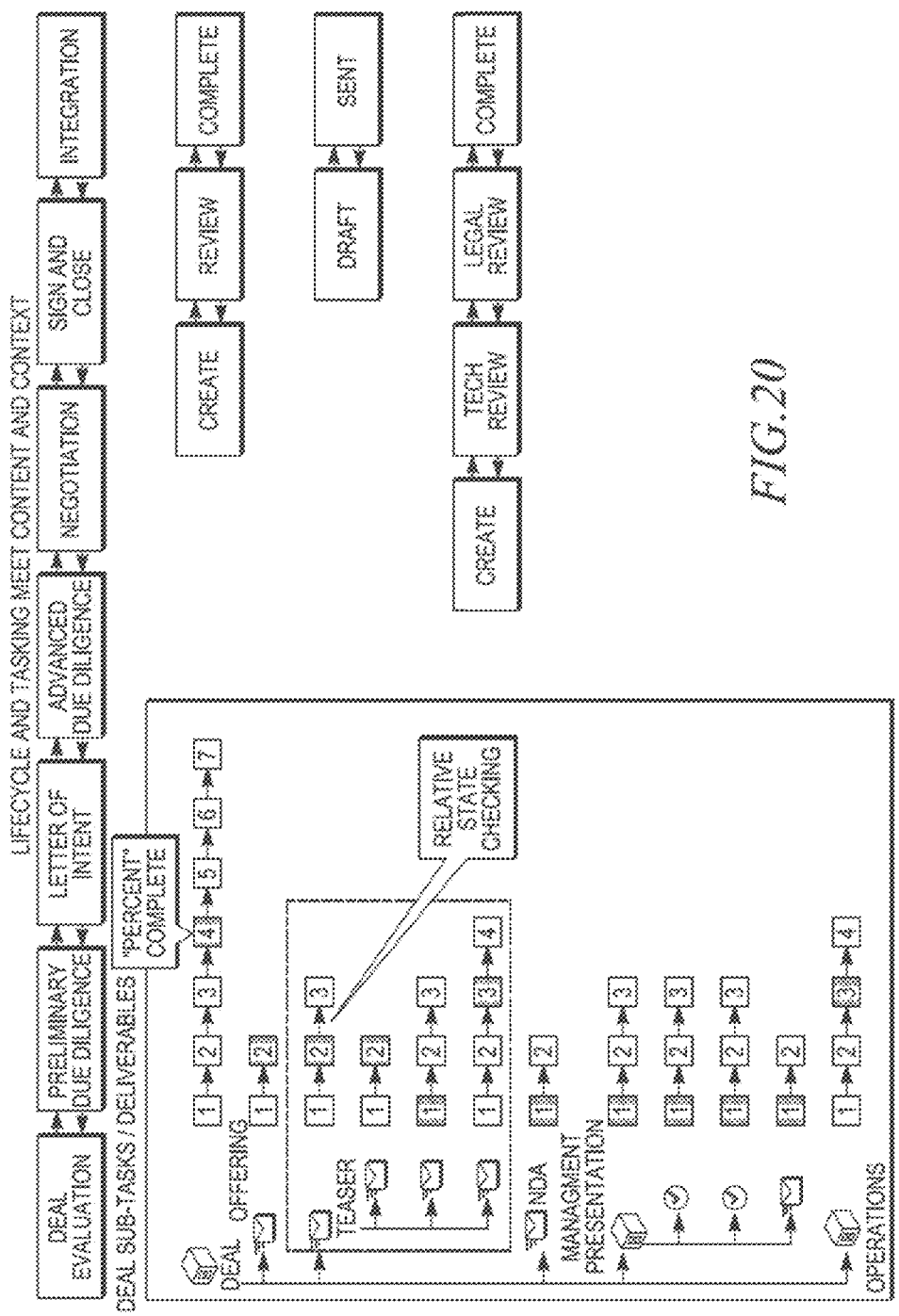

Referring to FIG. 20, this shows a number of example lifecycle processes, and how these processes may be accommodated within a set of tasks/sub-tasks and deliverables. In this instance, the four lifecycle examples (7 states, 3 states, two states, and four states, as shown) are then represented by block represented lifecycles in association with each of the tasks/sub-tasks. Visual attributes may provide the user via a user interface with status, such as showing a highlighted lifecycle state highlighted to show percent complete for the tasks, a highlighted state transition (e.g., and arrow between states) to show a relative state checking indicator between states, and the like.

Figure 21:
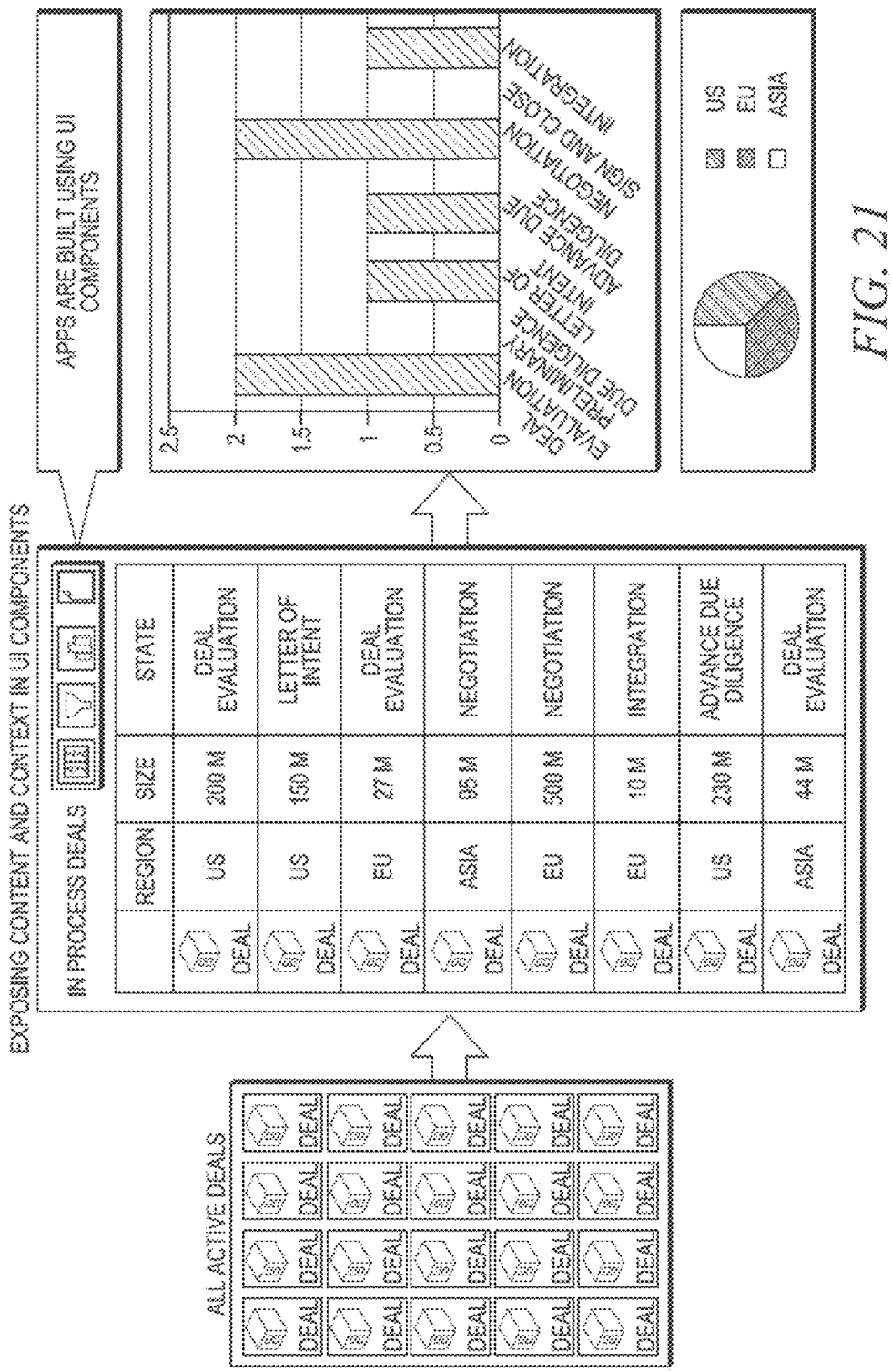

Referring to FIG. 21, the system may promote the exposing of content and context in user interface components, such as in various graphical representations of all the active deals in process, such as by type, region, size, lifecycle process state, or the like, where the application may be built using user interface building blocks and/or components of the system.

Figure 64:
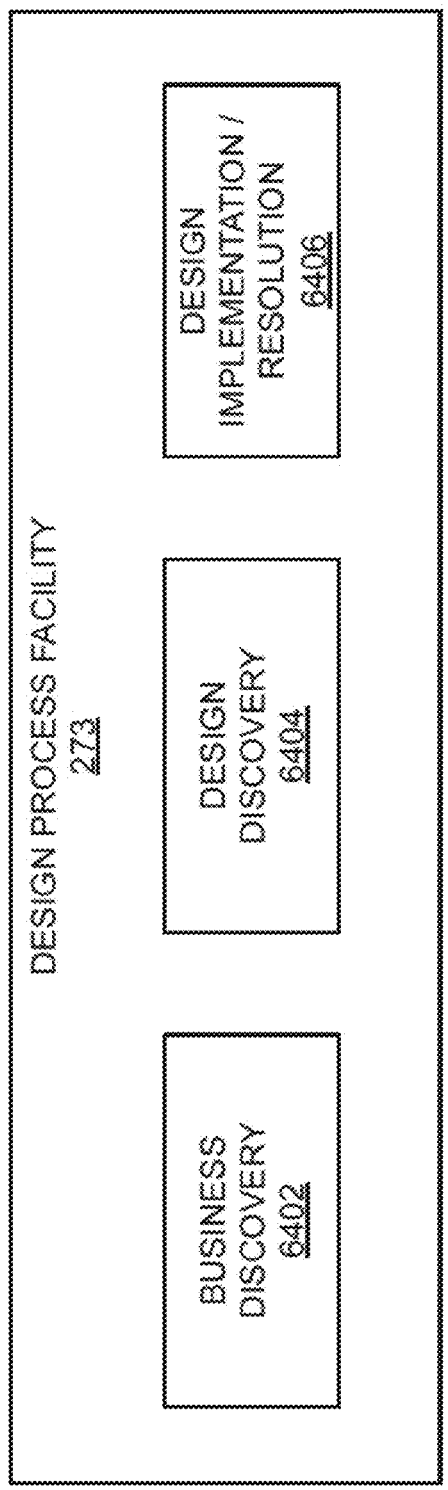
FIG. 64 depicts an embodiment of a design process facility.

Referring to FIG. 64, in embodiments the secure exchange server may provide a design process facility 273 for customizing a graphical user interface for users of the secure exchange system, such as those associated with a specific business entity or type of business entity, may be achieved using a design process, which may include a business discovery stage 6402, a design discovery stage 6404, and a design implementation/resolution stage 6406. The design process itself may be guided by a workflow that is embodied in a graphical user interface that includes a series of screens, dynamically supported by a database, that guide a user through a process for customizing the secure exchange environment. At each of the aforementioned stages, menu elements, such as drop-down menus, may allow a user to select options, filter out options, and the like, automatically resulting in modifications to one or more data structures that are used to populate the secure exchange.

A business discovery stage may include capabilities, prompted by menu elements on the user interface screen of the design process, for researching business goals (such as selecting among a menu of available goals, such as fund-raising goals, transaction goals, or the like), targeting specific users and/or personas of a business entity (such as via menu elements that allow selection of individuals or personas from a contact list or organization chart), including determining a minimum viable product (MVP), researching typical work flows and use scenarios (such as from a stored library of available work flows), defining success metrics (such as from a library of metrics that is associated with a list in a menu of the user interface), and recruiting users for a usability study (such as from a list of available users that is associated with a database of the same). For each of these elements, a data structure may be created and saved that captures the relevant parameters of the same, with associated metadata, such as indicating the origin of the element. A design discovery stage may include determining a visual design and identifying corresponding copywriting tasks, conducting user research regarding usability and impressions, and validating the design concepts. A data structure may be created for each of these elements, such as a task list data structure, which may be accessed by a workflow manager, such as to prompt a copywriter to undertake the assigned tasks according to a scheduled workflow. Usability studies may include user interviews, contextual inquiries, competitive analysis, user mental models, and task analysis. A design implementation stage may include prototyping, performing copywriting tasks, defining styles, and generating guides, along with additional usability testing, in each case guided by a series of screens that facilitate each of the choices required to implement a design via menu elements, so that upon completing the workflow, the design for the secure exchange is automatically implemented by the supporting infrastructure. A design resolution stage may include building a web user interface and a mobile device user interface, along with any needed redesign. Any needed redesign may include additional usability studies and participants, and/or a prioritization of use scenarios or work flows to support the redesign.

Each stage may be accompanied by an analysis of tasks and timeframe for accomplishing those tasks. In this manner, a user interface may be designed specifically for the workflow, rather than the platform.

In embodiments, the design process facility may utilize a single-page application (SPA) design. A SPA may comprise a web application or web site that fits on a single web page with all necessary code (e.g., HTML, JavaScript and CSS) to provide a more fluid user experience akin to a desktop application. Composition facilities may enable the stitching together of reusable pieces of functionality to compose a larger complex application, utilizing patterns to tackle complex business functions. The SPA may incorporate the design principles of integrity (e.g., uniformity in implementation, compliance to web standards such as html5, javascripts), extensibility (e.g., user interface components, empowered reusability among components, event driven communication between components), interoperability (e.g., compatibility with other technologies, frameworks and upcoming standards such as ES6), and the like. The SPA may utilize separate modules for each widget, such as workflow, custom fields, and the like, where a main application may be responsible to instantiate widgets. This approach may dictate that each widget is not aware of its counterpart widgets. To enable this separation, the SPA may make use of triggering events to communicate between widgets and modules, utilizing reuse modules and widgets as much as possible without committing them to a specific application. The SPA may enable scalability, such as utilizing JavaScript files for the application to be referenced and downloaded from within a main page upon bootstrapping the application at start-up.

In embodiments, a method may include the following steps: establishing, by a secure exchange server hosted by an intermediate business entity, a user login data authentication procedure that allows one or more users through at least one client computing device to access the secure exchange server, wherein communications between the secure exchange server and each of the one or more users is through a communications network, wherein the one or more users comprises a user of a second business entity communicating with the secure exchange server through a second computing device; providing, by the secure exchange server, a design process facility adapted to facilitate interaction between the secure exchange server and the user of the second business entity communicating through the second computing device to develop a customized graphical interface for the user of the second business entity, the interaction comprising: i. a business discovery stage to determine business goals of the second business entity related to development of the customized graphical interface, ii. a design discovery stage to determine a visual design for the customized graphic interface, iii. a design implementation stage to produce an iterative developmental implementation for the customizable graphical user interface, and iv. a design resolution stage to implement a functional customized graphical interface for use in interfacing between the secure exchange server and the second computer device; receiving a request from the second computing device to develop a customized graphical interface; requesting and receiving requirement parameters from the second computing device for the business discovery stage and design discovery stage for development of the customized graphical interface; iterating, between the secure exchange server and the second computing device, a user developmental implementation of the customized graphical interface; and implementing an operable customized graphical interface for the second computing device to interface with the secure exchange server.

Various configurations for implementations of a business data model and language may be provided. The ability for applications to define their own business data model (or schema) is enabled using a business language that the platform can interpret. The platform itself will enforce the basics of this language, like cardinality and the valid or invalid connections between various data model types and relationships.

Figure 22:
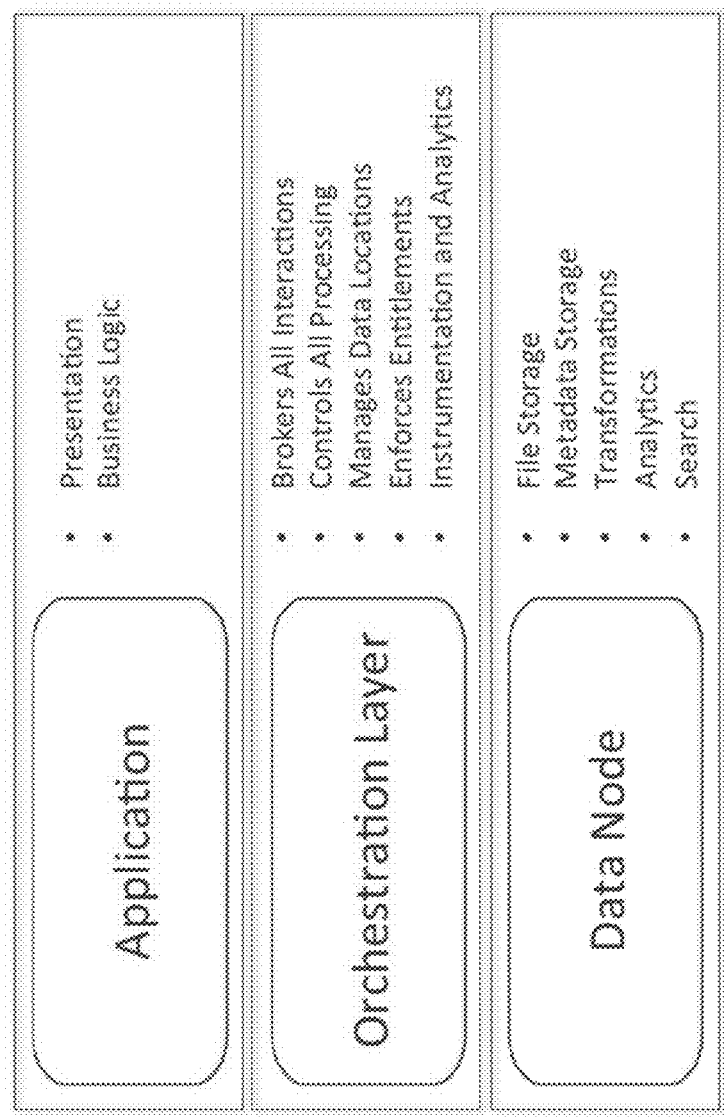

Referring to FIG. 22, the architecture of an exemplary customizable secure exchange platform may be described by these main functional areas: (1) an orchestration layer, and (2) data storage nodes for storage available to the user, via an application wherein the application includes business logic and presentation such as a user interface for the user/entity. The orchestration layer may provide orchestration services that keep track of and manage everything that is going on in the platform, including, without limitation, tracking where various data (also referred to herein as "assets" or "user data") resides, the extent of access to data, brokering interactions, controlling processing, managing data locations, enforcing entitlements, instrumenting and providing analytics, and the like. The data storage nodes may provide data node services that operate on and store the customer or user data in data stores (file systems), store files (content data), store metadata, provide transformations, provide customer or user analytics, provide searching tools, and the like. While the orchestration services know about everything that is going with the user data at the data content and/or metadata level, such as all actions and events that take place with respect to the user data, in embodiments the orchestration services don't actually see the data content of the user data itself.

Figure 23A:
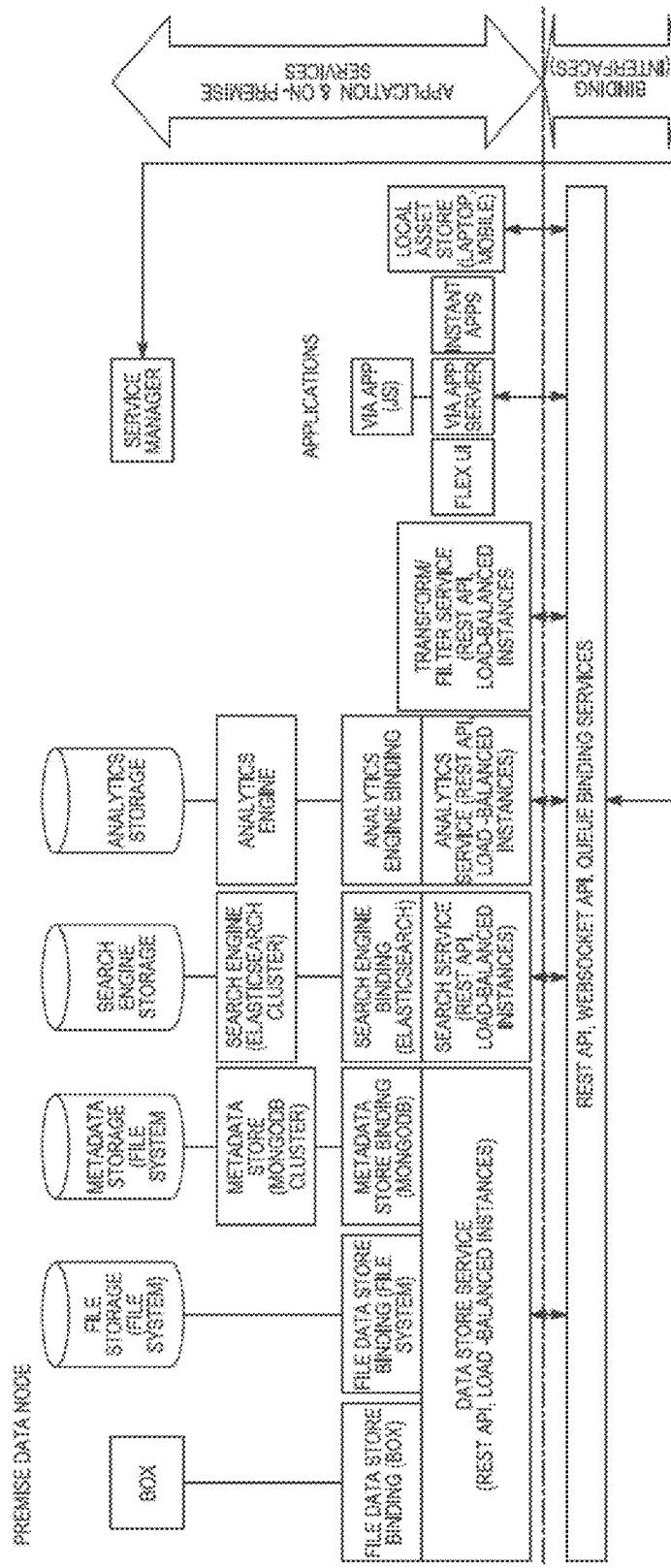
Figure 23B:
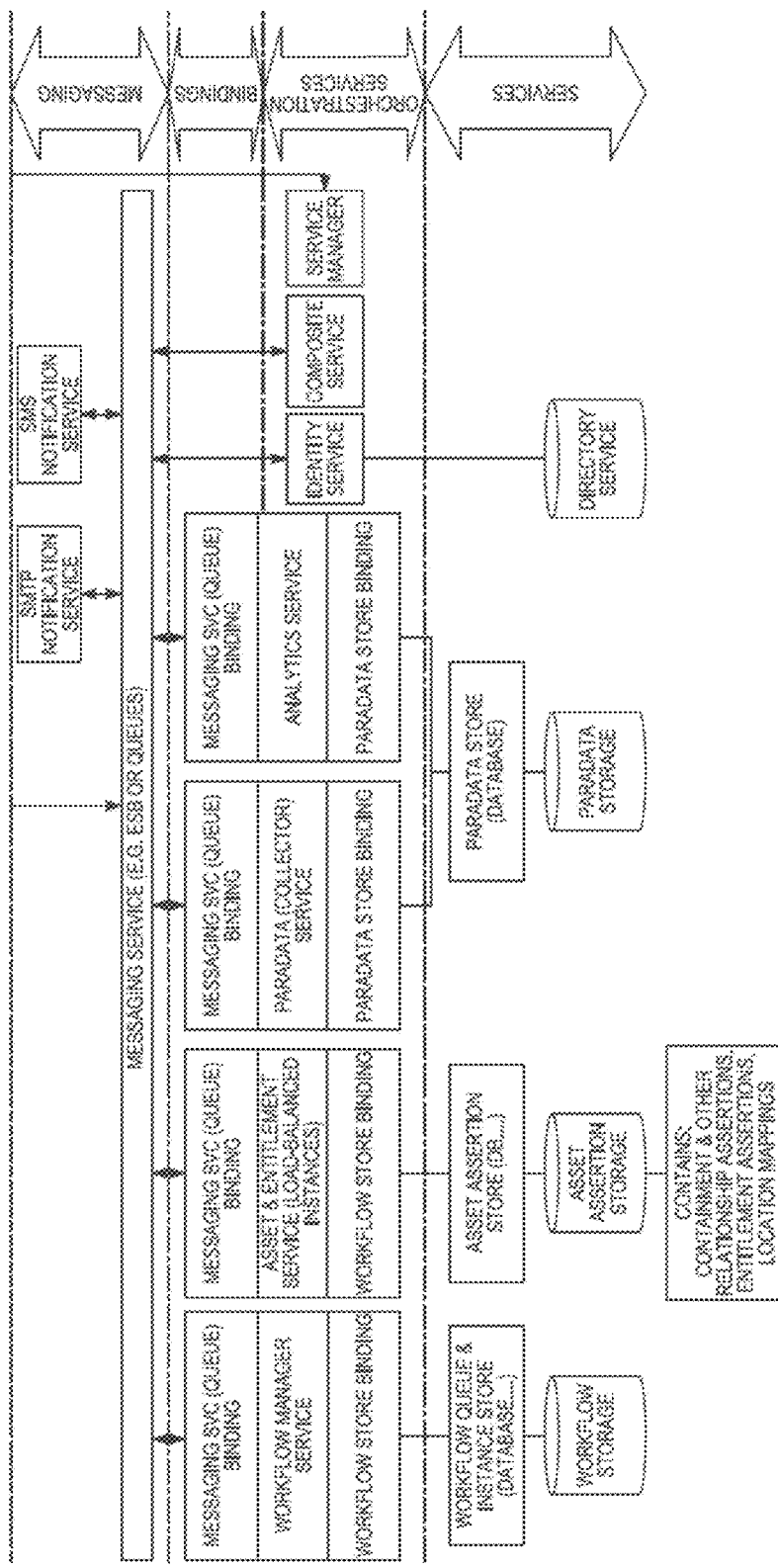

Referring to FIGS. 23A-B, exemplary platform architecture for the customizable secure exchange environment is presented, showing how a data storage environment (or data nodes) may be separated from an orchestration layer. As shown, the data storage node includes various data node services such as a data store service, a search service, an analytics service, a transform/filter service, and/or a service manager service, along with various business applications, and the like. The orchestration layer includes orchestration services such as a workflow manager service, an asset and entitlement service, a paradata collector service, an analytics service, an identity service, a composite service, and/or a service manager service, and the like. A messaging service and notification service acts to link these orchestration services with the data node. In this example, the data storage node is located on the premises of an enterprise, such as part of an enterprise data center, although this data node may also be located elsewhere.

Each of the services implemented in this architecture may be enabled with a 'provider' layer that insulates a basic service contract (implemented as an API) from the rest of the services. Each of the services may be capable of processing multiple versions of its API so that new services can be brought online before older versions of the service are taken offline. This enables the system to stay up and running without any interruption. Each of the services may be written in such a way that it can be automatically scaled up and down as required based on the level of performance of that service relative to the current workload needed by that service.

Generally, orchestration services are those services that keep track of and manage all the user data and processing that is occurring. In embodiments, a basic messaging system that brokers the communication among all the services and between the data nodes and the orchestration layer is utilized. For example, an asset and location service may be provided that is responsible for keeping track of where all the assets in the system are located and which users (persons, groups, and roles) have access to those services from a basic containment perspective. When a client (web browser, iOS app, or other type of client) of an entity needs to access a particular asset or grouping of assets, it first checks with the asset location and entitlement service. Upon validating, the user of that client is entitled to the asset from a containment perspective, the service returns the location of the asset along with a token (or ticket) that can be used, preferably only for a short predetermined time period, to access that asset from particular data node where that asset is stored.

Figure 34A:
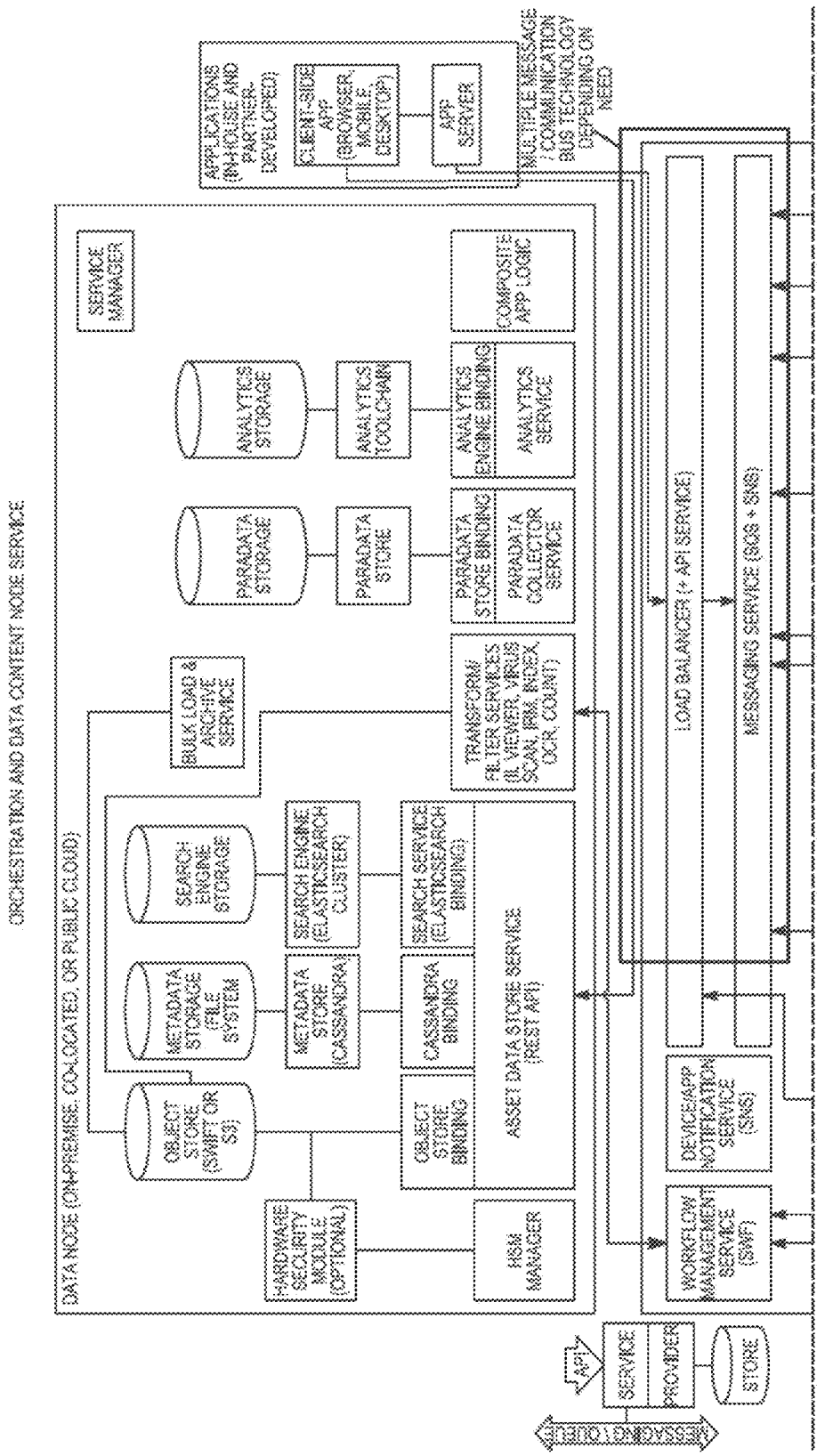
FIGS. 34A-34B illustrate an exemplary secure data exchange environment.
Figure 34B:
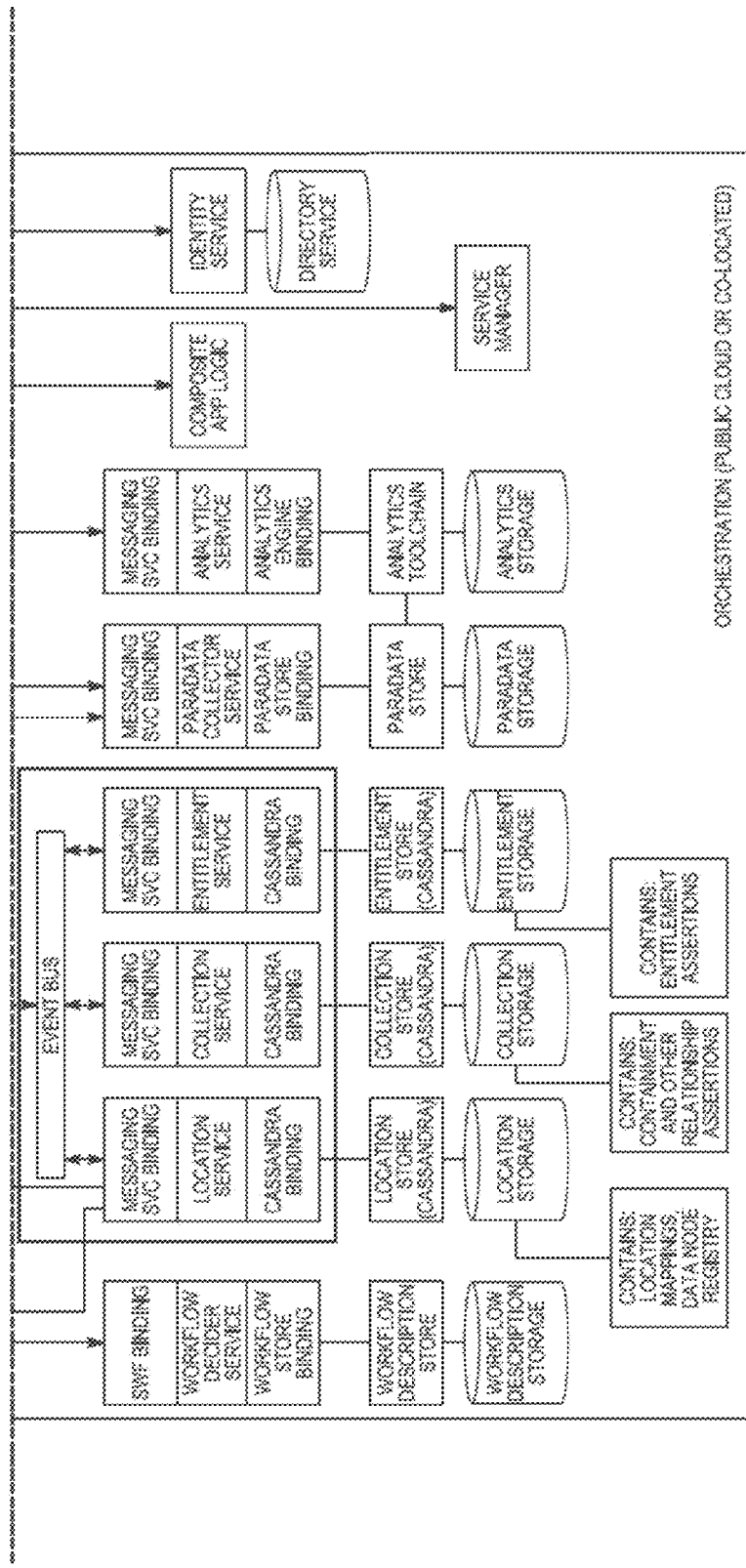

FIGS. 34A-B are similar to FIGS. 23A-B in many respects, and illustrate that an interface between the orchestration layer and the data storage nodes may include load balancing (e.g., in association with an API interface), a messaging service, and the like, where the messaging service may be provided through multiple message and communication bus technology depending on the interaction required by the services with each other. This configuration may also help ensure that a virtualization layer can be implemented in both the orchestration as well as in the data storage node, where the hardware may be located on the user's premises.

Figure 24:
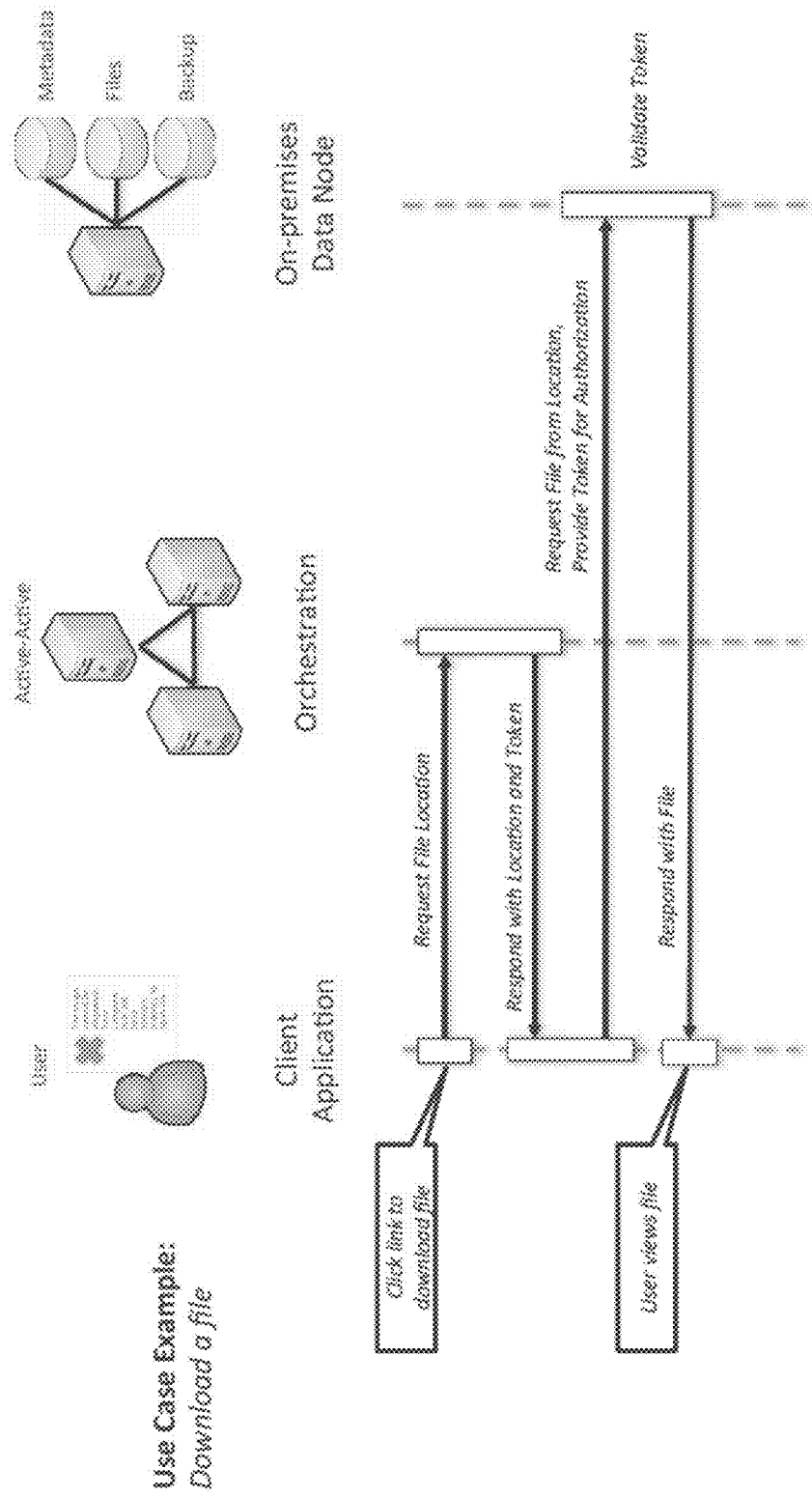

FIG. 24 shows an example download request process, where a user, via a client application, clicks a link to download a stored file. A request for the file location is then sent to the orchestration services, which upon validation of an authorized user, responds back to the client application with a location and token for the file (which securely represents the authorized action). The client application then requests the file from the data node location, providing the token for authorization. The data node takes the token and, using a key shared between the data node and orchestration service, re-signs the request, thus re-creating the information presented in the token. If the information received in the token from the client application matches the information in the newly generated token, then the message is verified, and has not been tampered with. Thus the request from the client application correctly represents the actions that were authorized by the orchestration service, verifying for the data node that it can proceed to execute them. Once the data node validates the token, it responds with sending the file to the client application. This process may be extended to the fine-grained details of an action. For instance, this process may specify not only access to a file, but also to particular actions (e.g., 'GET' vs. 'CREATE), and even control of which fields may or may not be changed, and the like. Therefore the process may be able to control and verify any level of action, thus preventing any unauthorized action from being executed on a file at a data node, even when control verification is provided in a separate location at an orchestration service location.

Other services may include a notification service, a composite service, an identity service, and the like. The notification service may be responsible for sending notifications via the appropriate channels (e.g., SMS—short message service, SMTP—simple mail transfer protocol). These services may pull messages from the message queue as appropriate and send them to the intended recipient. The composite service may be where application business logic (or common business logic) that needs to run outside the data node is processed. The identity service may be responsible for validating the identity of each user, providing a basic directory (also known as Global User Directory or GUD) of the system. This service may support various federation models in order to support both login activities as well as rights management. Functionalities addressed within the identity service may include single sign-on (SSO), exclusive single sign-on (ESSO), lightweight directory access protocol (LDAP), active directory integration, security assertion markup language (SAML), and the like. With regard to managing identities, a user may explicitly opt-in with regard to allowing their identities to be shared, such as providing their personally identifiable information (PII) to other users of the system depending on business need. Users who do not opt-in may not be provided with access to various services. As a general rule users who opt-in may not have control over the geographical locations of where their PII is stored (or replicated). For example, there may be specific requirements related to Swiss law that need to be taken into account using some sort of federated active directory that prevents any Swiss user involved in the banking industry from having their PII leave the Switzerland borders.

A service manager in the orchestration layer may provide basic health monitoring of all services (for the orchestration layer and data nodes), provide scaling of services up and down, provide deployment of business applications, provide provisioning of data nodes, initiate bulk loading and archiving, provide data migration tools (for migrating content from one data node to another data node), provide administration of business applications, configure various application and customer service extensions (e.g. transforms and filters), and the like. The service manager on the orchestration layer may initiate service requests to data nodes for various maintenance functions, such as backup and restore, deploy new versions of a service (or restore an old version), and the like. The service manager of the data node may carry out these functions and provide a mechanism for the orchestration layer to get status of whether the function was carried out or not. The ability may exist for tenants to be defined in such a way that full administration rights can be delegated to partners. This concept is referred to herein as a 'limited admin', where the system ensures that administration of tenants is based on the ownership of the administration rights for those tenants. Partners who have been assigned administration ownership of a tenant should have the same level of capabilities as a system administrator who owns administration capabilities for tenants that are provisioned. System administrators may not have access to perform any administration functions for tenants that are owned by a partner. The system may reserve the right to turn off a partner's ability to provision or administer accounts, but this does not mean that the system will be able to perform the administration once the partner's rights have been removed.

A workflow manager service may provide processing flow control of work that occurs in the system when user data (assets) are uploaded and downloaded from the system. The processing activities that occur during upload are referred to herein as transforms and the processing activities that occur during download are referred to herein as filters. These workflows may be configurable at multiple levels, including at the platform level (system wide across all applications), at the level of specific business applications, at the level of specific customers, and the like. These workflow processes may cause a number of actions to occur, such as a custom process, blocking further execution of the workflow, logging that an action occurred, alerting that an action occurred, and the like. These workflows may be used by entities such as professional services groups or partners to provide application- or customer-specific services to be processed (e.g., package best in class DLP (data loss prevention) or PII (personally identifiable information) integrations for customers to use).

Figure 25:
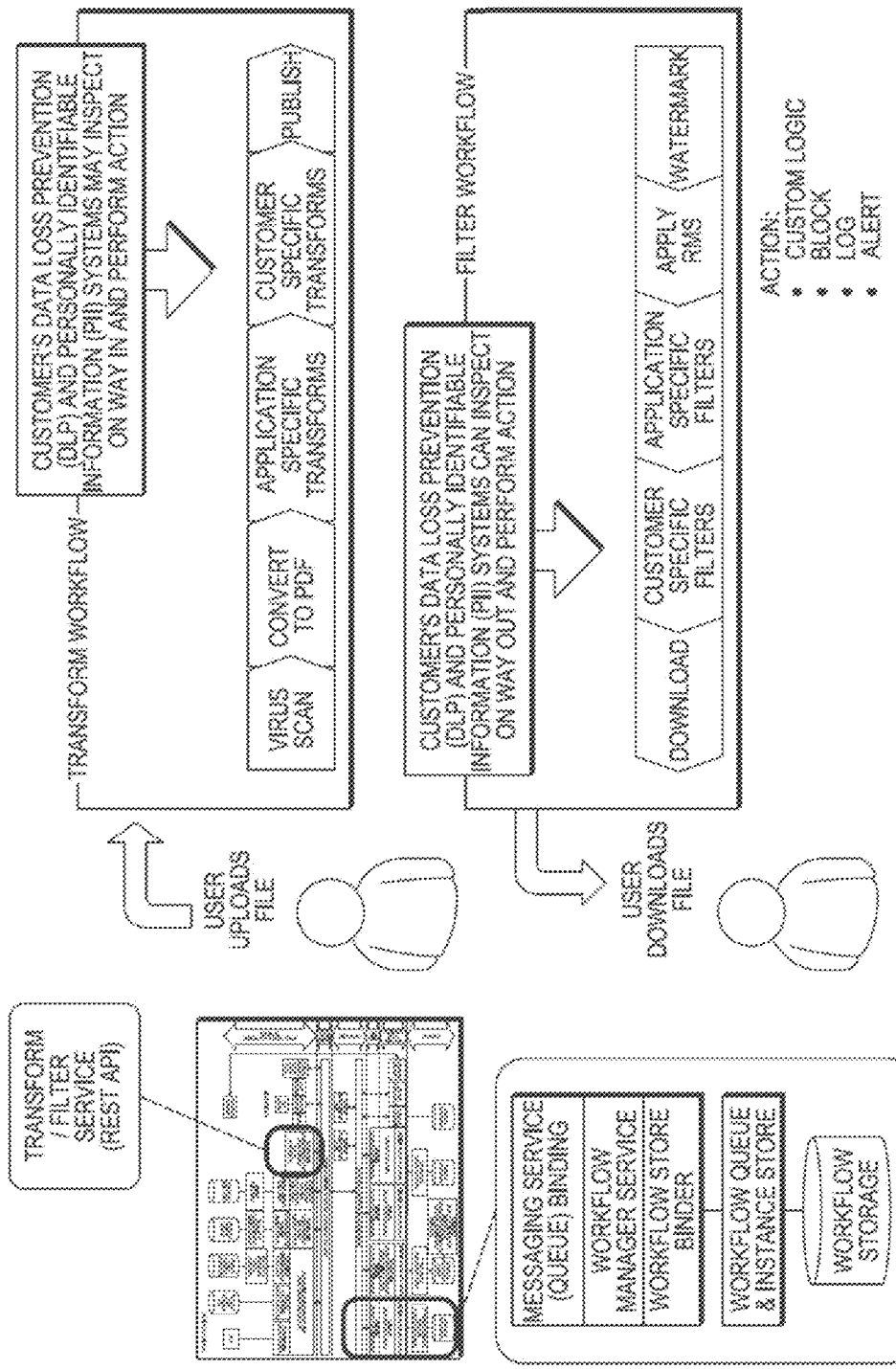

FIG. 25 depicts a concept behind the function of these workflows. For example, a transform workflow on a data file uploaded by a user may include a virus scan, a conversion to a PDF, various application or customer specific transforms, and then the data/file may be published. An example filter workflow for a file being downloaded by a user may include a watermark application, an RMS application, or various application or customer specific filters, and then the file may be downloaded.

Transform and filter services are those services that perform processing on files as they are uploaded and downloaded (respectively) to a data node. The processing occurs within the data node and can be configured using the workflow management service. The configuration may occur at multiple levels such as system wide (e.g., platform configured), application specific, client and professional services (e.g., on per customer basis), partner configured (on per partner application basis), and the like. All files that are uploaded to the system may be required to be processed by a virus scanning transform, and it may be required that no files are made available for download until the virus scanning has completed and the file is determined to be safe. Some document formats may be converted to a suitable format, such as PDF, for rendering by the viewer facility, for web viewing, and the like, such as from word processor formats, presentation formats, and the like. Watermarking may also be provided, which is a filtering process that occurs as files are being downloaded. In embodiments, this process may be provided for files that have been converted to PDF and are being viewed using the viewer facility only. The watermarking options can include username, date and time, name of the document, and the like. In addition to the information contained in the watermark, there may be display options that can be configured, such as the location of the watermark on the page size of the watermark, and the like.

For large files, 'viewer chunking' may be implemented in order to increase the viewer performance in handling the large files. For instance, viewer chunking may be implemented such that portions of the file can be downloaded and viewed without the user waiting for the entire file to be downloaded. There may be both synchronous and asynchronous chunking processes that occur, such as depending on the timing of the file download request relative to its initial upload. Rights management processing may also be applied (e.g., information rights management (IRM), digital rights management (DRM), and rights management service (RMS)), such as based on the type of file being processed and the technology used in the processing, to protect a document that is downloaded and viewed locally or offline. Other services may be provided for files being uploaded, such as full text search extraction, optical character recognition (OCR), page counting, and the like. The full text search extraction transform may process the different file types upon upload so that they can be searched, such as for PDF, Microsoft Office, text, and the like formats. OCR processing may be provided for documents, such as scanned PDF files, so that files that have been scanned into the system are also searchable.

Data node services are those services that process customer data. These services are required to look at customer data and perform logic based on that data. The data node layer as a collection of services can live anywhere, including in a public cloud provider, a system data center, on-premises at a customer site, such as via an appliance, virtual machine, and the like. The purpose behind the deployment options of the components of the data node layer is to accommodate the various customer needs around data privacy, legal data restrictions, cost, and the like.

Only users with appropriate entitlements are able to access or manage the data content in data storage nodes, such as in an asset data store, a file data store, and the like. An asset data store may be where metadata about assets is kept. This metadata may or may not be associated with specific files. The data contained in the asset data store can only be accessed by a user with the proper entitlements and only once the client they are using has presented the data store with the appropriate token (or ticket). The file data store may be where all file data for a given data node are stored.

In embodiments, a search facility or search service may be provided, such as to perform a full text search, a metadata search, and the like. A full text search capability may run on the data node and be responsible for full text searching. The indexing and other processing of file data needed for search may be provided during a transform when files are uploaded. There may also be a need for searching based on metadata. This searching may also be done on the data node layer because it is required to look at the actual contents of stored customer data.

A data node may provide a paradata service, an analytics service, and a reporting service, a service manager, a business language, bulk load and archiving facilities, customer managed keys, and the like. Paradata is the exhaust data of all the activity that occurs in the system, where a data node paradata service captures the customer-entered data. The customer specific analytics and reporting needs may primarily be met by interacting with the paradata service on their data node. They may run special purpose data extraction programs that provide data they are entitled to access for the purposes of running custom reports. The service manager at the data node interacts with the service manager that is part of the orchestration services. It accepts, acts, and responds to messages from the orchestration service manager. Business language may provide the processing that enables an application to query and traverse the business data model using terminology defined by the application. The bulk load and archive processing may enable exporting and importing data such that a complete set of customer data can be reconstituted in its entirety including historical information with date and time information. While this service may provide a basic navigation and view of this information (e.g. via raw XML), any 'live' presentation of this information in an offline mode may typically be the responsibility of the application responsible for creating and rendering the data initially.

Infrastructure and management services may be provided that control and help manage the rest of the services in the platform. For instance, there may be a component of the management service in the orchestration layer and another component of it in each data node. These services may each perform local functions as well as communicate to each other in order to have functions performed on their behalf. Some of the operations carried out by these components may be enabled in an automated way based on configuration parameters that have been set, and other operations performed on-demand through the use of API calls. The ability to deploy, monitor and control both orchestration and data node services may support the ability to check on the number of service instances running at any point in time, the ability to check on the health of any service instance that is running, the ability to bring specific new versions of a service up, the ability to bring specific old versions of a service down (e.g., soft shutdown), the ability to force a specific instance of a service to shut down (e.g., hard shutdown), auto-scale a service that is not meeting its service-level agreement (SLA), the ability to configure the SLA for a specific service, the ability to identify the physical resources that are available for resources to pull from, the ability for a service to request additional physical resources from a pool of resources, the ability to perform backup (and restore) operations, and the like.

In embodiments, the infrastructure and management services may provide for different resource deployments, such as cloud deployment, on-premises deployment, hosted software-as-a-service (SaaS), and the like, as well as hybrids of the foregoing. Cloud deployment of services in a public cloud infrastructure may be supported for services including the orchestration and data node architecture components. On-premises deployment of data node services may be supported, such as for performing an automated "self-check" of whether data node resources are accessible, checking and monitoring the physical resources available on a data node, bringing up a data node, checking on the version of all services in a data node, bringing up services on a data node, checking on the health and operations of a data node, checking on the security of a data node, pushing new versions of any service down to a data node, and the like. There are a number of physical data node classes that may be supported, such as depending on the level of availability desired by the customer, including active-active fixed scale, active-active dynamic scale, and the like. Orchestration and data node services may also be hosted on the system's secure server.

Figure 26:
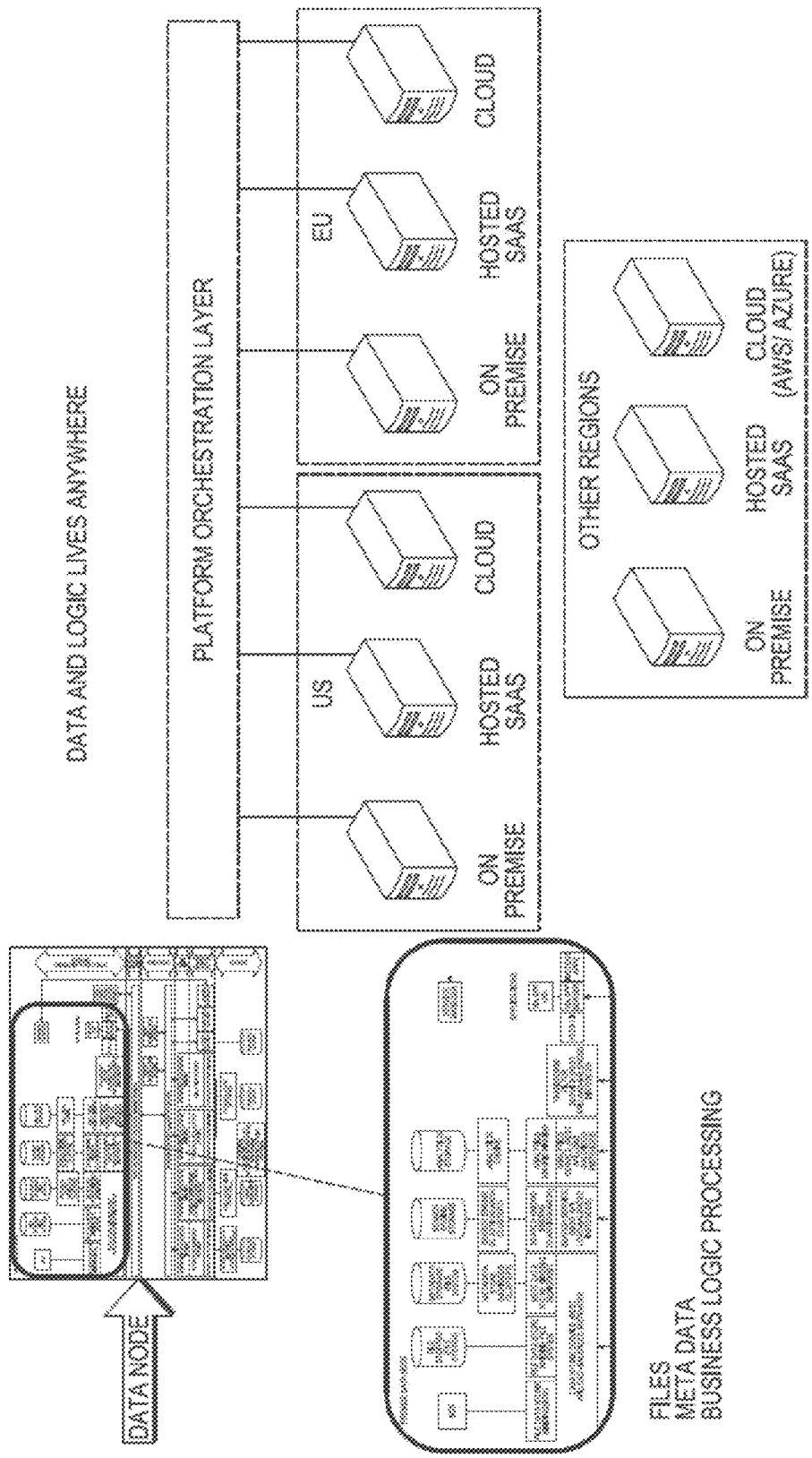

Referring to FIG. 26, it is shown how this separation of the data node structure from the orchestration layer provides flexibility as to where data nodes, with their files, metadata, business logic processing, and the like, may reside, such as on premises with the business entity, as a hosted software as a service (SaaS), stored in the cloud, located in different geographic regions, and the like. With this structure, the presence of a separated orchestration layer in the architecture is not bound to the premises, and enables tracking and reporting of actions on objects, properties, tasks, work streams, and the like, at a level of abstraction that does not require access to the underlying data content itself. For example, the data node may be located in a cloud service provider location and the orchestration layer located on the secure server of the system. The data, files, lifecycle, tasking, reporting, and the like, may be present in the cloud located data node, where the orchestration layer on the secure server may have connectivity with the data structure but not knowledge of the data content itself. For instance, the data node may contain data as part of the completion of a series of tasks, and the orchestration layer may know of the hierarchy relating the data and completion of tasks, but have no knowledge of the substance of the tasks (e.g., just that they are 80 tasks that are in a hierarchy and 20 are complete).

Figure 27:
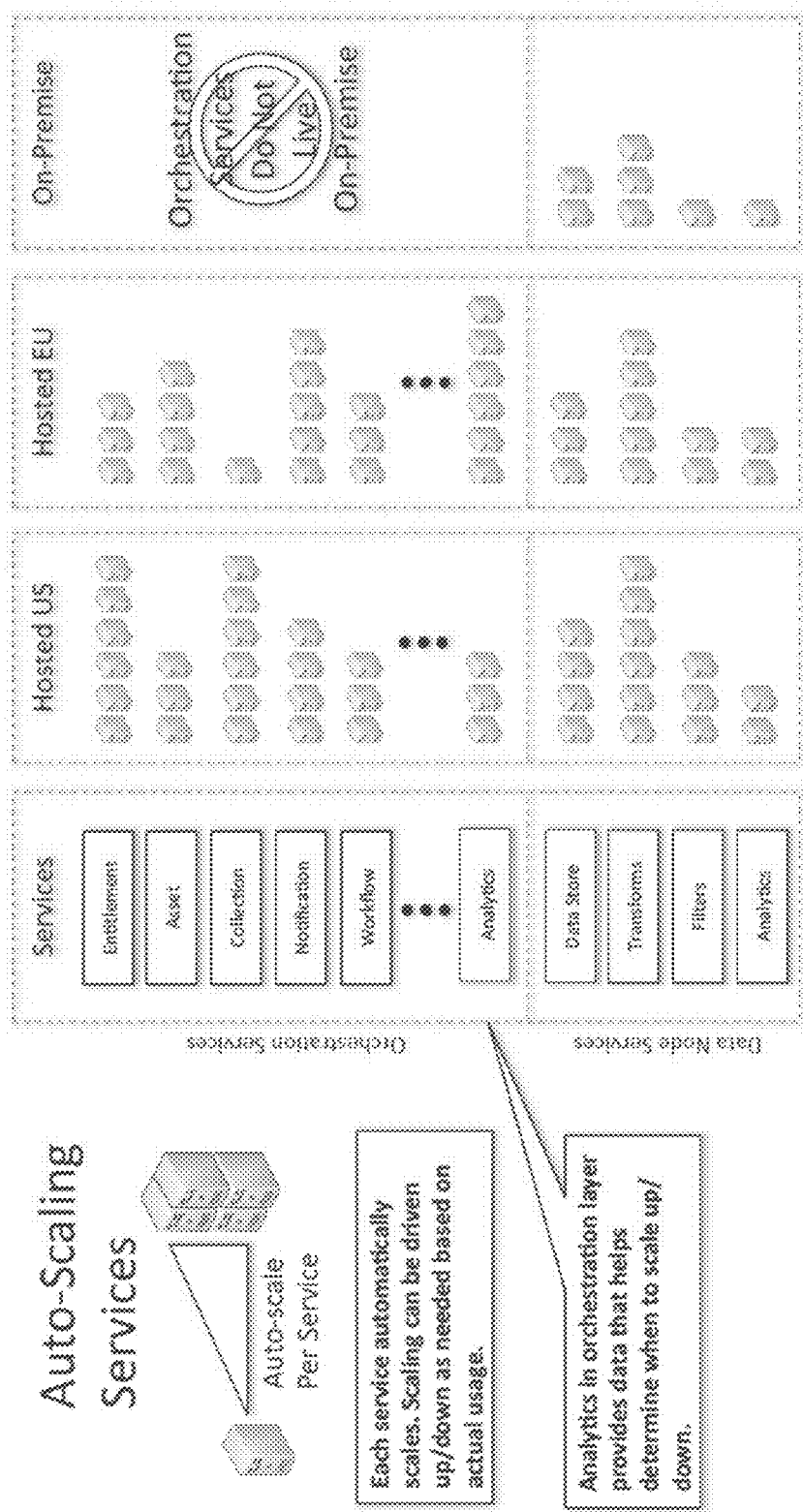

Referring to FIG. 27, services provided by the orchestration layer and the data node may be scalable in order to accommodate different hosted solutions, where services may be automatically scaled or adjusted up or down based on actual usage, where analytics in the orchestration layer may provide data that at least in part determines whether to scale up or down. For instance, as shown in the illustrative example of FIG. 27, there may be a greater need for data storage in the data node service for a hosted U.S. data node than for a hosted E.U. data node and still less for an on-premises data node, where needs for the data store are scalable to the needs of the three sites. In a similar way, the services provided by the orchestration layer may be scalable to the needs of different business solutions, such as shown where there is much greater need for support of collection in the hosted U.S. solution and less in the hosted E.U. solution. Further, there may be some solutions to which no orchestration services are provided in some cases, such as an entirely on-premises solution. Each service may have the ability to be configured with a specific SLA (service level agreement) threshold and this threshold will be monitored using paradata so that the service can be scaled up as needed as long as the physical resources are available. In addition to physical resources being configured from which each service may pull, there may also be a non-physical equivalent that is configured for public cloud environments. The purpose of this is to put a limit on the number of resources that can be consumed if a specific service gets into a situation that it attempts to consume unacceptable amounts of resource.

Figure 28:
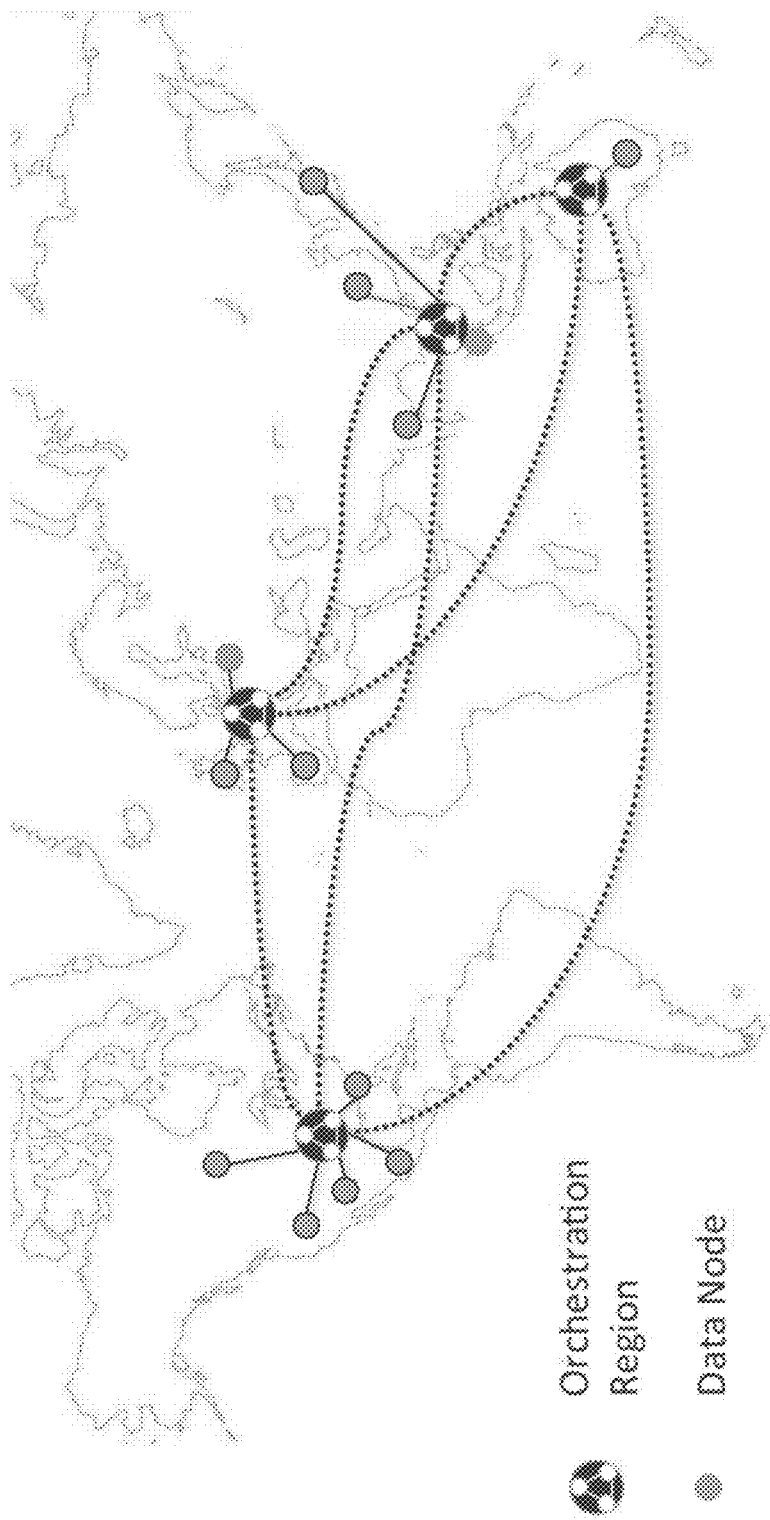
Figure 29:
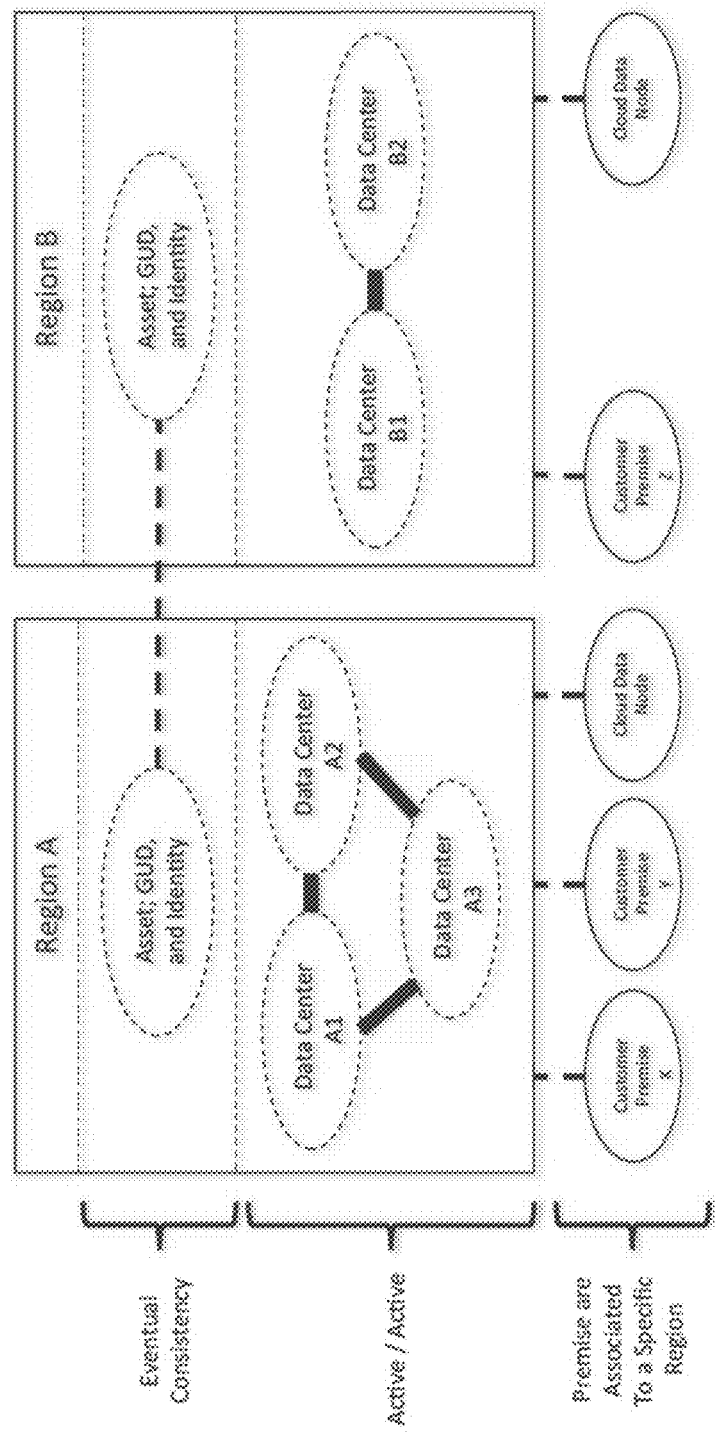

Referring to FIGS. 28 and 29, data node accommodation may be by regions, available zones, resources available on premises, and the like. For instance, there may be different regions, where each region may share certain capabilities, assets, identities, and the like; have data centers assigned to them; have customer premises support assigned to them; have a cloud node assigned to them; and the like. For instance, as shown, there may be a region A and a region B, where they may be able to share certain resources. Region A and region B may also have their own dedicated data centers, such as data center A1, A2, and A3 for region A, and data center B1 and B2 for region B. These data centers may act as stand-alone data centers, or may be networked together, such as to share data, share configuration information, provide extended resources for a data center that needs to scale up due to activity. Customer premises data nodes and cloud data nodes may also be assigned to one region or the other, such as based on the geographic location. This regional data structure may provide regional flexibility as user needs drive scaling of the resources assigned to each user's solution.

Figure 30:
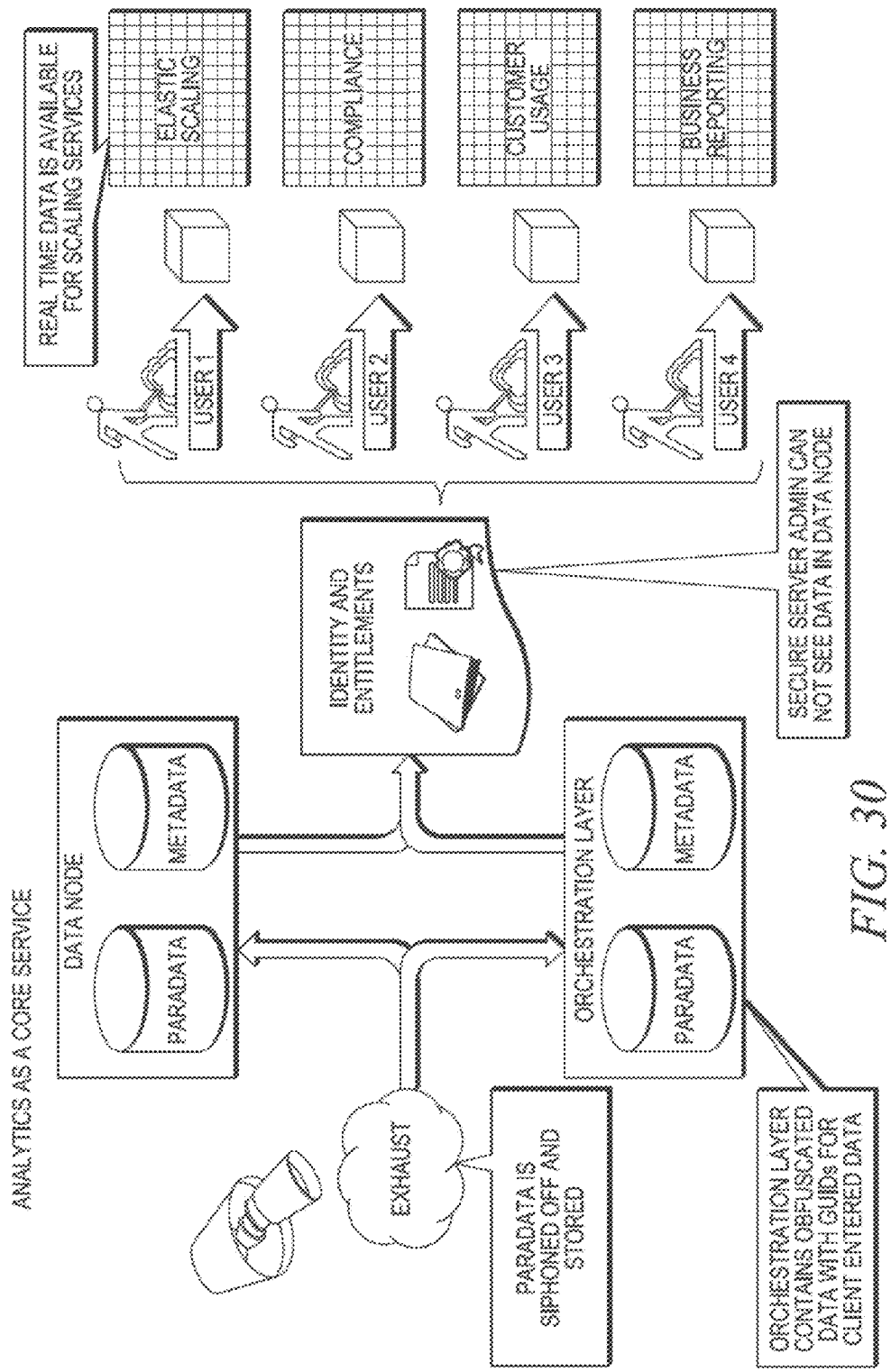

Referring to FIG. 30, analytics may be a core service of a customizable secure exchange facility, such as intelligently handling paradata (referred to in the figure as 'exhaust') that is siphoned off from user activity and stored. An orchestration paradata service may, for example, capture de-identified data without needing to see the data itself. Paradata may be used for analytics and report processing of many kinds. Examples of what paradata may be used for include elastic or dynamic scaling of services, compliance reporting, progress reporting, business application reporting, customer usage reporting, billing reporting, customer specific reporting, transaction specific reporting, and the like. Paradata pulls messages off the queue and stores the data in such a way that accessing that data for reporting does not affect the basic performance of the system. Stored data may be directly stored in the associated data node, and stored in the orchestration layer as obfuscated data (e.g., with GUID-globally unique identifier). For instance, a user may have complete access to a data product stored in the data node, but a secure server administrator associated with the orchestration layer may not be able to see the data in the data node, and only have access to obfuscated data through the orchestration layer. Paradata messaging may be organized, such as with a header (a basic version and timestamp information), context (capturing the context of the message, e.g. which application, user, operation were involved), metadata (e.g., application specific data and system defined data), paradata (detailed status and debugging information, where the original message is also included so any data can be retrieved at a later point in time even if it wasn't originally defined as interesting), and the like.

In embodiments, volume limitations may be improved through the use of the customizable secure exchange facility. For example, a traditional platform may have fixed volume limitations, such as an organization limit of 7500 users per monitored domain; a user limit of 5000 users per exchange and 2500 users per group; an exchange limit of 10,000 folders, 20,000 documents, 200 top-level folders, 1000 documents per folder, 2500 groups; a document limitation of 2 GB file size, 2000 files per download, 500 MB max download; and the like. However, with the scalability of the customizable secure exchange facility, volume limitations may be virtually eliminated, where the enabling technologies may provide for a reporting infrastructure, asynchronous/non-blocking calls, domain-level visibility processing, isolated optimized security model, separating complex models from large domains, elastic services, horizontal scaling, distributed data, defined application patterns, and the like.

In embodiments, the customizable secure exchange facility may provide for an increase in the development rate at which a user deploys a secure exchange environment, where different levels of integration may provide different levels of developmental velocity, such as from a more basic services level, to a business process applications level with basic building blocks, to business process applications and partners level with full components, to business process applications and partner communities including an applications building toolkit software development kit, and the like. These systems may scale up from for instance, a standardized and automated environment creation environment, to a fully automated application development environment, to an independent and isolated services environment, to an automated API and component level testing environment, to full business applications, and the like. The customizable secure exchange facility may enable users to have greater control and customization potential for building unique collaborative sharing environments that are scalable such that volume limitations are virtually eliminated.

Analytics and reporting may be provided through a group of services that operate both in, or with respect to, the orchestration and data node portions of the system. Those services that are referred to as paradata capture all activity that occurs with respect to data. The analytics service is where data, metadata and paradata are organized in useful ways such that they can be used for solving various problems that range from real time health and monitoring of the services, special purpose reporting needs, to ad-hoc customer reporting, and the like. Analytics and reporting may include compliance reporting, billing reports, customer usage reporting, and the like. In addition to reports for market-to-cash applications, additional capabilities to support business systems may be provided, such as for throttling, provisioning, turning capabilities on/off based on usage and adoption, and the like. Throttling is the ability to restrict access to system resources based on limits defined in a business system is required. For example, resources that may be restricted (and the reasons for those restrictions) include disk space, processing (e.g. number of API calls per unit of time), features (e.g., the ability to turn features on/off based on license agreements), applications (e.g., the ability to provide/deny access to applications based on license agreements), system access (e.g., the ability to provide/deny access to the system based on payment or lack thereof), and the like. The business systems may need to have the ability to query for how much of a given resource is being utilized against specific contracts so that they can perform processing and notifications, such as when a client is approaching a specific percentage of their allotted resource, when a client has used up their allocation of an allotted resource, when a client has exceeded their allocation for an allotted resource by a specific percentage in cases where exceeding allocation is allowed, and the like. Business systems may need to have the ability to shut off access to specific resources. Shutting off access may be temporary or permanent depending on the situation. Some examples for when access needs to be shut off are when a client does not pay their bill, when a trial period expires, and the like.

A provisioning facility may be provided for provisioning of users and system containers (e.g. tenants, exchanges, workspaces, etc.) as needed, such as to get users up and running in various modes, including trial accounts, 'freemium' accounts, paid accounts, and the like. The ability to provision partners may also be provided, such as for different types of partners that will need to be provisioned. Examples of the different partner types include partners who build and sell apps on top of our platform, partners who build and sell services used by our platform and applications, partners (e.g., clients) who integrate our platform and applications to their systems, developer (e.g., potential partners) who want to experiment with the system's APIs, and the like. The ability for partners to be administrators of their customers without system administrators may be needed, such as to provision accounts, provision resources, monitor and throttle accounts and resources, administer various aspects of their customer accounts, and the like.

In embodiments, other components and composites may be provided as part of the architecture, such as a business language services, lifecycle services, tasking, collection/folder component, data policy composite, menu and commands, forms, tables, portal, tree, indented table, application builder toolkit, and the like. The platform may provide a business language that application teams, professional services, partners and customers can use to write applications. This language will enable the articulation of the business data model for an application as well as a way to traverse that data model efficiently. Any object in the system may have a lifecycle associated with it, where the lifecycle is a series of states through which the object traverses. Any portion of the business data model that is hierarchical in nature can be thought of as a task structure. The business objects of that model are the tasks starting at the top with the main 'process' task and working all the way down through the structure to the deliverable (leaf) task nodes. A collection (or folder) is a basic construct used for grouping other deliverables. Permissions may be based on the parents' permissions and may be overridden at any point in the folder hierarchy or at individual deliverables. How the system saves and allows data to be accessed may be policy driven, where there may be a need to be able to define basic data policy with respect to how long the data is to be retained on line or in 'cold storage'. Menu and commands may be the primary mechanism by which users interact with the user interface. They may be rendered as links, buttons, popup menus, and the like as needed. The primary presentation may be the responsibility of the application creating the user interface. The menu/command component may enable pre-check filtering, check and post action triggers for events, application, custom logic for professional services, custom logic for customers and partners, and the like. A form component may present the user with a basic list of name-value pairs of metadata. A table component may present the user with a list of business objects and for each business object a series of fields of data about those objects or objects they are related to. The portal component is a composite screen that presents multiple widgets, such as a form, table, chart, graph, tree, lifecycle browser, menu and commands, and the like. A tree component may provide a hierarchical view and navigation of a structure. An indented table component may be a combination of the tree and table components. The application builder may consist of a builder for prototyping and making quick modifications to existing applications and a scripting language (e.g., XML) for building full applications in such a way that they can be controlled using source control management tools.

Figure 31A:
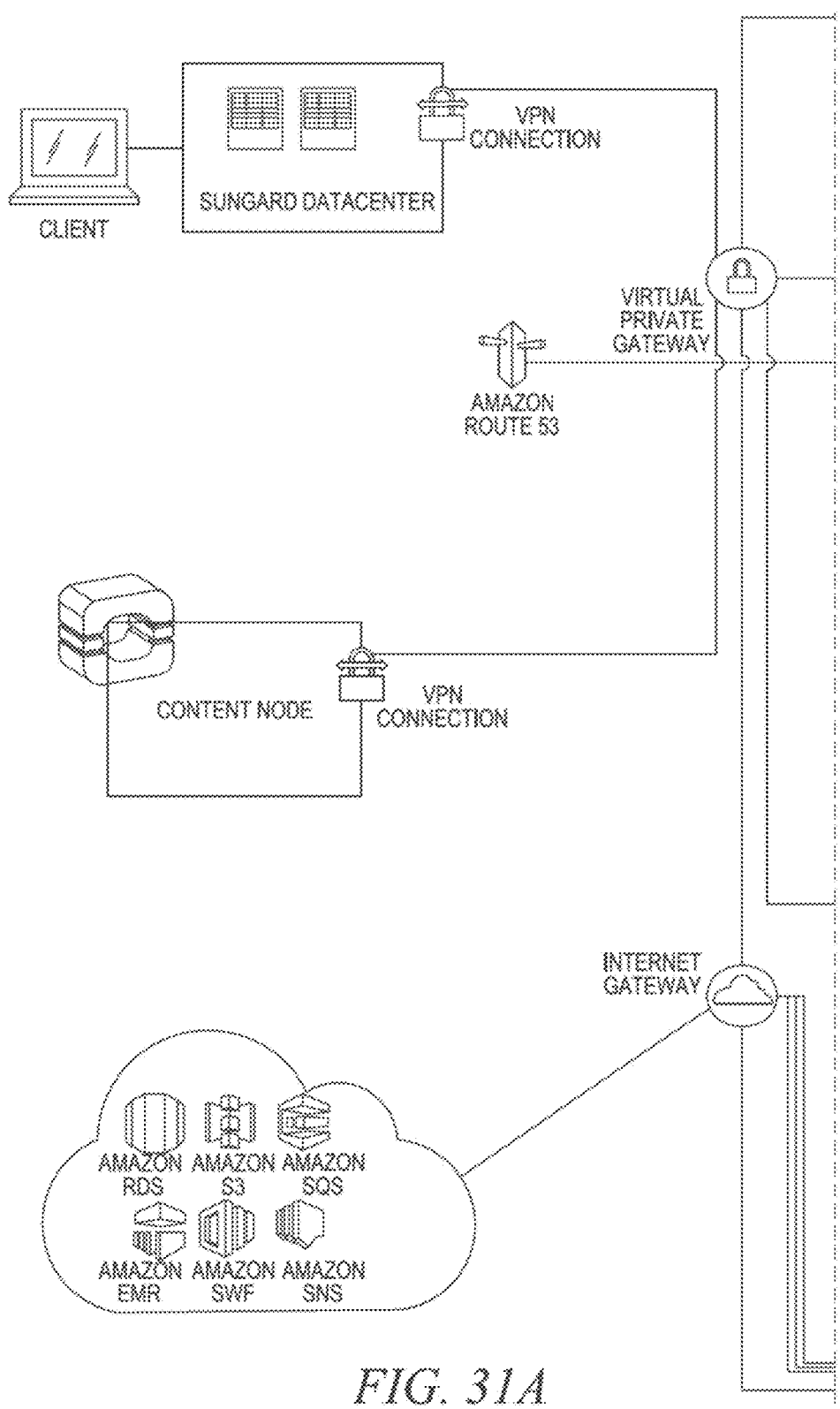
FIGS. 31A-31C depict a non-limiting embodiment of a cloud-computing implementation of the data management facility.
Figure 31B:
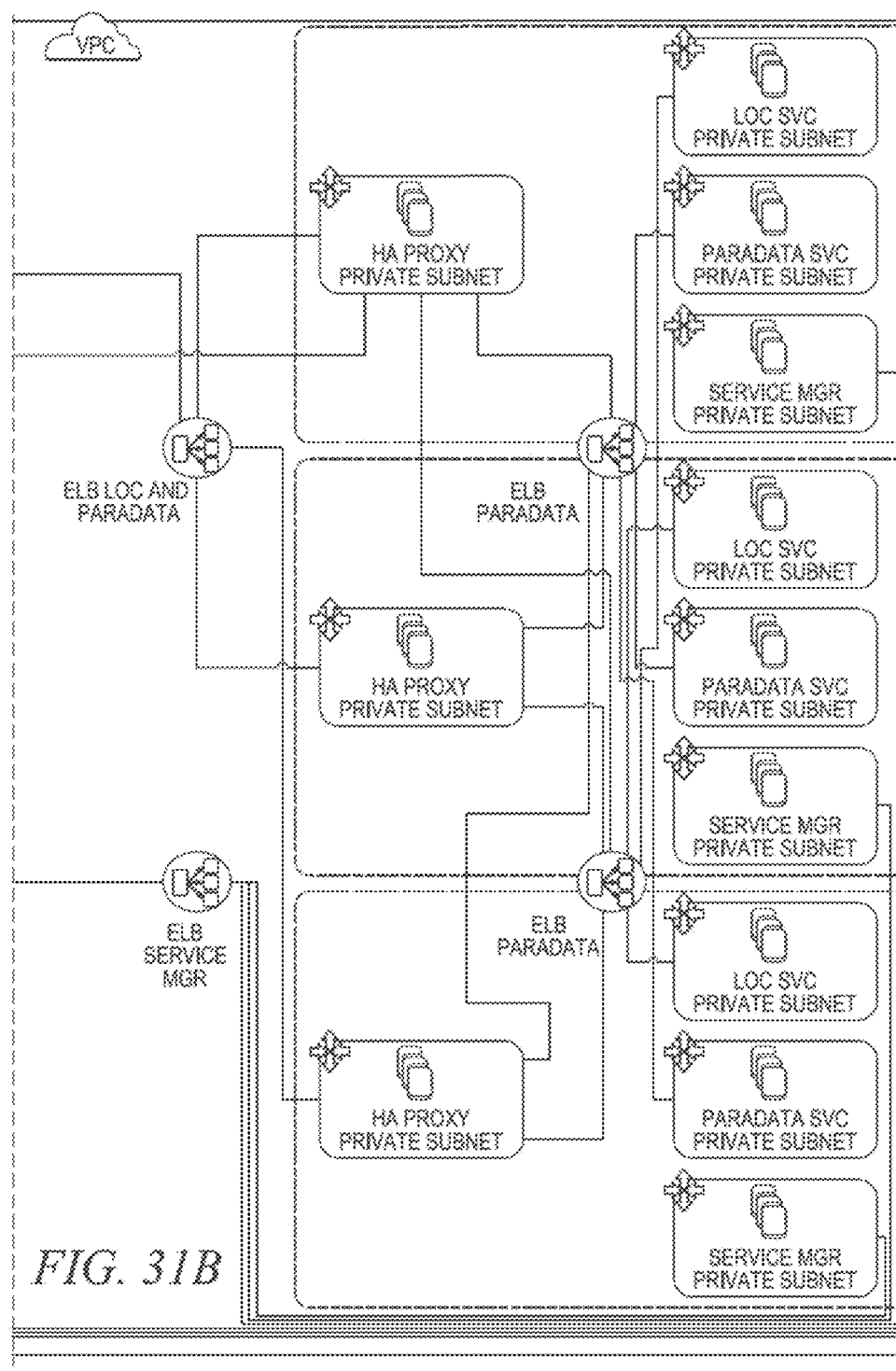
Figure 31C:
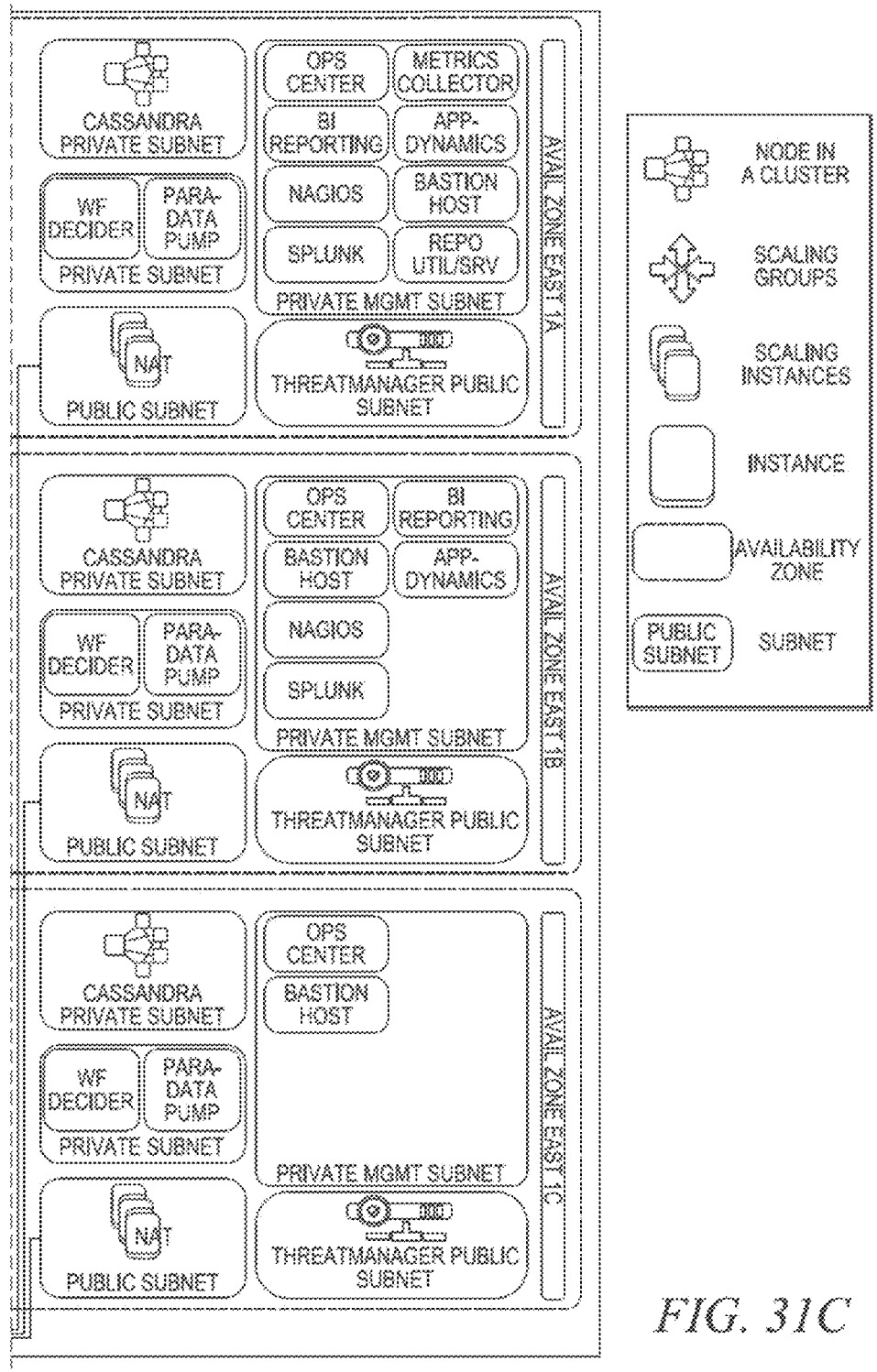

Referring to FIGS. 31A-31C, an embodiment of the data management facility is depicted, which provides orchestration services to the system with respect to content stored in data storage nodes. One skilled in the art will recognize that FIGS. 31A-31C represent one possible implementation of the data management facility and is not meant to be limiting in any way. These figures depict an implementation of the data management facility this is configured as a virtual private cloud (VPC), where an on-demand configurable pool of shared computing resources is allocated within a public cloud environment, such as provided by Amazon, and isolated from other VPC users. Thus, use of a VPC enables the data management facility to operate as a 'virtually private' cloud, secure and isolated from the public cloud. The VPC may be provided through allocation of private and public IP subnets and virtual communication systems, such as with a virtual private network (VPN) that extends a private network across a public network (e.g., the Internet). The VPN may be created by establishing virtual point-to-point connections through the use of dedicated connections, virtual tunneling protocols, traffic encryptions, and the like, enabling the security and management resources of the customizable secure exchange system to extend out into the public network as if it were directly connected to a private network, including authentication and encryption services, and with remote access to its VPC cloud-computing resources.

Referring specifically to the data management facility embodiment depicted in FIGS. 31A-C, a client may access the VPC implementation of the data management facility, as well to a data storage node, through a data center and VPN connection to a virtual private gateway, which connects to allocated computing resources within the VPC (e.g. different computing resource allocation zones), such as through an elastic load balancer (ELB) to distribute the incoming load across several instances of service, such as for paradata and service manager. The system then connects to various highly available (HA) proxy private subnets, to correctly route request to the correct service. In embodiments, the various computing resource allocation zones may be interconnected through ELB location and Paradata and ELB service managers cloud-computing resources within the VPC may be provided through a plurality of public and private subnets, such as for location services, paradata services, service management, threat management, and the like. In embodiments, public subnets may provide connectivity through an Internet gateway to commercial computing resources, such as, in a limited example, to Amazon™ cloud-computing resources (e.g., relational database service (RDS), simple storage service (S3), simple queue service (SQS), elastic map reduce (EMR), simple workflow service (SWF), simple notification service (SNS), and the like), which may provide a broad set of scalable compute, storage, database, analytics, application, and deployment services. Although Amazon™ cloud-computing resources has been used here as a representative example of commercial cloud-computing resources, one skilled in the art will recognize that similar cloud-computing resources are available from other commercial providers, and is but one example embodiment of cloud-computing resources that may be employed by organizations implementing systems within the cloud-computing environment.

Figure 32A:
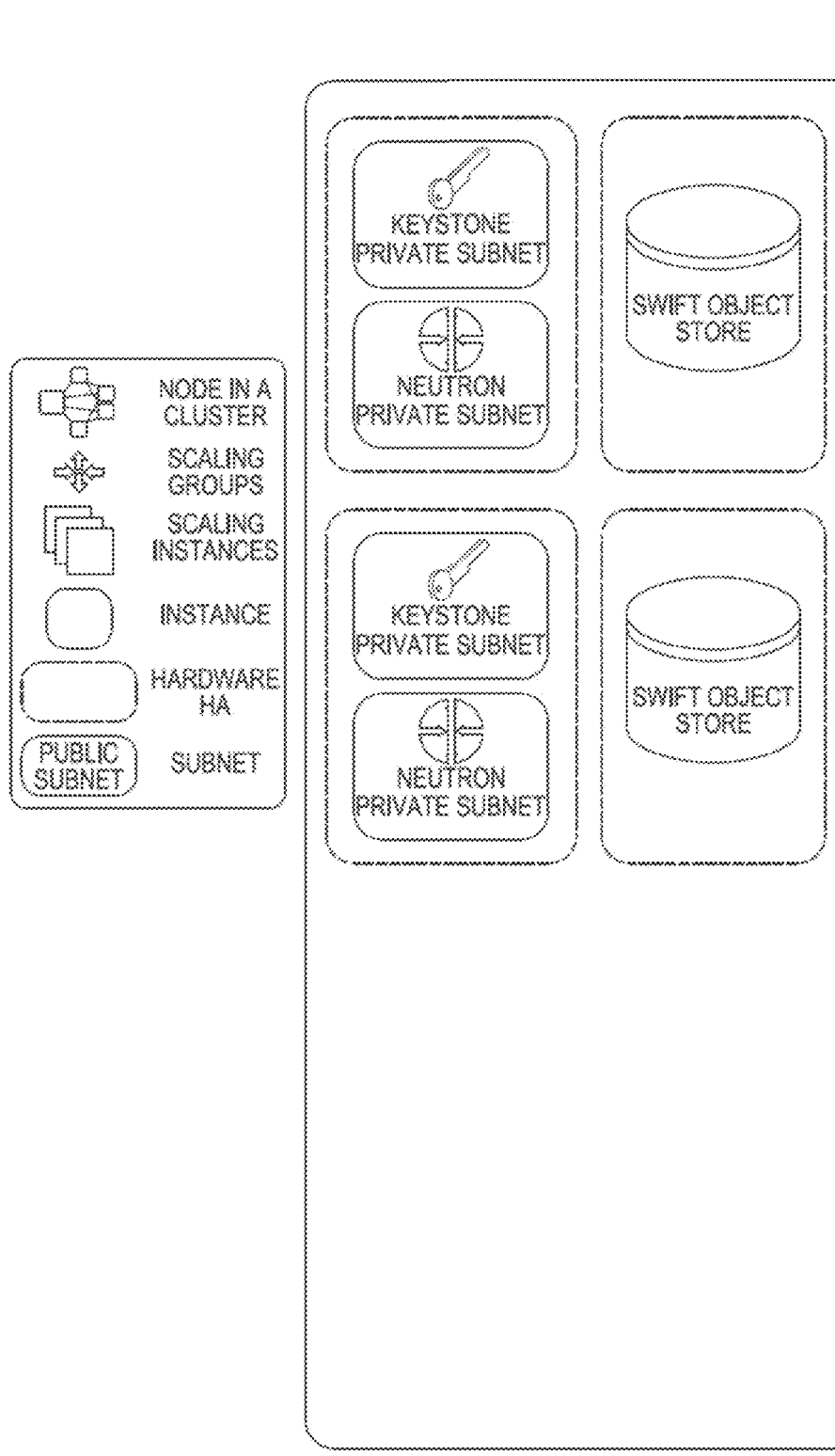
FIGS. 32A-32C depict a non-limiting embodiment of a cloud-computing implementation of the data storage node.
Figure 32B:
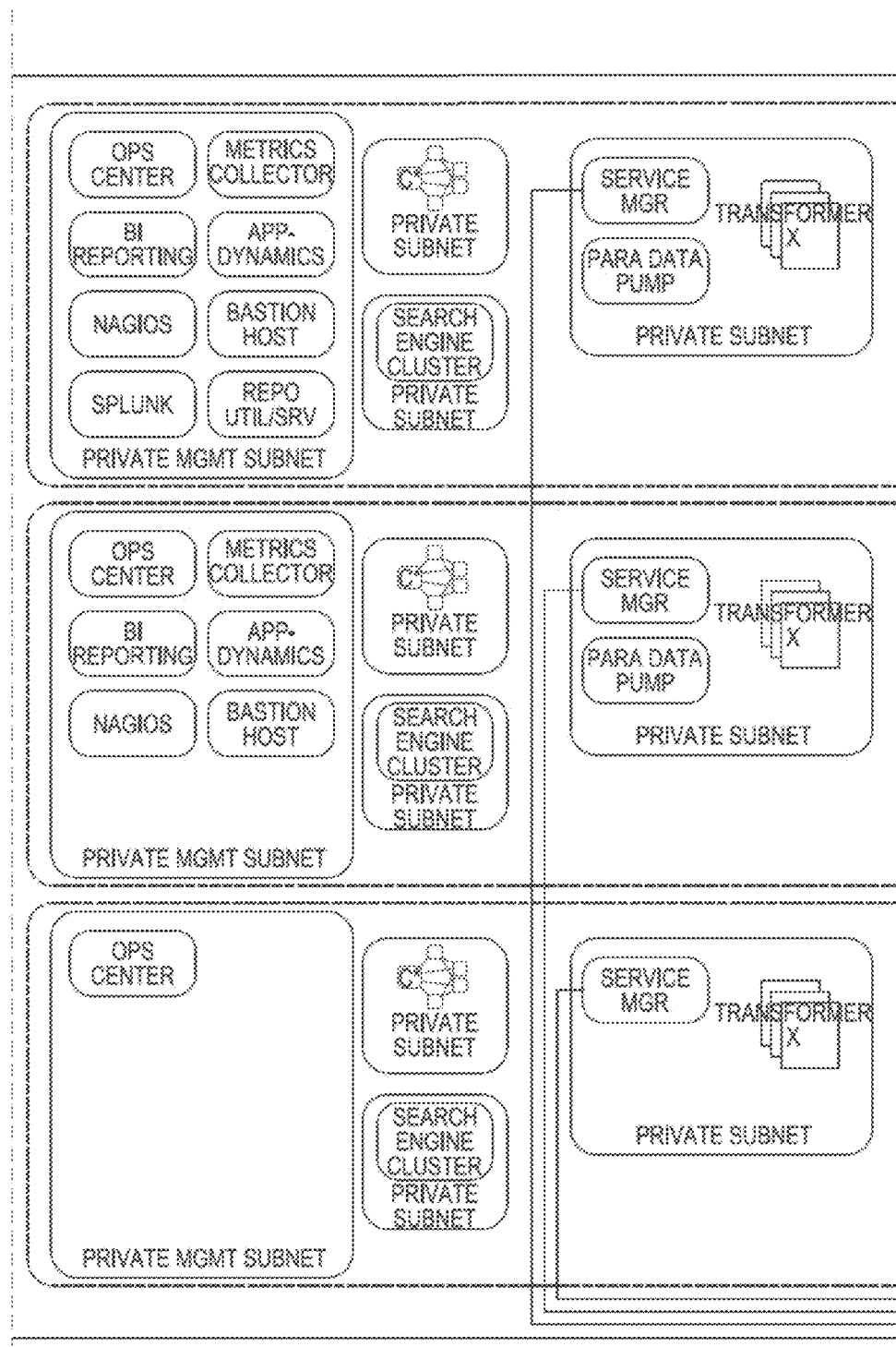
Figure 32C:
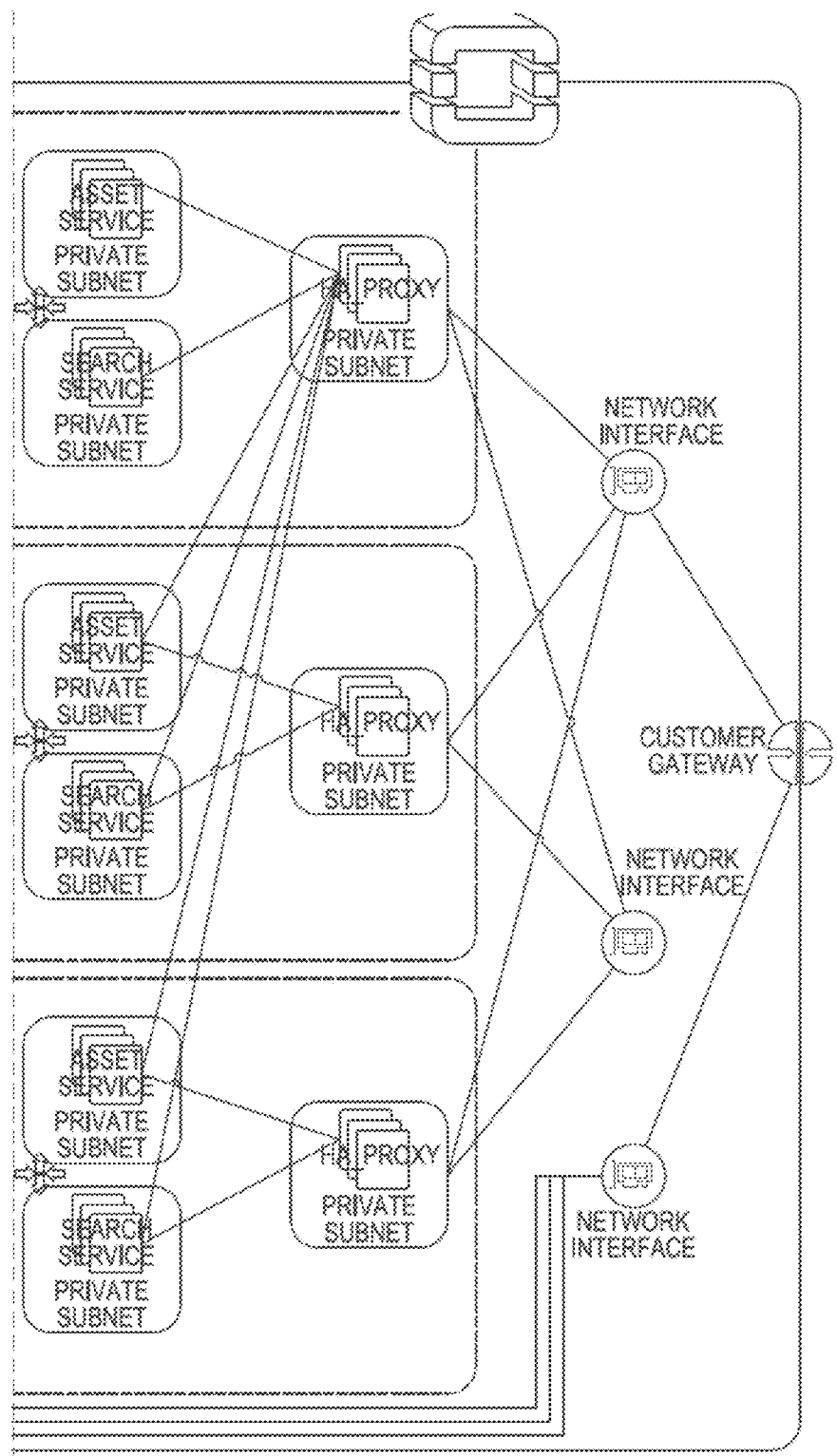
Figure 33A:
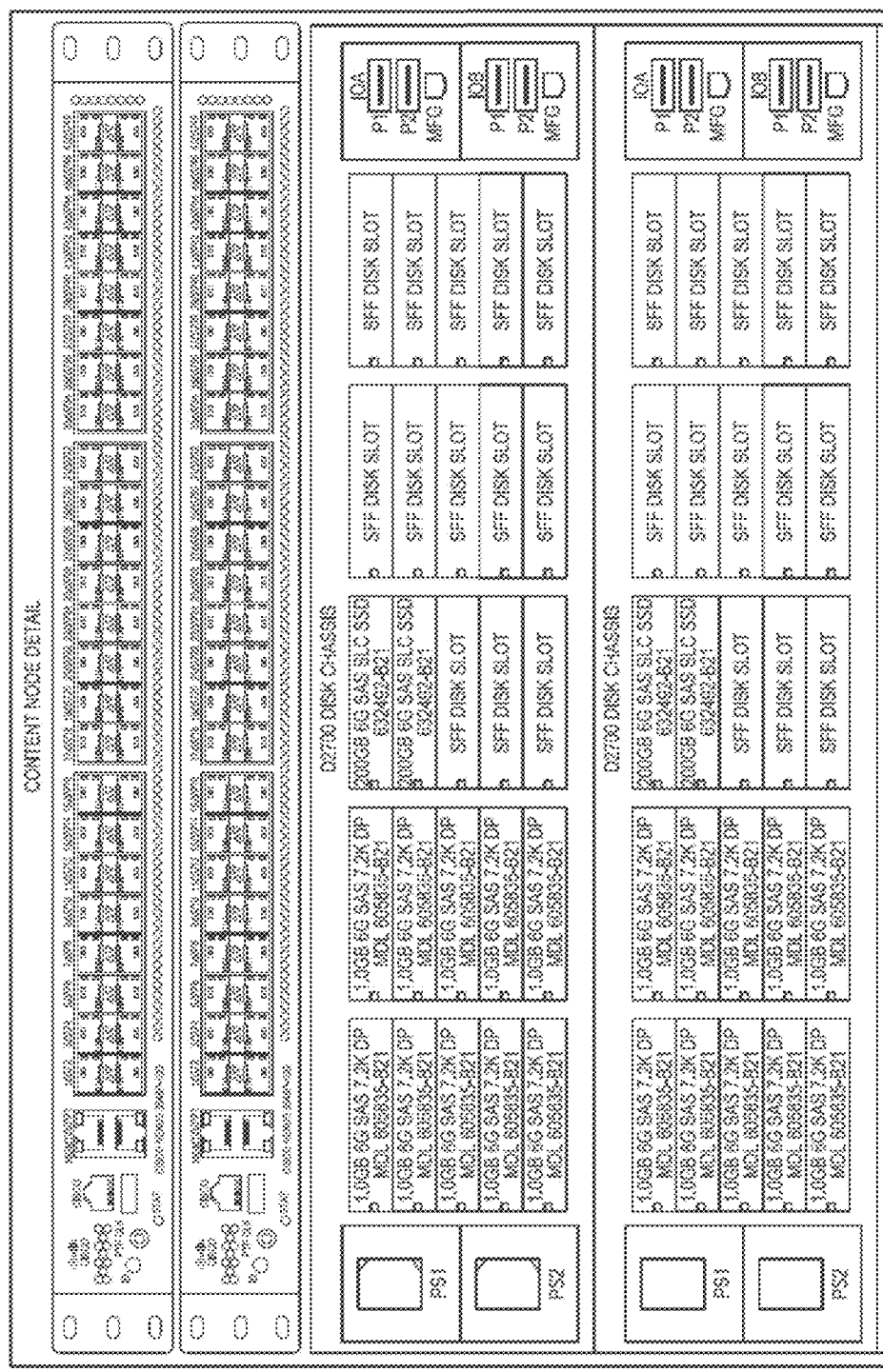
FIGS. 33A-33D depict a representative optional rack configuration for a data storage node.
Figure 33B:
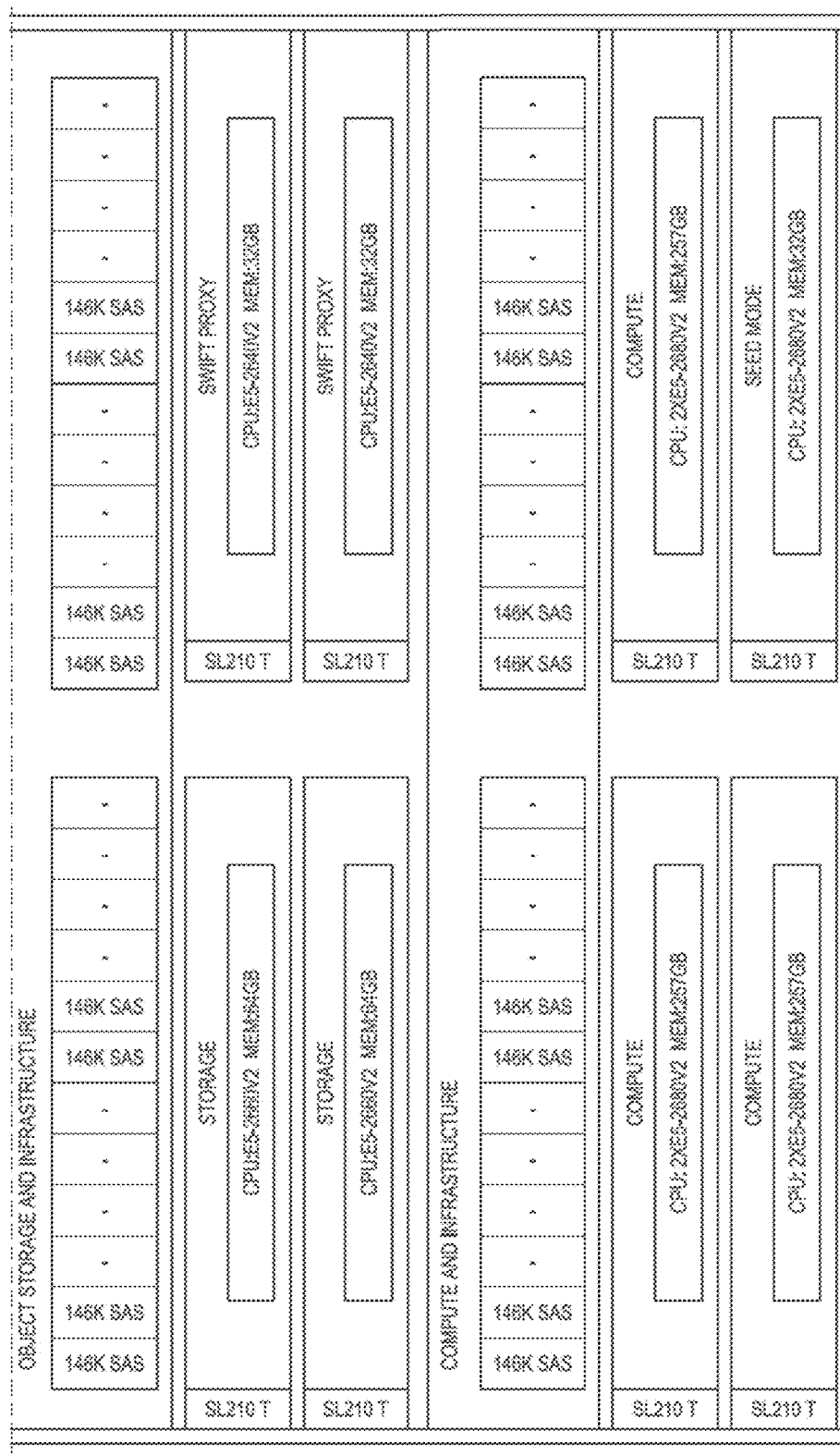
Figure 33C:
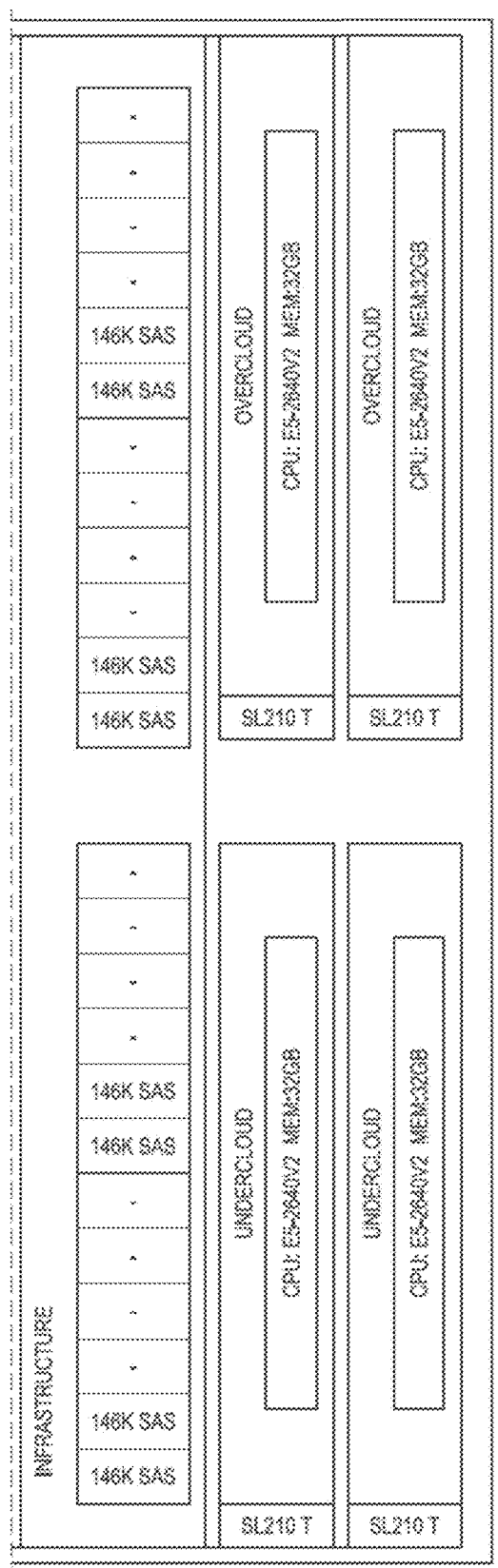
Figure 33D:
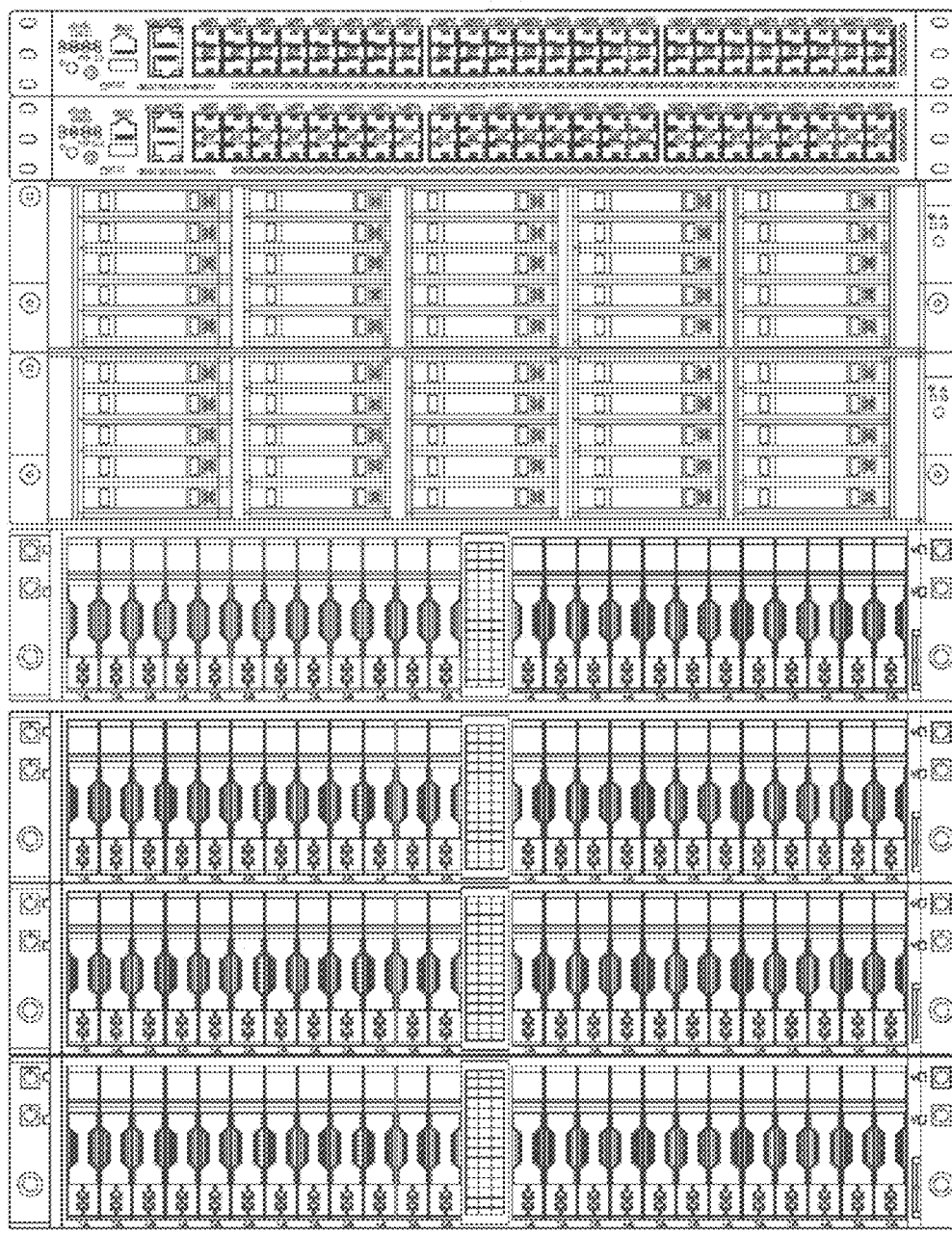

Referring to FIGS. 32A-C, embodiments of the data storage node may be similarly implemented in a cloud-computing environment. Referring specifically to the data storage node embodiment depicted in FIG. 32A-C, where in this instance it is implemented as an extension of the embodiment of the data management facility depicted in FIGS. 31A-C, a client may access the data storage node through the data center, such as via a virtual private customer gateway, virtual private network, network interfaces, and the like. This data storage node embodiment may employ a plurality of private subnets, such as for asset services, search services, transformation services, paradata management, service management, key management, and the like. In addition, data storage facilities are provided. The cloud-computing embodiment depicted in FIGS. 32A-C is one embodiment of how the data storage node may be implemented. In embodiments, a data storage node may be implemented in a cloud-computing environment, behind an enterprise firewall as part of the enterprise computing resources, in a hybrid configuration between enterprise computing resources and cloud-computing resources, and the like.

FIGS. 33A-D represent a non-limiting representative rack implementation for a data storage node.

Enhancements to a Customizable Exchange System

Figure 66:
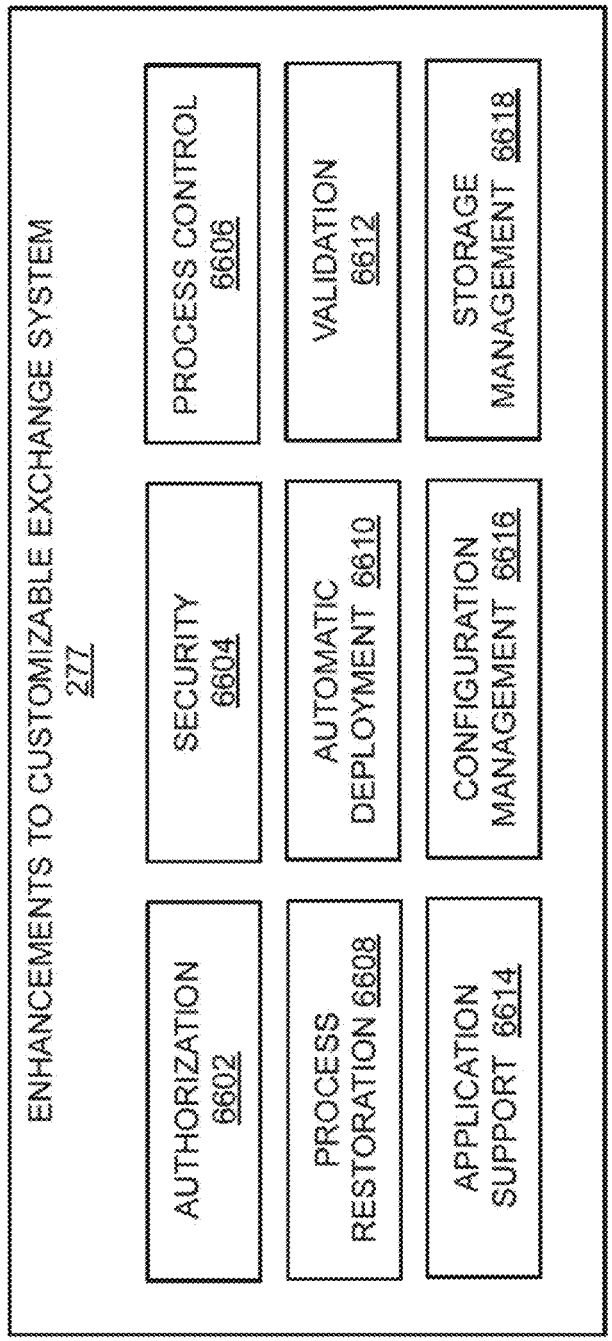
FIG. 66 depicts an embodiment of enhancements to the customizable exchange system.

Referring to FIG. 66, the customizable exchange system, as described herein, may include various enhancements 277 that improve authorization 6602, security 6604, process control 6606, process restoration 6608, automatic deployment 6610, validation 6612, application support 6614, configuration management 6616, storage management 6618, and the like.

In embodiments, authorization information may be transmitted between parts of a distributed system, transiting untrusted systems but ensuring the authorization is not tampered with. For example, an authorizing system may sign messages with a secret shared with the distributed executing system, which includes an identifier of the secret. Thus, the exchange across untrusted systems can be confirmed by using the secret to validate the authorization. In embodiments, messages to and between services may be cryptographically signed for both authentication of origin and tamper detection. For instance, a message authentication code (MAC), a keyed-hash MAC (HMAC), and the like may be used in the process, where a MAC is a short piece of information used to authenticate a message and to provide integrity and authenticity assurances on the message, and a HMAC is a keyed-hash type of MAC that is a specific construction for calculating a MAC involving a cryptographic hash function in combination with a secret cryptographic key. In embodiments, a progressive HMAC processor may be utilized, which is a set of methods that allow an HMAC to be computed on piecewise chunks or a stream, rather than a complete, contiguous buffer.

In embodiments, a method may be provided to sign a JavaScript Object Notation message to allow parts of the message to be altered and other parts to be tamper-proof. For example, a message may include a list of signed fields, which are then placed in an ordered list and signed with a secure hash, which can only be accessed by a suitable key that corresponds to knowledge of the secure hash.

In embodiments, there may be a mechanism to share an encryption secret between distributed systems. In embodiments content nodes may generate their own new keys, then notify the orchestration layer, which passes it along to a location service. Anytime a service doesn't have a valid key it may request the latest keys from a service manager agent before failing the message. The service manager agent may then return the previous/current keys and the previous key's expiration timestamp. The content node may always be ready for a new key from the location service and always knows the previous key and the time at which it expires (e.g., long enough to flush out pending links). So there is never a window that is potentially keyless, and content nodes may be able to generate new keys any time they like and for any reason, simply notifying orchestration layer when they have done so. The reason the content node chooses to rotate keys might be that the orchestration layer provided instructions to do so with a message, an individual at the content node user interface commanded it, a timer went off at the orchestration layer, a timer went off at a content node, and the like. In embodiments, the orchestration layer may not need to be involved with the trigger, and content nodes may rotate their own keys asynchronously from other content nodes.

In embodiments, there may be a mechanism to securely control authorization in distributed nodes from a central system, such as by having the central system manage keys that are required in order to access content on a content node or to share content from a content node.

In embodiments, there may be a method to indicate progress of a processing step. For example, a process may emit a start message and an end message, where the end message includes a success or error. Similarly, an "in process" message may be provided where a step has started but is not yet complete. This may include process steps involved in uploading documents, downloading documents, undertaking steps in a workflow or progression, or the like. Analytics processing may be used to trigger that a process is not yet complete. For instance, an analytic may be set up to count each start (count+1) and end (count−1) in real-time and maintain a flag for the summed value, where non-zero instances indicate that the process has not yet completed.

In embodiments, a process may indicate progress of processing steps in a distributed system, such as steps occurring across different content nodes. For example, each content node may emit messages with common identifiers that are associated with a particular step, such as to tie the processing steps together (i.e., relate them to the applicable processing step), in order to report overall progress on the processing step when the step is occurring across diverse content nodes.

In embodiments, a method may detect failures in a distributed set of processing steps. For example, messages may be sent to a central location, and messages may be processed to find known pairs of starts and endings, with the absence of endings or endings with errors indicating a failure. In embodiments, analytics processing may be used to trigger consistency repair operations, where the need for repair operations may be identified from missing pieces of paradata. For instance, an analytic may be set up to count each start (count+1) and end (count−1) and flag summed non-zero instances, where the analytic may flag instances in real-time or over periods of time. Any non-zero detection may indicate a failure, where a failure report is generated, a repair process is initiated, the process is repeated, and the like. In embodiments, a method may restore consistency in a distributed system after failures of distributed processing. For example, failures discovered by the system may trigger specific recovery actions, such as dictated by which known pair has failed.

In embodiments, a mechanism may be provided to stage application code or client code for automatic deployment. For example, a system may upload code to a content management system (e.g., content data node) along with meta-data describing it. In embodiments, a mechanism may be provided to establish identity, origin, correctness, and the like, of staged client code. For example, metadata for code may include a hash of the code, identifier of a shared secret, identifier of a client, other client data signed with the secret, and the like. Deployment of the system may validate against a known shared secret of a client. In embodiments, a mechanism may be provided to automatically deploy code. For instance, an upload may trigger an event, a processor may find it in a content management system, build it into a 'container', deploy it to a virtual machine, and update routing configuration to send requests. In embodiments, a mechanism may be provided to securely run client code. For example, a container may request that all code pass through a proxy, such as one having a "white list" of allowed operations and requests. Code related to native API calls may be very fine grained, and applications may require options for packaging them into larger units of business logic, and asynchronous processing may require a mechanism for reporting the results. In embodiments, application specific operations may allow applications to deploy composites, where composites are units of application code that are deployed on either the orchestration layer or data nodes. These operations may make multiple calls to native operations to achieve a business goal. An operation may also make only a single call, and exist in order to translate the API into application domain terms. Composites may be developed by the application implementers, initiated by a message with an operation unique to that composite, communicate with the APIs via standard messages, used for a feature which should be available to multiple applications, and the like. In embodiments, there may be a composite on the data node to match one on the orchestration layer for the same function. Or the application may make API calls to complete the operation.

In embodiments, a mechanism may be provided to support applications and clients to extend a platform with custom code which executes in the context of the platform. Application developers may need to be able to develop and deploy application-specific functionality on both content nodes and orchestration layers/regions. These functions should be 'sandboxed' and have managed access to resources (e.g., other platform services), such as based on an identifier (e.g., user Id and app ID authentication and authorization). For example, an extension to search functionality for searching across a plurality content nodes or workspaces may be implemented. For instance, this extension could execute a content or workspace search, such as executing two separate searches and combining them into a single search result, which is related to federated searching as disclosed herein. The process may include functions of governance, isolation, development, deployment, invocation, authentication, authorization, and the like. In an example, compliance hooks may provide compliance no matter where data resides and such that a customer's governance framework integrity is maintained. For instance, transform workflows may include customer specific transforms, a filter workflow may include customer specific filters, and the like.

In embodiments, content may be configured to be replicated among distributed content stores. For example, a collection may be defined in a central service, a set of content store defined for replication, and content stores defined in the central service. In embodiments, a method may be provided to coordinate replication among distributed content stores. For example, an update in one content store notifies central service, which looks up a replication configuration, a central service initiates transformer workflows in each relevant distributed content store, and the transformers request data from the original content store. In embodiments, a method may be provided to resolve concurrency (e.g., out of time sequence) issues among distributed updates. For example, a timestamp may be set for every update, and during sort updates by timestamps apply updates back into proper order. In embodiments, a method may be provided to replicate content between distributed content stores under central control, such as through replication and concurrency resolution. Each content node may have a single identical replica within a given geographic region. Replication workflow may be monitored for backlogs, such as for making appropriate scaling adjustments to the resources involved in performing asset replication.

Distributed content nodes (DCN) may be made highly available by deploying multiple, independent DCNs, and automating the replication of asset data among them in a flexible fashion, using an asynchronous processing approach to schedule and manage replication tasks. As each asset is finalized, that is, after all processing workflow tasks which produce renderings have completed, an additional workflow task may initiate one or more replication operations. Replication transformers may be deployed on each DCN, each subscribed to workflow tasks specific to that DCN, such as to pull serialized asset data from its source. The approach to content node replication may depend on asset operations that serialize and de-serialize, such as implemented either by the asset service, or by a separate asset (de)serialization service. When instructed to perform a serialize-asset operation, the specified asset data (e.g., including any or all metadata and renderings, as parameters dictate) may be assembled from its metadata and file data stores (e.g., Cassandra and object store), in a defined packaging (serialization) format. The format may be assumed to be zip, tar, or another commonly used multi-file format. A virtual directory structure may be constructed, conforming to conventions such as how all data is named and stored. This may include metadata, file data, paradata, orchestration data, and the like. A manifest describing the contents of the serialized package may be included, to aid in processing the components. The de-serialize-asset operation performs the reverse, un-packaging serialized asset data into a new location (e.g., a DCN), including all its data stores, as appropriate. The workflow manager may send a finalize workflow event when the workflow on the source DCN finishes processing the asset. This will cause each replica DCN to pull changes. These tasks may be initiated as a workflow by the workflow manager that subscribes to finalize events, looks up and understands to which other DCNs the asset needs to be replicated. The workflow decider may schedule a workflow task for each, addressed to a replication transformer on each replica DCN, which pull the asset from the source and insert them into the destination. Since the asset service serialize-asset operation packages all information required to reconstitute with minimal additional processing, the replica DCN should not execute an additional file processing workflow.

In embodiments, a mechanism may be provided to control processing in a central service for many distributed content stores. For example, processing steps may be configured in a central service, notification of the content to be processed sent from the content store, tasks in the process placed into queues, and different queues for different content stores. One such processing step may be a transformer, such as operating on a data node, provided to consume a transform task from a workflow activity task list (e.g., a queue), read an associated base file from an asset service, execute a transformation, and render it back to the asset service. In embodiments, the task to be transformed may be a base file that was uploaded to the asset service where the rendering is a variant of the base file created by the transformer. The transformer may provide optimization for overall throughput verses single workflow execution time, where the transformer may provide single or multiple transformations. A workflow decider, or simply decider, may orchestrate a set of transformer activities by comparing a given workflow (e.g., related set of tasks) description against the execution history of a workflow instance and determine the next task(s) to be performed. For instance, the workflow decider may consume a decision task from a decision task list, determine which workflow description is being executed by the current workflow instance, compare the event history of a workflow instance with its corresponding workflow description to determine next task(s) (e.g., transform, publish or other tasks), submit next task(s) and appropriate arguments (e.g., to the correct task list(s)), and cause a workflow instance to terminate when it is determined to have reached a completion or irrecoverable error state. In embodiments, a mechanism may be provided to process content in distributed content stores based on a central service. For example, different processing tasks may independently query a central queue for work, and may independently process work as they find it.

Federated Access Across Heterogeneous Content Repositories

Sharing data, whether as a part of a work or personal activity, has many options in today's diverse, Internet and cloud environment. Some data sharing and storage processes and facilities are highly secure, such as for an employee at work sharing and storing a document within an enterprise facility while operating a computer that resides on the network and behind the enterprise's firewall. Some processes are relatively less secure, such as an individual sharing a personal document from home to a public storage site. Further, there are many processes that lie between these two extremes that may leave a document in an uncertain security state. For instance, an employee may be working from home and save a document to an enterprise storage facility. Or an employee, operating from within an enterprise firewall, may wish to share an enterprise-controlled document to a third party, where the third party does not have a secure storage facility, or utilizes unsecure commercial cloud-storage facilities. In addition, documents may be shared with the individual from outside the firewall, such that the document enters in an unknown security state, where the individual is also put in a position of not knowing how to store that document securely, send edits of that document back to the sender, and the like. This diversity of available content repositories makes it difficult to determine the extent to which a document sharing-storage process is secure, or meets the requirements for security desired from an enterprise. This uncertainty makes it difficult to securely share and store documents with others outside of an enterprise firewall.

In embodiments, a secure federated access facility may be provided for uniting heterogeneous content repositories (e.g., secure, public, private, commercial, inside a firewall, outside a firewall, etc.) under a single user interface, such as where file management is agnostic to the location of content within the repositories. For instance, a user, operating through the user interface provided by the secure access facility, may view (e.g., seeing files and content items), access (e.g., open, read), edit, save, share, and otherwise act on items stored in these disparate content repositories as if they are part of, or extensions to, the user's network or file system. Thus, the user is able to take actions on content items without having to think about the nature or location of the storage, or the type of security associated with the different repositories.

In embodiments, security is provided in the distinct repositories in a manner that complies with consistent policies and requirements, such as enterprise policies, no matter where content items are stored within the umbrella of repositories associated with the secure, federated access facility.

Figure 38:
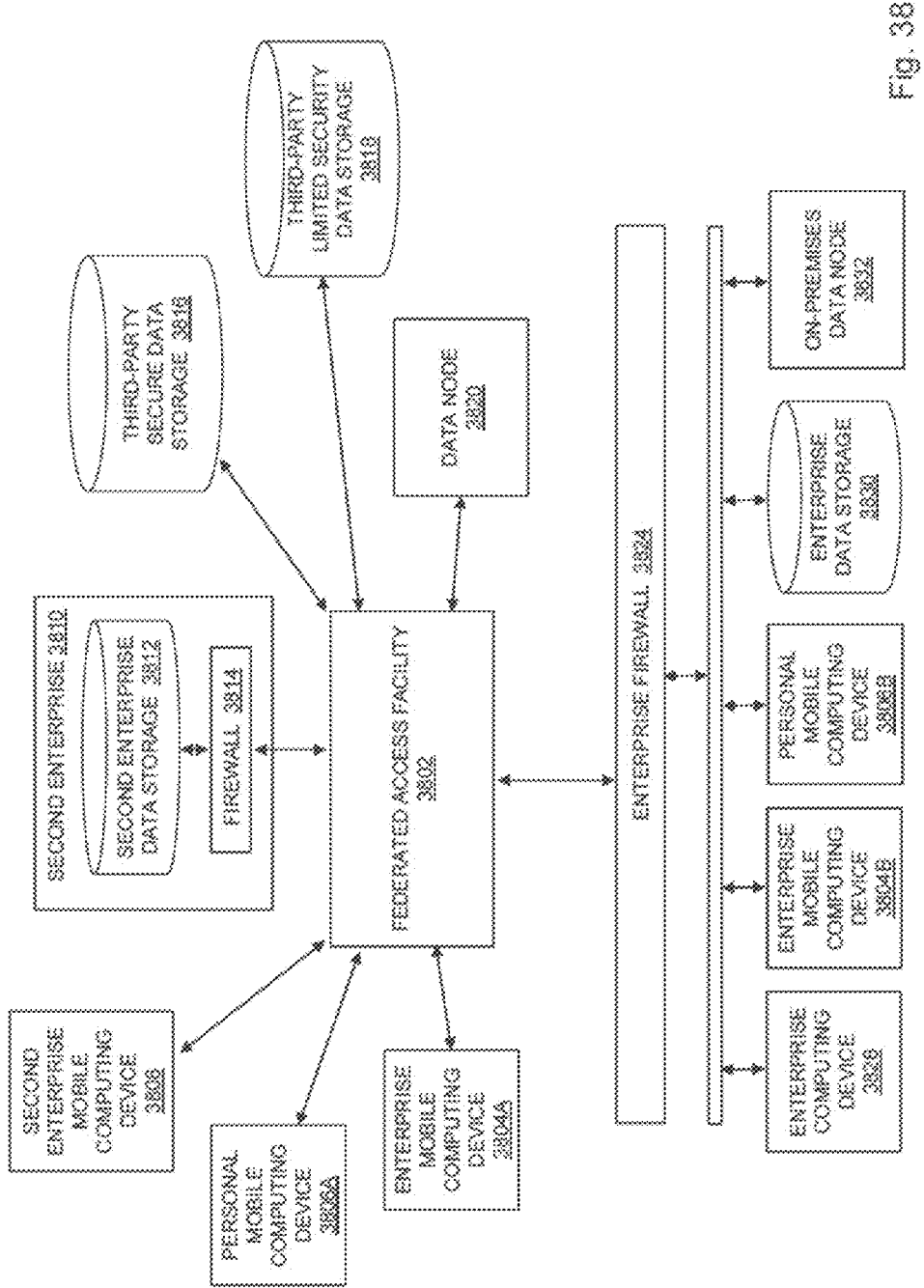
FIG. 38 depicts an embodiment of a federated access facility for access across heterogeneous content repositories.

Referring to FIG. 38, in embodiments the federated access facility 3802 may interface with, or within, an enterprise to provide federated access services amongst diverse data storage facilities, such as the enterprise data storage 3830, a data storage 3812 for a second enterprise 3810 (e.g., such as a partner of the enterprise, a vendor of the enterprise), a third-party secure data storage 3816, a third-party limited security data storage 3818, and the like. The federated access facility may also interface with data storage associated with computing devices 3828, 3804B, 3806B that are internal to the enterprise and/or computing devices 3804A, 3806A, 3808 that are external to the enterprise and/or second enterprise 3810.

The secure federated access facility 3802 may provide a unified architecture for federated access. The facility may be a web-enabled, multi-layered management-access environment that unites the heterogeneous content repositories, including uniting them with enterprise data storage (e.g., including on premises 3832 and cloud-based enterprise data storage 3820).

In embodiments, exchange features may be provided for secure collaboration across multiple business entities involving the documents managed in the federated repositories. There may be, for instance, an orchestration layer, as described in this disclosure, for management of the system, where the orchestration layer is managed by a host that manages the underlying federated system, such as including tracking locations of content items in heterogeneous repositories, managing secure (e.g., key-based) access to content items (e.g., based on policies), logging metadata regarding to actions taken with respect to items in repositories, and the like. In embodiments, the orchestration layer may access such data as metadata and file location data, but it may be unable to provide access to the actual underlying content that is stored and managed by users in the various data storage facilities. For example, content itself may be encrypted with a different set of keys (e.g., customer-managed or managed by the vendor of a commercial storage solution) than metadata and other items related to locating and tracking access to such content itself.

In embodiments, in association with the orchestration layer, a data layer may provide for storing and management of data by a user, where the data node may provide a secure content storage facility managed by the enterprise. The data layer may comprise data node(s), such as including a cloud-based data node 3820 outside the enterprise firewall, an appliance-based data node within the enterprise firewall 3824, an end point data node on a user device (e.g., mobile device or personal computer), and the like. In embodiments, content nodes include or are part of data access engines that index and provide access to and control management and indexing of content. The data access engines may be associated with an enterprise firewall, such as in a configuration where as data is brought inside a firewall, such as an enterprise firewall 3824, where the access engine takes control of management of the data. An access engine may, for example, take data from a connector, broker, service, or the like and encrypt the data as it is brought through an enterprise firewall. The access engine may tag data, add metadata, and otherwise provide security for such data, including managing access permission to access the data outside the firewall in the various repositories.

Sharing between members of the federated access facility may be from inside the federated sharing facility, where the federated access facility appears to be a single content system, with folders, data streams, and communication streams for different users/groups. The federated access facility may provide translation facilities transparent to the user for translations of content extracted from, moved between and loaded to different repository formats (e.g., for repositories that employ different file types and different IRM protection schemes). Sharing a content item, such as a document, may then be handled as if it is merely a file management action, enabling the user to move documents around within the federated access facility as if the heterogeneous repositories were one contiguous file management system, such as for moving files; duplicating, copying, pasting files; allocating a file to a data-stream; attaching a file to a communication-stream, and the like. In one embodiment, storing a file in an access repository may automatically implement security for the file, such as using encryption or requiring access credentials, accounting for the log-on and storage environment of the storage environment. For example, dropping a file into a commercial cloud storage environment might automatically trigger encryption of the file, such that the file can be accessed only from the federated access facility by an authorized party (including a third party participant in an exchange, for example).

The functionality of the federated access facility may include a wide range of capabilities described throughout this disclosure, including, but not limited to, document-level IRM access control of shared documents, remote wipe control of shared documents, viewing and editing of non-native application documents, remote viewing of spreadsheet content, document use tracking for compliance and visibility, cross-platform synchronization, virtual window screen capture, host-client layered security environment, cloud-enabled virtual software applications, application virtualization to client devices, end-point sharing security, off-line file access, secure viewing of a document, location-based file access, and the like.

The secure federated access facility may provide federated content access and management functionality across the various repositories, such as collaborative document actions, searching, auditing, access policy implementation, security, e-discovery, and the like. Collaborative document actions may include sharing and un-sharing with a non-member of the facility, such as where inbound documents may be translated and incorporated into the system. Outbound documents may contain encapsulated metadata including document history, configuration information, and the like, such as to be re-incorporated when the document is shared again as an inbound document, across different business entities, and the like. Sharing activity history may be shared, post-sharing activity history may be shared, sharing may be provided with intent functionality, there may be the capability to un-share (e.g., a remote device wipe), provide end-point sharing control, and the like.

The secure federated access facility may provide federated viewing functionality, such as with the ability to securely view a document stored on a diverse collection of repository types and from different computing devices, including as stored on a secure repository 3816, on a limited security repository 3818, from a secure mobile device (e.g., an enterprise configured mobile computing device 3804A, 3804B), from an unsecure mobile device 3806A (e.g., personal device, a device connected through an unsecure network), when a user is viewing off-line, when a user is viewing through a spreadsheet viewer, and the like. View permissions may be shared and un-shared, provided through a secure viewing facility, viewed through a DRM sharing facility (e.g., without plugins), and the like.

Sharing may comprise permissioning, such as for access control (e.g., read, write, copy, print), user credential permissioning, location-based credential permissioning (e.g., file location, file/repository location), time-based credential permissioning, and the like. Auditing functionality may enable tracking what content was viewed (e.g., including sub-parts of files), by whom, when, for what duration, and the like. Auditing may comprise auditing metadata, such as without access to data (e.g., by an orchestration layer). Access restrictions may be provided to improve security, such as with geo-location based access restrictions, network type access restrictions, personnel classification access restrictions, and the like (e.g., implemented through IRM controls).

The secure federated access facility may provide policies for access to federated repositories, such as for specifying who is allowed to store or view documents on different types of repositories. For instance, a Chief Information Officer (CIO) of an enterprise may want marketing personnel to have access to files stored in a commercial repository, but not be able to share or store enterprise content in the commercial repository. In another instance, engineering personnel may be able to store content in a commercial repository, but the content may be IRM protected. Policy may also specify how personal files are handled within the secure federated access facility. For instance, the system may allow employees to access their personal files from the workplace, but inform them that their actions are auditable and that they may not put company information at risk. In another instance, employees may be able to share documents with outside parties that use commercial repositories, but these actions may be auditable and include protection of files that are shared from the company to the partner.

Various types of content repositories may be accommodated within the construct of the secure federated access facility, including enterprise storage inside and outside the firewall of the enterprise. Enterprise storage outside the enterprise firewall may include company content stored on a third-party secure facility 3816, a third-party unsecure facility 3818, an employee personal device (e.g., device 3806B inside enterprise firewall 3824 and device 3806A outside the enterprise firewall 3824 and outside firewall 3814), and the like. Content types may include enterprise finance database, financial data repository, human resources database, supply chain management database, analytic databases (e.g., for marketing), sales and inventory database, CRM database, general enterprise databases, and the like.

Different repositories may have different formats and processes associated with storage and access. The secure federated access facility may provide translation functionality for movement of content between repositories, such as for moving content between different secure repositories, between an unsecure repository and a secure repository, as the result of content inbound from outside user, outbound to outside user, and the like. Translation methodologies and topologies between heterogeneous repositories may be provided as direct connectors between repositories (e.g., using various extraction, transformation, and loading (ETL) systems), using brokers/translators, using bridges or other intermediate connections and translation services (including in service oriented architectures, such as using SOAP protocols or WSDL), as metadata-based connectors, using light data interchange formats (e.g., JSON) and the like.

Sharing content beyond the firewall may include both inbound and outbound sharing. For instance, outbound sharing may be directly to a second enterprise, such as to locations inside a second enterprise firewall, to a second enterprise computing device outside either firewall (e.g., in the field from one computing device to another across an unsecure network, to a portable data storage device), to a third-party secure facility, to a third-party unsecure facility, and the like. Inbound sharing of content may be sharing directly from a second enterprise 3810, such as from inside a second enterprise firewall 3814, from a second enterprise computing device 3808 outside second enterprise firewall 3814 and/or outside enterprise firewall 3824 (e.g., in the field from one computing device to another across an unsecure network), from a third-party secure facility, from a third-party unsecure facility, and the like. Sharing content may be provided to/from different types of computer storage, including server-based (e.g., inside the enterprise, cloud-based), desktop computer, laptop computer, tablet, smartphone, portable data storage device, storage disk, and the like.

The secure federated access facility may provide a unified environment where diverse content repositories, with varying levels of security protocols and process, may be accessible to a user without the user needing to consider the security implications, formats, protocols, or processes of the different repositories. In addition, as different content repositories typically have their own login, the secure federated access facility may provide a single-sign-on process for all systems and repositories associated with the system. In this way, the secure federated access facility may provide a single secure access environment for all of the user's needs.

Content Distribution Management

Traditional enterprise content management (ECM) systems have typically included three major components, including: 1. an engagement component, such as a user interface through which users are able to interact with the content; 2. a record-keeping and governance component, which acts to audit access to content, manage retention policies (e.g. to determine when content may be archived or destroyed), and manage access controls to content; and 3. a storage component, which is where the content is physically stored. In such traditional systems, all of these components are tied to where to the content is stored. With the availability of cloud storage, and a heterogeneous, highly distributed storage environment, such as previously described herein, securely managing workflows, information governance and security is rendered more difficult.

Figure 55A:
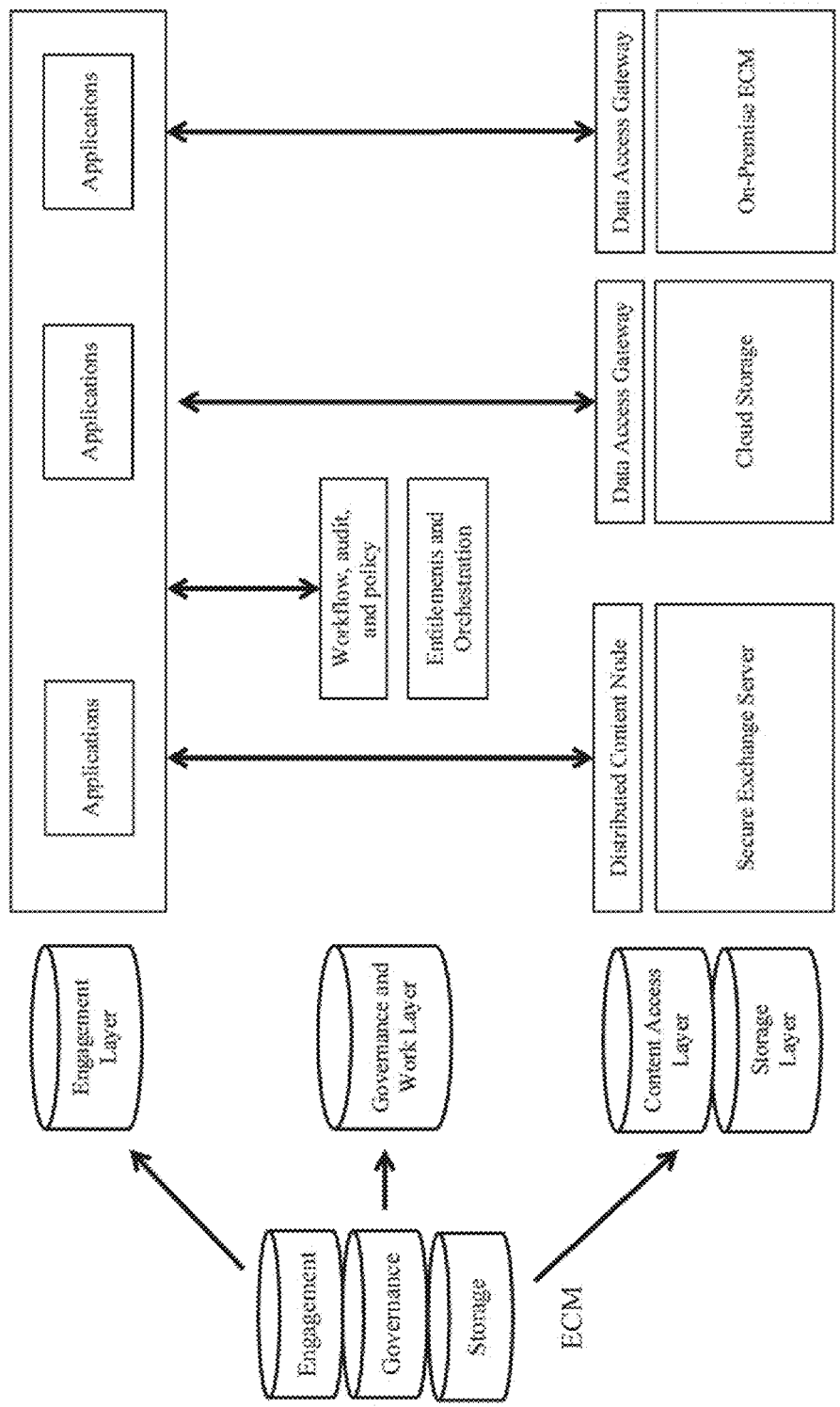
FIG. 55A depicts an exemplary content distribution management system.

A new exemplary enterprise content distribution management system is illustrated in FIG. 55A, which allows for work to be conducted across various heterogeneous systems of engagement and allows centralized policy to be applied to content wherever it is stored or processed, and thus represents a 'de-layering' and distribution of an ECM components. In particular, such a system may include an engagement layer, a governance and workflow layer, and a content access layer. The governance and workflow layer may allow for securing and governance of content, no matter where it resides. The governance and workflow layer may include a set of workflow services that is exposed via API, such that workflows may be instantiated across various different systems of engagement and/or various different content access systems. The content access layer may include a set of services that provides integration with third party content repositories, allowing any type of storage to appear as a 'distributed content node' in the enterprise content distribution management system.

More specifically, the governance layer may include integrated information rights management (IRM), which may comprise a policy server and files that are aware of associated policies. As described above, IRM may be used to 'wrap' and encrypt files such that users must authenticate with the policy server in order to access them. In this manner, content may be secured as it is distributed and enterprise retention policies may be enforced no matter where the content resides. For example, a policy may be that if a file is seven years old and has not been accessed in thirty days, then the file is to be deleted (or the encryption key to decrypt the file is to be deleted to render the file reasonably incapable of being decrypted). Using integrated IRM for content enables governance and security policies to be associated with the file itself, rather than such policies being tightly coupled to the location where the file resides or the means by which the file is accessed.

Additionally, the governance layer may also include analytics services, which can provide capabilities for analyzing content and metadata, an audit trails of user activity, distribution of content and files, usage levels and limits (such as number of documents or pages in storage), and the like. For example, access to files may be recorded, along with identification of the accessing user and the geographic location of the file, etc. The use of IRM allows for gathering of analytics data regardless of the location of the files, and may provide an audit trail useful for providing compliance with various regulations, contractual requirements, policies, and the like. Analytic information may be captured and aggregated in a data lake, analyzed and processed, and made available via various APIs or user interface tools. These tools may allow users to transform the raw data into custom, meaningful reports to prove compliance for auditors or other audiences. Additionally, predictive analytics may be generated with these tools. For example, by monitoring user activity, it may be possible to predict how likely a potential buyer is to bid on an asset in a mergers and acquisitions transaction. Further, it may be possible to provide insight into which past buyers or users should be targeted with marketing materials. Analytics services may run on a plurality of servers that have access to an entire enterprise content distribution management system to enable analysis of large portions of available data, or may run locally on a plurality of distributed content nodes to enable analysis of the data stored on each node while ensuring that the data itself remains located solely on that node.

As previously described, the enterprise content distribution management system may allow knowledge workers and teams from different enterprises to share and collaborate on documents across enterprise boundaries, which allows for content-centric work to occur between these enterprises. The workflow layer may allow users to manage the work process. For example, a user may assign work items to other collaborators and monitor the process of that work. By setting up a 'review and approve' type workflow, a user may be allowed to make changes to a document, share that document with another user, request the other user review the document, and upon completion of that review, either approve or reject that document. With the workflow process, the user may review the status of each of the work steps involved. These workflows may require the following two conditions: the document must be stored using the secure exchange system, and each of the collaborators must be authorized users of the secure exchange system.

A federated workflow may allow collaborators from different enterprises to initiate cross-boundary, cross-system workflows, and the mechanisms for sharing and collaborating may be heterogeneous, allowing for initiation of workflows from the secure exchange system to other third-party file sharing or collaboration services.

Figure 55B:
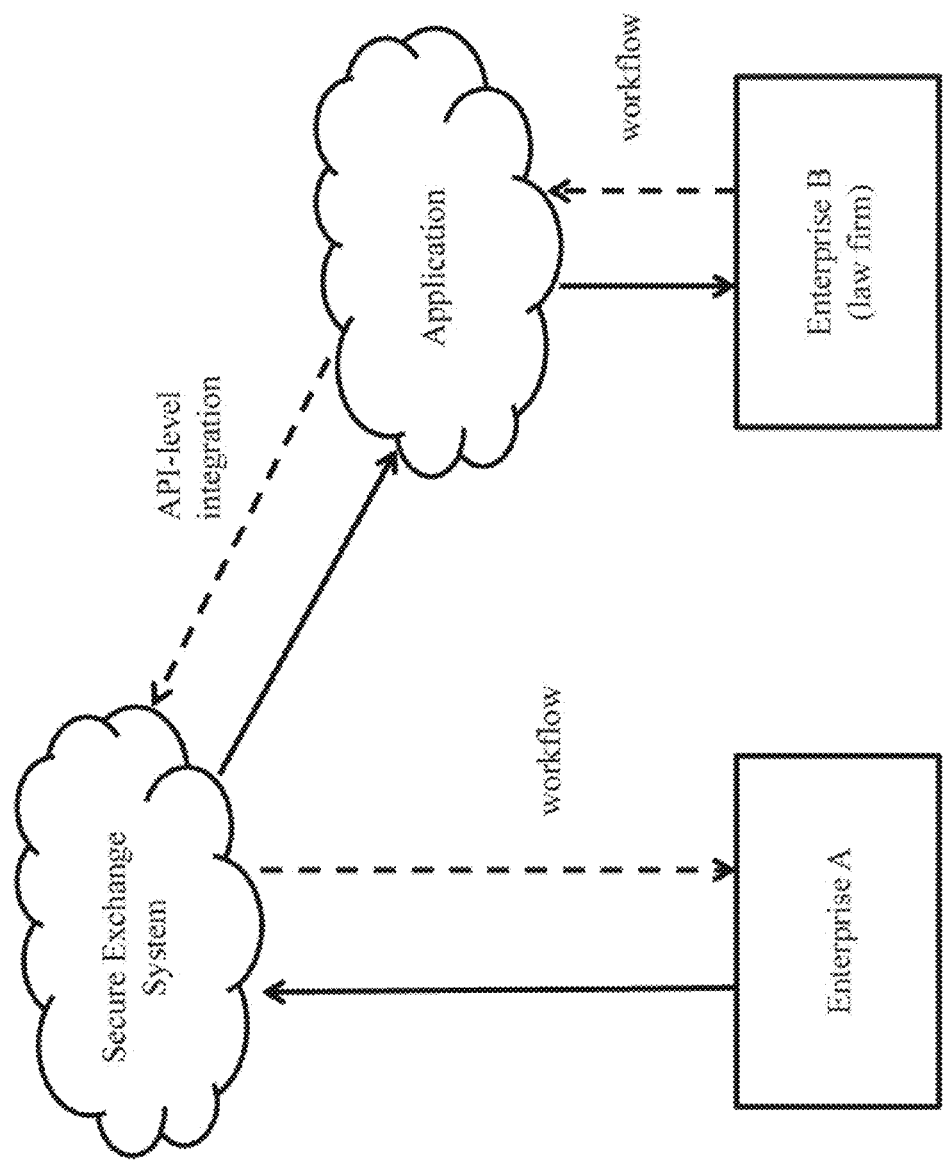
FIG. 55B depicts operation of a content access layer of an exemplary content distribution management system.

To establish a federated workflow, the secure exchange system may expose the workflow as a service via well-known APIs, and create integration points with third-party cloud services (such as Microsoft Office 365). Rules may be configured such that workflows initiated to specific entities (organizations or specific email addresses) create a corresponding workflow in the third party cloud service. As shown in FIG. 55B, in a simple example, a user of the secure exchange system could initiate a workflow to review a contract with an attorney at an outside law firm, where the attorney's law firm uses Microsoft SharePoint in Microsoft Office 365. The attorney is notified that she has a task waiting through an Microsoft Office 365 workflow, and reviews the file in Microsoft SharePoint.

Additionally, the content access layer may allow for federated access. The content access layer may enable users of the secure exchange system to access and interact with content that is stored outside the secure exchange service, and still benefit from the security, audit, and governance provided by the secure exchange system. For example, an IT administrator at a first enterprise may wish to provide users at that enterprise access to personal content stored in a cloud storage service, such as Dropbox. The IT administrator may allow users to retrieve files from a specific cloud storage service account, but not put enterprise files into that service, or if such files are allowed, then activity regarding those files can be audited. In another example, the IT administrator may allow external access by users outside an enterprise to an internal (inside a firewall) content management system of the enterprise, such as IBM FileNet or Microsoft SharePoint). By integrating these content repositories at the API-level, the secure exchange system can facilitate access to content without having to synchronize it to a cloud storage service. This integration may be facilitated via an on-premise application or appliance that brokers connections to the internal content management system using native API calls.

Additional Statements of Invention

The following clauses provide additional statements regarding the inventions disclosed herein.

Clause 1. A method comprising: establishing, by a secure exchange server hosted by an intermediate business entity, a user login data authentication procedure that allows each of a plurality of users through at least one corresponding client computing device to access the secure exchange server, wherein communications between the secure exchange server and each of the plurality of users is through a communications network, wherein the plurality of users comprises a user of a second business entity and at least one anonymous user; storing, by the secure exchange server, data relating to a user login authentication for the user of a second business entity; receiving computer data content from the user of the second business entity; receiving from the user of the second business entity an indication of permission for the at least one anonymous user to access the computer data content through an anonymous information rights management (IRM) facility hosted by the intermediate business entity, wherein the anonymous IRM facility limits the retention of information about the at least one anonymous user, and wherein the indication of permission comprises at least one anonymous access condition; receiving a request to access the computer data content by the at least one anonymous user; and granting, by the secure exchange server, access to the computer data content, through the anonymous IRM facility, to the at least one anonymous user, wherein retention of information about the at least one anonymous user is limited and the access is granted based on the at least one anonymous access condition.

Clause 2. The method of clause 1, wherein the at least one anonymous access condition is that the at least one anonymous user is a user of a third business entity, wherein the third business entity is specified by the user of the second business entity in the indication of permission.

Clause 3. The method of clause 2, wherein the user of the second business entity is provided access to information comprising the identity of the third business entity but not the identity of the at least one anonymous user.

Clause 4. The method of clause 1, wherein the at least one anonymous access condition is that the at least one anonymous user is a user of a computer domain specified by the user of the second business entity in the indication of permission.

Clause 5. The method of clause 1, wherein the at least one anonymous access condition is that the at least one anonymous user is a user of a geographic region specified by the user of the second business entity in the indication of permission.

Clause 6. The method of clause 1, further comprising collecting metadata, by the anonymous IRM facility, relating to access of the computer data content.

Clause 7. The method of clause 6, wherein the metadata is at least one of a domain from which the computer data content was accessed and a location from which the computer data content was accessed.

Clause 8. The method of clause 6, wherein the metadata comprises data regarding where the computer data content was shared after the computer data content was accessed.

Clause 9. The method of clause 6, wherein the metadata comprises data regarding when the computer data content was accessed.

Clause 10. A method, comprising: providing a federated search facility adapted to search for computer content on a plurality of disparate computer content storage facilities comprising a first content storage and a second content storage, wherein the federated search facility, the first content storage, and the second content storage are interconnected through the Internet; receiving, by the federated search facility, a computer content search request from a client computing device, wherein the user of the client computing device has access rights to secure computer content on at least one of the first content storage and the second content storage; executing, by the federated search facility, a first computer content search on the first content storage and a second computer content search on the second content storage, wherein executing the search includes using the access rights of the user on the at least one content storage to which the user has access rights; receiving a first computer content search result from the first content storage and a second computer content search result from the second content storage; consolidating the first computer content search result and the second computer content search result into a consolidated computer content search result; and providing, by the federated search facility, the consolidated computer content search result to the user through a graphical user interface that presents the consolidated computer content as a single computer content search result.

Clause 11. The method of clause 10, further comprising providing a user authentication identifier required for the user to access computer content on the at least one of the first content storage and the second content storage to which the user has access rights, wherein the federated search facility provides the user authentication identifier to the content storage as part of the executing the content search.

Clause 12. The method of clause 10, wherein the first content storage and the second content storage are managed by different business entities.

Clause 13. The method of clause 10, wherein the first content storage and the second content storage are managed by the same business entity.

Clause 14. The method of clause 10, wherein the first content storage and the second content storage are managed by an intermediate business entity that manages the federated search facility.

Clause 15. The method of clause 10, wherein the first content storage and the second content storage are located at different geographic locations.

Clause 16. The method of clause 10, wherein the plurality of disparate computer content storage facilities are managed by a plurality of business enterprise entities and the federated search facility is managed by an intermediate business entity that provides the federated search facility as a service to the plurality of disparate computer content storage facilities.

Clause 17. The method of clause 10, wherein the computer content search request is a request for at least one computer content document.

Clause 18. The method of clause 10, wherein the computer content search request is received in the form of a request for a search of a text string.

Clause 19. The method of clause 10, wherein the first content storage and the second content storage maintain different local search facilities, wherein the step of executing a first computer content search on the first content storage and a second computer content search on the second content storage comprises a first search request to a first local search facility on the first content storage, and a second local search request to a second local search facility on the second content storage.

Clause 20. The method of clause 10, wherein the plurality of disparate computer content storage facilities comprise a plurality of search engine indexes, including a first search engine index and a second search engine index, for collecting, parsing, and storing computer content to facilitate fast and accurate information retrieval, wherein the first content storage maintains the first search engine index and the second content storage maintains the second search engine index.

Clause 21. The method of clause 10, wherein the graphical user interface is provided by the federated search facility.

Clause 22. A system, comprising: a server-based secure data exchange system for secure sharing of content between a first client device accessed by a user associated with a first organizational entity and a second client device accessed by a user associated with a second organizational entity, wherein the content has shared relevance with the first organizational entity and the second organizational entity, the secure data exchange system comprising a data management facility managed by a third organizational entity and adapted to provide permissioned control to a plurality of organizational entities for use of at least one of a plurality of data storage nodes, wherein the first organizational entity is granted permissioned control of a first data storage node by the third organizational entity for a content, wherein the content is shared between the first client device and the second client device through the first data storage node, wherein the data management facility manages secure data exchange of the content through the first data storage node; wherein the data management facility is distributed into a plurality of data management sites to enable management of the plurality of data storage nodes, wherein the plurality of data storage nodes are located at network locations separate from the data management facility and specified by the plurality of organizational entities, and wherein the server-based secure data exchange system includes at least one of: an authentication facility, an authorization facility, an encryption sharing facility, a process failure monitoring facility, a software deployment management facility, and a content replication facility.

Clause 23. The system of clause 22, wherein the data management facility has access to the metadata of the stored data for managing sharing of the content via the first data storage node, but the data management facility does not have access to the content.

Clause 24. The system of clause 22, wherein the authorization facility provides authorization data for the secure sharing of content across the plurality of organizational entities, the plurality of data management sites, and the plurality of data storage nodes, which ensures that an authorization for the sharing is not tampered with.

Clause 25. The system of clause 24, wherein the authorization facility signs messages with a shared secret that comprises an identifier of the secret.

Clause 26. The system of clause 25, wherein the shared secret is cryptographically signed for at least one of an authentication of origin and tamper detection.

Clause 27. The system of clause 25, wherein the shared secret comprises a changeable portion and a tamper-proof portion, wherein the tamper-proof portion is cryptographically protected.

Clause 28. The system of clause 22, wherein the encryption sharing facility enables sharing of an encryption secret between the plurality of organizational entities, the plurality of data management sites, and the plurality of data storage nodes.

Clause 29. The system of clause 28, wherein the encryption secret comprises an encryption key that at least one of the plurality of content nodes generates as part of an encryption key rotation process.

Clause 30. The system of clause 29, wherein the at least one of the plurality of content nodes notifies at least one of the plurality of data management sites and transmits the encryption key to a central encryption key management facility.

Clause 31. The system of clause 22, wherein the process failure monitoring facility monitors in-process messages to determine if a process has started but is not yet complete, wherein the process includes at least one of uploading documents, downloading documents, and undertaking steps in a workflow.

Clause 32. The system of clause 31, wherein the monitored in-process messages each include a start process indicator or an end process indicator, and the process failure monitoring facility monitors a count value, wherein during the monitoring, the count value is increased when a start process indicator is detected and the count value is decreased when an end process indicator is detected, and wherein the process failure monitoring facility transmits a process failure indication when the count value is not zero at a predetermined time.

Clause 33. The system of clause 22, wherein the software deployment management facility establishes at least one of an identity, an origin, and a correctness for deployed software.

Clause 34. The system of clause 33, wherein deployed software comprises metadata for software comprising at least one of a hash of the code, an identifier of a shared secret, and an identifier of a client.

Clause 35. The system of clause 33, wherein the software deployment management facility provides automatic deployment of software that is triggered by an event, including at least one of an upload triggering the event and a processor triggering the event.

Clause 36. The system of clause 22, wherein the content replication facility provides content replication services to the secure data exchange system.

Clause 37. The system of clause 36, wherein the content replication facility coordinates replication of content among the plurality of data storage nodes.

Clause 38. The system of clause 36, wherein the content replication facility facilitates creation of a new data storage node, and replicating content from an existing data node from the plurality of data storage nodes to the new data storage node.

Clause 39. A method comprising: establishing, by a secure exchange server hosted by an intermediate business entity, a user login data authentication procedure that allows one or more users, including a user of a second business entity, through at least one client computing device to access the secure exchange server, wherein communications between the secure exchange server and each of the one or more users is through a communications network; providing, by the secure exchange server, an encryption management facility, wherein the encryption management facility is adapted to adjustably configure encryption services based on a selection criteria provided by the user of the second business entity for selection of at least one of: i. secure exchange server side encryption, wherein computer data content is transmitted from the second business entity to the secure exchange server to be encrypted by the secure exchange server, and ii. business entity side encryption, wherein computer data content is transmitted from the second business entity to the secure exchange server as encrypted data that was encrypted by the second business entity before it was transmitted; receiving a selection criteria from the user of the second business entity, wherein the selection criteria establishes the selection of at least one of secure exchange server side encryption and business entity side encryption for a computer data content to be stored on the secure exchange server; and receiving computer data content from the user of the second business entity, wherein the computer data content is encrypted by the selected mode of encryption based on the received selection criteria.

Clause 40. The method of clause 39, wherein the selection criteria is a level of security desired for the computer data content.

Clause 41. The method of clause 39, wherein the selection criteria is based on the identity of a business group.

Clause 42. The method of clause 41, wherein the business group is a financial business group.

Clause 43. The method of clause 41, wherein the business group is a legal business group.

Clause 44. The method of clause 39, wherein the selection criteria is assigned for the user of the second business group.

Clause 45. The method of clause 39, wherein the selection criteria is a level of key management support.

Clause 46. The method of clause 39, wherein the selection criteria enables dynamic selection of either secure exchange server side encryption or business entity side encryption as determined by a security condition assigned to the computer data content at the time the computer data content is transferred to the secure exchange server.

Clause 47. The method of clause 46, wherein the user of the second business entity sets the security condition.

Clause 48. The method of clause 46, wherein an administrator of the second business entity sets the security condition.

Clause 49. A method comprising: establishing, by a secure exchange server hosted by an intermediate business entity, a user login data authentication procedure that allows one or more users through at least one client computing device to access the secure exchange server, wherein communications between the secure exchange server and each of the one or more users is through a communications network, wherein the one or more users comprises a user of a second business entity; providing, by the secure exchange server, a data chunking facility adapted to receive and segment a computer data content transmitted from a client computing device of the one or more users, wherein the received computer data content is stored as a plurality of encrypted computer data content segments; receiving computer data content from the user of the second business entity, wherein the received computer data content is segmented and each computer data content segment is separately encrypted to form a plurality of encrypted computer data content segments; and storing, by the secure exchange server, the plurality of encrypted computer data content segments.

Clause 50. The method of clause 49, further comprising providing a mapping facility for storing a corresponding memory location for each of the plurality of encrypted computer data content segments.

Clause 51. The method of clause 50, wherein the mapping facility is utilized to access the plurality of encrypted computer data content segments to assemble them back into the computer data content for transmission upon reception of an access request for the computer data content.

Clause 52. The method of clause 49, wherein the secure exchange server monitors access to each of the plurality of encrypted computer data content segments, and if any is accessed without a corresponding access request for the computer data content, then an alert notification is generated.

Clause 53. The method of clause 49, wherein each of the plurality of encrypted computer data content segments is assigned a corresponding priority level.

Clause 54. The method of clause 53, wherein a corresponding priority level corresponds to a portion of the computer data content that was marked with a priority level prior to the receiving of the computer data content from the user of the second business entity.

Clause 55. The method of clause 49, wherein a separate encryption key is used for encrypting each of the plurality of encrypted computer data content segments.

Clause 56. A method comprising: establishing, by a secure exchange server hosted by an intermediate business entity, a user login data authentication procedure that allows one or more users through at least one client computing device to access the secure exchange server, wherein communications between the secure exchange server and each of the one or more users is through a communications network, wherein the one or more users comprises a user of a second business entity communicating with the secure exchange server through a second computing device; providing, by the secure exchange server, an asynchronous notification upload messaging facility adapted to: i. receive and process computer data content and a computer message transmitted together as a data message composite content from a client computing device of the one or more users, wherein the computer message comprises a data processing preference, and ii. asynchronously communicate to the client computing device of the one or more users a processing notification related to the processing of the data message composite content; receiving a data message composite upload from the second computing device comprising computer data content and a computer message comprising a data processing preference; processing, by the secure exchange server, the received data message composite upload based on the data processing preference; and notifying, by the secure exchange server, the second computing device of a processing state of the received data message composite upload, wherein the notification is provided asynchronously to the processing of the data messaging composite upload.

Clause 57. The method of clause 56, wherein the receiving of the data messaging composite upload comprises uploading the computer data content and the computer message in a single computer process call.

Clause 58. The method of clause 56, wherein the processing preference specifies a destination preference for computer data content.

Clause 59. The method of clause 58, wherein the destination preference relates to sending the computer data content to a data storage facility.

Clause 60. The method of clause 58, wherein the destination preference relates to sending the computer data content to at least one of the one or more users.

Clause 61. The method of clause 56, wherein the step of notifying the second computing device of a processing state comprises transmitting a plurality of process notification messages to the second computing device during the processing of the data message composite upload.

Clause 62. The method of clause 56, further comprising receiving, by the secure exchange server, a notification mode request from the second computing device to specify information to be provided in the notification.

Clause 63. The method of clause 56, wherein the processing is a search indexing processing.

Clause 64. The method of clause 56, wherein the processing is a virus scan.

Clause 65. The method of clause 56, wherein the processing is a file format conversion.

Clause 66. A method, comprising: establishing, by a secure exchange server hosted by an intermediate business entity, a server-based secure data exchange facility adapted for secure sharing of computer data content between users of a plurality of organizational entities comprising at least a first user of a first organizational entity, the secure data exchange system comprising a data management facility adapted to provide permissioned control to the plurality of organizational entities for use of at least one data storage node of a plurality of data storage nodes, wherein the data management facility is distributed into a plurality of data management sites to enable management of the plurality of data storage nodes, wherein the at least one data storage node is located at a network location separate from the data management facility and specified by the plurality of organizational entities, wherein the first user maintains a plurality of computer identities for access to the computer data content; and providing, by the secure exchange server, an identity facility for user identity management within the server based data exchange facility, wherein the plurality of computer identities for the first user is maintained as a single federated identity across the plurality of data management sites for the sharing of computer data content on the at least one data storage node.

Clause 67. The method of clause 66, wherein the plurality of computer identities of the first user are provided by a plurality of identity providers.

Clause 68. The method of clause 67, wherein at least one of the plurality of identity providers is one of the plurality of organizational entities.

Clause 69. The method of clause 66, wherein each of the plurality of computer identities is associated with a corresponding access authentication procedure.

Clause 70. The method of clause 69, wherein the identity facility provides a single federated access authentication procedure that unifies each corresponding access authentication procedure of the plurality of computer identities.

Clause 71. The method of clause 70, wherein the identity facility produces security authentications that are digitally signed statements of authenticated identity for each corresponding access authentication procedure.

Clause 72. The method of clause 67, wherein the identity facility establishes a trust relationship with the plurality of identity providers in the establishment of the single federated identity.

Clause 73. The method of clause 66, wherein the identity facility further comprises an identity store that provides a virtual content node service used to manage identity metadata for each of the plurality of computer identities.

Clause 74. The method of clause 67, wherein the identity metadata comprises personally identifiable information.

Clause 75. The method of clause 66, wherein the plurality of computer identities is synchronized across the plurality of data management sites in the maintaining of the single federated identity.

Clause 76. A method comprising: establishing, by a secure exchange server hosted by an intermediate business entity, a user login data authentication procedure that allows one or more users through at least one client computing device to access the secure exchange server, wherein at least one of the one or more users is of a second business entity, wherein communications between the secure exchange server and each of the one or more users is through a communications network; storing, by the secure exchange server, user login authentication data for the at least one user of the second business entity; receiving computer data content from at least one user of a third business entity; receiving from at least one user of the third business entity an indication of permission for the at least one user of the second business entity to access the computer data content through a designated mobile computing device equipped with a touch responsive display, wherein the indication of permission includes a content viewing policy that permits viewing of the computer data content on the display of the designated mobile computing device only when at least one finger of the at least one user of the second business entity is in contact with the touch responsive display; and by the secure exchange server, granting access to the computer data content to the at least one user of the second business entity on the designated mobile computing device through a secure viewing facility when the secure exchange server receives the user login authentication data for the at least one user of the second business entity, wherein the secure viewing facility restricts viewing of the computer data content as presented by the designated mobile computing device to only the authenticated at least one user of the second business entity on the designated mobile computing device, wherein the granted access is in accordance with the content viewing policy.

Clause 77. The method of clause 76, wherein the granted access that permits viewing of the computer data content on the display of the designated mobile computing device is facilitated through digital rights management encoding provided with the computer data content.

Clause 78. The method of clause 76, wherein the granted access that permits viewing of the computer data content on the display of the designated mobile computing device is facilitated through the secure viewing facility operating locally on the designated mobile computing device.

Clause 79. The method of clause 76, further wherein the granted access that permits viewing of the computer data content on the display of the designated mobile computing device occurs after the at least one user of the second business entity enters a user identifier on the designated mobile computing device.

Clause 80. The method of clause 79, wherein after the user identifier is entered on the designated mobile computing device, the at least one user of the second business entity is enabled to view the computer data content on the display of the designated mobile computing device only when at least one finger is in contact with the display and needs to re-enter the user identifier if the at least one finger is subsequently out of touch with the display in order to re-view the computer data content on the display.

Clause 81. The method of clause 76, further wherein a fingerprint recognition facility on the designated mobile computing device verifies the identity of the at least one user of the second business entity before the computer data content is viewable by the at least one user of the second business entity.

Clause 82. The method of clause 81, wherein the fingerprint recognition facility continually verifies the identity of the at least one user of the second business entity while the at least one finger is in contact with the display for viewing of the computer data content.

Clause 83. The method of clause 82, wherein if the at least one user of the second business entity discontinues contact with the display, the viewing of the computer data content is obfuscated until contact with the display by the at least one user of the second business entity is reestablished, and wherein the fingerprint recognition facility verifies the identity of the at least one user of the second business entity during the reestablishment of contact with the display.

Clause 84. The method of clause 76, wherein the computer data content is viewable for a predetermined period of time after the at least one user of the second business entity discontinues contact with the display.

Clause 85. The method of clause 76, further comprising presenting a list of computer content items on the display, and wherein if an item on the list is pressed and held, at least one of a preview or an abstract of the associated computer content item is displayed while the at least one user of the second business entity continues to make contact with the display.

Clause 86. The method of clause 85, wherein a further action by the at least one user of the second business entity opens the full computer content of the associated computer content item.

Clause 87. The method of clause 86, wherein the further action comprises sliding the item from the list with the at least one finger in contact with the display.

Clause 88. A method comprising: establishing, by a secure exchange server hosted by an intermediate business entity, a user login data authentication procedure that allows each of a plurality of users, including a user of a second business entity and a user of a third business entity, through at least one corresponding client computing device, to access the secure exchange server, wherein communications between the secure exchange server and each of the plurality of users is through a communications network; storing, by the secure exchange server, data relating to a user login authentication for the user of a second business entity and data relating to a user login authentication for the user of the third business entity; receiving computer data content from the user of the third business entity; receiving from the user of the third business entity an indication of permission for the user of the second business entity to access the received computer data content; receiving a request to access the computer data content by the user of the second business entity; by the secure exchange server, determining a level of access authentication for access to the received computer data content for the user of the second business entity based on an event condition related to a current state of the client computing device of the user of the second business entity at the time of the access request; and by the secure exchange server, adjusting a level of access authentication based on the event condition, presenting the user of the second business entity the adjusted level of access authentication, and granting access to the received computer data content when the secure exchange server receives the adjusted level of access authentication.

Clause 89. The method of clause 88, wherein the event condition is a computing device characteristic.

Clause 90. The method of clause 89, wherein the computing device characteristic is that the computing device is a mobile device.

Clause 91. The method of clause 89, wherein the computing device characteristic is that the computing device is a computing device that is for personal use.

Clause 92. The method of clause 89, wherein the computing device characteristic is that the computing device is not connected to a secure communications network.

Clause 93. The method of clause 88, wherein the event condition is that the access request is made at a time that is determined to be inside or outside of an acceptable range of time.

Clause 94. The method of clause 88, wherein the event condition is whether a geographical location of the client computing device of the user of the second business entity is inside or outside a resident country of the second business entity.

Clause 95. The method of clause 94, wherein the geographical location of the client computing device is determined based on at least one of a GPS location of the computing device and a network IP address through which the access request is made.

Clause 96. The method of clause 88, wherein the event condition comprises the occurrence of multiple content viewing access requests from the computing device of the user of the second business entity.

Clause 97. The method of clause 88, wherein the event condition is a determination that the user of the second business entity has changed client computing devices.

Clause 98. The method of clause 97, wherein the determination that the user of the second business entity has changed client computing devices is based on a corresponding change in at least one of a network IP address, a browser fingerprint profile, and a hardware ID.

Clause 99. The method of clause 88, wherein the adjusted level of access authentication comprises presenting the user of the second business entity with additional authentication challenges when the event condition indicates an increased level of access risk.

Clause 100. The method of clause 88, wherein the adjusted level of access authentication comprises a change in the level of security of the access authentication.

Clause 101. A system for providing secure computer content access through multifactor authentication on a mobile computing device, the system comprising: a multifactor authentication facility on a mobile computing device, the mobile computing device comprising a memory and a mobile device communication facility adapted to wirelessly interface with at least one external communication facility of a plurality of external communication facilities, wherein the at least one external communication facility is adapted to transmit a unique transmitter identifier that matches a stored unique transmitter identifier in the memory of the mobile computing device, wherein the multifactor authentication facility monitors for connectivity between the mobile device communication facility and the at least one external communication facility, and monitors for the transmission of the unique transmitter identifier, and if a communication connection is detected between the mobile device communication facility and the at least one external communication facility, and the transmitted unique transmitter identifier matches the stored unique transmitter identifier in the memory of the mobile computing device, then a digital content stored in the memory of the mobile computer device will be enabled for access if at least one additional authentication factor is provided, the at least one additional authentication factor selected from the group including: (i) a user identifier entered into the mobile computing device, (ii) a user password entered into the mobile computing device, (iii) use of a digital key stored in the memory of the mobile computing device, which is associated with access permission to the digital content, and (iv) a determination that the distance between the mobile device communication facility and the at least one external communication facility is within a predetermined range value.

Clause 102. The system of clause 101, wherein the mobile device communication facility exchanges data over short distances.

Clause 103. The system of clause 102, wherein the mobile device communication facility utilizes at least one of the Bluetooth communication standard and a WiFi communication standard.

Clause 104. The system of clause 101, wherein the stored unique transmitter identifier is stored in the mobile computing device from a pairing procedure implemented between the mobile computing device and the at least one external communication facility.

Clause 105. The system of clause 101, wherein the digital key is an encryption key and the digital content is an encrypted digital content where the encryption key is used to decrypt the encrypted digital content, wherein the additional authentication factor is the encryption key stored in the memory of the mobile computing device, and when connectivity is detected between the mobile device communication facility and the at least one external communication facility, the multifactor authentication facility decrypts the encrypted digital content and provides access to the digital content.

Clause 106. The system of clause 101, wherein the additional authentication factor is the digital key stored in the memory, wherein access is provided to the digital content when the multifactor authentication facility confirms the presence of both the digital key stored in the memory and a communication connection between the mobile device communication facility and the at least one external communications facility.

Clause 107. The system of clause 101, wherein the additional authentication factor is the user identifier, wherein access is provided to the digital content when the user of the mobile computing device enters the user identifier into the mobile computing device while the mobile computing device is connected to the at least one external communications facility.

Clause 108. The system of clause 101, wherein the additional authentication factor is the determined range between the mobile device communication facility and the at least one external communication facility within the predetermined range value, wherein the predetermined range value is stored in the memory of the mobile computing device, wherein the multifactor authentication facility provides access to the digital content when a communication connection is detected between the mobile device communication facility and the at least one external communication facility, and the determined range between the mobile device communication facility and the at least one external communication facility is within the predetermined range value as stored in the memory of the mobile computing device.

Clause 109. The system of clause 108, wherein the predetermined range value is from a known location of the mobile device communication facility.

Clause 110. The system of clause 101, wherein the mobile computing device is adapted to connect through a network to a secure content management facility that manages access to the digital content when the mobile computing device is communicatively connected to the secure content management facility, and when the mobile computing device is not connected to the secure content management facility, then access to the digital content is provided through the multifactor authentication facility on the mobile computing device.

Clause 111. The system of clause 101, wherein the digital key stored in memory was transmitted from the at least one external communication facility when the communication connection is made.

Clause 112. The system of clause 111, wherein the digital key is deleted from memory when the communication connection is lost.

Clause 113. The system of clause 101, wherein the at least one external communication facility is integrated with a user identification card corresponding to the user of the mobile computing device.

Clause 114. The system of clause 113, wherein the user identification card is an employee identification card.

Clause 115. The system of clause 101, wherein the mobile computing device is a mobile smart phone, and the multifactor authentication facility is an application that operates on the mobile smart phone.

Clause 116. The system of clause 1, wherein the at least one external communication facility operates as a transmitter beacon that transmits the unique transmitter identifier.

Clause 117. A method comprising: establishing, by a secure exchange server hosted by an intermediate business entity, a user login data authentication procedure that allows one or more users through at least one client computing device to access the secure exchange server, wherein communications between the secure exchange server and each of the one or more users is through a communications network, wherein the one or more users comprises a user of a second business entity communicating with the secure exchange server through a second computing device; providing, by the secure exchange server, a design process facility adapted to facilitate interaction between the secure exchange server and the user of the second business entity communicating through the second computing device to develop a customized graphical interface for the user of the second business entity, the interaction comprising: i. a business discovery stage to determine business goals of the second business entity related to development of the customized graphical interface, ii. a design discovery stage to determine a visual design for the customized graphic interface, iii. a design implementation stage to produce an iterative developmental implementation for the customizable graphical user interface, and iv. a design resolution stage to implement a functional customized graphical interface for use in interfacing between the secure exchange server and the second computer device; receiving a request from the second computing device to develop a customized graphical interface; requesting and receiving requirement parameters from the second computing device for the business discovery stage and design discovery stage for development of the customized graphical interface; iterating, between the secure exchange server and the second computing device, a user developmental implementation of the customized graphical interface; and implementing an operable customized graphical interface for the second computing device to interface with the secure exchange server.

Clause 118. The method of clause 117, wherein a data structure with associated metadata is developed to capture the relevant parameters of received requirement parameters.

Clause 119. The method of clause 117, wherein the business discovery stage comprises determining at least one of fundraising goals and transactional goals.

Clause 120. The method of clause 117, wherein the business discovery stage targets a user persona.

Clause 121. The method of clause 120, wherein the user persona is developed based on a contact list on the second computing device.

Clause 122. The method of clause 117, wherein the design discovery stage comprises at least one of identifying corresponding copywriting tasks, conducting user research regarding usability and impressions, and validating design concepts.

Clause 123. The method of clause 117, wherein the design implementation stage comprises at least one of prototyping, performing copywriting tasks, defining styles, generating guides, and usability testing.

Clause 124. The method of clause 117, wherein the design resolution stage comprises the development of at least one of a web user interface and a mobile device user interface.

Clause 125. The method of clause 118, wherein the design process facility utilizes a single-page application design process to develop a customized graphical interface that is accommodated on a single web page with all necessary software code.

While the invention has been described in connection with certain preferred embodiments, other embodiments would be understood by one of ordinary skill in the art and are encompassed herein. The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, facilities and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software facilities, or as facilities that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a computer that may be a dedicated computing device, specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
   establishing, by a secure exchange server hosted by an intermediate business entity, a user login data authentication procedure that allows each of a plurality of users through at least one corresponding client computing device to access the secure exchange server, wherein communications between the secure exchange server and each of the plurality of users is through a communications network, wherein the plurality of users comprises a user of a second business entity and at least one anonymous user;

storing, by the secure exchange server, data relating to a user login authentication for the user of a second business entity;

receiving computer data content from the user of the second business entity;

receiving from the user of the second business entity an indication of permission for the at least one anonymous user to access the computer data content through an anonymous information rights management (IRM) facility hosted by the intermediate business entity, wherein the anonymous IRM facility limits the retention of information about the at least one anonymous user, and wherein the indication of permission comprises at least one anonymous access condition;

receiving a request to access the computer data content by the at least one anonymous user; and granting, by the secure exchange server, access to the computer data content, through the anonymous IRM facility, to the at least one anonymous user, wherein retention of information about the at least one anonymous user is limited and the access is granted based on the at least one anonymous access condition.

2. The method of claim 1, wherein the at least one anonymous access condition is that the at least one anonymous user is a user of a third business entity, wherein the third business entity is specified by the user of the second business entity in the indication of permission.

3. The method of claim 2, wherein the user of the second business entity is provided access to information comprising the identity of the third business entity but not the identity of the at least one anonymous user.

4. The method of claim 1, wherein the at least one anonymous access condition is that the at least one anonymous user is a user of a computer domain specified by the user of the second business entity in the indication of permission.

5. The method of claim 1, wherein the at least one anonymous access condition is that the at least one anonymous user is a user of a geographic region specified by the user of the second business entity in the indication of permission.

6. The method of claim 1, further comprising collecting metadata, by the anonymous IRM facility, relating to access of the computer data content.

7. The method of claim 6, wherein the metadata is at least one of a domain from which the computer data content was accessed and a location from which the computer data content was accessed.

8. The method of claim 6, wherein the metadata comprises data regarding where the computer data content was shared after the computer data content was accessed.

9. The method of claim 6, wherein the metadata comprises data regarding when the computer data content was accessed.

10. A method comprising:

establishing, by a secure exchange server hosted by an intermediate business entity, a user login data authentication procedure that allows one or more users, including a user of a second business entity, through at least one client computing device to access the secure exchange server, wherein communications between the secure exchange server and each of the one or more users is through a communications network;

providing, by the secure exchange server, an encryption management facility, wherein the encryption management facility is adapted to adjustably configure encryption services based on a selection criteria provided by the user of the second business entity for selection of at least one of:
  i. secure exchange server side encryption, wherein computer data content is transmitted from the second business entity to the secure exchange server to be encrypted by the secure exchange server, and
  ii. business entity side encryption, wherein computer data content is transmitted from the second business entity to the secure exchange server as encrypted data that was encrypted by the second business entity before it was transmitted;

receiving a selection criteria from the user of the second business entity, wherein the selection criteria establishes the selection of at least one of secure exchange server side encryption and business entity side encryption for a computer data content to be stored on the secure exchange server; and receiving computer data content from the user of the second business entity, wherein the computer data content is encrypted by the selected mode of encryption based on the received selection criteria.

11. A method comprising:

establishing, by a secure exchange server hosted by an intermediate business entity, a user login data authentication procedure that allows one or more users through at least one client computing device to access the secure exchange server, wherein communications between the secure exchange server and each of the one or more users is through a communications network, wherein the one or more users comprises a user of a second business entity;

providing, by the secure exchange server, a data chunking facility adapted to receive and segment a computer data content transmitted from a client computing device of the one or more users, wherein the received computer data content is stored as a plurality of encrypted computer data content segments;

receiving computer data content from the user of the second business entity, wherein the received computer data content is segmented and each computer data content segment is separately encrypted to form a plurality of encrypted computer data content segments; and storing, by the secure exchange server, the plurality of encrypted computer data content segments.

12. A method comprising:

establishing, by a secure exchange server hosted by an intermediate business entity, a user login data authentication procedure that allows one or more users through at least one client computing device to access the secure exchange server, wherein communications between the secure exchange server and each of the one or more users is through a communications network, wherein the one or more users comprises a user of a second business entity communicating with the secure exchange server through a second computing device;

providing, by the secure exchange server, an asynchronous notification upload messaging facility adapted to:
  i. receive and process computer data content and a computer message transmitted together as a data message composite content from a client computing device of the one or more users, wherein the computer message comprises a data processing preference, and ii. asynchronously communicate to the client computing device of the one or more users a processing notification related to the processing of the data message composite content;

receiving a data message composite upload from the second computing device comprising computer data content and a computer message comprising a data processing preference;

processing, by the secure exchange server, the received data message composite upload based on the data processing preference; and notifying, by the secure exchange server, the second computing device of a processing state of the received data message composite upload, wherein the notification is provided asynchronously to the processing of the data messaging composite upload.

13. A method comprising:

establishing, by a secure exchange server hosted by an intermediate business entity, a user login data authentication procedure that allows each of a plurality of users, including a user of a second business entity and a user of a third business entity, through at least one corresponding client computing device, to access the secure exchange server, wherein communications between the secure exchange server and each of the plurality of users is through a communications network;

storing, by the secure exchange server, data relating to a user login authentication for the user of a second business entity and data relating to a user login authentication for the user of the third business entity;

receiving computer data content from the user of the third business entity;

receiving from the user of the third business entity an indication of permission for the user of the second business entity to access the received computer data content;

receiving a request to access the computer data content by the user of the second business entity;

by the secure exchange server, determining a level of access authentication for access to the received computer data content for the user of the second business entity based on an event condition related to a current state of the client computing device of the user of the second business entity at the time of the access request; and by the secure exchange server, adjusting a level of access authentication based on the event condition, presenting the user of the second business entity the adjusted level of access authentication, and granting access to the received computer data content when the secure exchange server receives the adjusted level of access authentication.

* * * * *